United States Patent
Geens et al.

(10) Patent No.: US 11,892,696 B2
(45) Date of Patent: *Feb. 6, 2024

(54) CABLE SEALANT ARRANGEMENT WITH PORT SIZE REDUCER

(71) Applicant: COMMSCOPE TECHNOLOGIES LLC, Hickory, NC (US)

(72) Inventors: Johan Geens, Bunsbeek (BE); Philippe Coenegracht, Hasselt (BE); Pieter Doultremont, Kermt-Hasselt (BE); William B. Bryan, Fuquay-Varina, NC (US); William Alan Carrico, Raleigh, NC (US); Eddy Luc Cams, Bilzen (BE); Erik David Bishop, Fuquay-Varina, NC (US); Thomas Ross Marmon, Angier, NC (US); Bart Mattie Claessens, Hasselt (BE); Alan Armando Garcia Gonzalez, Chihuahua (MX); Roel Modest Willy Bryon, Kessel-Lo (BE); Roger Alaerts, Aarschot (BE); Conny Van De Velde, Herselt (BE); Jos Brants, Korbeek-lo (BE); El Moïz Mohammed Michel Ghammam, Brussels (BE); Jozef Christiaan Mathieu Versleegers, Bree (BE); Marc Eugène Willem Bervoets, Hasselt (BE); Barry Wayne Allen, Siler City, NC (US); Maarten Aerts, Kessel-Lo (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,811

(22) Filed: Aug. 22, 2022

(65) Prior Publication Data

US 2023/0050734 A1  Feb. 16, 2023

Related U.S. Application Data

(63) Continuation of application No. 16/969,890, filed as application No. PCT/US2019/017904 on Feb. 13, 2019, now Pat. No. 11,422,327.

(Continued)

(51) Int. Cl.
*G02B 6/36* (2006.01)
*G02B 6/44* (2006.01)
*G02B 6/38* (2006.01)

(52) U.S. Cl.
CPC ......... *G02B 6/4444* (2013.01); *G02B 6/3897* (2013.01); *G02B 6/4452* (2013.01)

(58) Field of Classification Search
CPC .. G02B 6/4444; G02B 6/3897; G02B 6/4452; G02B 6/4441; G02B 6/36
See application file for complete search history.

(56) References Cited

U.S. PATENT DOCUMENTS 5,775,702 A  7/1998 Laeremans et al.
6,573,455 B1  6/2003 Radelet
(Continued)

FOREIGN PATENT DOCUMENTS

EP  1 127 396 A1  8/2001
EP  2 523 286 A1  11/2012
(Continued)

OTHER PUBLICATIONS

Extended European Search Report for European Patent Application No. 19754601.3 dated Oct. 15, 2021, 11 pages.
(Continued)

*Primary Examiner* — Jennifer Doan
(74) *Attorney, Agent, or Firm* — Merchant & Gould P.C.

(57) ABSTRACT

The present disclosure relates to a sealed closure having modular components, enhanced cable sealing, modular connection interfaces, enhanced cable anchoring and enhanced fiber management.

29 Claims, 146 Drawing Sheets

Related U.S. Application Data

(60) Provisional application No. 62/630,155, filed on Feb. 13, 2018, provisional application No. 62/661,574, filed on Apr. 23, 2018, provisional application No. 62/683,931, filed on Jun. 12, 2018, provisional application No. 62/698,053, filed on Jul. 14, 2018, provisional application No. 62/748,039, filed on Oct. 19, 2018, provisional application No. 62/804,597, filed on Feb. 12, 2019.

(56) References Cited

U.S. PATENT DOCUMENTS

| | | |
|---|---|---|
| 6,802,512 B2 | 10/2004 | Muller et al. |
| 7,349,616 B1* | 3/2008 | Castonguay ........... G02B 6/445 398/67 |
| 7,603,018 B2 | 10/2009 | Mullaney et al. |
| 8,189,983 B2 | 5/2012 | Brunet et al. |
| 8,213,760 B2 | 7/2012 | Rudenick et al. |
| 8,634,688 B2 | 1/2014 | Bryon et al. |
| 8,642,891 B2 | 2/2014 | Berghmans et al. |
| 8,989,547 B2 | 3/2015 | Brower et al. |
| 9,442,265 B2 | 9/2016 | Hill et al. |
| 9,837,754 B2 | 12/2017 | Coenegracht et al. |
| 11,422,327 B2* | 8/2022 | Geens ................ G02B 6/4444 |
| 2011/0255837 A1 | 10/2011 | Solheid et al. |
| 2017/0033544 A1 | 2/2017 | Coenegracht et al. |
| 2020/0192043 A1 | 6/2020 | Geens et al. |

FOREIGN PATENT DOCUMENTS

| | | |
|---|---|---|
| EP | 2 930 795 A1 | 10/2015 |
| WO | 2007/039585 A1 | 4/2007 |
| WO | 2009/029259 A1 | 3/2009 |
| WO | 2012/007904 A1 | 1/2012 |
| WO | 2012/007905 A1 | 1/2012 |
| WO | 2017/046187 A2 | 3/2017 |
| WO | 2018/158362 A1 | 9/2018 |
| WO | 2019/241230 A1 | 12/2019 |

OTHER PUBLICATIONS

International Search Report and Written Opinion of the International Searching Authority for International Patent Application No. PCT/US2019/017904 dated Jun. 19, 2019, 18 pages.

"OFDC—A4 Outdoor fiber distribution closure", EnLighten FTTH Solutions, Tyco Electronics (Shanghai) Co., Ltd., 2 pages (Mar. 2010).

"OFDC—C12 Outdoor Fiber Distribution Closure", CommScope, 2 pages (2017).

* cited by examiner

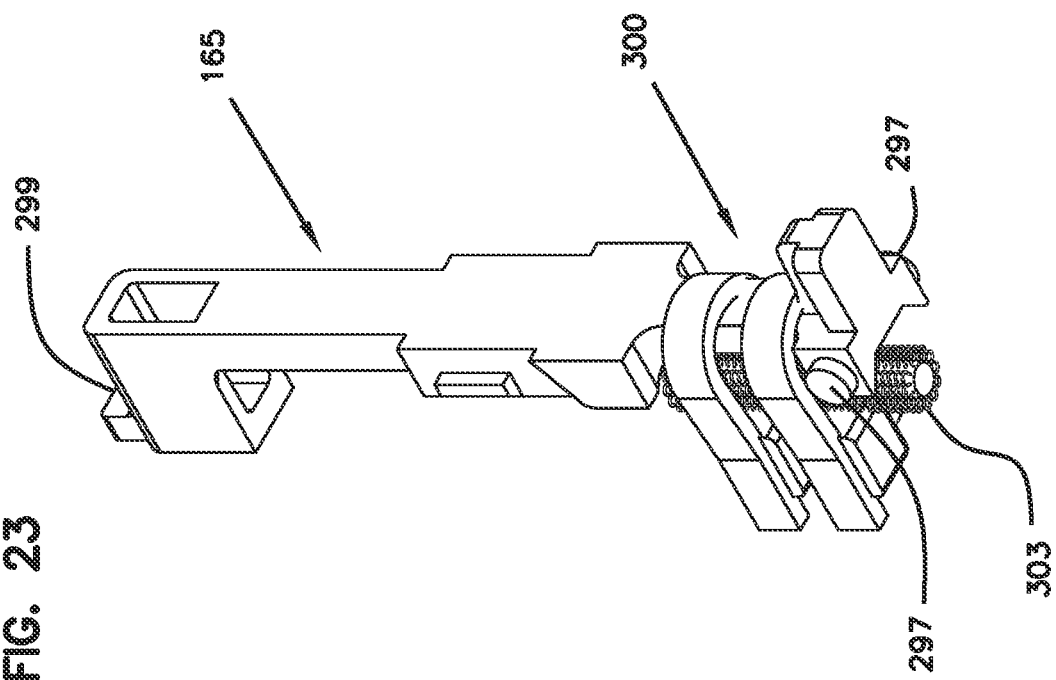
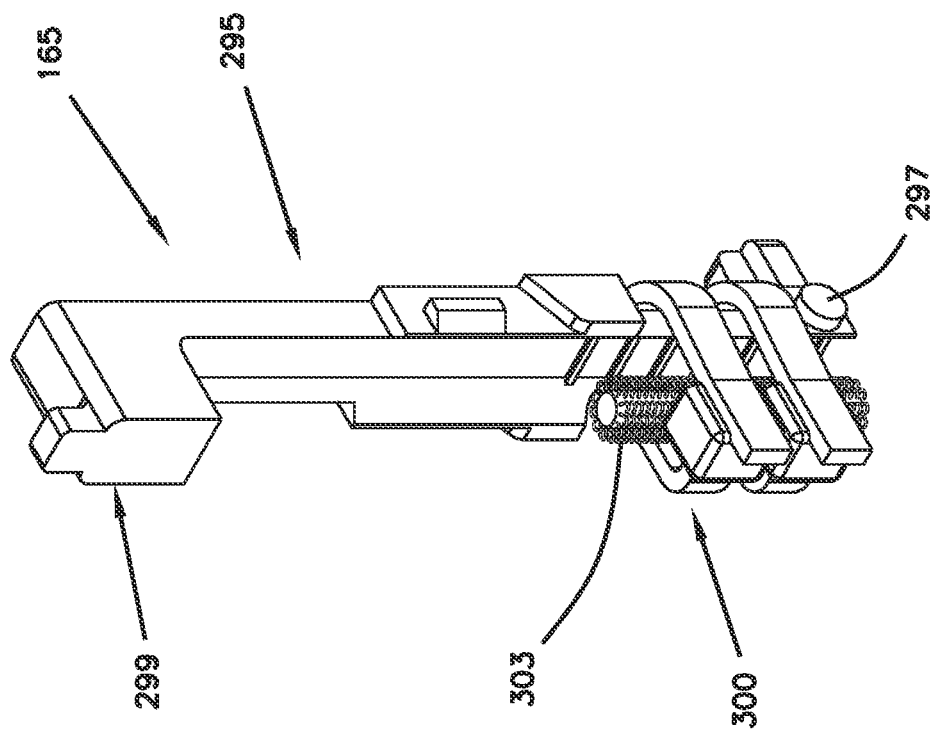

CABLE SEALANT ARRANGEMENT WITH PORT SIZE REDUCER

CROSS-REFERENCE TO RELATED APPLICATIONS

This application is a Continuation of U.S. patent application Ser. No. 16/969,890, filed on Aug. 13, 2020, now U.S. Pat. No. 11,422,327, which is a National Stage Application of PCT/US2019/017904, filed on Feb. 13, 2019, which claims the benefit of U.S. Patent Application Ser. No. 62/630,155, filed on Feb. 13, 2018, and claims the benefit of U.S. Patent Application Ser. No. 62/661,574, filed on Apr. 23, 2018, and claims the benefit of U.S. Patent Application Ser. No. 62/683,931, filed on Jun. 12, 2018, and claims the benefit of U.S. Patent Application Ser. No. 62/698,053, filed on Jul. 14, 2018, and claims the benefit of U.S. Patent Application Ser. No. 62/748,039, filed on Oct. 19, 2018, and claims the benefit of U.S. Patent Application Ser. No. 62/804,597, filed on Feb. 12, 2019, the disclosures of which are incorporated herein by reference in their entireties. To the extent appropriate, a claim of priority is made to each of the above disclosed applications.

BACKGROUND

As demand for telecommunications increases, networks are being extended in more and more areas. In facilities such as single family homes, multiple dwelling units (MDU's), apartments, condominiums, businesses, etc., boxes are used to provide subscriber access points to a telecommunications network. Cables are also used to interconnect the subscriber access points provided by boxes with subscribers at subscriber locations (e.g., at each residence).

Various boxes for telecommunications equipment are known. The boxes used for subscriber access points can have various forms depending on such factors as the environment, the space requirements for containing telecommunications equipment, and the type of technician access needed for the telecommunications equipment. These and other considerations are related to box design and usability.

Optical fiber splice closures (which are sometimes called splice cases or enclosures) generally include a casing which provides a closed space for containing splices between optical fibers. Such closures normally also contain excess lengths of the spliced optical fibers. These excess lengths of optical fibers are normally used to carry out the fiber splicing operation, which is generally performed using splicing equipment next to the closure. Excess fiber also may be used to facilitate organization the fiber splices in the closure. Optical fiber splice closures normally include one or more trays to store the splices in an organized manner. The excess optical fiber associated with the organized splices is stored in the closure in such a way that its bend radius does not fall below a minimum bend radius of the fiber (i.e., the minimum safe radius at which the fiber may be bent without causing damage to the fiber or causing signal loss in the fiber).

There is a continued need for improvement in splice closure designs.

SUMMARY

Some aspects of the disclosure are directed to a telecommunications enclosure including a management unit having a support infrastructure and a rear tray. The support infrastructure defines an adapter mounting location and a splice mounting location. In certain examples, splice components can be latched to the support infrastructure at the splice mounting location. In certain examples, the support infrastructure also provides storage for excess fiber length. In certain examples, the management unit includes a pivotable rear tray to hold the excess fiber length. In certain examples, the rear tray inhibits access to the splice mounting location.

One aspect of the present disclosure relates to a robust and reliable pivot interlock for a fiber management tray. In one example, the pivot interlock can have an integrated detent arrangement for holding the fiber management tray at a desired pivot location. In one example, the pivot interlock can have a configuration that is easy to interlock and that allows the fiber management tray to be smoothly pivoted between pivot positions. In one example, the pivot interlock can include a pivot detent portion and a pivot guide portion.

Another aspect of the present disclosure relates to an optical fiber management device including a tray mount and a fiber management tray that are coupled together by a pivot interlock that when interlocked couples the tray mount and the fiber management tray together by a pivotal connection that allows the fiber management tray to pivot relative to the tray mount between a first pivot position and a second pivot position.

The pivot interlock includes a detent pivot arrangement and guide pivot arrangement. The detent pivot arrangement includes a detent pivot pin portion integrated with one of the tray mount and the fiber management tray, and also includes a detent receptacle integrated with the other of the tray mount and the fiber management tray. The detent receptacle is configured for receiving the detent pivot portion when the pivot interlock is interlocked. The detent pivot pin portion includes a plurality of pin flat surfaces positioned circumferentially about the detent pivot pin portion, and the detent receptacle defining a plurality of receptacle flat surfaces.

The guide pivot arrangement includes a cylindrical pivot pin portion integrated with one of the tray mount and the fiber management tray, and also includes a guide receptacle integrated with the other of the tray mount and the fiber management tray. The guide receptacle is configured for receiving the cylindrical pivot pin portion when the pivot interlock is interlocked. The guide receptacle has an open end positioned opposite from a closed end. The open end is configured to allow the cylindrical pivot pin portion to be inserted into the guide receptacle, and the closed end includes a guide surface having a concave curvature that curves along a convex curvature of the cylindrical pivot pin portion when the pivot interlock is interlocked.

The fiber management tray pivots between the first and second pivot positions relative to the tray mount about a pivot axis. When the pivot interlock is interlocked, the pivot axis extends axially though the cylindrical pivot pin portion, the detent pivot pin portion, the guide receptacle and the detent receptacle. As the fiber management tray is pivoted between the first pivot position and the second pivot position, at least some of the pin flat surfaces and the receptacle flat surfaces engage one another to cause the detent receptacle to elastically deform and the cylindrical pin portion concurrently pivots within the guide receptacle. An interaction between the pin flat surfaces and the receptacle flat surfaces provides a tray retention force for retaining the fiber management tray in the first and second pivot positions.

Teachings of the present disclosure relate to a mechanical connection interface that can allow for simple and reliable connecting and releasing of optical components. In certain examples, the connection interface can be easily interlocked in an intuitive manner. In certain examples, the connection interface is configured to allow a latch of the interface to be flexed down from a latching position to an unlatched position by laterally moving a component desired to be latched, as compared to requiring the latch to be directly pressed down. In certain examples, the mechanical interface allows a first component desired to be coupled to a second component to be loaded into a flush configuration relative to the second component prior to any latch or latches being flexed or deflected. This allows for more intuitive and easier coupling of the interface. In certain examples, mechanical interfaces in accordance with the principles of the present disclosure can provide actuation of a latch by direct sliding or lateral movement relative to the latch. This allows the latch to be flexed and the component to move to an interlocked position in one step, as compared to requiring the latch to be initially flexed prior to sliding the component into a latched position.

Aspects of the present disclosure relates to a mechanical connection interface for securing first and second structural elements together. In a preferred example, the structural elements are parts (e.g., pieces, components, members, etc.) of a fiber optic telecommunications system, unit or device. In one example, the first structural element is a holder for holding optical components such as passive optical splitters, wavelength division multiplexers, optical splice protectors or the like, and the second structural element is a structure such as a tray, bracket, flange, shelf, panel, housing wall, housing cover, housing base, or the like.

Another aspect of the present disclosure relates to a mechanical connection interface adapted for coupling together first and second structural elements. The mechanical interface includes first and second connection interface arrangements that are configured to be interlocked with one another to couple the first and second structural elements together. Preferably, the first and second connection interfaces can also be selectively disengaged from one another to allow the first and second structural elements to be decoupled from each other. The first connection interface arrangement defines an attachment opening defining a groove portion and an enlarged portion. The groove portion has a length that extends along a first reference line and a first width that extends perpendicular to the first reference line. The enlarged portion defines a second width perpendicular with respect to the first reference line that is larger than the first width. The first connection interface arrangement further including a flexible cantilever latch positioned within the enlarged portion of the attachment opening. The flexible cantilever latch has a length that extends along the first reference line. The flexible cantilever latch includes a base end and a free end. The enlarged portion of the attachment opening includes an interlock receiving portion defined between the free end of the flexible cantilever latch and the groove portion of the attachment opening. The free end of the flexible cantilever latch defines a stop surface, and the flexible cantilever latch defines a stop receptacle. The second connection interface arrangement includes an interlock and a stop aligned along a second reference line. The stop includes a stop surface. The interlock defines a third width that extends perpendicular to the second reference line. The third width is smaller than the second width and larger than the first width. At least one of the stop receptacle and the stop includes a ramp surface. The second connection interface arrangement is connected to the first connection interface arrangement by orienting the second connection interface arrangement in a first position relative to the first connection interface arrangement in which: a) the first and second reference axes are aligned; b) the interlock is received within interlock receiving portion of the enlarged portion of the attachment opening; and c) the first stop is positioned within the stop receptacle of the of the flexible cantilever latch; and then sliding the second connection interface arrangement along the aligned first and second reference axes from the first position to a second position in which: a) the first interlock is received within and interlocked with the groove portion of the attachment opening; b) the stop is positioned within the interlock receiving portion of the enlarged portion of the first attachment opening with the stop surface of the stop opposing the stop surface at the free end of the flexible cantilever latch; c) the interlock is received within and interlocked with the groove portion of the second attachment opening. As the second connection interface arrangement is slid from the first position to the second position, the ramp surface causes the flexible cantilever latch to deflect from a latching position to an unlatched position. After the stop moves past the free end of the flexible cantilever latch, the flexible cantilever latch elastically returns from the unlatched position to the latching position.

Another aspect of the present disclosure relates to a sealed enclosure including a housing defining an opening and a cable sealing arrangement positioned within the opening. The cable sealing arrangement engages the housing to seal the opening. The cable sealing arrangement includes a block of gel defining a total gel volume. The cable sealing arrangement includes at least first and second gel sections which coincide with at least a portion of the block of gel. The cable sealing arrangement includes a cable pass-through location defined at an interface between the first and second gel sections. The first and second gel sections are configured to form seals about cables routed axially through the cable pass-through location. The gel volume has a first outer boundary which is the outer boundary of the block of gel when the gel block is not sealing about a cable or cables. Open space is provided to accommodate deformation of the block of gel when the gel is pressurized with one or more cables routed through the cable pass-through location. The open space has a volume that is at least 5 percent as large as the total gel volume.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 22 is a perspective view of another cable anchor in accordance with the principles of the present disclosure;

FIG. 23 is another perspective view of the cable anchor of FIG. 22;

FIG. 120 is another perspective view of the exterior cable anchoring component of FIG. 119;

FIG. 121 depicts another telecommunications device in accordance with the principles of the present disclosure;

FIG. 122 shows the telecommunications device of FIG. 121 with a cover of the device removed from a base of the device so as to expose an internal insert unit;

FIG. 123 shows the telecommunications device of FIG. 121 with the cover and the base exploded from the insert unit;

FIG. 124 is a bottom plan view showing an interior of the cover of the telecommunications device of FIG. 121;

FIG. 125 is a bottom perspective view showing the interior of the cover of FIG. 124;

FIG. 126 is a top plan view showing an interior of the base of the telecommunications device of FIG. 121;

FIG. 127 is a top perspective view showing the interior of the base of FIG. 126;

FIG. 128 is a perspective view showing a cable anchoring and sealant containment frame that is part of the insert unit of the telecommunications device of FIG. 121;

FIG. 129 is another perspective view of the cable anchoring and sealant containment frame of FIG. 128;

FIG. 130 is a top view of the cable anchoring and sealant containment frame of FIG. 128;

FIG. 131 is a bottom view of the cable anchoring and sealant containment frame of FIG. 128;

Figure 121:
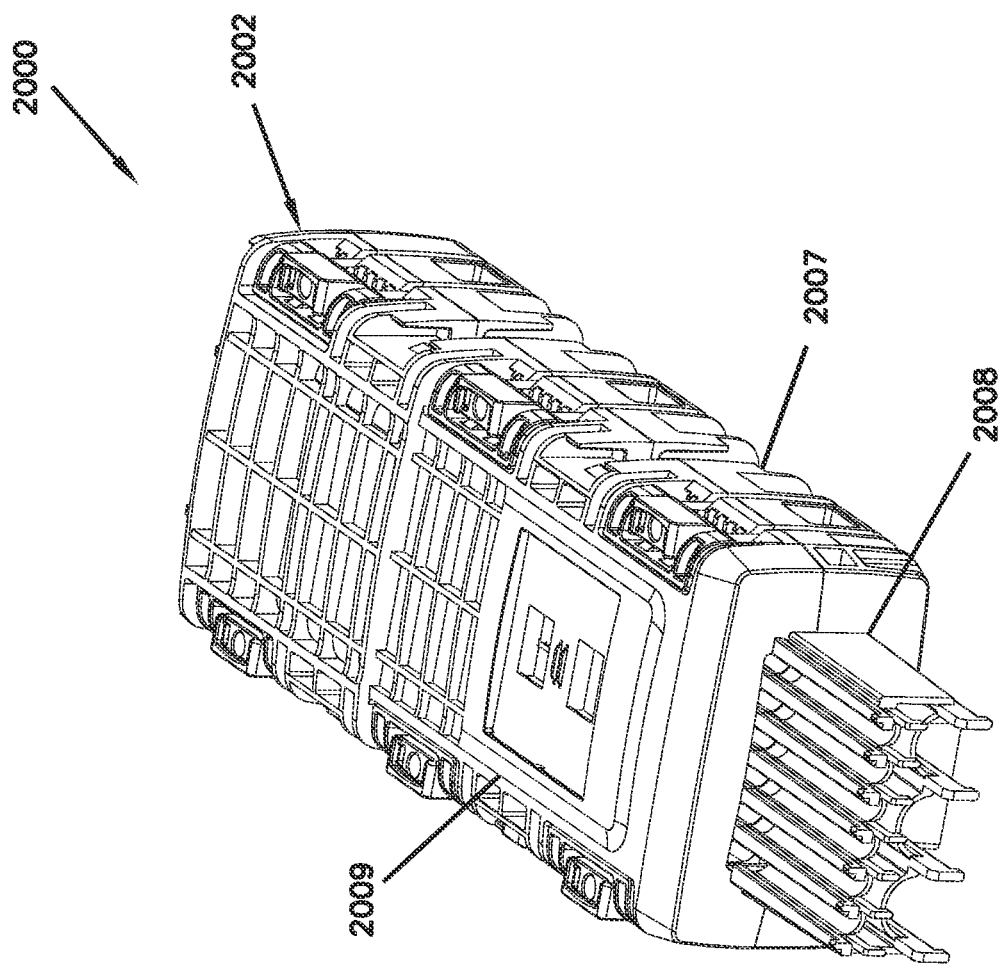
Figure 128:
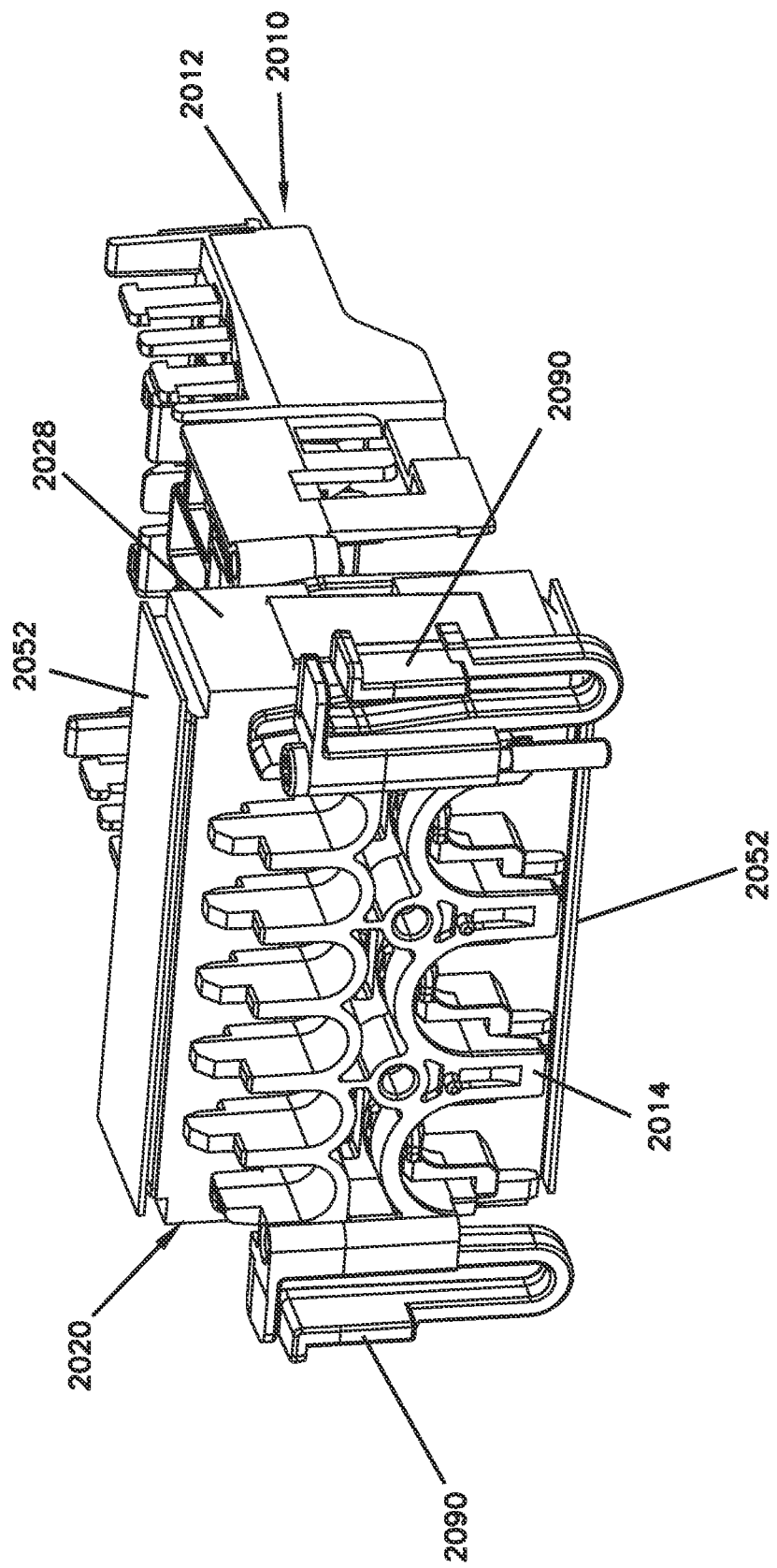
Figure 129:
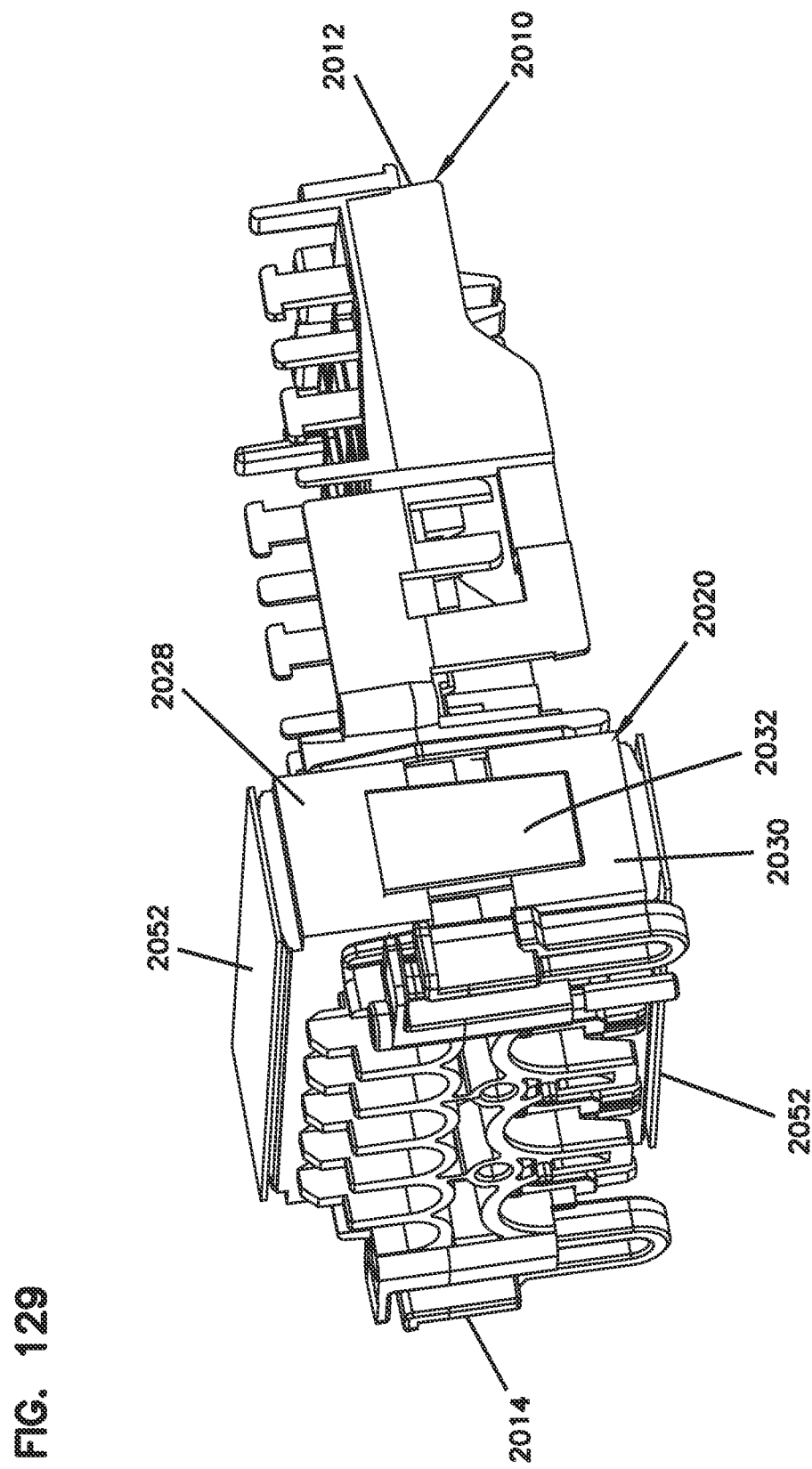
Figure 132:
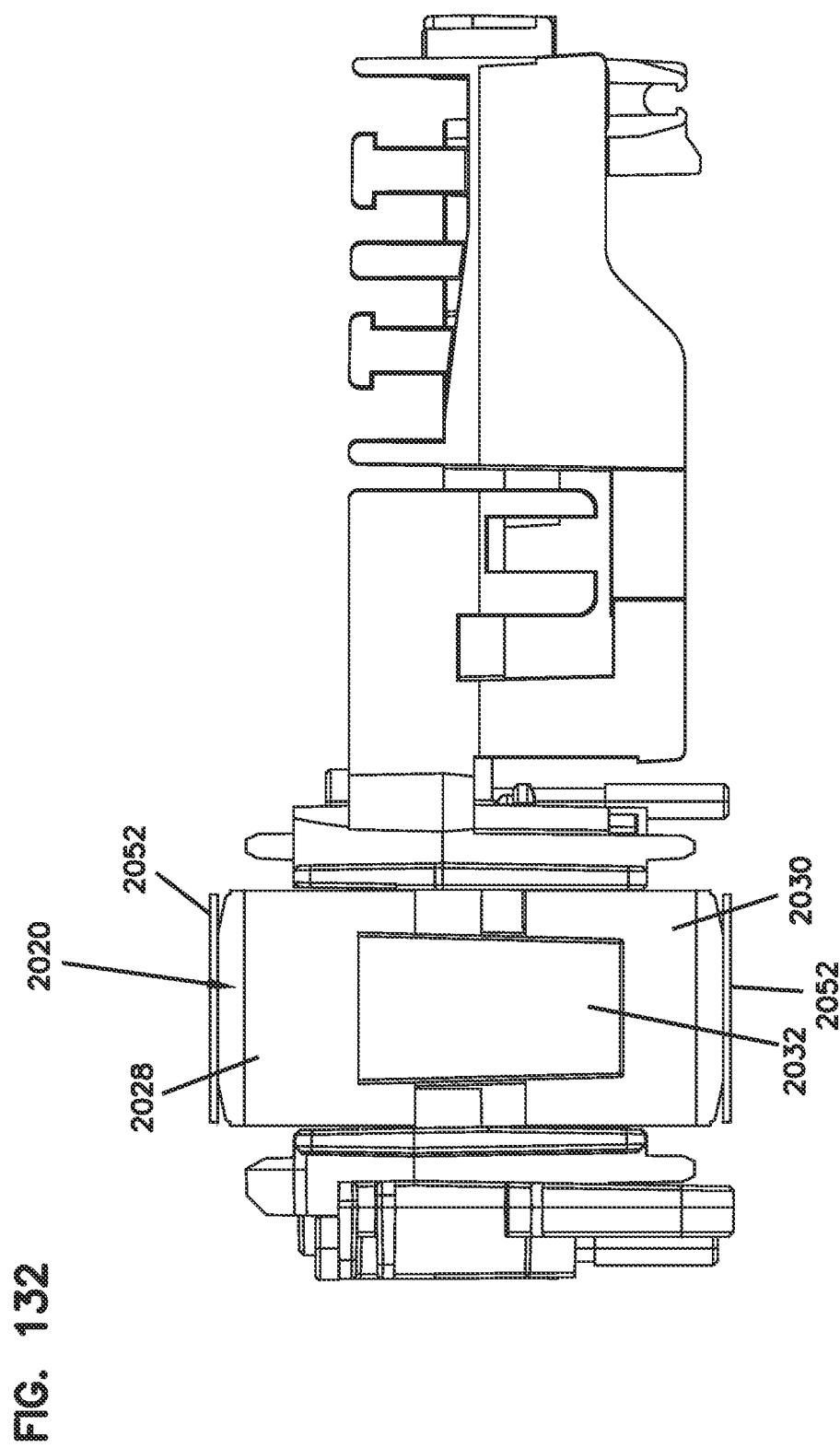
Figure 133:
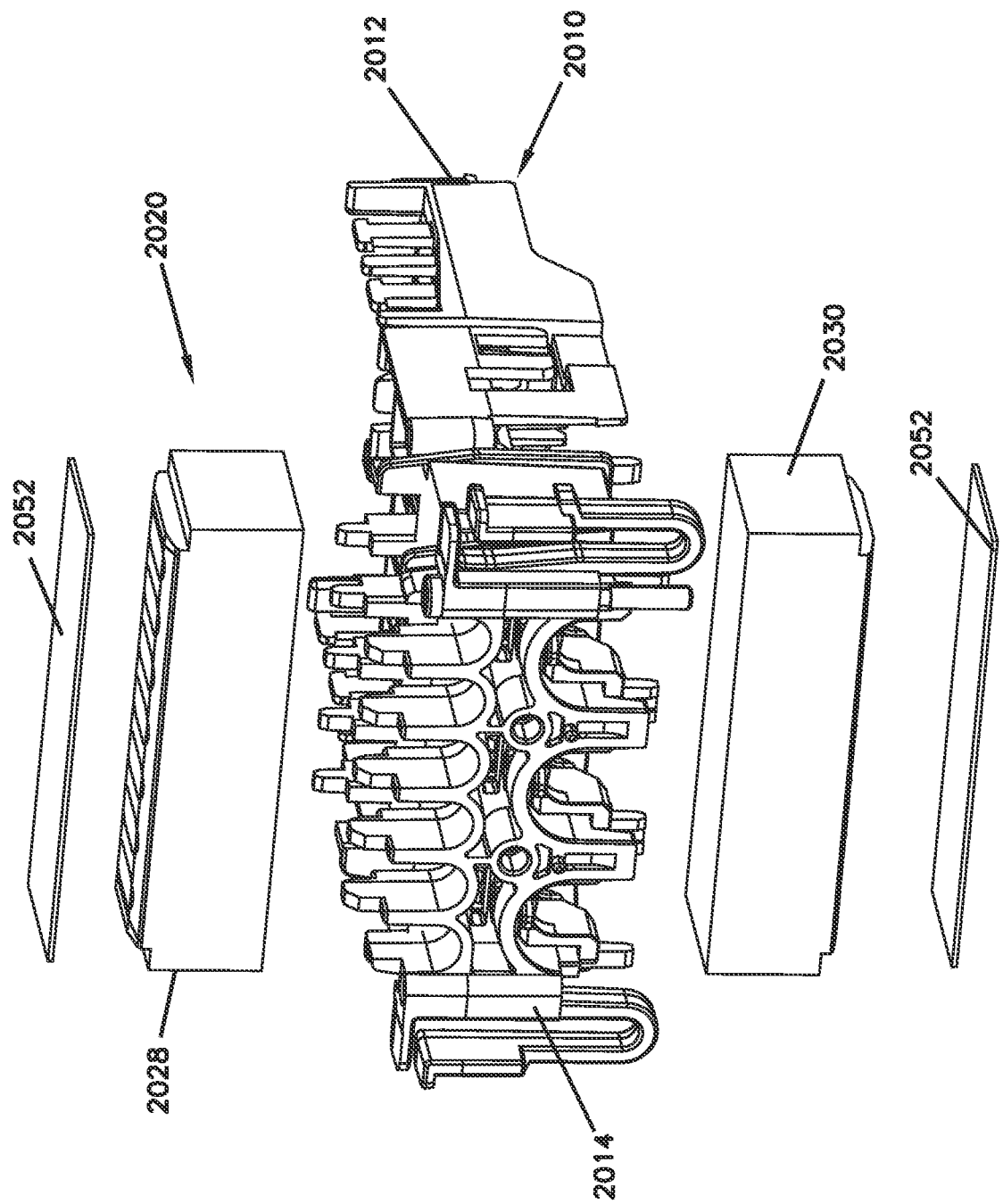
Figure 134:
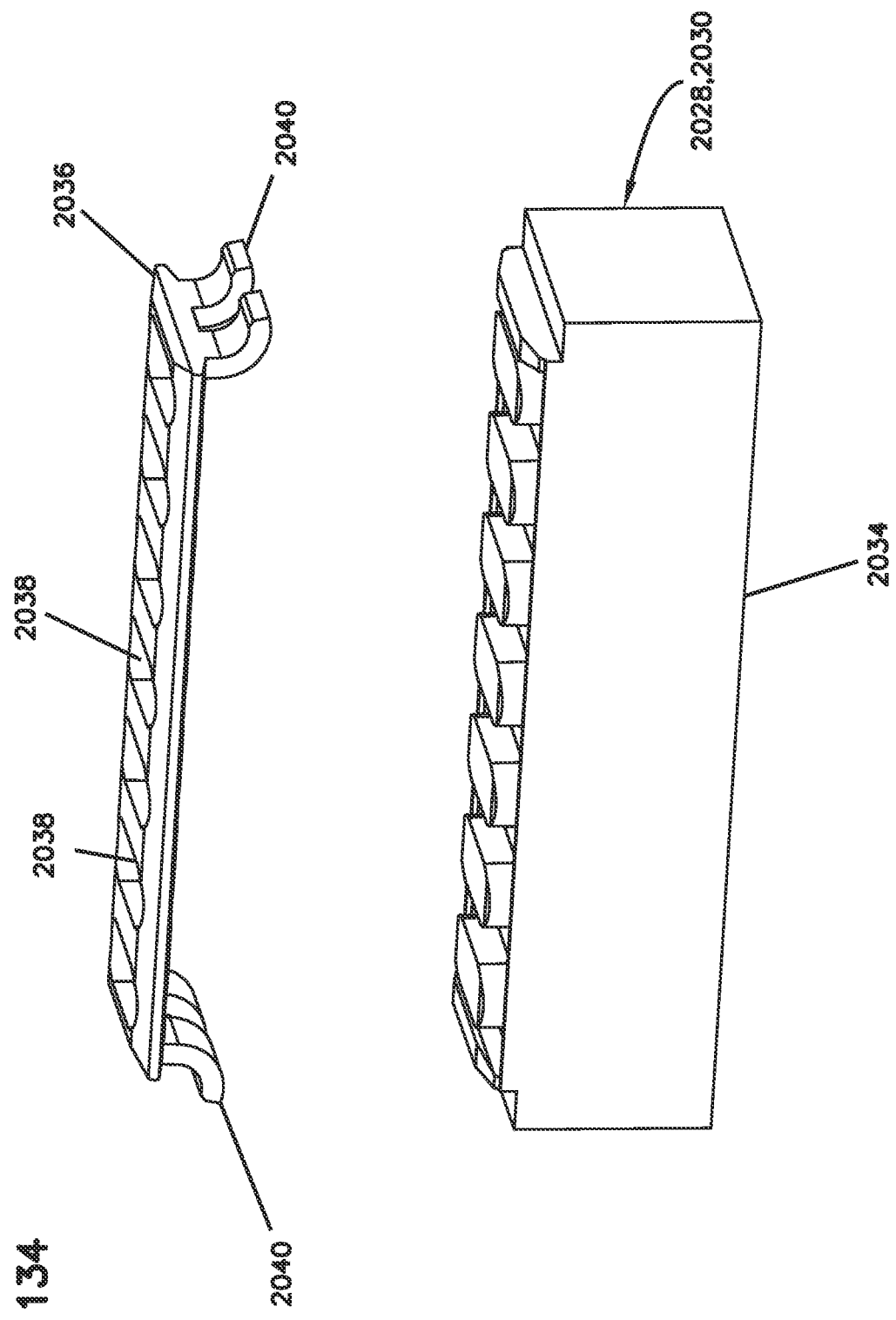
Figure 135:
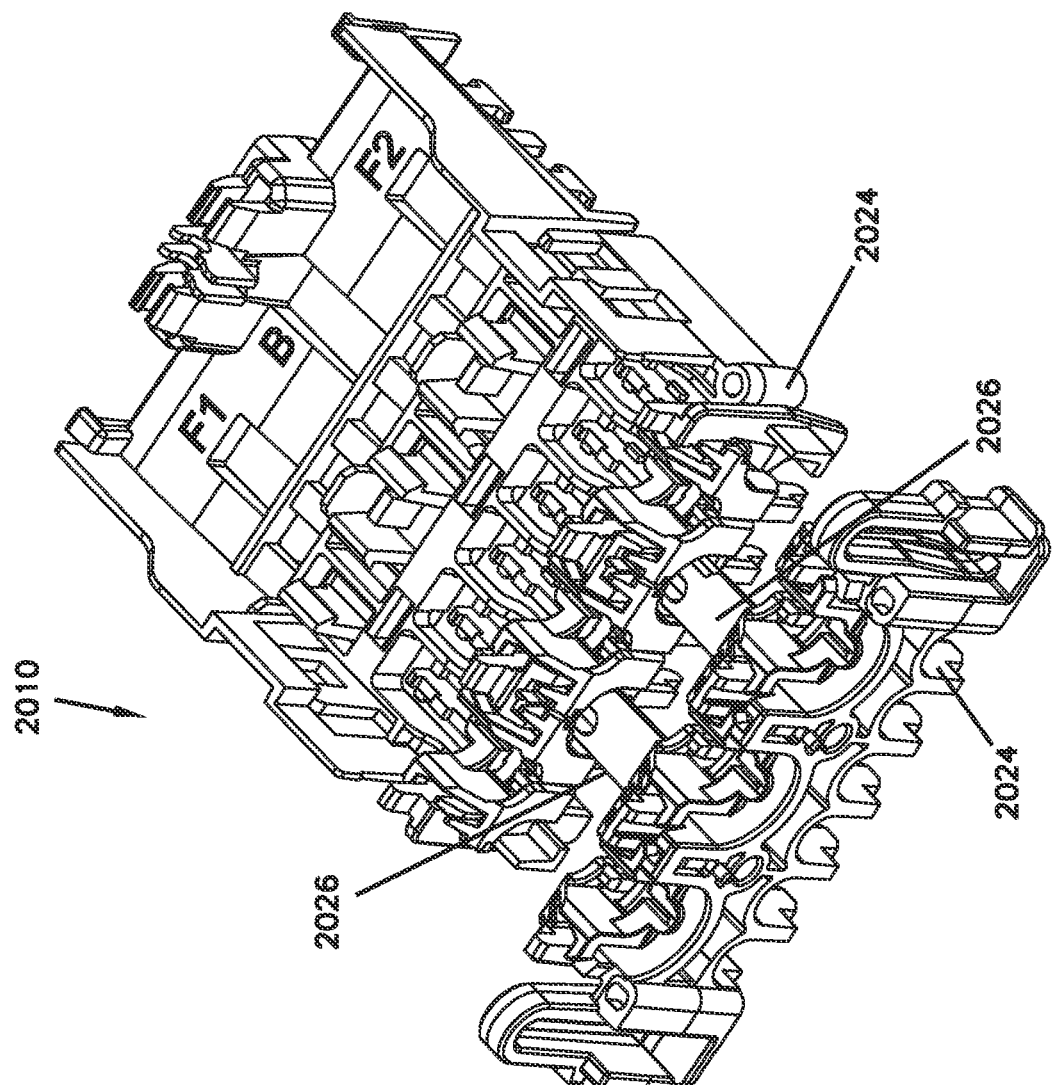
Figure 136:
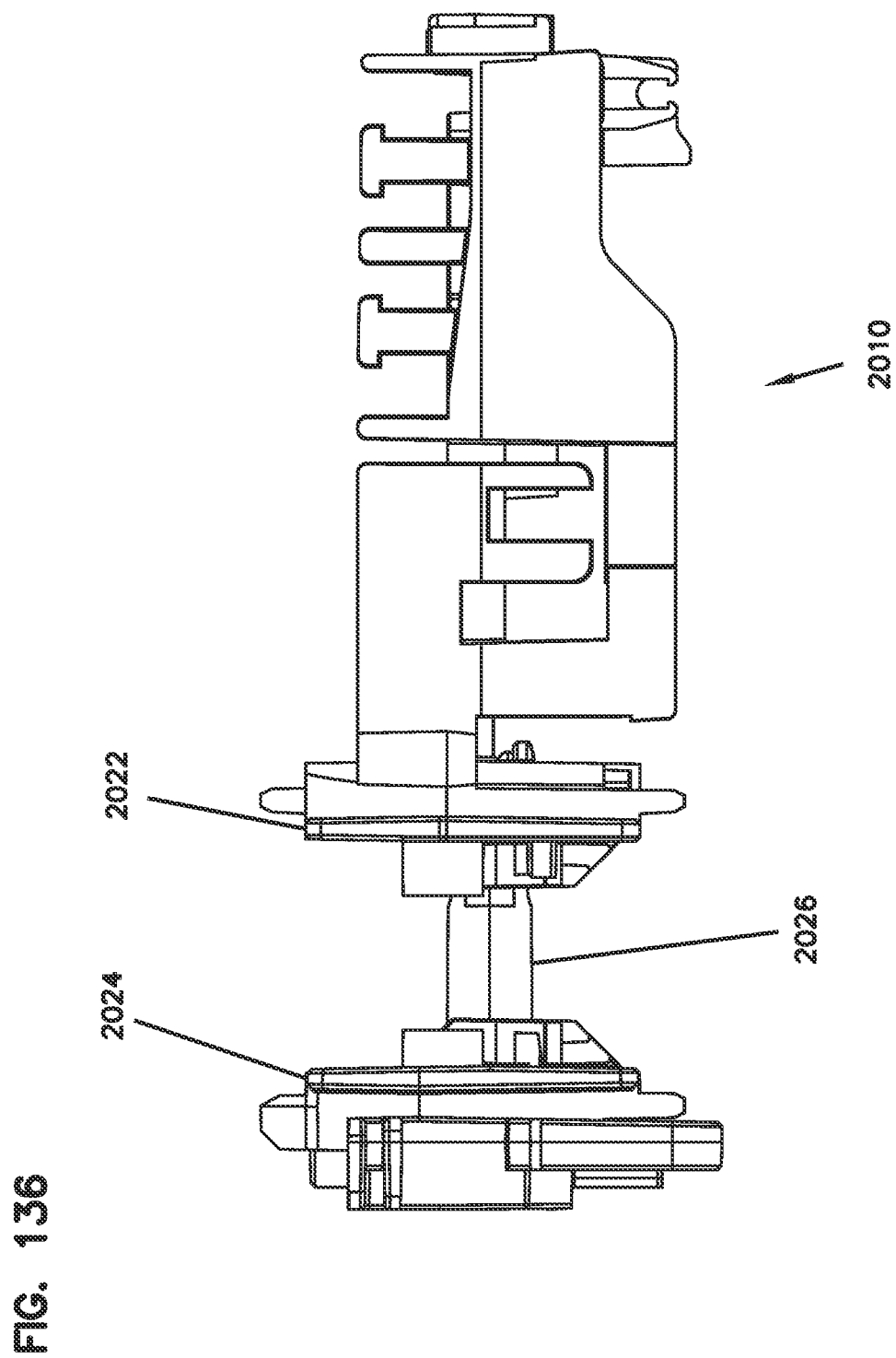
Figure 137:
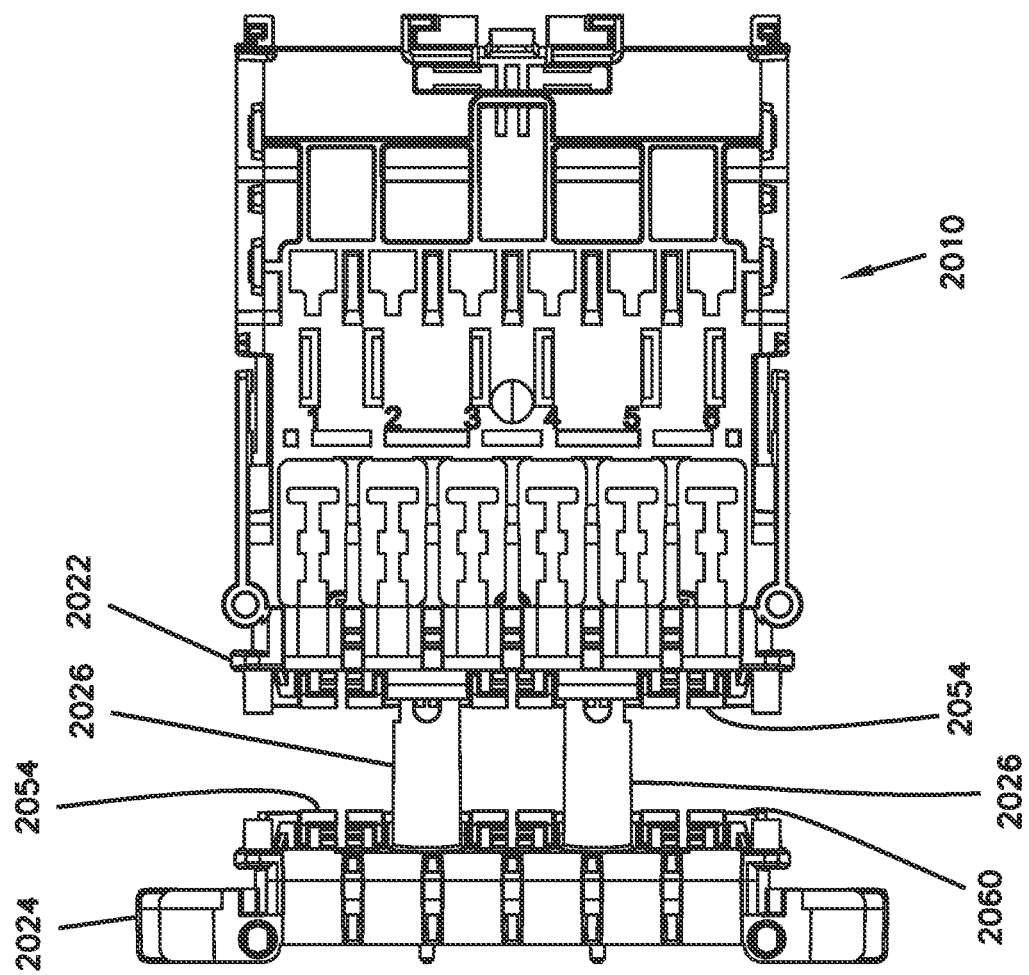
Figure 138:
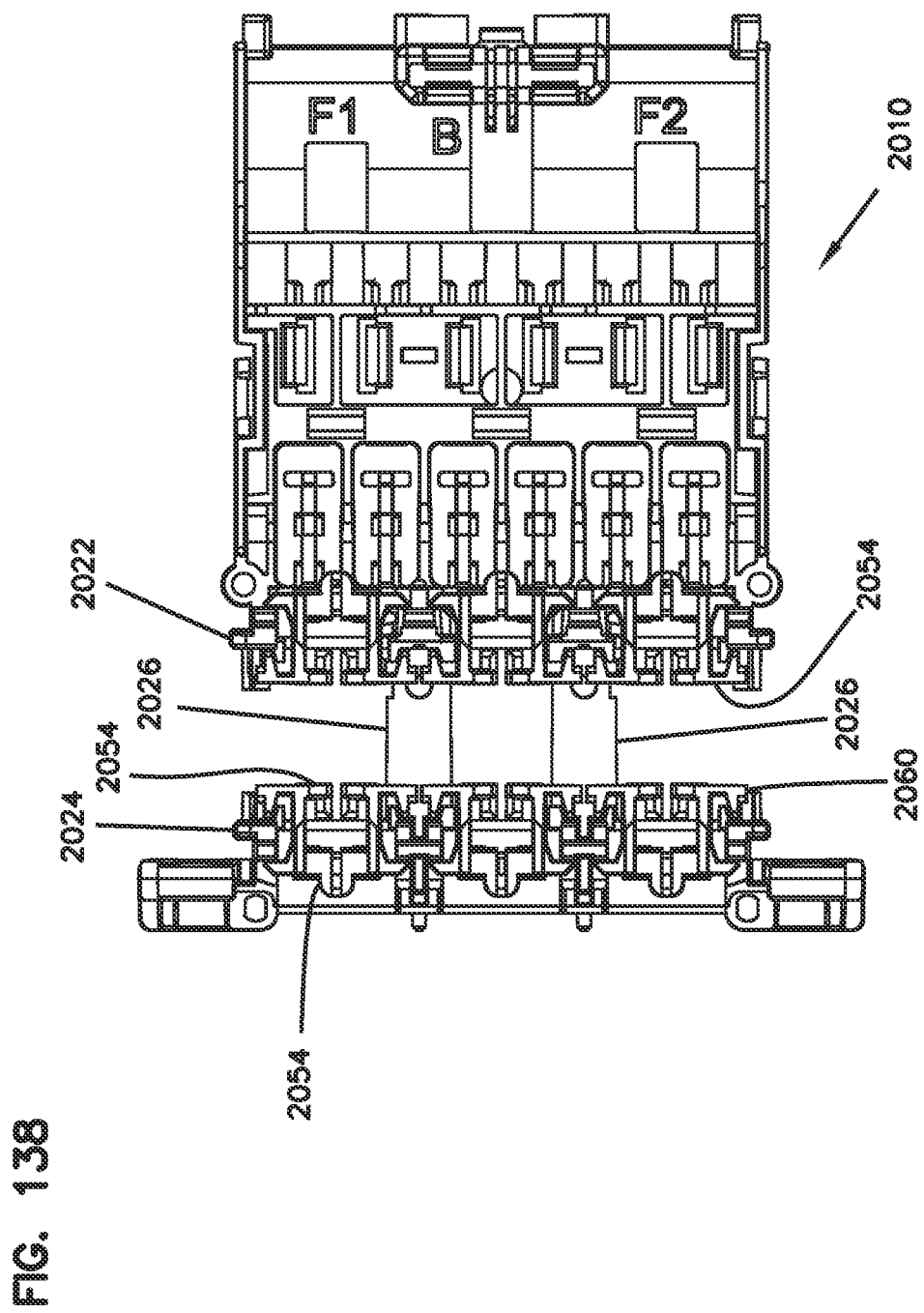
Figure 139:
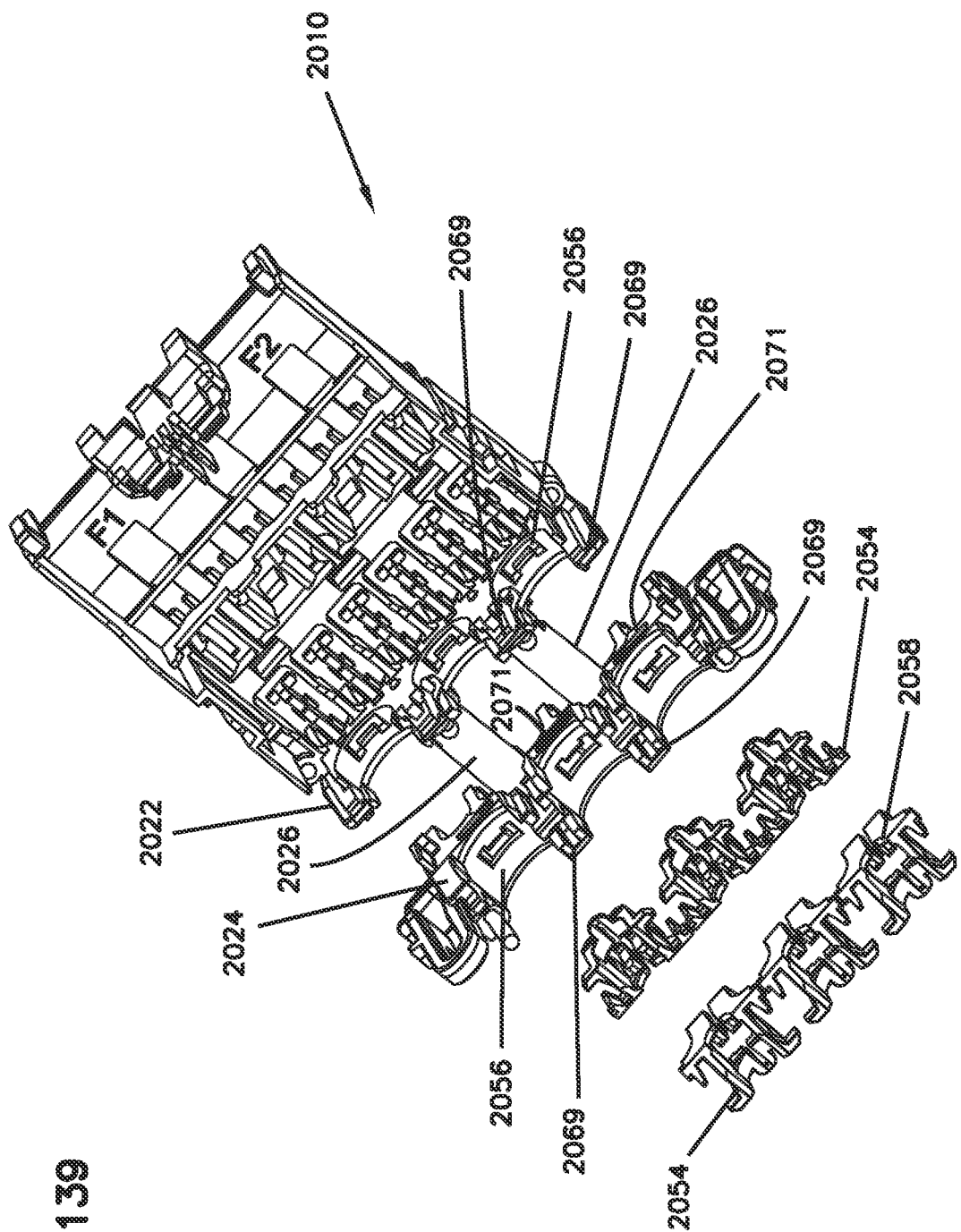
Figure 140:
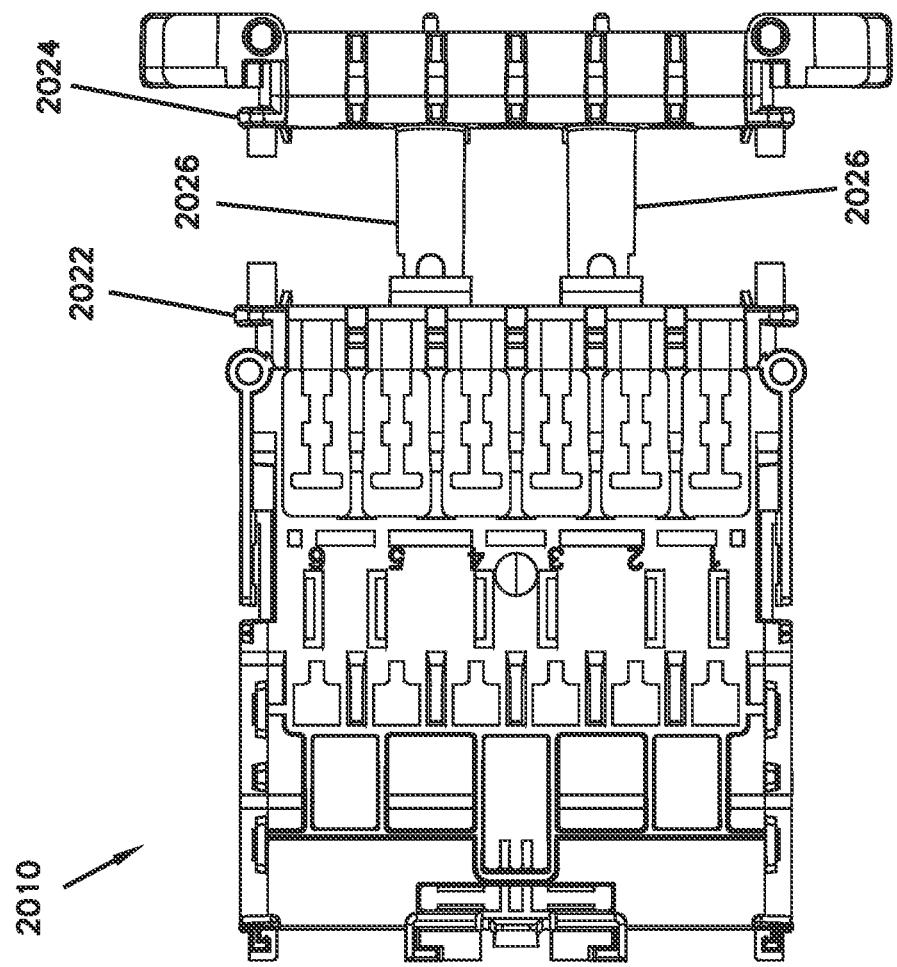
Figure 141:
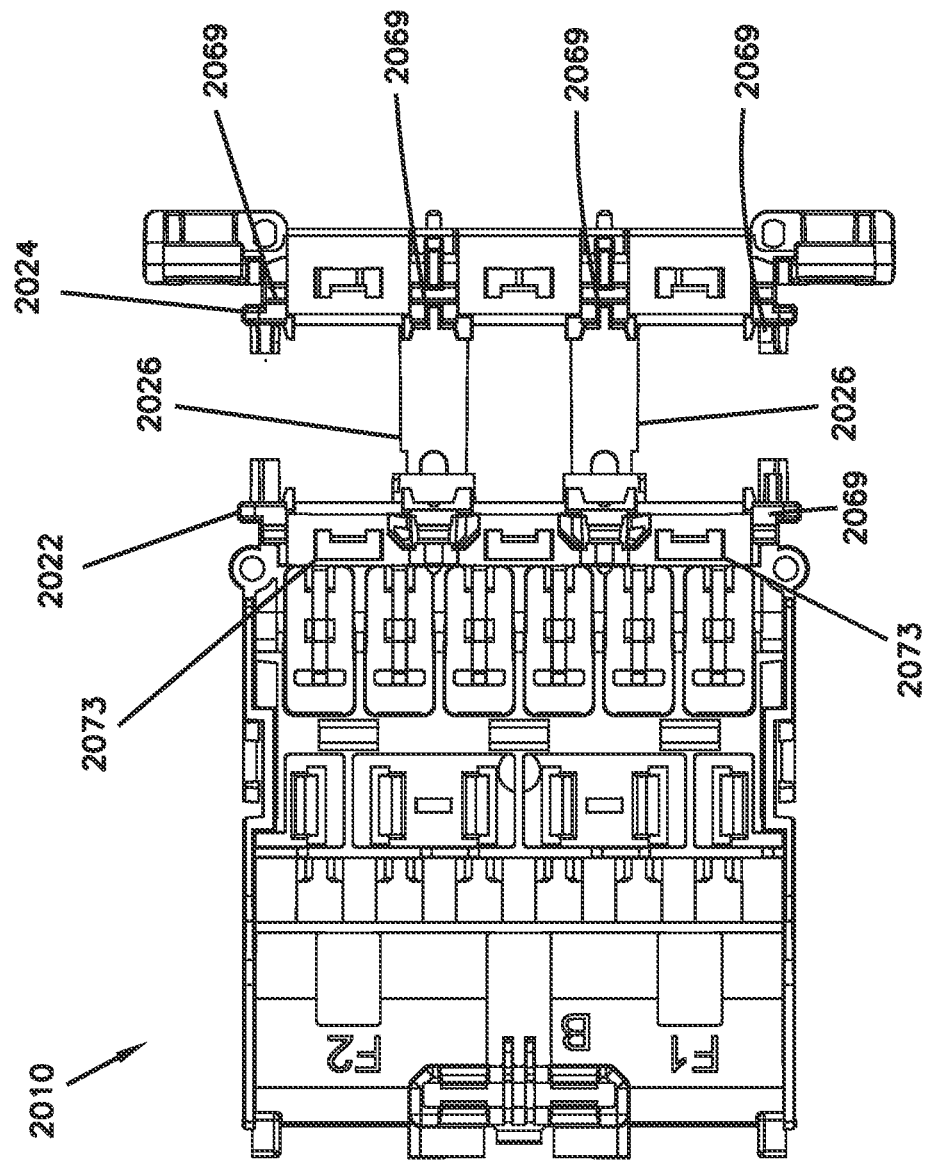
Figure 142:
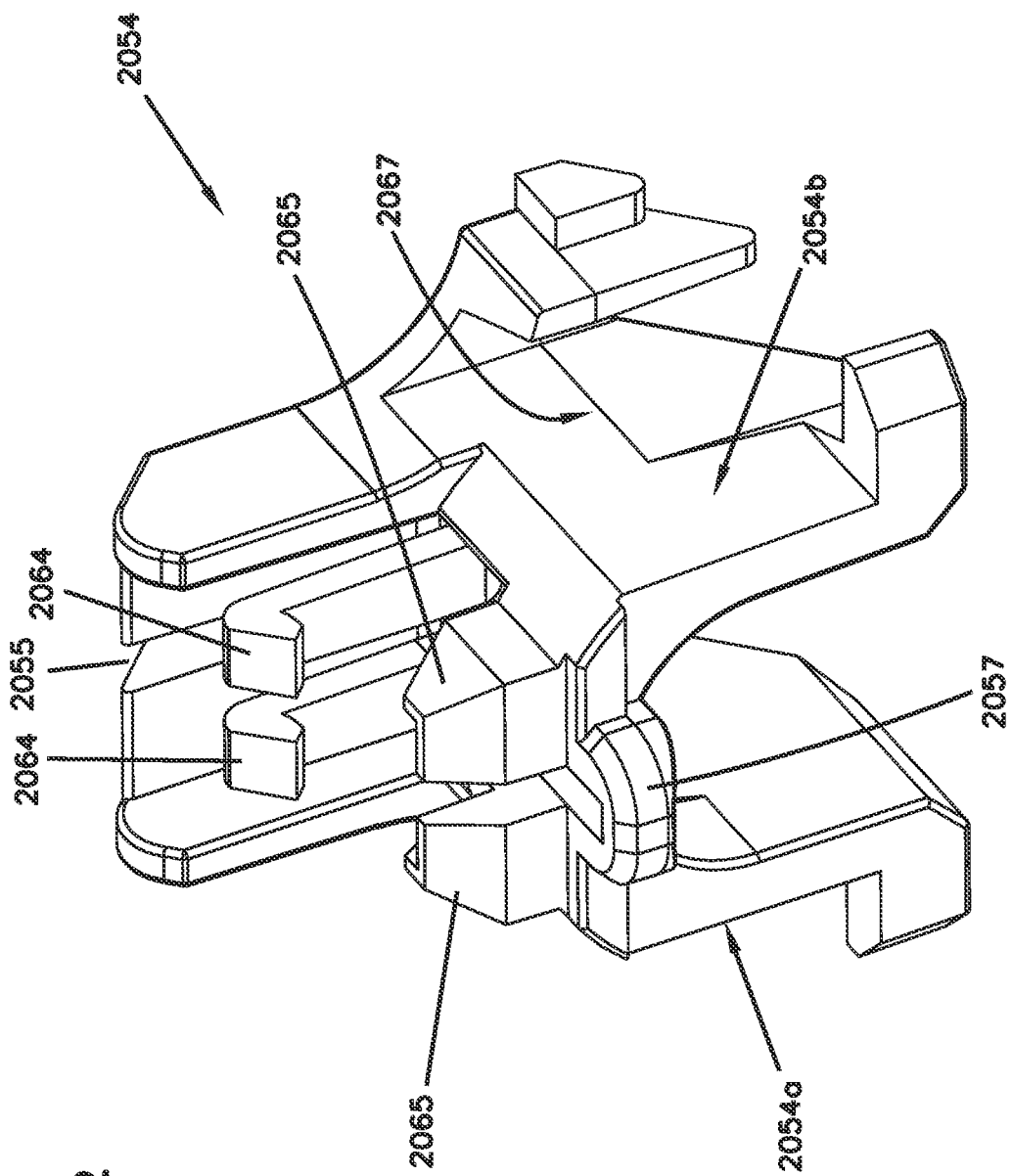
Figure 143:
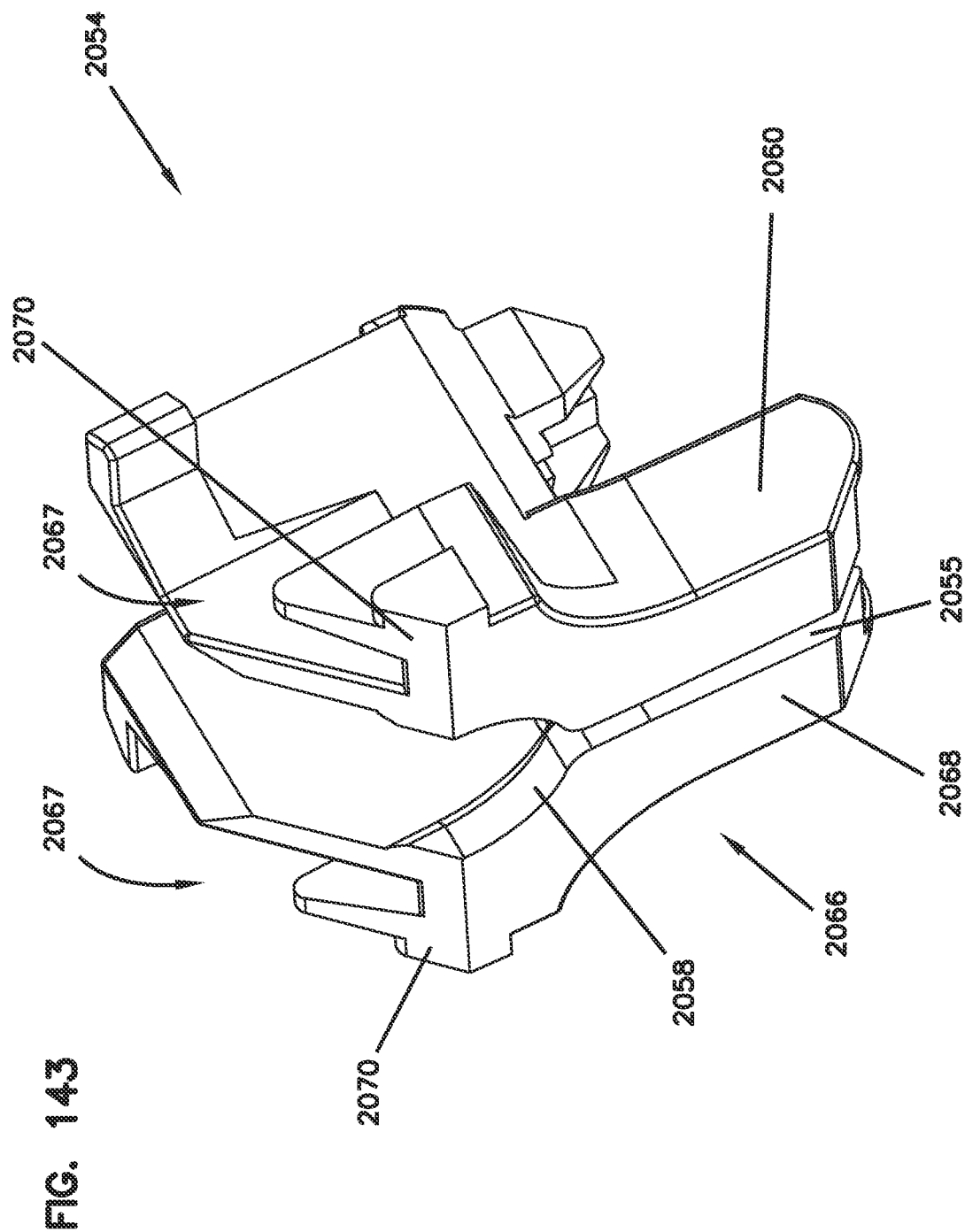
Figure 144:
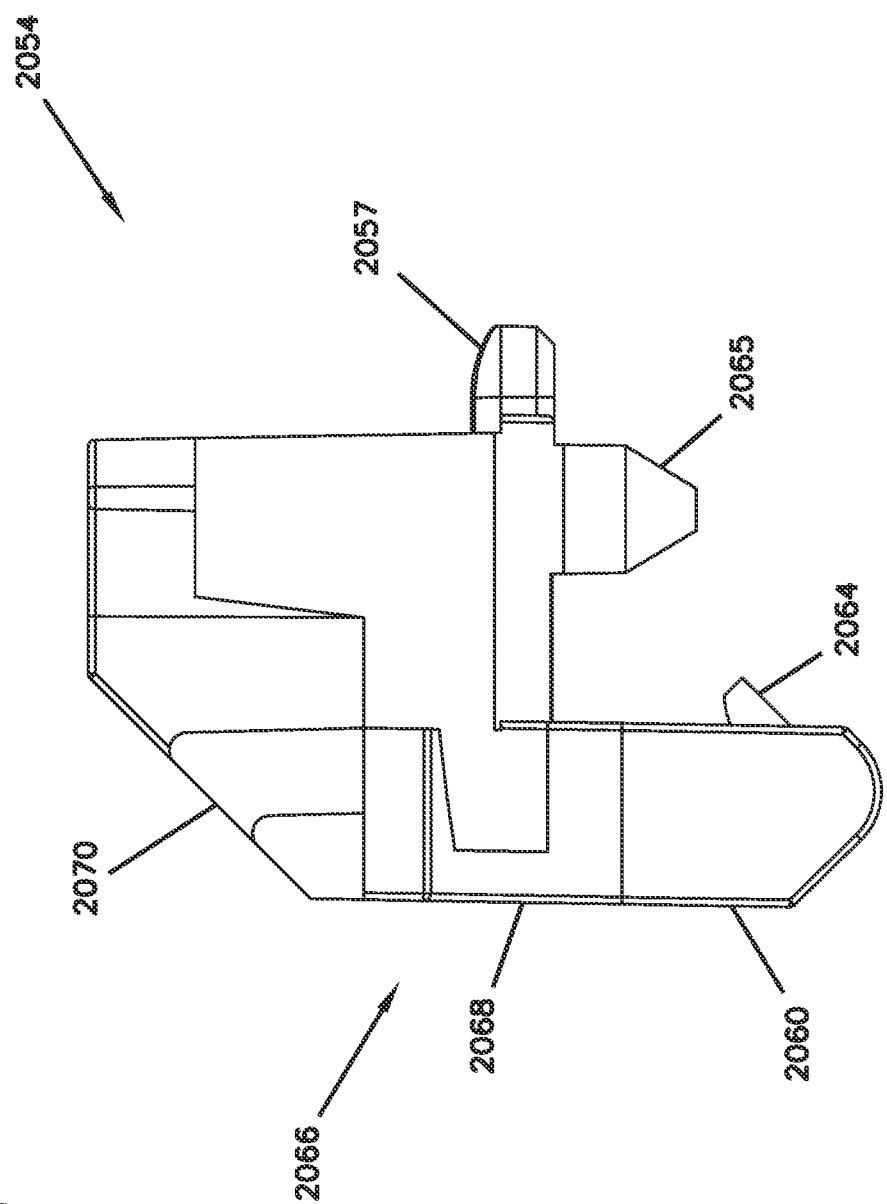
Figure 145:
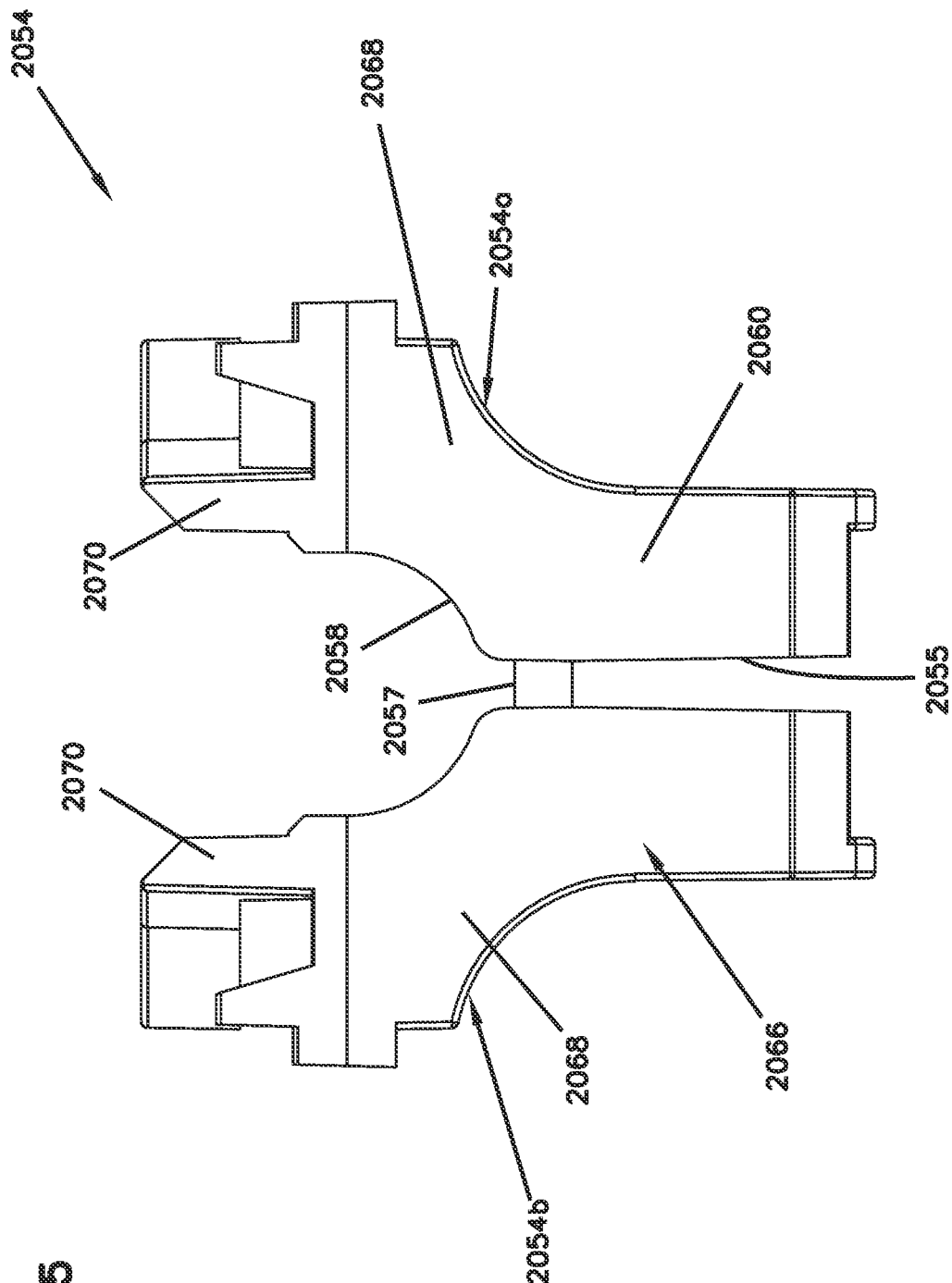
Figure 146:
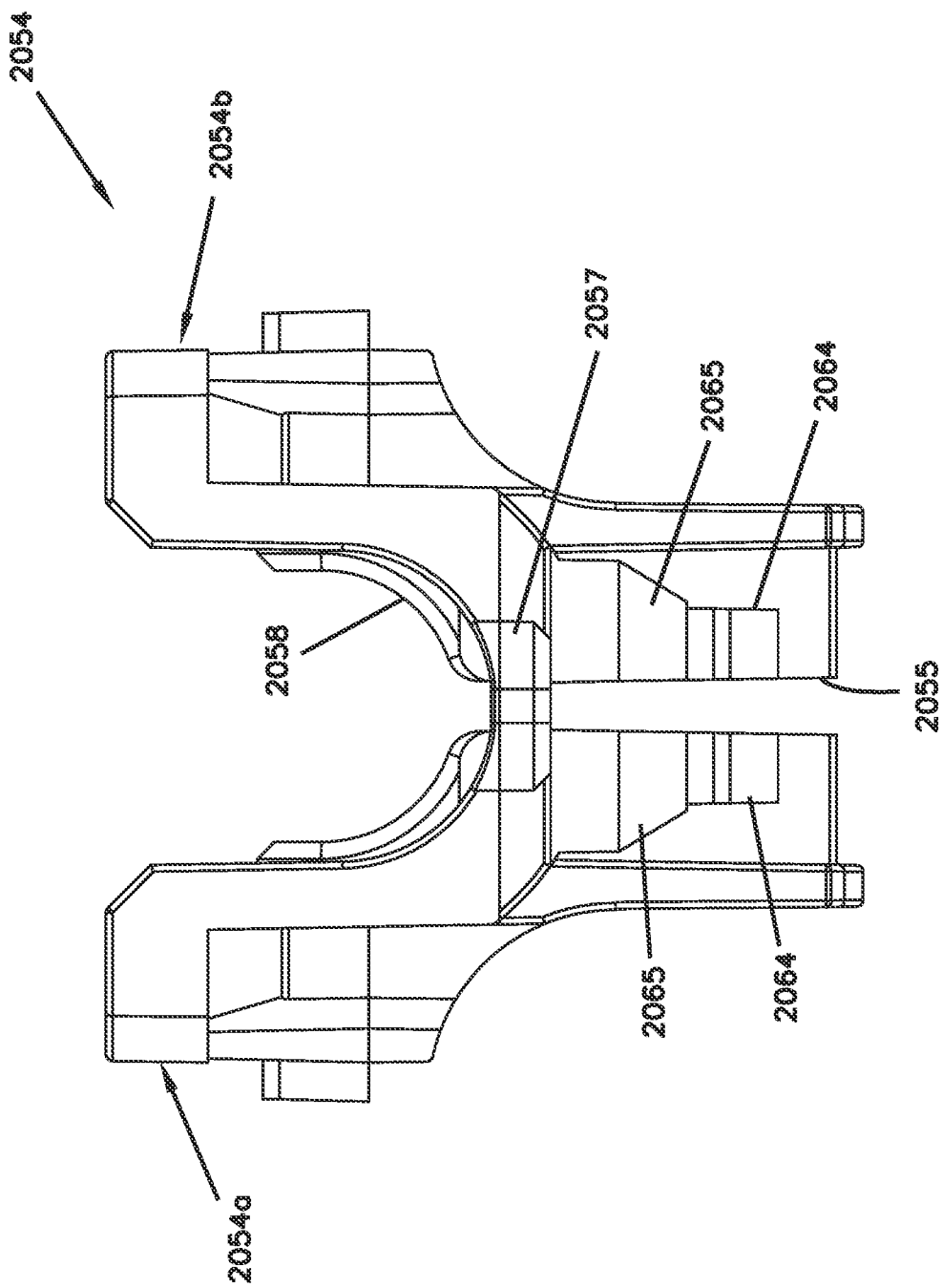
Figure 147:
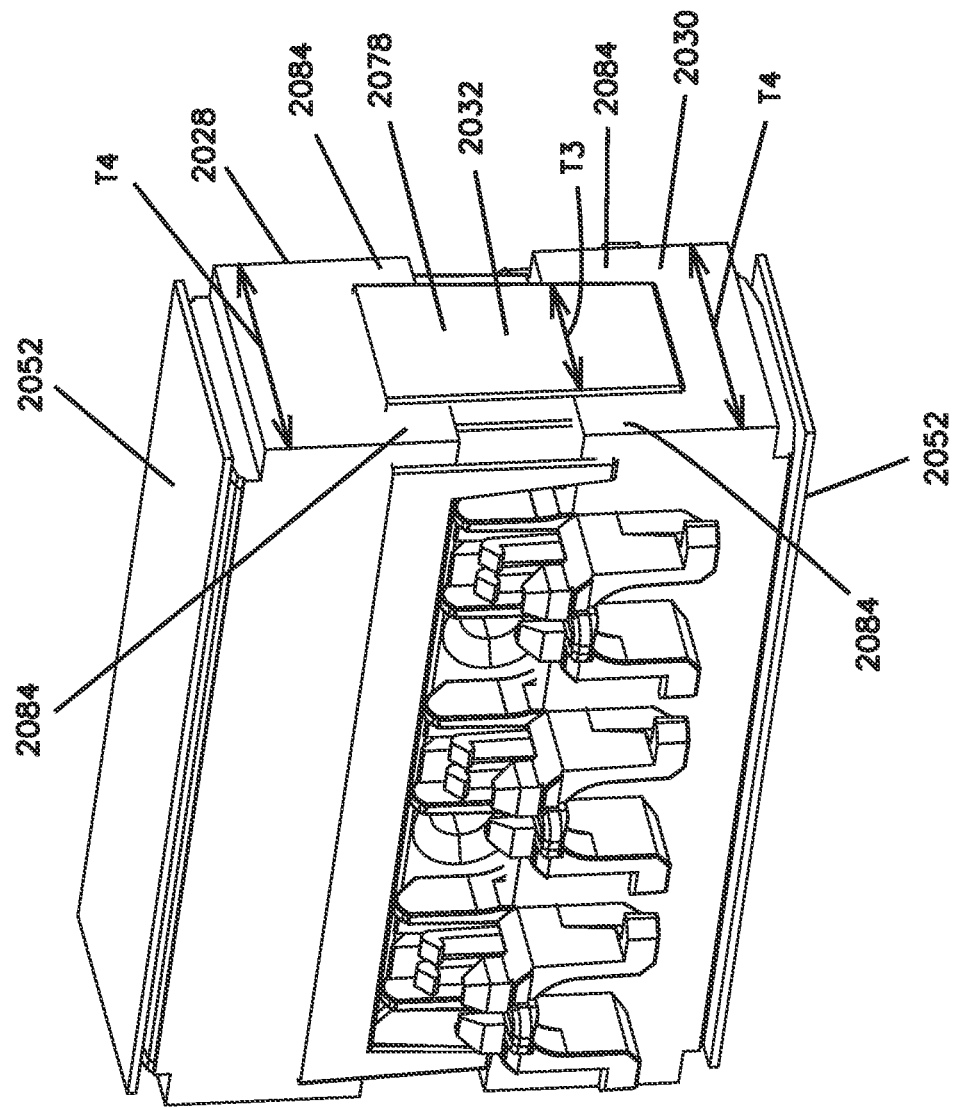
Figure 148:
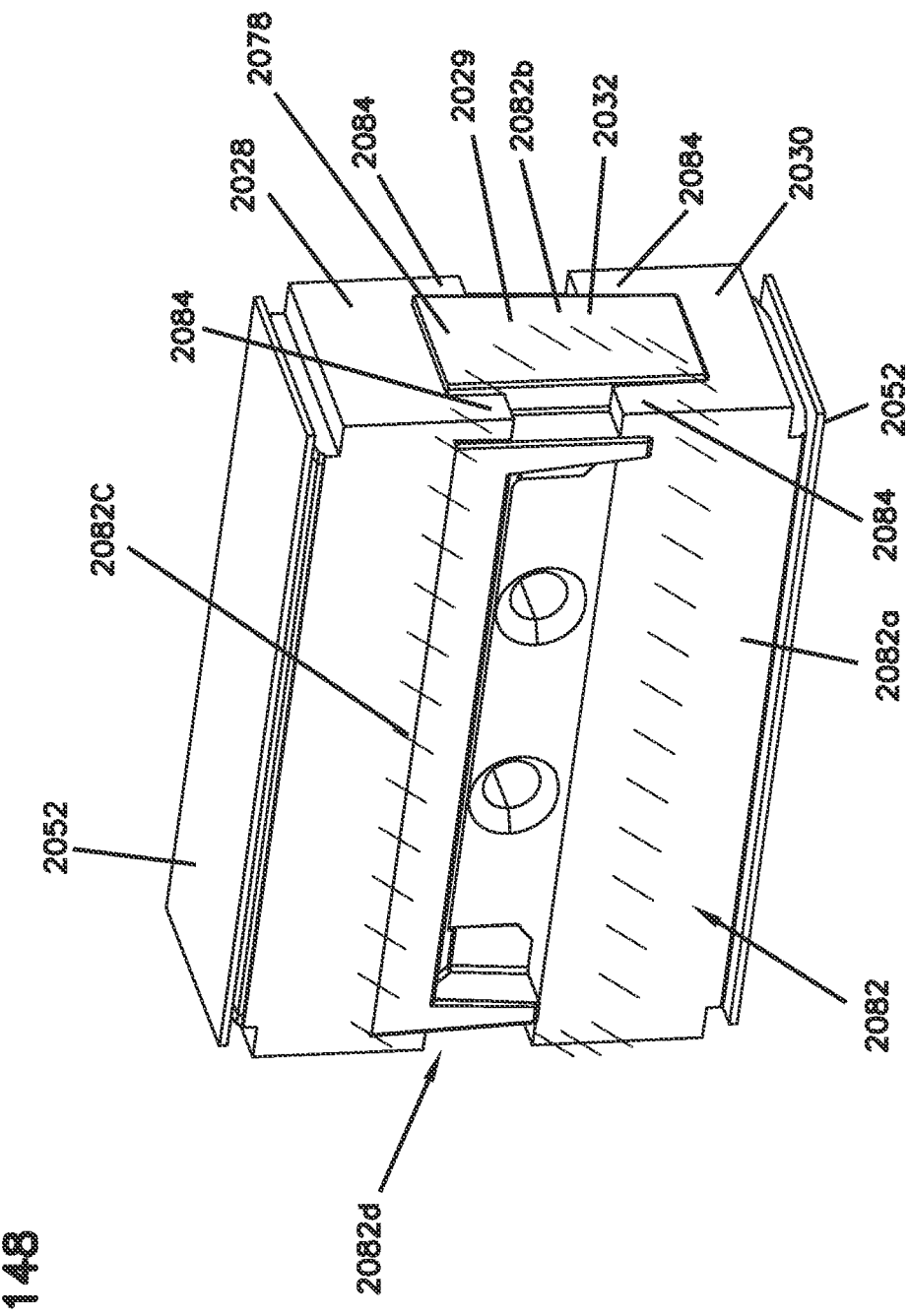
Figure 149:
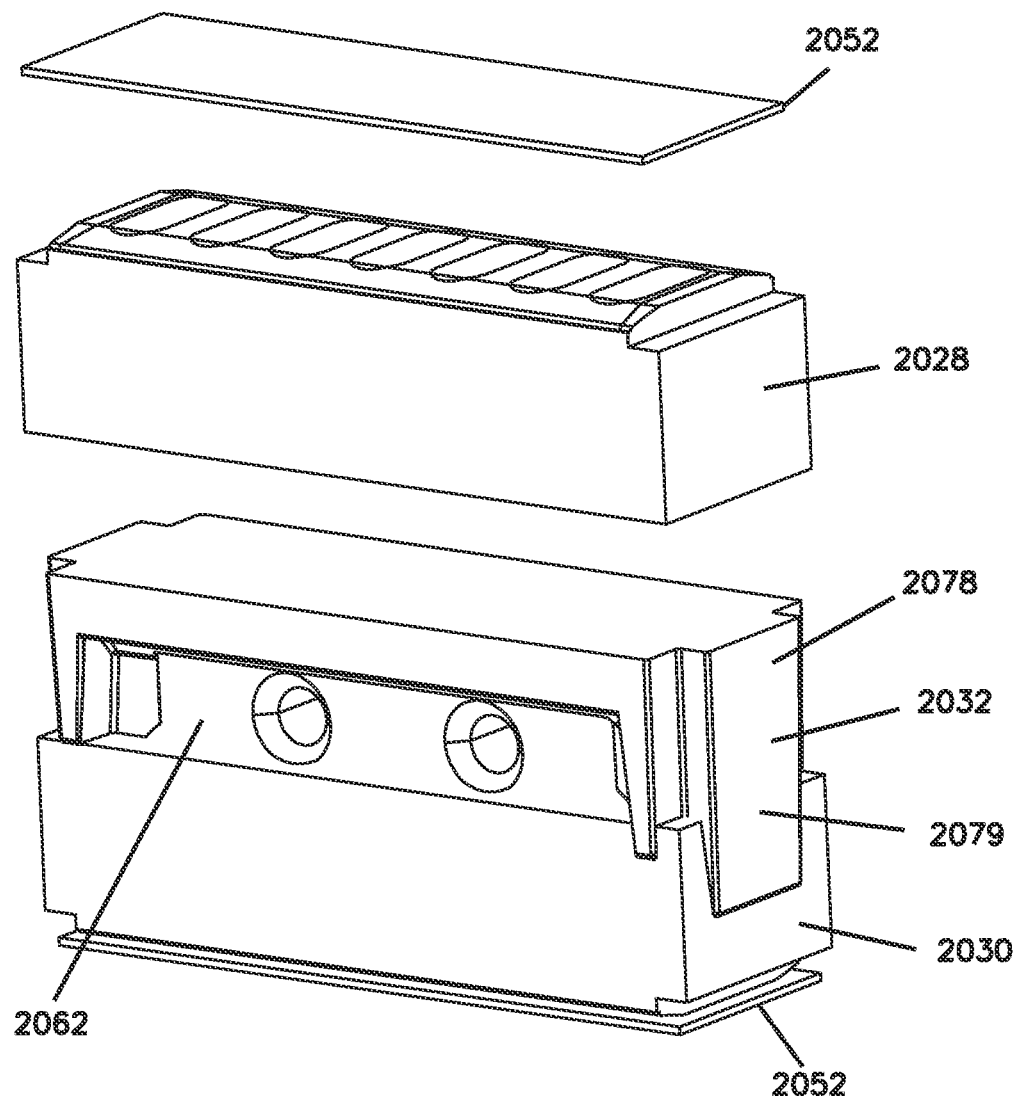
Figure 150:
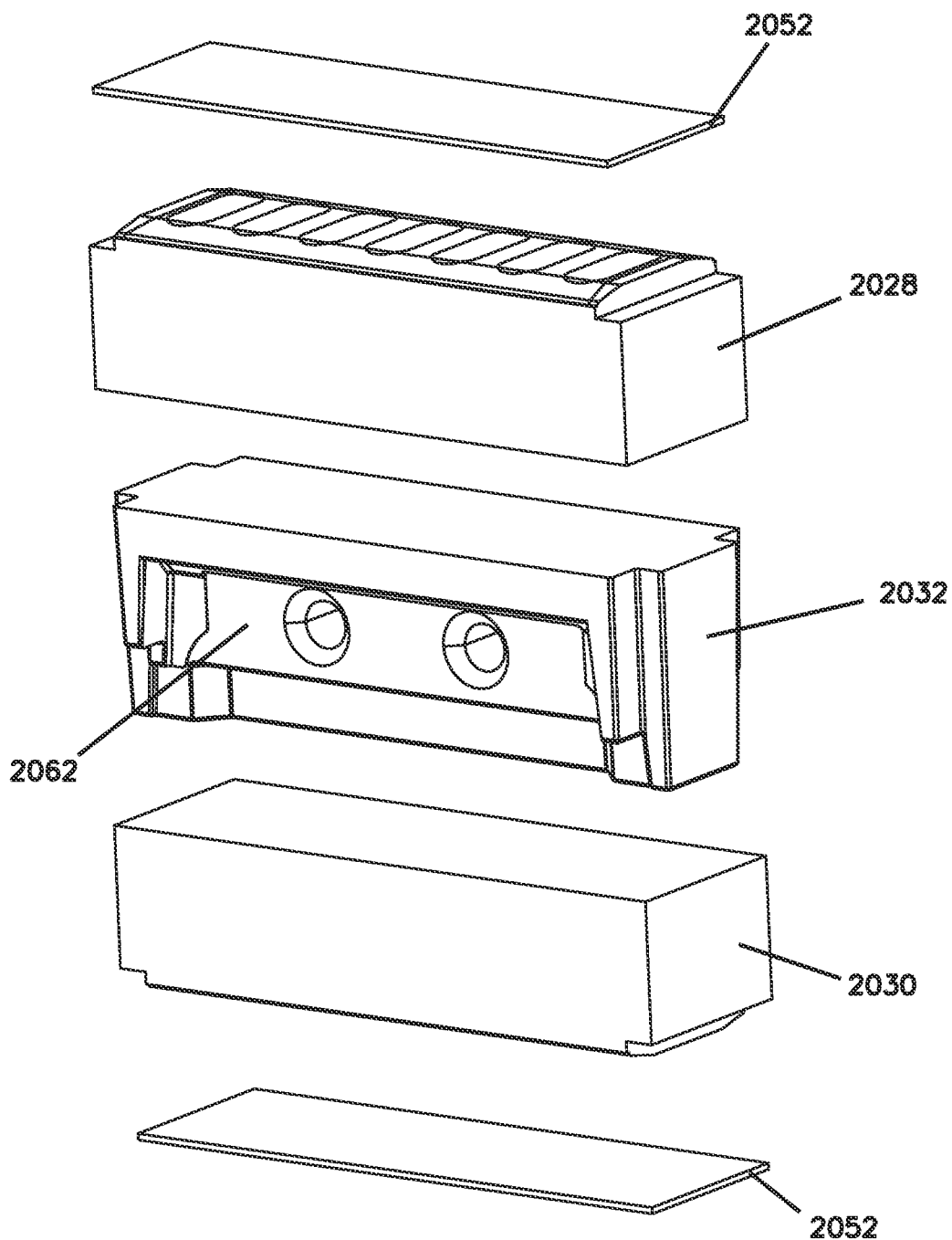
Figure 151:
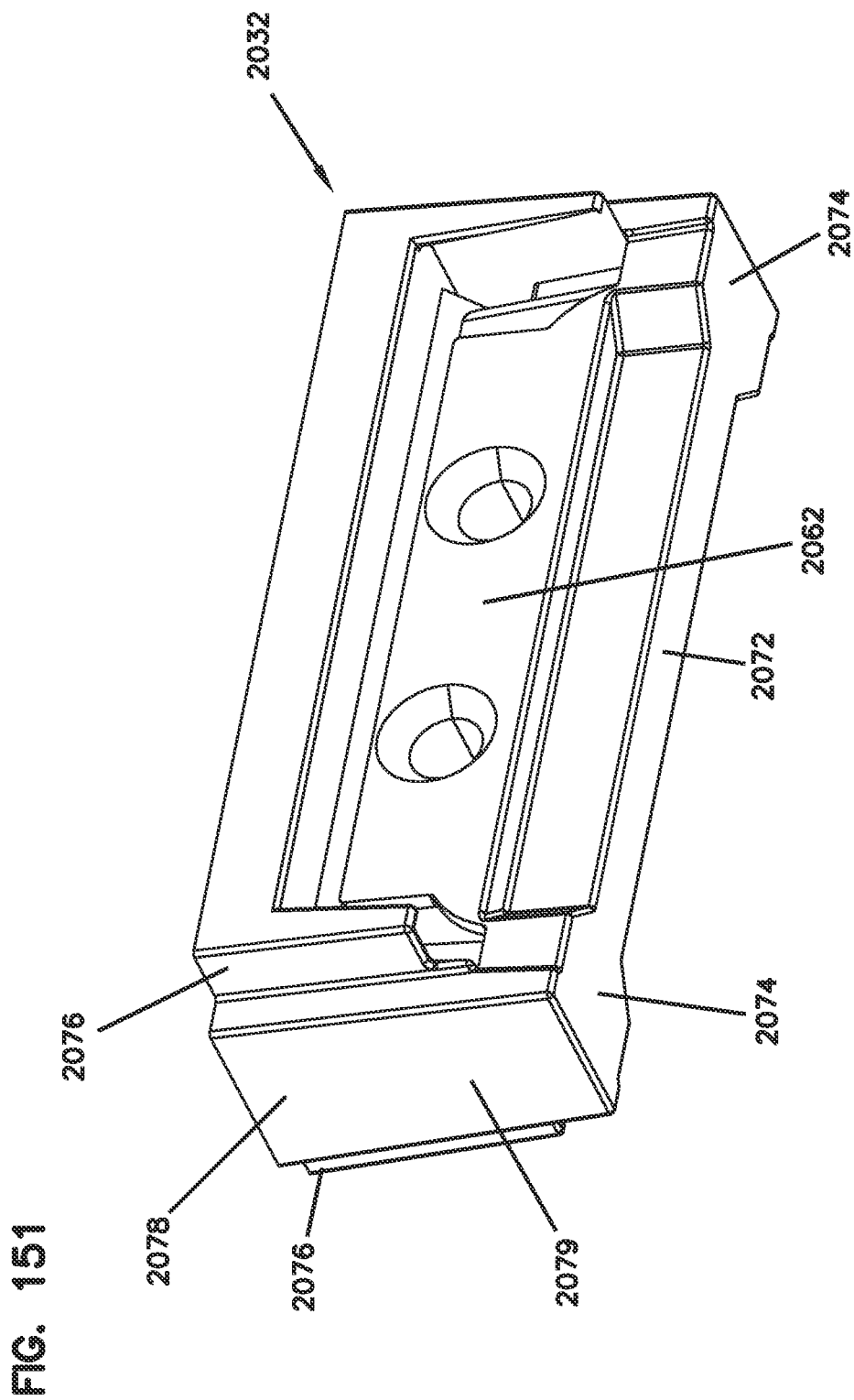
Figure 152:
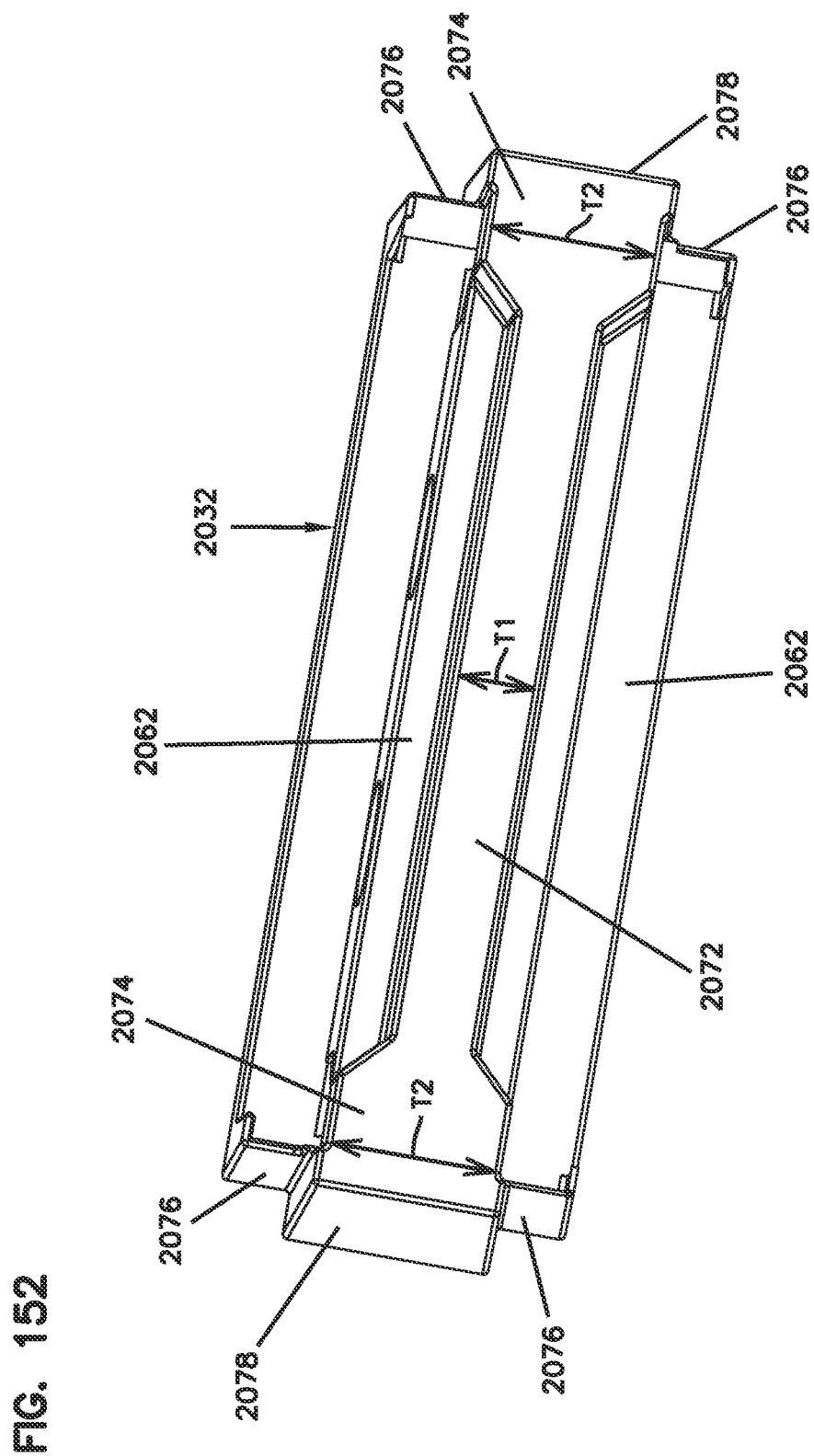
Figure 153:
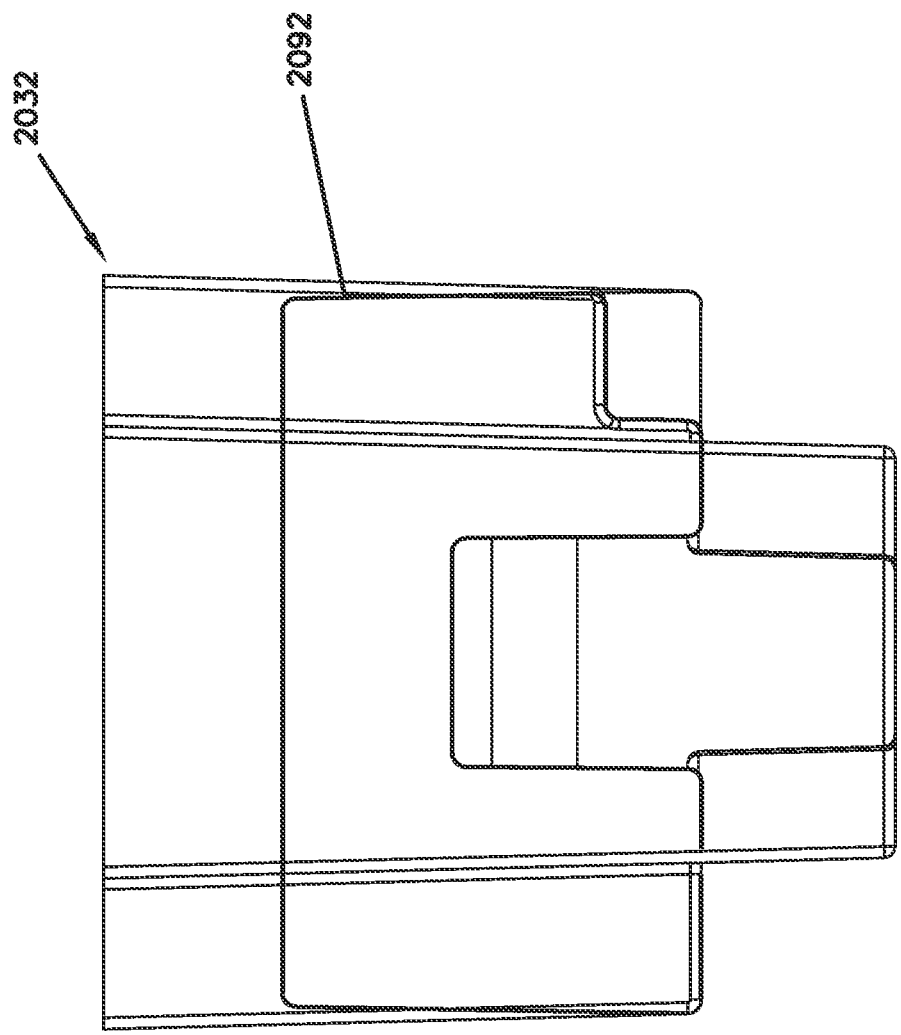
Figure 154:
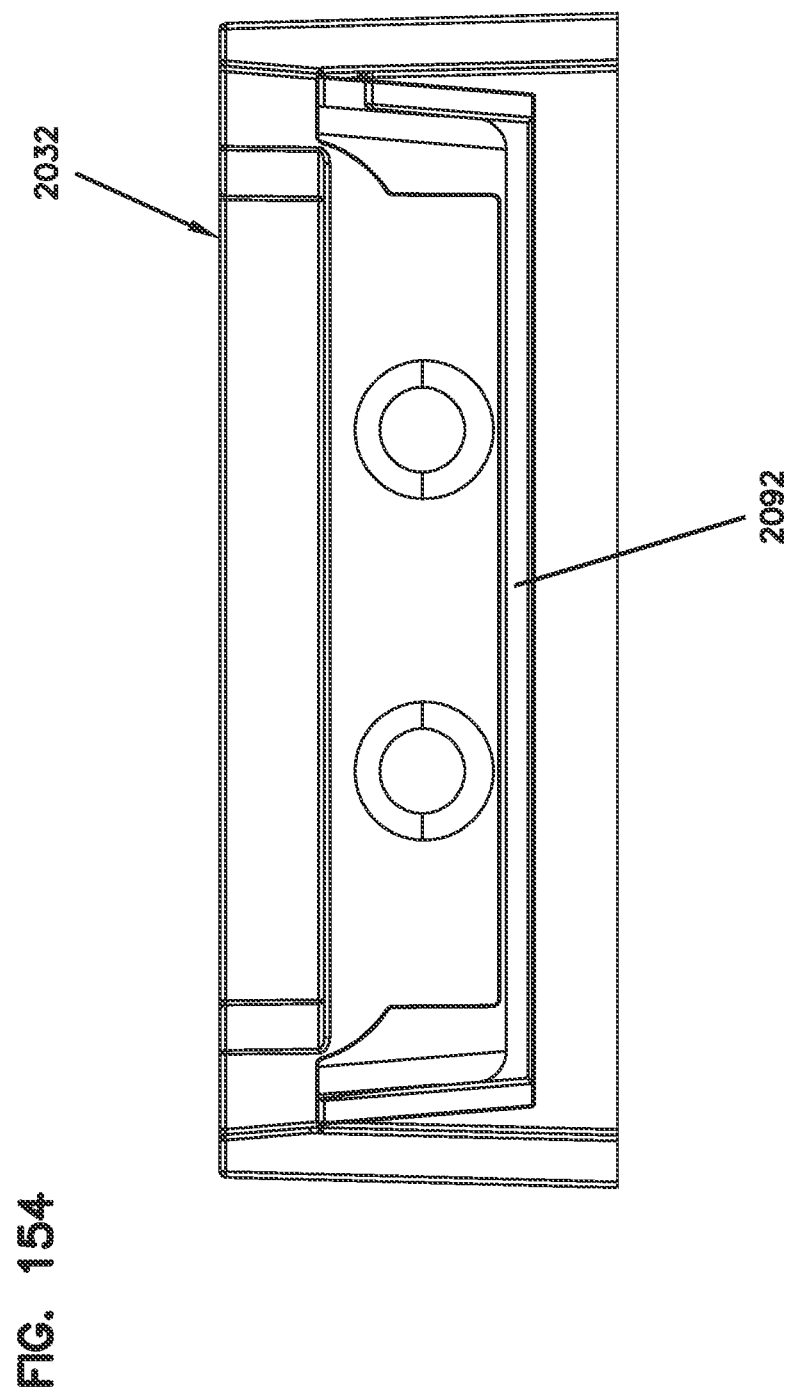
Figure 155:
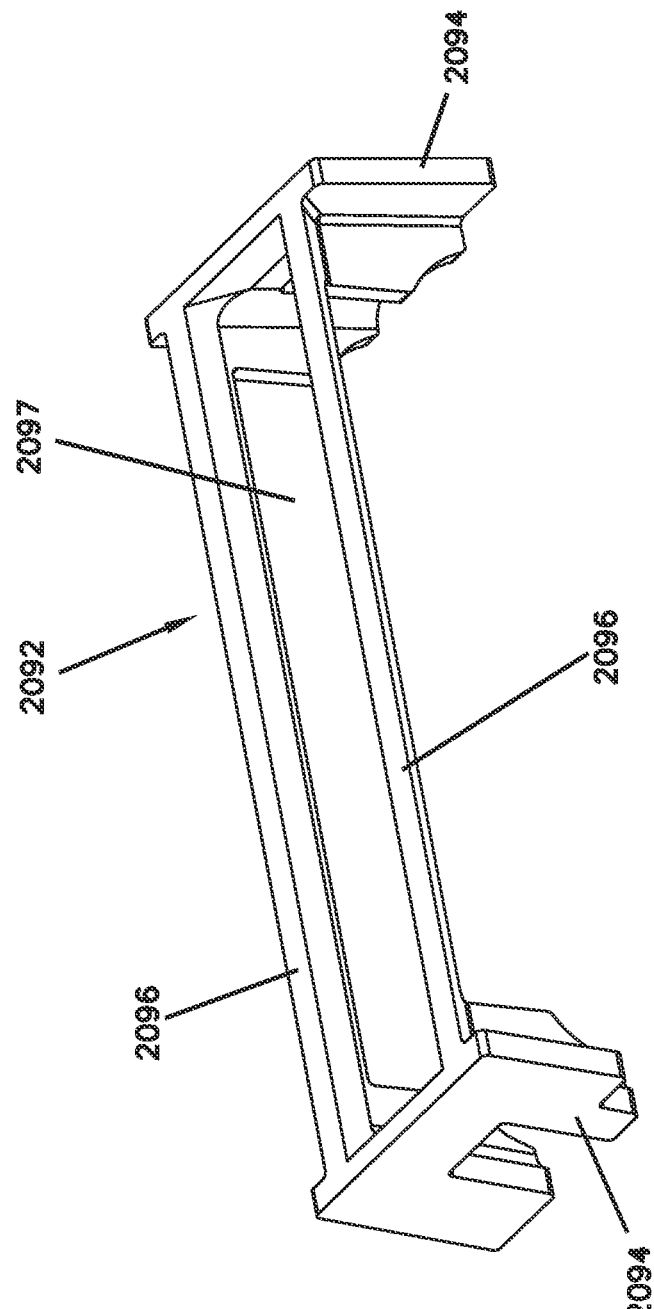
Figure 156:
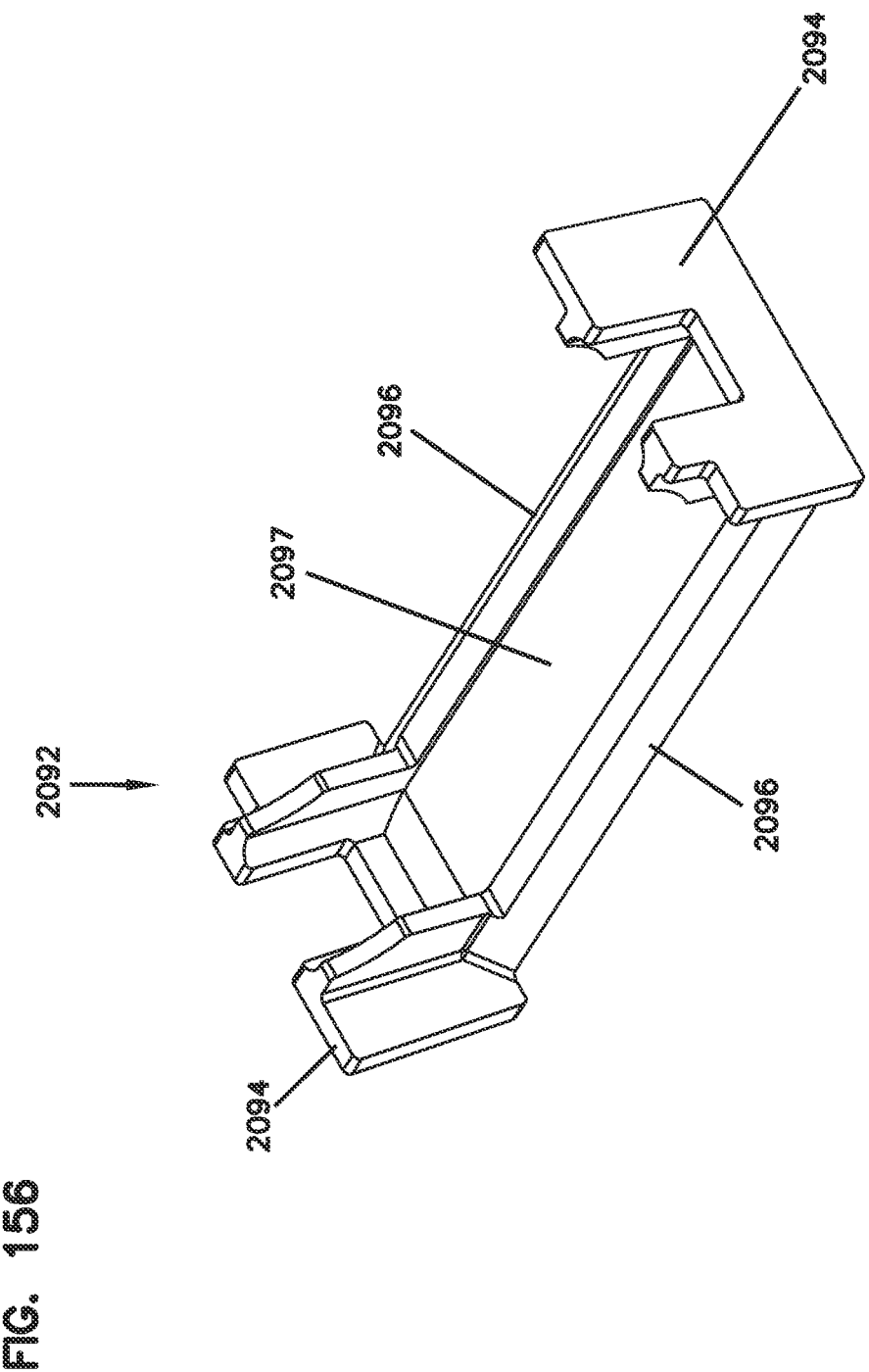
Figure 157:
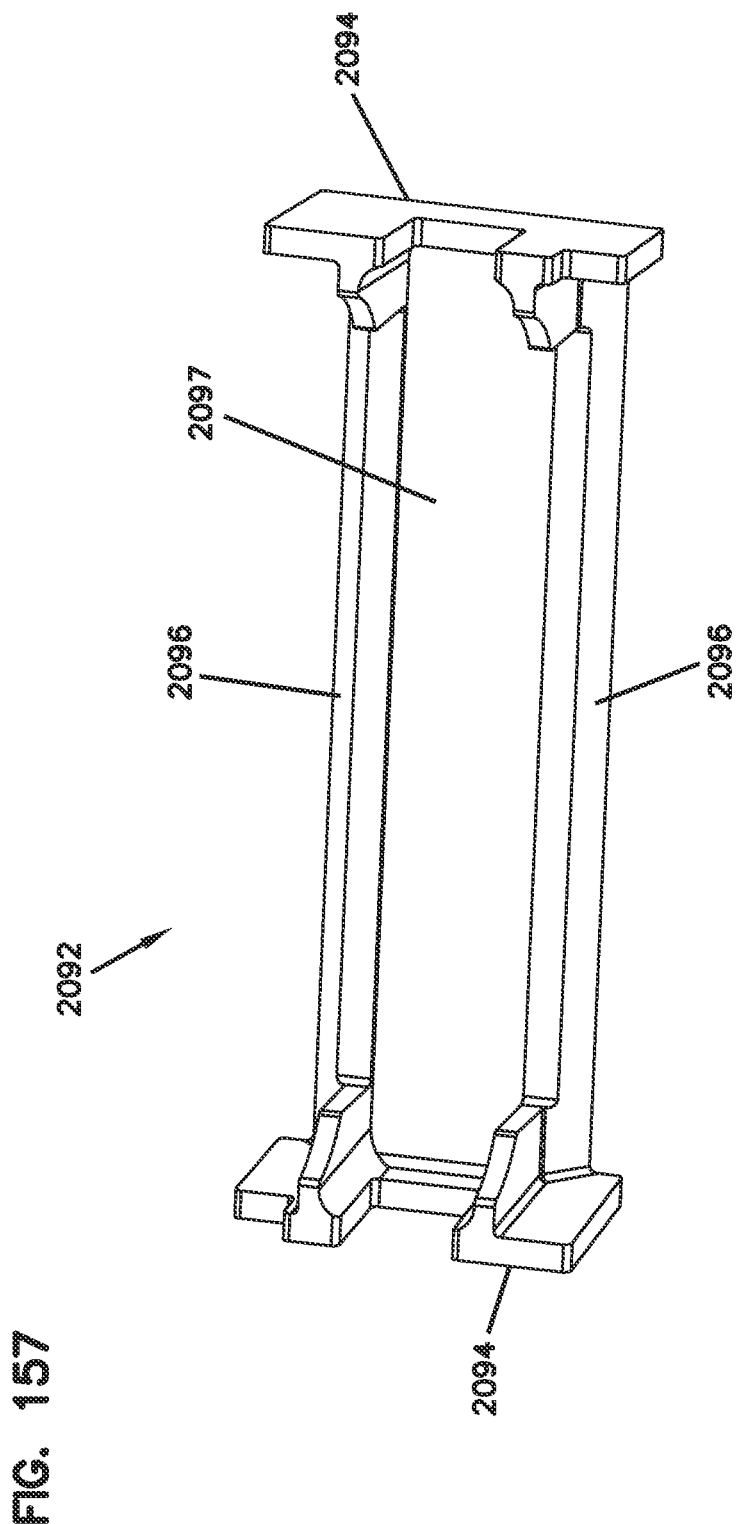
Figure 158:
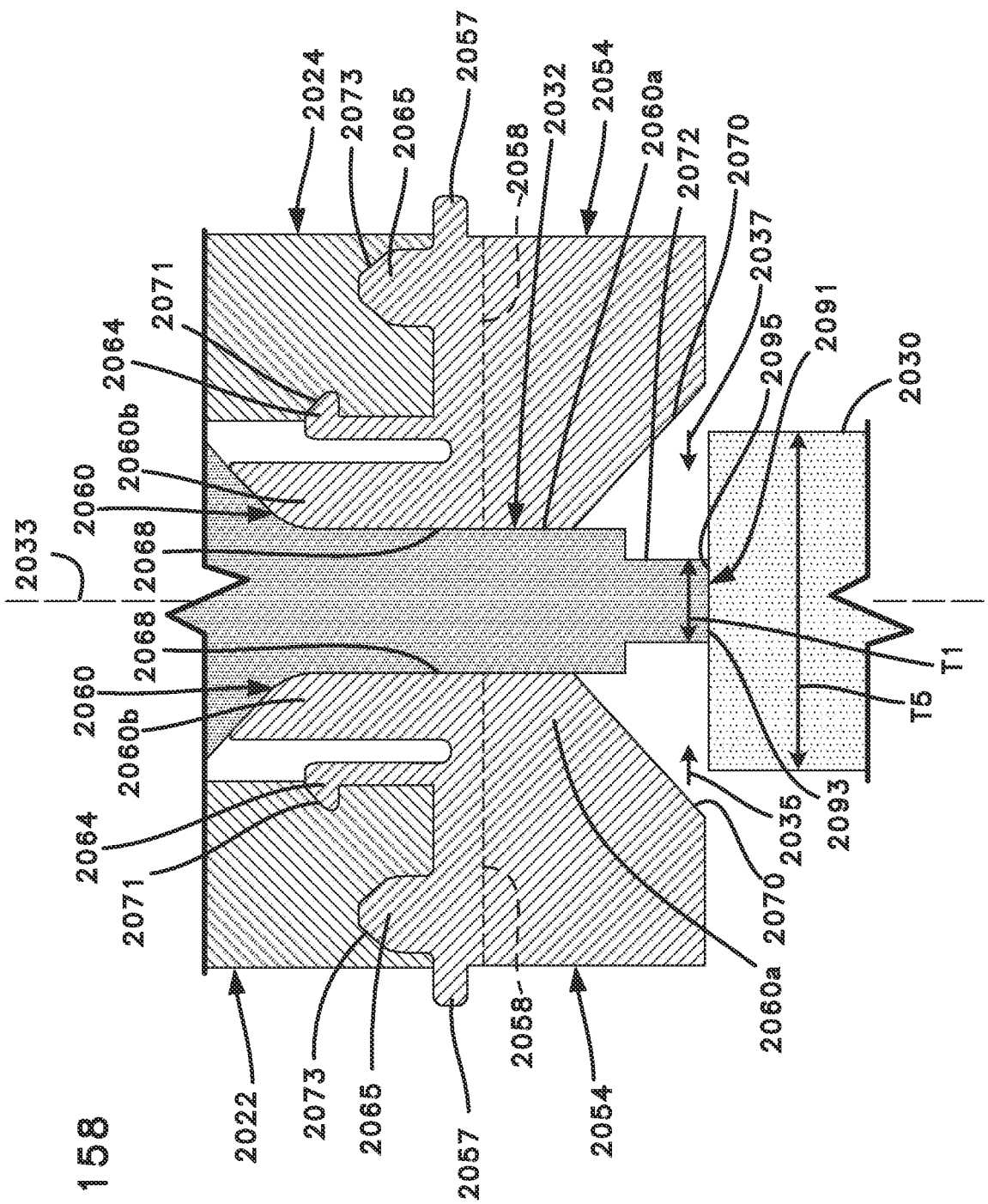
Figure 159:
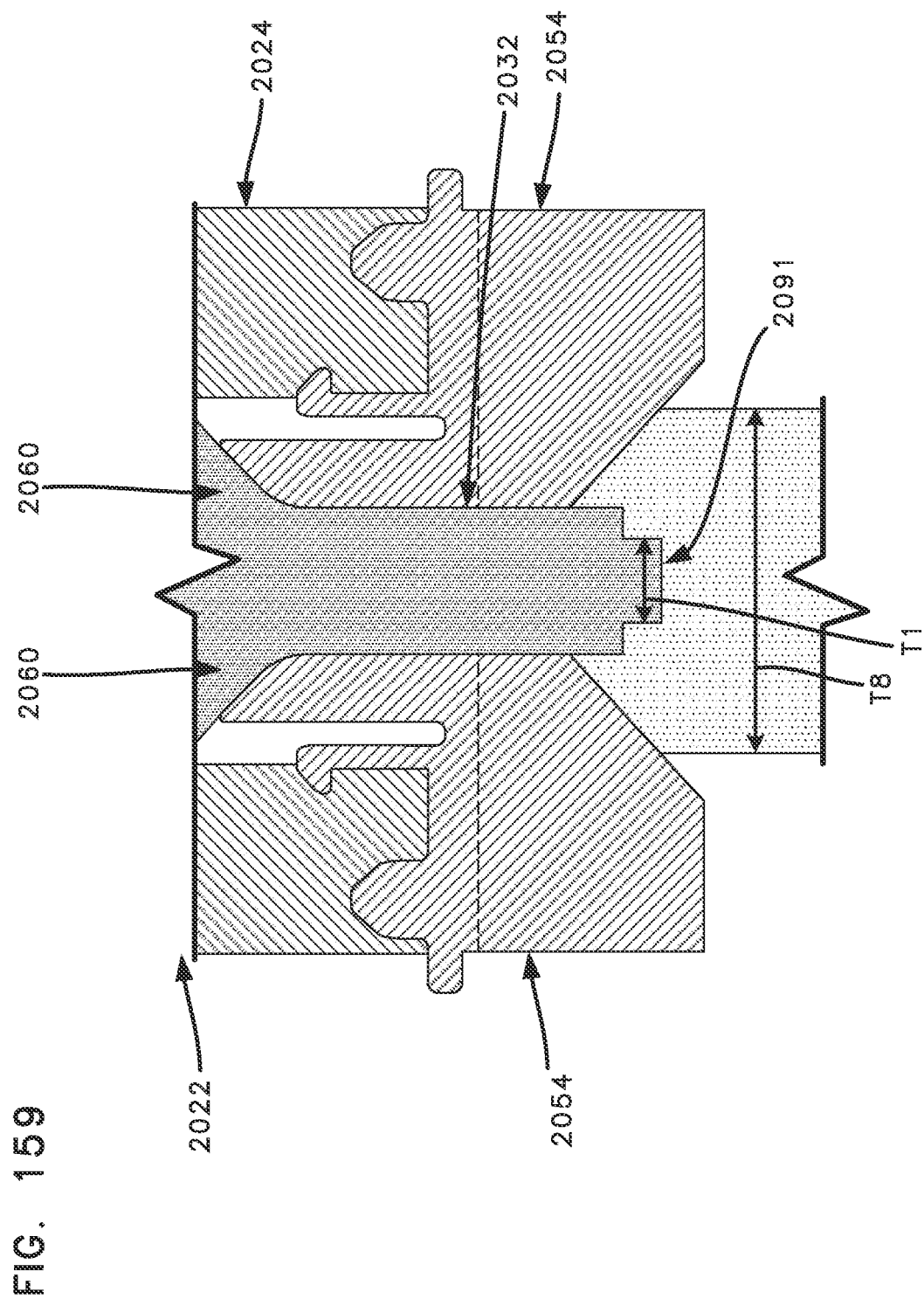
Figure 161:
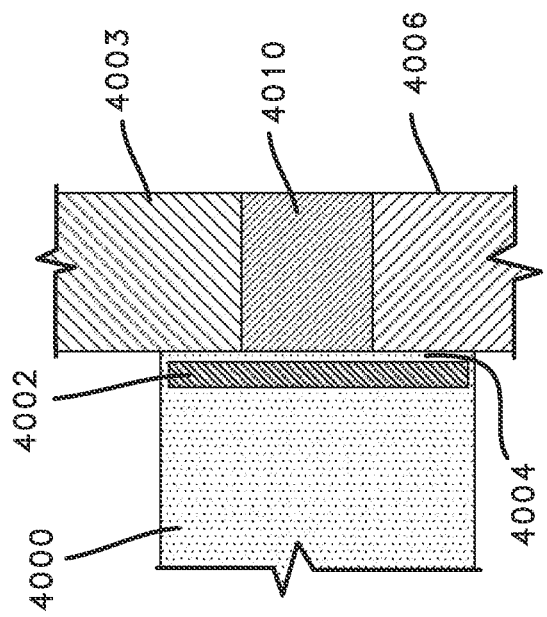
Figure 160:
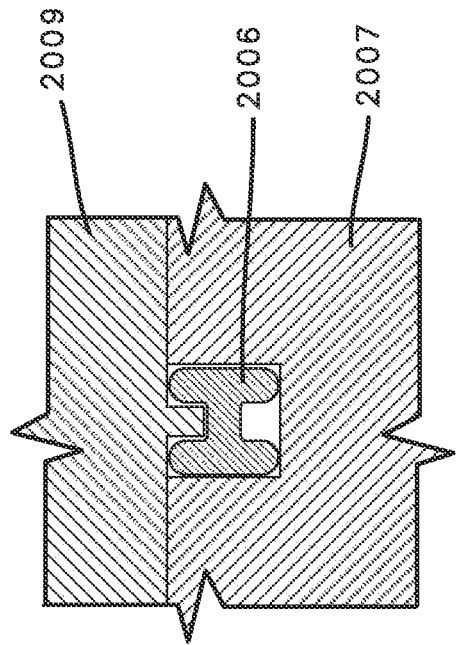
Figure 163:
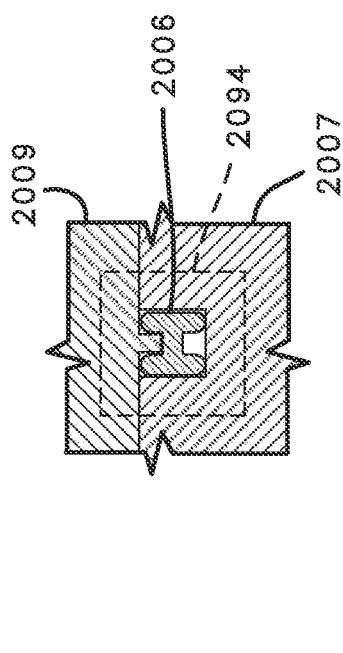
Figure 165:
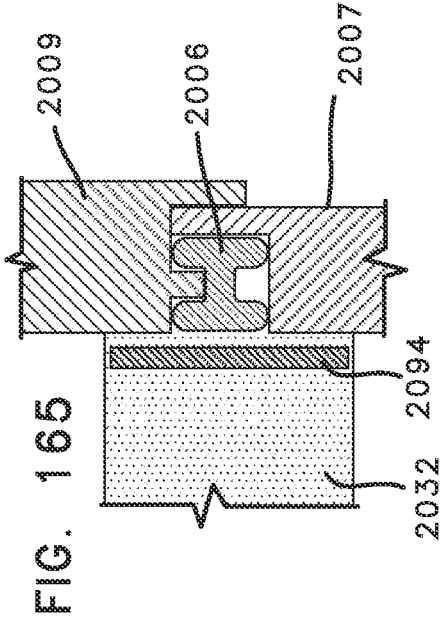
Figure 162:
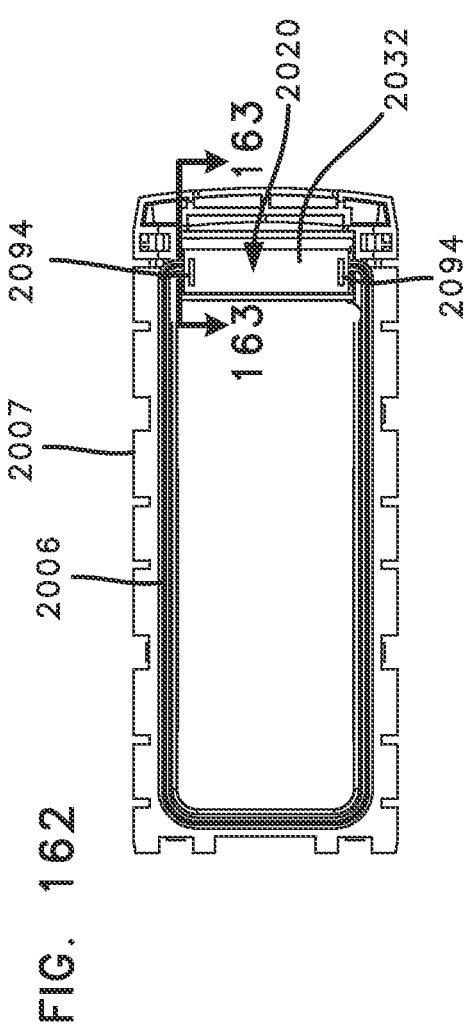
Figure 164:
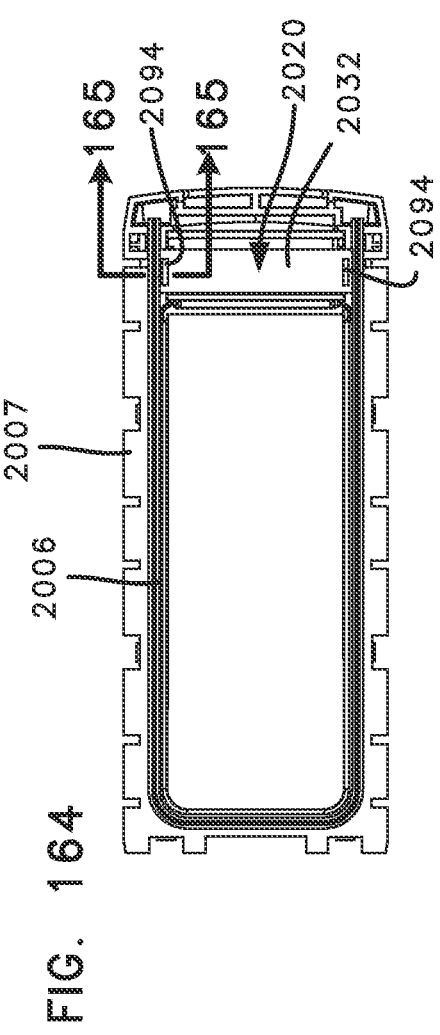
Figure 166:
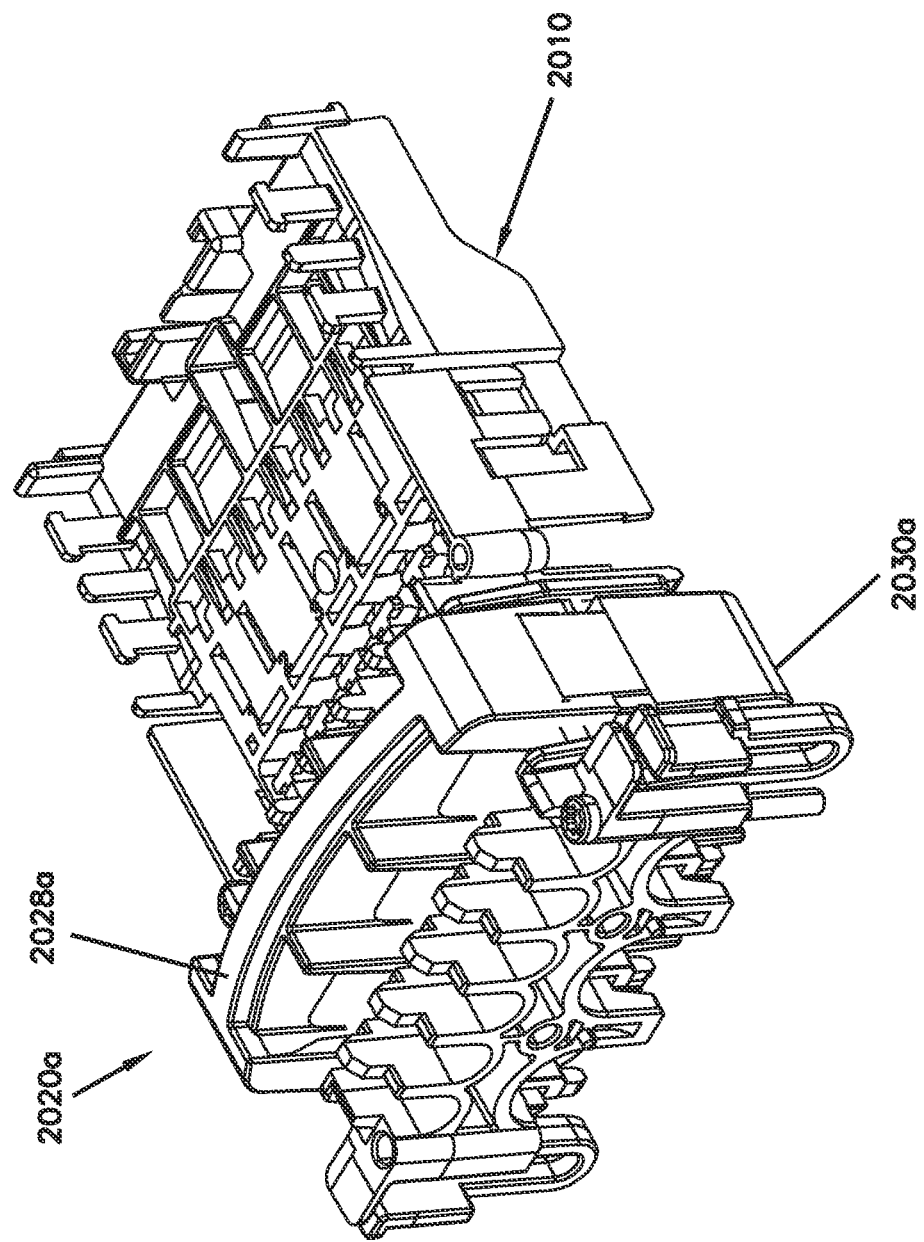
Figure 167:
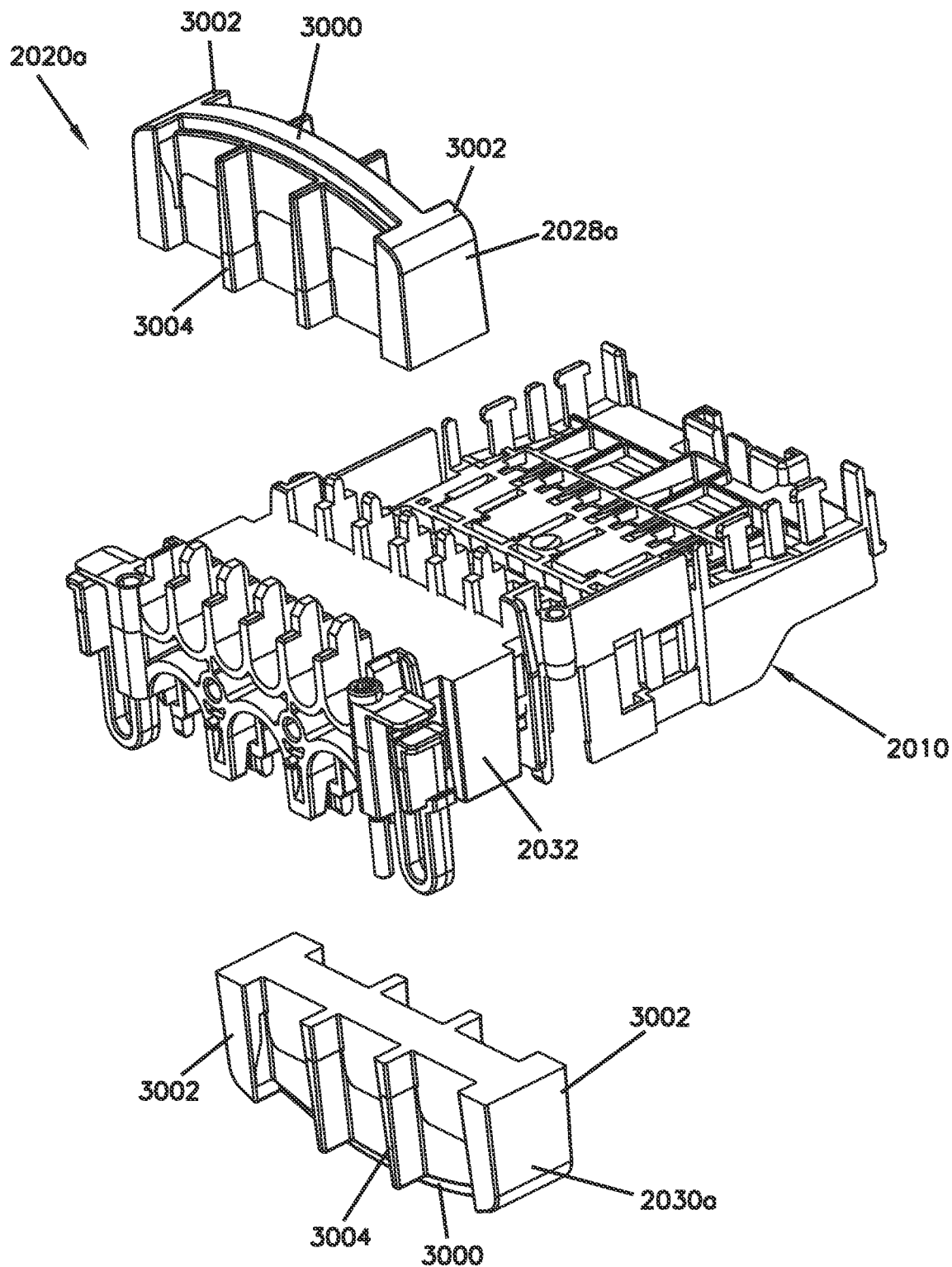
Figure 168:
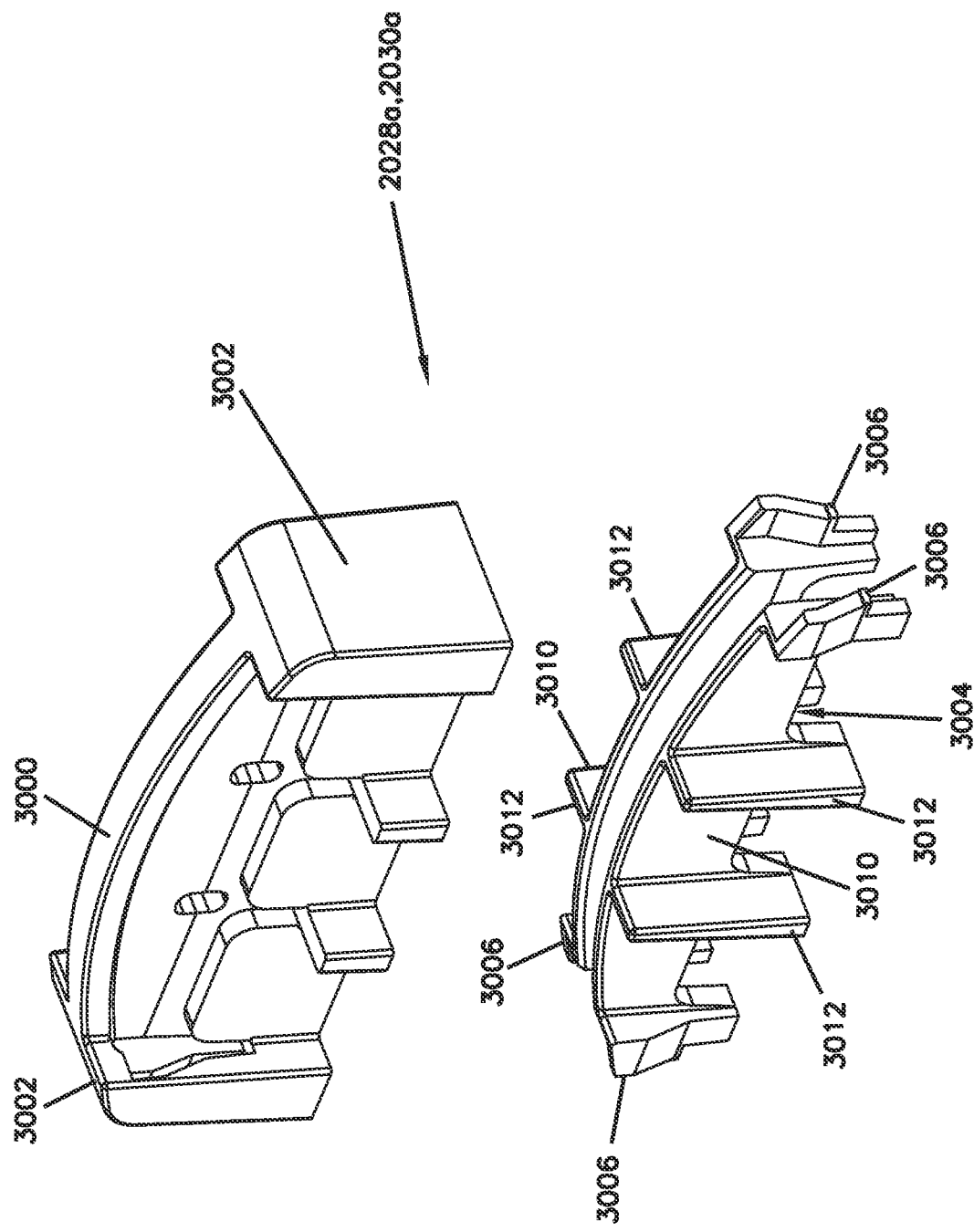

FIG. 132 is a side view of the cable anchoring and sealant containment frame of FIG. 128;

FIG. 133 is a partially exploded view of the cable anchoring and sealant containment frame of FIG. 128;

FIG. 134 depicts a sealant block of the type used as upper and lower sealant blocks within the cable anchoring and sealant containment frame of FIG. 128, a reinforcing carrier which in actual practice is over-molded within the sealant of the sealant block is shown exploded from the sealant for illustration purposes;

FIG. 135 shows the cable anchoring and sealant containment frame of FIG. 128 with the sealant removed and with port reducers installed on the frame;

FIG. 136 is a side view of the cable anchoring and sealant containment frame of FIG. 135;

FIG. 137 is a top view of the cable anchoring and sealant containment frame of FIG. 135;

FIG. 138 is a bottom view of the cable anchoring and sealant containment frame of FIG. 135;

FIG. 139 shows the cable anchoring and sealant containment frame of FIG. 128 with the sealant removed and with port reducers exploded from the main structure of the cable anchoring and sealant containment frame;

FIG. 140 is a top view of the cable anchoring and sealant containment frame of FIG. 128 with the sealant and port reducers removed;

FIG. 141 is a bottom view of the cable anchoring and sealant containment frame of FIG. 140;

FIG. 142 is a perspective view of a port reducer adapted for use with the cable anchoring and sealant containment frame of FIG. 128, a side of the port reducer adapted to face away from the sealant is depicted;

FIG. 143 is a perspective view of the port reducer of FIG. 142 showing a side of the port reducer adapted to face toward the sealant held by the sealant containment frame;

FIG. 144 is an elevational view of the port reducer of FIGS. 142 and 143;

FIG. 145 is an elevational view showing the side of the port reducer of FIGS. 142 and 143 adapted to face toward the sealant contained within the cable anchoring and sealant containment frame;

FIG. 146 is an elevational view showing the side of the port reducer of FIGS. 142 and 143 adapted to face away from the sealant contained within the cable anchoring and sealant containment frame;

FIG. 147 shows a sealant arrangement adapted to be contained by the sealant containment frame of FIG. 128; the primary structure of the cable anchoring and sealant containment frame has been omitted; however, the port reducers are shown positioned relative to the sealant arrangement as if they were being held in place by the primary structure of the cable anchoring and sealant containment frame;

FIG. 148 shows the sealant arrangement of FIG. 147 with the port reducers removed; a continuous sealing path/loop where the sealing arrangement seals against the inside of the enclosure is depicted;

FIG. 149 shows the sealant arrangement of FIG. 148 with the upper gel block exploded upwardly from an intermediate sealant block of the sealant assembly;

FIG. 150 shows the sealant assembly of FIG. 149 with the upper and lower sealant blocks exploded away from the intermediate sealant block;

FIG. 151 is a perspective view of the intermediate sealant block of FIG. 150;

FIG. 152 is a bottom, perspective view of an intermediate sealant block of FIG. 151;

FIG. 153 is an end view of the intermediate sealant block of FIG. 151 with the sealant depicted as being transparent so as to allow an internal reinforcing carrier within the sealant to be visible;

FIG. 154 is a view showing a primary side of the intermediate sealant block with the sealant depicted as being transparent such that the internal reinforcing carrier is visible;

FIG. 155 is a perspective view of the internal carrier of the intermediate sealing block of FIG. 151;

FIG. 156 is another perspective view of the carrier of FIG. 155;

FIG. 157 is a further perspective view of the carrier of FIG. 155;

FIG. 158 is a cross-sectional view through a portion of the sealant arrangement of FIG. 147 prior to pressurization of the sealant;

FIG. 159 is a cross-sectional view through the portion of the sealant arrangement of FIG. 158 after pressurization of the sealant;

FIG. 160 is a cross-sectional view showing a cross-sectional profile of a perimeter gasket of the enclosure of the telecommunications device of FIG. 121;

FIG. 161 shows a sealing configuration for sealing an interface between first and second housing pieces of an enclosure;

FIG. 162 shows a sealing interface between a perimeter seal and a cable sealing block at a triple point of a sealed enclosure;

FIG. 163 is a cross-sectional view taken along section line 163-163 of FIG. 162;

FIG. 164 shows another sealing interface between a perimeter seal and a cable sealing block at a triple point of a sealed enclosure;

FIG. 165 is a cross-sectional view taken along section line 165-165 of FIG. 164;

FIG. 166 depicts the cable anchoring and sealant containment frame of FIG. 128 with an alternative sealant arrangement;

FIG. 167 depicts the cable anchoring and sealant containment frame of FIG. 166 with upper and lower sealant blocks of the sealant arrangement exploded from the frame; and FIG. 168 depicts a sealant block of the type used for the upper and lower sealant blocks of FIGS. 166 and 167, a carrier which is integrated with the sealant in actual practice has been shown exploded from the sealant for illustration purposes.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a telecommunications enclosure including a management unit having a support infrastructure and a rear tray. The support infrastructure defines an adapter mounting location and a splice mounting location. In certain examples, the support infrastructure also provides storage for excess fiber length. In certain examples, the management unit includes a pivotable rear tray to hold the excess fiber length.

Figure 1:
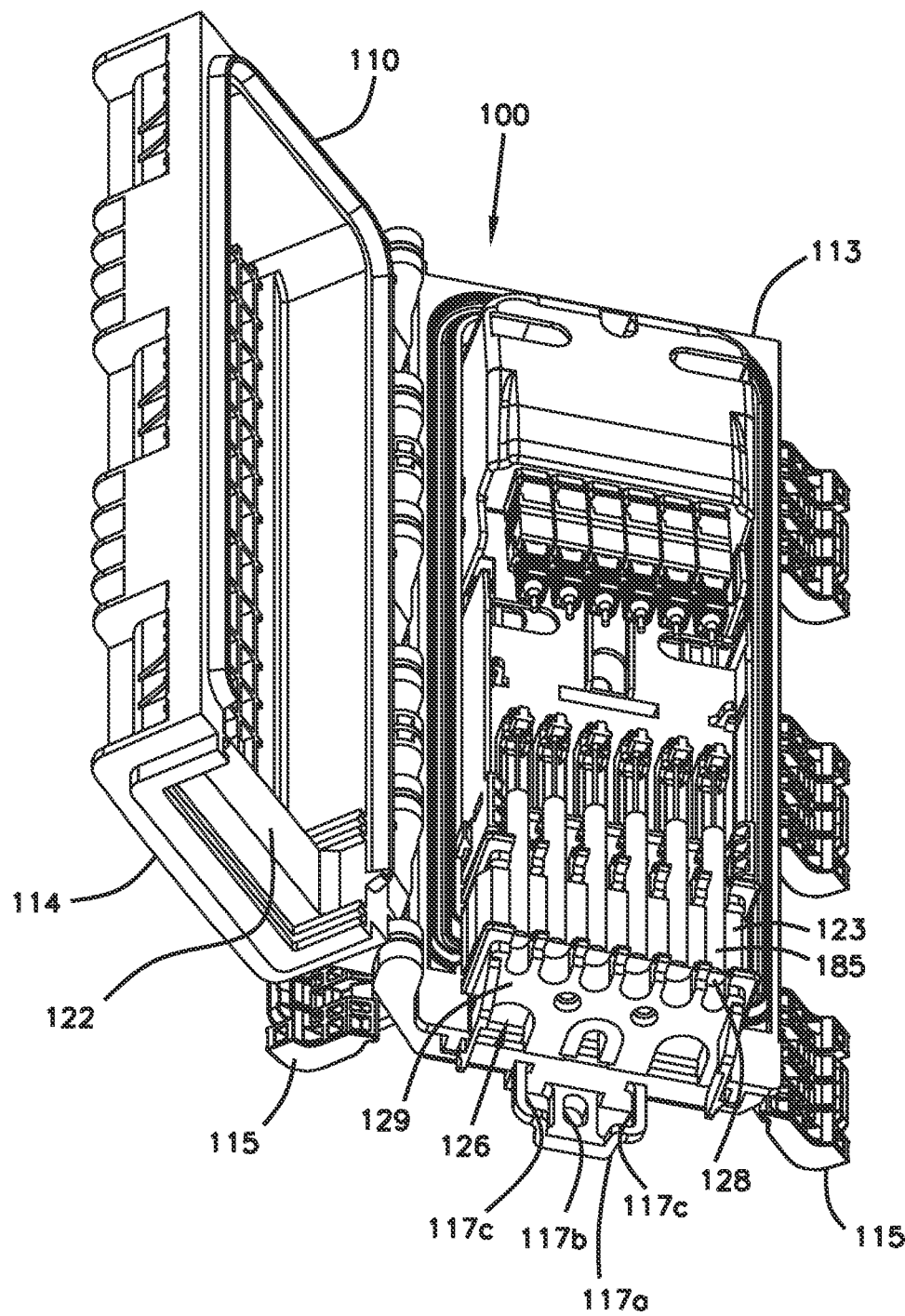
FIG. 1 is a front perspective view of an example telecommunications enclosure configured in accordance with the principles of the present disclosure, the telecommunications enclosure including housing having a cover shown open relative to a base to expose a management unit.
Figure 2:
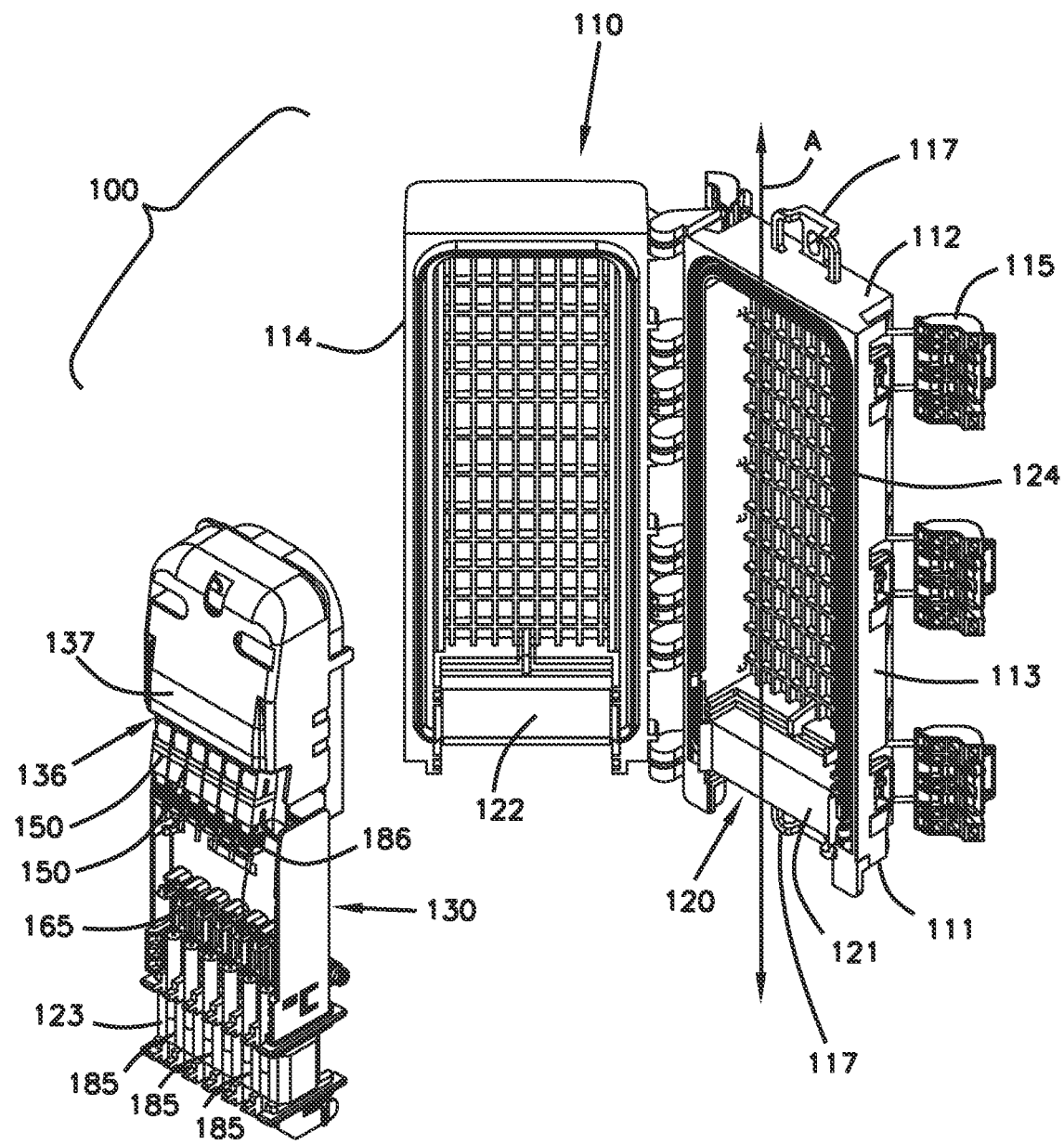
FIG. 2 shows the management unit of FIG. 1 exploded out from the housing of FIG. 1.
Figure 3:
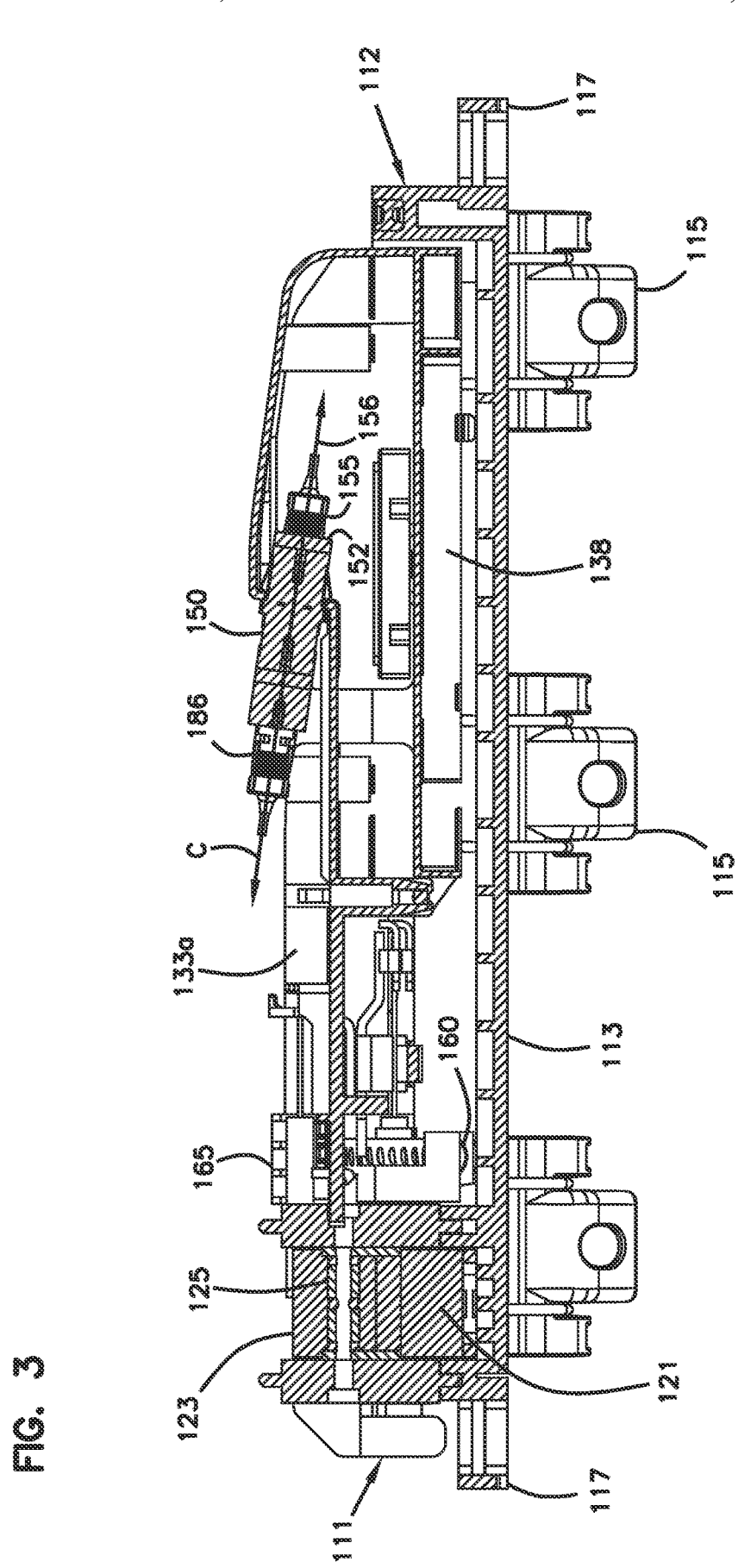
FIG. 3 is a cross-sectional view of the telecommunications enclosure of FIG. 1.

Referring to FIG. 1, a telecommunications enclosure 100 includes a housing 110, a sealing arrangement 120 for sealing the housing 110, and a management unit 130 that mounts within the interior of the housing 110. The housing 110 is elongate along a major axis A of the housing 110. The major axis A extends along a length of the housing 110 between first and second opposite ends 111, 112.

The housing 110 includes a base 113 and a cover 114 that cooperate to define an interior of the housing 110. The cover 114 is pivotally connected to the base 113 and is pivotally moveable relative to the base 113 between an open position and a closed position. In an example, the hinge axis of the housing 110 is parallel to the major axis A of the housing 110. In other examples, the hinge may have a slide feature which allows the pivot axis to slide/move relative to the base so that the cover can be staged above the base prior to latching. This type of configuration allows a perimeter seal of the housing to be evenly compressed at both the hinge side and the opposite side when the housing is latched closed. A suitable sliding hinge configuration is disclosed at FIGS. 18-30 of PCT Publication No. WO2017/046187, which is hereby incorporated by reference in its entirety.

In certain examples, latches 115 are spaced about a perimeter of the housing 110 to clamp the cover 114 in the closed position. The cover 114 defines a front of the housing 110 and the base 113 defines a rear of the housing 110.

In certain implementations, the housing 110 includes mounting structure 117 to hold (e.g., attach) the housing 110 to a pole, wall, or other surface. In some examples, the mounting structure 117 includes a mounting projection 117a defining a fastener opening 117b therethrough and also defining band clamp receptacles 117c between which the mounting projection 117a is positioned. In other examples, band clamp receivers 117 are positioned at the first and second ends 111, 112 of the housing 110. Each of the band clamp receivers 117 is configured to receive a band of a band clamp. In certain examples, the band clamps extend through the band clamp receivers 117 in an orientation that extends along a minor axis of the housing 110.

The sealing arrangement 120 seals the housing 110. The sealing arrangement 120 includes a cable sealing arrangement 119 at the first end 111 of the housing 110. The cable sealing arrangement 119 includes a rear gel volume 121 mounted in the base 113 (e.g., molded into the base), a front gel volume 122 mounted in the cover 114 (e.g., molded into the cover), and an intermediate gel volume 123 positioned between the front and rear gel volumes 121, 122. The cable sealing arrangement 119 includes a first cable entry location 126 defined between the rear gel volume 121 and the intermediate gel volume 123 and a second cable entry location 128 defined between the front gel volume 122 and the intermediate gel volume 123. The sealing arrangement 120 also includes a perimeter seal 124 that extends about a perimeter of the housing 110 for sealing between the cover 113 and the base 114.

In certain examples, the cable sealing arrangement 119 includes inner and outer gel containment walls 129 between which the front, rear and intermediate gel volumes 121-123 are positioned and axially contained. The containment walls 129 can define openings respectively corresponding to the first and second cable entry locations 126, 128 which locations where cables can be routed through the containment walls 129 and the gel. When the cable sealing arrangement 119 is positioned within the housing 110, the containment walls 129 are axially fixed (i.e., fixed in an orientation that extends along or parallel to the axes of cables that are routed though the cable sealing arrangement 120) relative to one another such that an axial spacing between the containment walls 129 is fixed. The spacing extends along a cable pass-through direction (i.e., the axial direction) which corresponds to the direction the cables extend as the cables are routed through the cable sealing arrangement 120. The containment walls 129 can include edges 233 (e.g., flanges, extensions, lips, etc.) that fit within corresponding slots 235 defined by the housing 110 (e.g., by both the base and the cover) such that interference between the edges 233 and the portions of the housing 110 defining the slots 235 limit or prevent relative movement between the containment walls 129 along the cable pass-through direction. In certain examples, the edges 233 can have portions that taper toward each other to match a contour or shape of the interior of the cover and/or to prevent interference between the cover and the edges 233 when the cover is closed.

Figure 10:
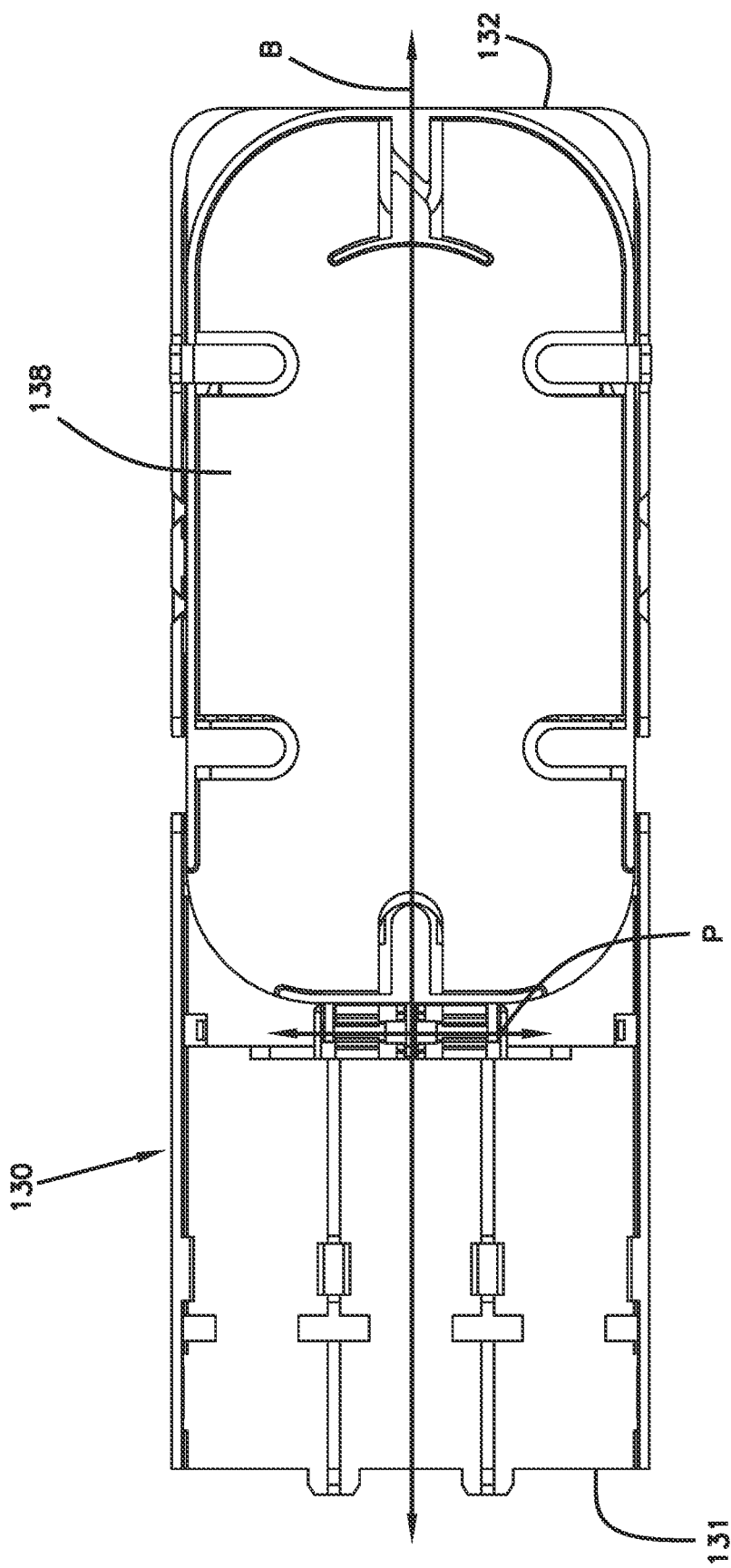
FIG. 10 is a rear view of the management unit of FIG. 9.
Figure 11:
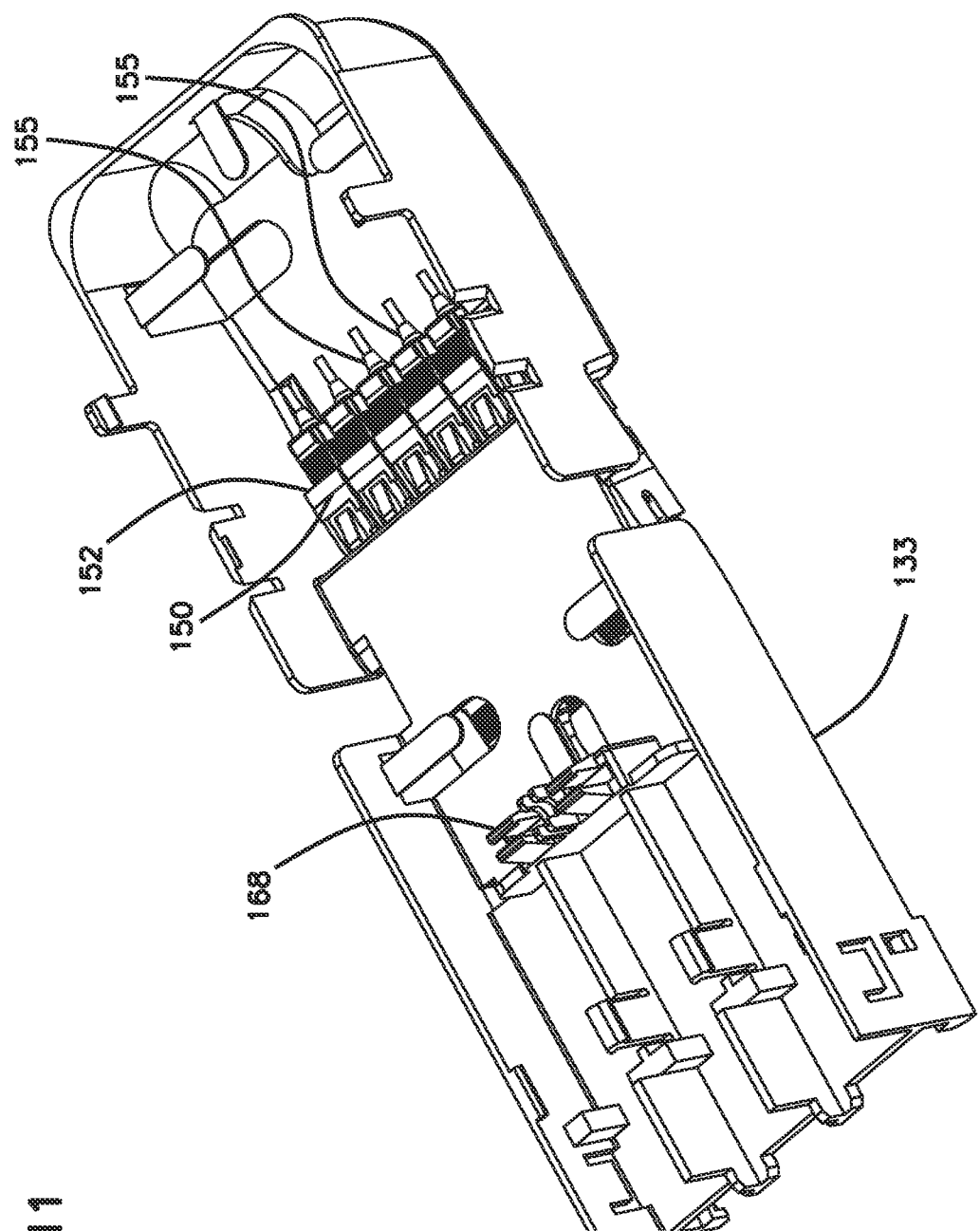
FIG. 11 is a rear perspective view of the management unit of FIG. 9 with a rear tray and splice components removed for ease in viewing the rear of the support infrastructure.

The management unit 130 mounts within the interior of the housing 110. In one example, the management unit 130 is latched in the housing by a snap-fit latching arrangement. In one example, the snap-fit latching arrangement includes elastic latches 239 on the housing 110 that engage catches 240 on the management unit 130. The management unit 130 is elongate along a major axis B (FIG. 10) that is parallel to the major axis A of the housing 110 when the management unit 130 is mounted within the interior of the housing 110. The major axis B of the management unit 130 extends along a length of the management unit 130 between a first end 131 and an opposite second end 132 of the management unit 130. The first end 131 of the management unit 130 is positioned adjacent to the first end 111 of the housing 110 when the management unit 130 is mounted within the housing 110. The second end 132 of the management unit 130 is positioned at the second end 112 of the housing 110 when the management unit 130 is mounted within the housing 110.

The management unit 130 includes a support infrastructure 133 (e.g., a frame structure) including a front side 134 and an opposite back side 135. The support infrastructure 133 includes an adapter mounting location 136 and a front cover 137 positioned between the adapter mounting location 136 and the second end 132 of the management unit 130 at a front 134 of the management unit 130. The catches 240 can be positioned at the sides of the support infrastructure 133.

In certain examples, the intermediate gel volume 123 of the cable sealing arrangement 119 is secured between and carried with the containment walls 129. In certain examples, the containment walls 129 are separated by one or more spacers 125 positioned between the containment walls 129. The spacers 125 can be separate pieces from the containment walls 129 or integrated (e.g., unitarily formed) with one or both of the containment walls 129. In certain examples, the intermediate gel volume 123 is molded between the containment walls 129 and overmolded over the spacers 125. In certain examples, the containment walls 129 can be secured together by fasteners. In certain examples, the fasteners can extend through the spacers 125. In certain examples, the cable sealing arrangement 119 can be attached to the support infrastructure 133 by fasteners, latches, adhesive, a snap-fit connection or other means so that the cable sealing arrangement 119 is carried with the support infrastructure 133 when the management unit 130 is removed from the housing 110. For example, the inner containment wall 129 can be attached to the support infrastructure 133. In other examples, the cable sealing arrangement 119 is not attached to the support infrastructure 133, but the support infrastructure 133 and the cable sealing arrangement 119 are retained in relative position with respect to each other (e.g., held together) by the housing when they are mounted in the housing 110.

Figure 4:
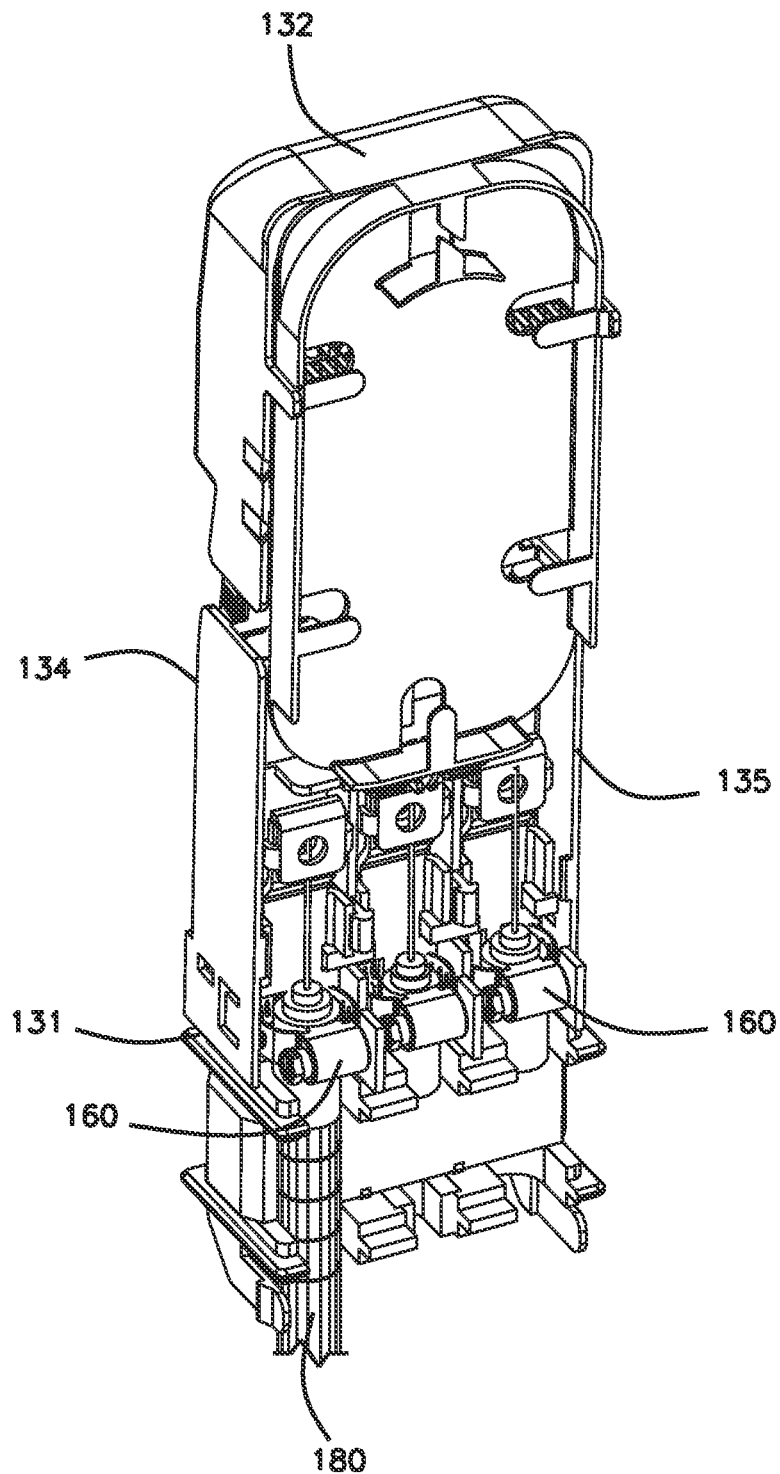
FIG. 4 is a rear perspective view of the management unit of FIG. 2 to which example pass-through cables and an intermediate gel volume are shown anchored.
Figure 5:
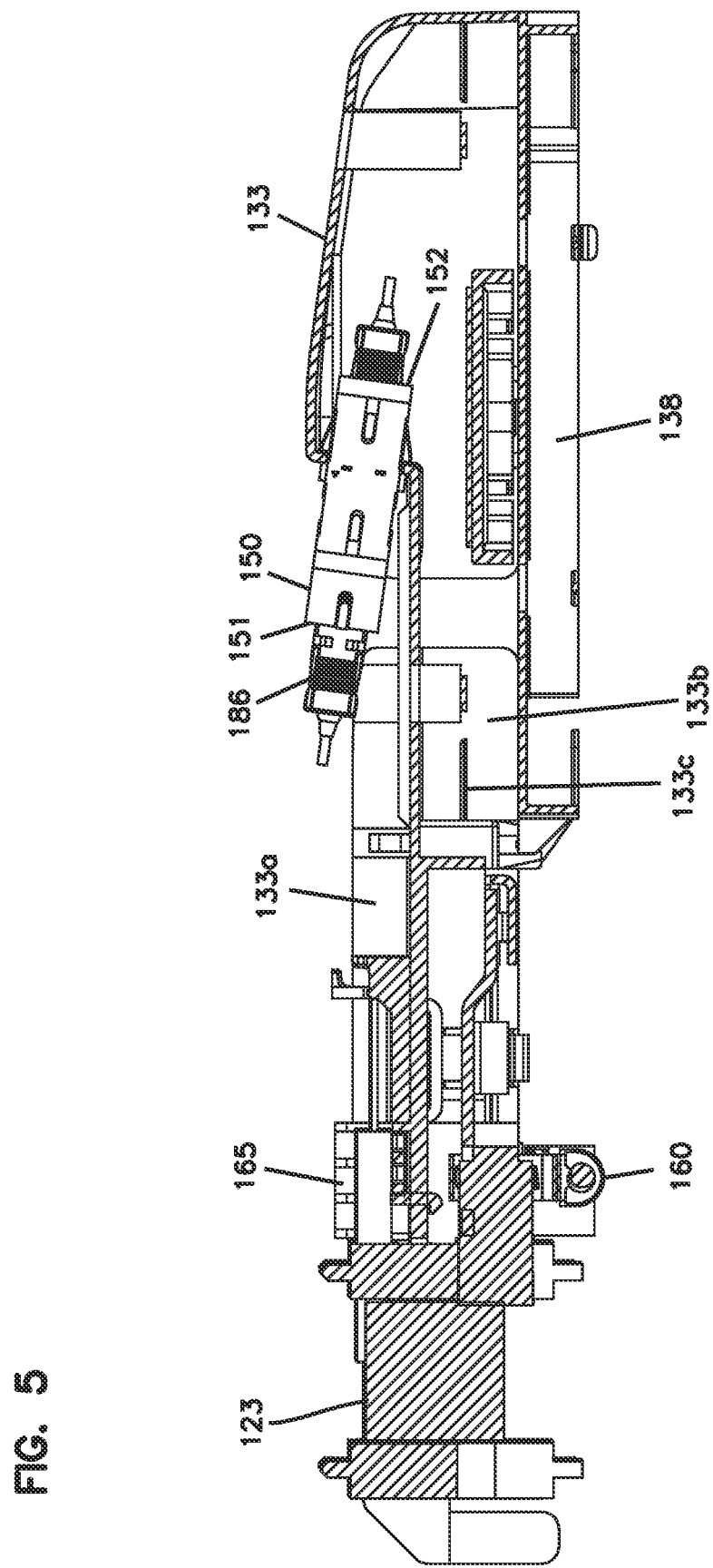
FIG. 5 is a cross-sectional view of the management unit of FIG. 4.

The management unit 130 also includes a rear tray 138 positioned at a rear of the management unit 130. The rear tray 138 is pivotally coupled to the support infrastructure 133. The rear tray 138 is pivotally moveable about a tray pivot axis P that is transverse relative to the major axis B of the management unit 130 between an open positon and a closed position. The rear tray 138 is located at the second end 132 of the management unit 130. The rear tray 138 can pivot about the tray pivot axis P between the closed position (see FIG. 4) in which the rear tray 138 is parallel to the rear side of the support infrastructure 133 and the open positon in which the rear tray 138 is perpendicular to the rear side of the support infrastructure 133. The support infrastructure 133 can include latches 242 that engage the rear tray 138 when the rear tray is in the closed position to retain the rear tray in the closed position.

Figure 12:
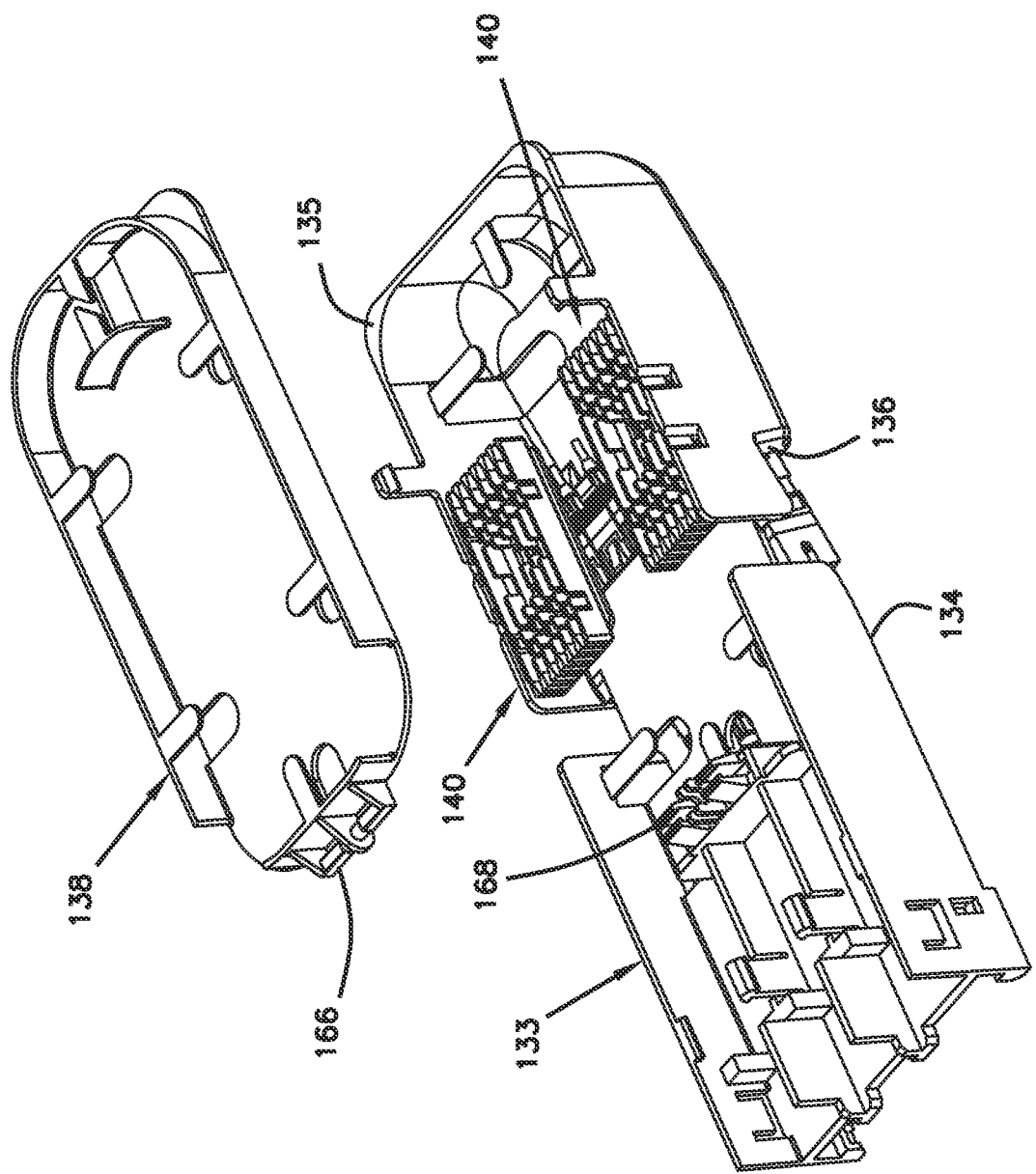
FIG. 12 is a rear perspective view of the management unit of FIG. 9 with the rear tray exploded off the support infrastructure to expose the splice components.
Figure 13:
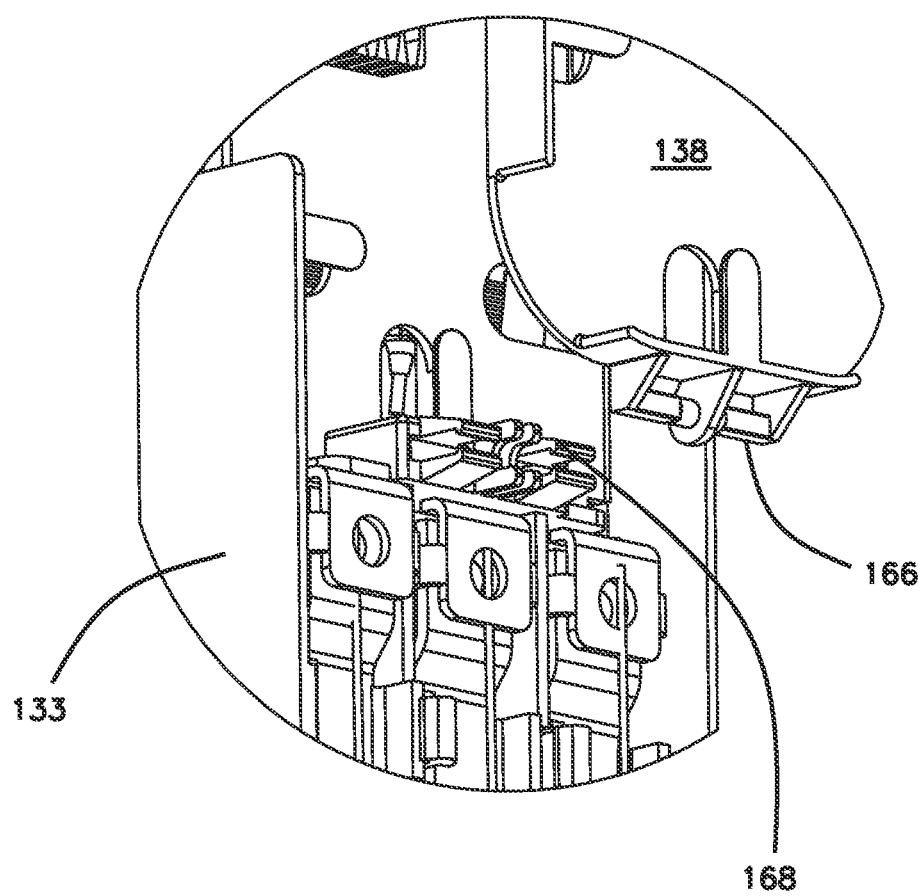
FIG. 13 is an exploded view of the management unit of FIG. 12 so that the detent structure that holds the rear tray in the open and closed positions is visible.

Optical component holders 706 (see FIGS. 12 and 14) are mounted to the support infrastructure 133 at a component mounting location 139 (i.e., a layer or zone) positioned forwardly with respect to the rear tray 138. The optical component holders 706 are secured to side walls of the support infrastructure 133 by brackets 141. The optical component holders 706 are covered by the rear tray 138 when the rear tray 138 is in the closed position and are accessible from the rear of the management unit 130 when the rear tray 138 is in the open position. The optical component holders 706 can have grooves, fingers, pockets or other structures for holding splice reinforcing sleeves (sleeves which typically contain adhesive and a reinforcing rod contained within a heat shrink sleeve adapted for surrounding, protecting and reinforcing fusion splices between optical fibers). In other examples, the optical component holders 706 can be configured (e.g., can include suitably sized slots, fingers, pockets, receptacles, or the like) for holding passive optical splitters or wavelength division multiplexers. In still other examples, the optical component holder 706 can be configured for holding a fiber optic adapter or a bank of fiber optic adapters suitable for mechanically an optically coupling together fiber optic connectors.

A bank of adapters 150 is mounted at the adapter mounting location 136. The bank of adapters 150 include first ports 151 that face at least partially toward the first end 131 of the management unit 130 and second ports 152 that face at least partially toward the second end 132 of the management unit 130. The front cover 137 is configured to block access to the second ports 152 from the front 134 of the management unit 130. The adapter mounting location 136 can include an opening 246 defined by front cover 137. The adapters 150 can be snapped within the opening 246. For example, an edge of the front cover 137 can be captured between a shoulder 248 and a spring clip 250 which snaps through the opening 246 when the adapter 150 is loaded into the opening and functions to retain the adapter 150 in the opening 246.

In certain implementations, the fiber optic adapters 150 define axes C that are angled in a front-to-rear orientation such that first ports 151 of the fiber optic adapters 150 face at least partially in a forward direction and second ports 152 of the fiber optic adapters 150 face at least partially in a rearward direction.

Pre-installed fiber optic connectors 155 are loaded into the second ports 152 of the fiber optic adapters 150. The pre-installed fiber optic connectors 155 terminate the ends of pigtail optical fibers 156 that are routed to the component mounting location 139 where the pigtail optical fibers can be spliced to optical fibers of feeder cables (e.g., distribution cables, pass-through cables, etc.) or to outputs of passive optical splitters or wavelength division multiplexers having inputs coupled to optical fibers of feeder cables.

First cable anchors 160 are provided at the first end 131 of the management unit 130 at the rear 135 of the management unit 130 for anchoring (e.g., securing, attaching, fixing, etc.) feeder cables to the rear of the support infrastructure 133. Second cable anchors 165 are provided at the first end 131 of the management unit 130 at the front 134 of the management unit 130 for anchoring drop cables to the rear of the support infrastructure 133.

The first cable anchors 160 include anchor components 260 that snap into the rear side of the support infrastructure 133. The anchoring components 260 can have a metal construction. In one example, the support infrastructure 133 can include flexible latches 262 that engage tabs 264 located at intermediate positions along the lengths of the anchor components 260 to secure the anchor components 260 to the rear side of the support infrastructure 133. The first cable anchors 160 also include strength member clamping regions 266 at the ends of the anchor components 260. The strength member clamping regions 266 are adapted for receiving fasteners such as screws used to clamp strength members (e.g., a fiberglass reinforced polymeric rod, a string-like reinforcing member such as aramid yarn, etc.) of fiber optic cables to the anchor components 260. The first cable anchors 160 further include cable clamps 268 having clamping bands 270 that can be expanded and contracted through the use of actuation structures. The actuation structures can include tunnels through which the bands 270 extend and in which screws 276 are mounted. The threads of the screws 276 engage slots in the bands 270. By turning the screws 276 in a first direction, the diameters of the band 270 are enlarged. By turning the screws in an opposite second direction, the diameters of the bands are reduced. By placing cables though the bands 270 and then constricting the diameters of the bands 270 by turning the screws 276, the cables can be clamped to the anchor components 260.

FIGS. 17-21 show another cable anchor 160a that can be used to anchor feeder cables to the rear side of the support infrastructure 133. The cable anchor 160a includes an anchor component 260a that preferably has a metal construction. Anchor component includes an axial portion 261a adapted to extend axially along a length of a cable secured thereto. The axial portion 261a includes first and second sections 263a, 265a separated by a step 267a which elevates the first section 263a with respect to the second section 265a. A strength member clamp 266a is mounted at the first section 263a. The strength member clamp 266a includes a clamping member 269a secured to the first section 263a by a fastener 271a. The fastener 271a is depicted as a screw which threads within an opening defined by the first section 263a of the axial portion 261a. The fastener 271a can be used to draw the clamping member 269a toward the first section 263a such that a strength member of a fiber optic cable can be clamped between the clamping member 269a and the first section 236a. The first section 263a includes a clamp receptacle 273a defined between upright tabs 275a for receiving the clamping member 269a. The clamping member 269a includes downwardly projecting tabs 277a against which the ends of cable strength members can abut. The fastener 271a can also be used to secure the anchor component 260a to the rear side of the support infrastructure 133. For example, the fastener 271a can thread within an opening defined by the support infrastructure 133. Other fasteners can also be used to secure the anchor component 260a to the support infrastructure. For example, the axial portion 261a can be clamped against the support infrastructure 133 by the head of a fastener secured to the support infrastructure 133. The second section 265a includes a downwardly projecting tab 279a adapted to fit within a mounting opening defined by the support infrastructure 133 to limit axial movement of the anchor component 260a. The anchor component 260 further includes a clamping flange 281a that projects upwardly from the axial portion 261a. The clamping flange 281a includes two fingers 283a, 285a separated by a gap 287a. The fingers 283a, 285a are parallel to the axial portion 261a. The finger 283a includes cable retention projections 288a adapted to embed in a cable jacket of a cable clamped to the clamping flange 281a. A clamping element such as cable clamp 268 (e.g., a hose clamp) can be used to secure a cable to the clamping flange 281a and the axial portion 261a. The clamping band 270 of the cable clamp 268 can extend around the axial portion 261a and through the gap 287a.

Figure 6:
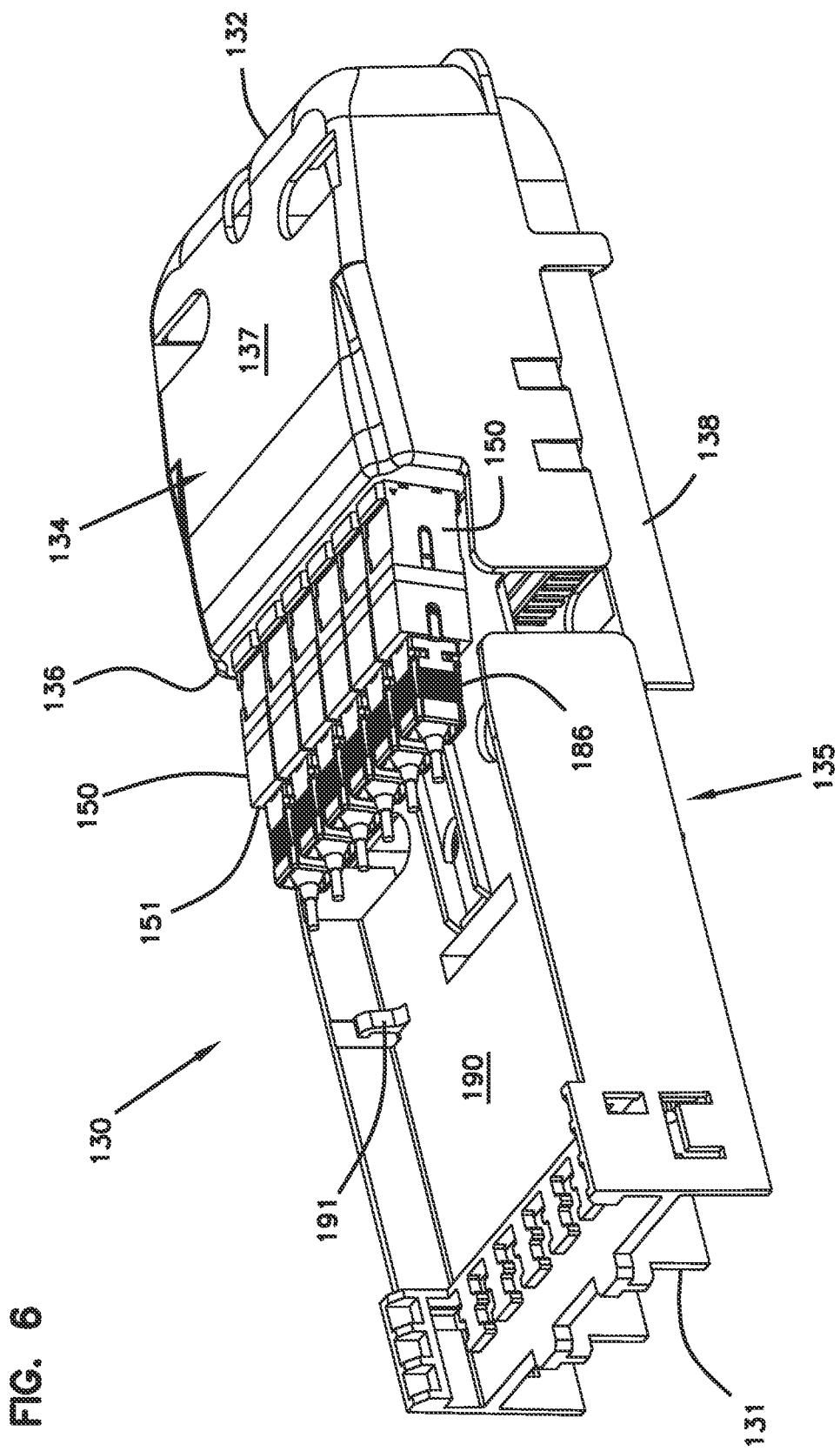
FIG. 6 is a front perspective view of the management unit of FIG. 4 shown without the pass-through cables and intermediate gel volume.
Figure 24:
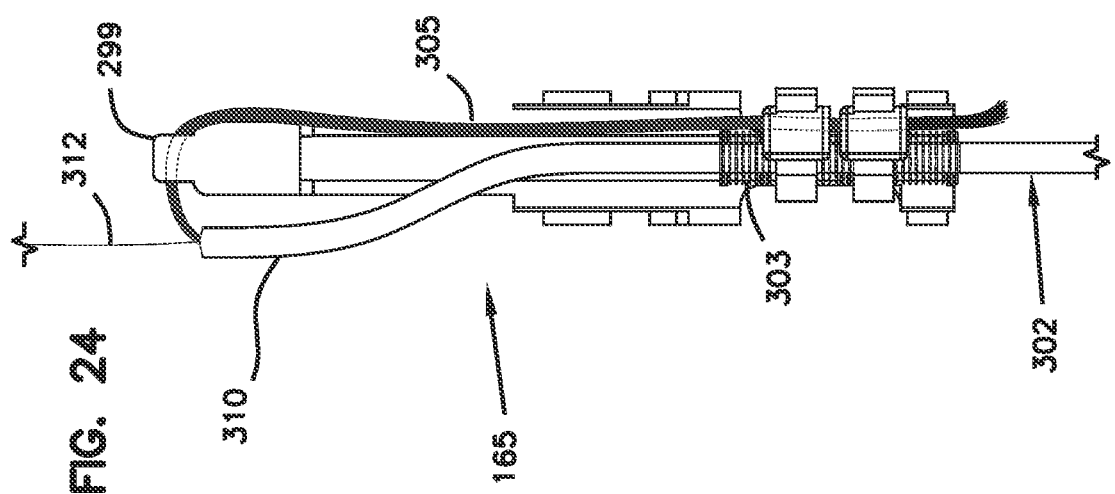
FIG. 24 is a front view of the cable anchor of FIG. 22 with a cable anchored thereto.

The second cable anchors 165 at the front 134 of the management unit 130 are adapted for anchoring drop cables to the front side of the management unit 130. In certain examples, the support infrastructure 133 can include cable anchoring fingers 293 (see FIG. 6) to which cables (e.g., drop cables) can be anchored with clamps, straps, bands, cable ties or the like. In certain examples, the second cable anchors 165 can be used to anchor cables (e.g., drop cables) to the front side of the management unit 130. FIG. 24 shows an example cable 302 fixed to one of the cable anchors 165. The cable 302 includes a jacket 310, an optical fiber 312, and a strength layer 305. As shown at FIGS. 22-25, the second cable anchors 165 can include anchoring members 295 that can be pivotally coupled to the support infrastructure 133 (e.g., by pivots 297 that snap within pivot receptacles defined by the support infrastructure 133). The anchoring members 295 each include a hook portion 299 and a cable fixing location 300. As shown at FIG. 24, a section of hook tape 303 is wrapped about the jacket 310 of the drop cable 302 at the cable fixing location 300. The hook tape 303 is wrapped around the cable 302 with the hook side out. The hook tape 303 includes a plurality of mini or micro hooks that are integrated with and project outwardly from one side (e.g., the outer side) of a tape layer. It will be appreciated that the hook tape 303 can be the same type of hook tape used for hook and loop fastening system (e.g., Velcro fastening systems). As shown at FIG. 24, the strength layer 305 (e.g., an Aramid yarn layer) of the cable 302 is routed from a jacket end of the cable 302, around the hook portion 299 to the cable fixing location 300. In one example, the strength layer 305 is looped about 180 degrees about the hook portion 299. At the cable fixing location 300, the strength layer 305 is entangled with (i.e., hooked by) the mini hooks of the hook tape 303. Wrap-style/strap style fastening elements such as cable ties 307 are used compress the strength layer 305 against the hook tape 303 and to compress the hook tape 303 about the circumference of the jacket 310 of the cable 302. Cable ties can include straps with teeth that extend through receivers having pawls that engage the teeth to the cable ties to be cinched and locked in a cinched position.

Referring generally to FIGS. 1-26, in use, a pass-through cable 180 (e.g., feeder cable) is routed through the first cable entry location 126 and is anchored to the rear 135 of the support infrastructure 133 by the first cable anchors 160, 160a. The pass-through cable 180 can include a jacket containing one or more strength members or a strength layer and also containing a plurality of buffer tubes each containing a plurality of optical fibers. A stripped section of the cable is located at a mid-span location of the cable 180 and has the outer jacket removed to expose the buffer tubes. The stripped section of the cable 180 is stored within the housing 110. Specifically, the buffer tubes are wound in a coil and stored in a cable loop at the rear tray 138. The stripped section of the cable 180 extends between first and second jacketed portions of the pass-through cable 180 which pass through the sealing gel at the first cable entry location 126 and are secured to the rear 135 of the support infrastructure 133 by the first cable anchors 160 160a. One or more of the buffer tubes and the corresponding optical fibers of the cable are cut and accessed at the mid-span location of the cable within the housing 110. The cut optical fibers are routed to the component mounting location 139 where the optical fibers of the feeder cable 180 can be optically spliced to the pigtail optical fibers 156 at the splice mounting location 139, or can be coupled to an input of an optical splitter or wavelength division multiplexer having outputs coupled to the pigtail optical fibers 156.

Drop cables 185 are routed through the second cable entry location 128 and anchored to the front 134 of the support infrastructure 133 by the second cable anchors 165. The drop cables 185 have connectorized ends 186 that plug into the first ports 151 of the fiber optic adapters 150.

In certain implementations, the management unit 130 and the intermediate volume of gel 123 are removeable together from the housing 110. In some examples, the intermediate volume of gel 123 is attached to the support infrastructure 133. In some examples, the intermediate volume of gel 123 is sandwiched between the drop cables 185 and the pass-through cable 180 that are anchored to and carried with the management unit 130.

In certain implementations, the support infrastructure 133 includes front side walls 133a and rear side walls 133b. In certain examples, fiber management tabs 133c project inwardly from the rear side walls 133b and assist in managing the pigtail optical fibers 156 and/or the optical fibers accessed from the pass-through cable 180.

Figure 7:
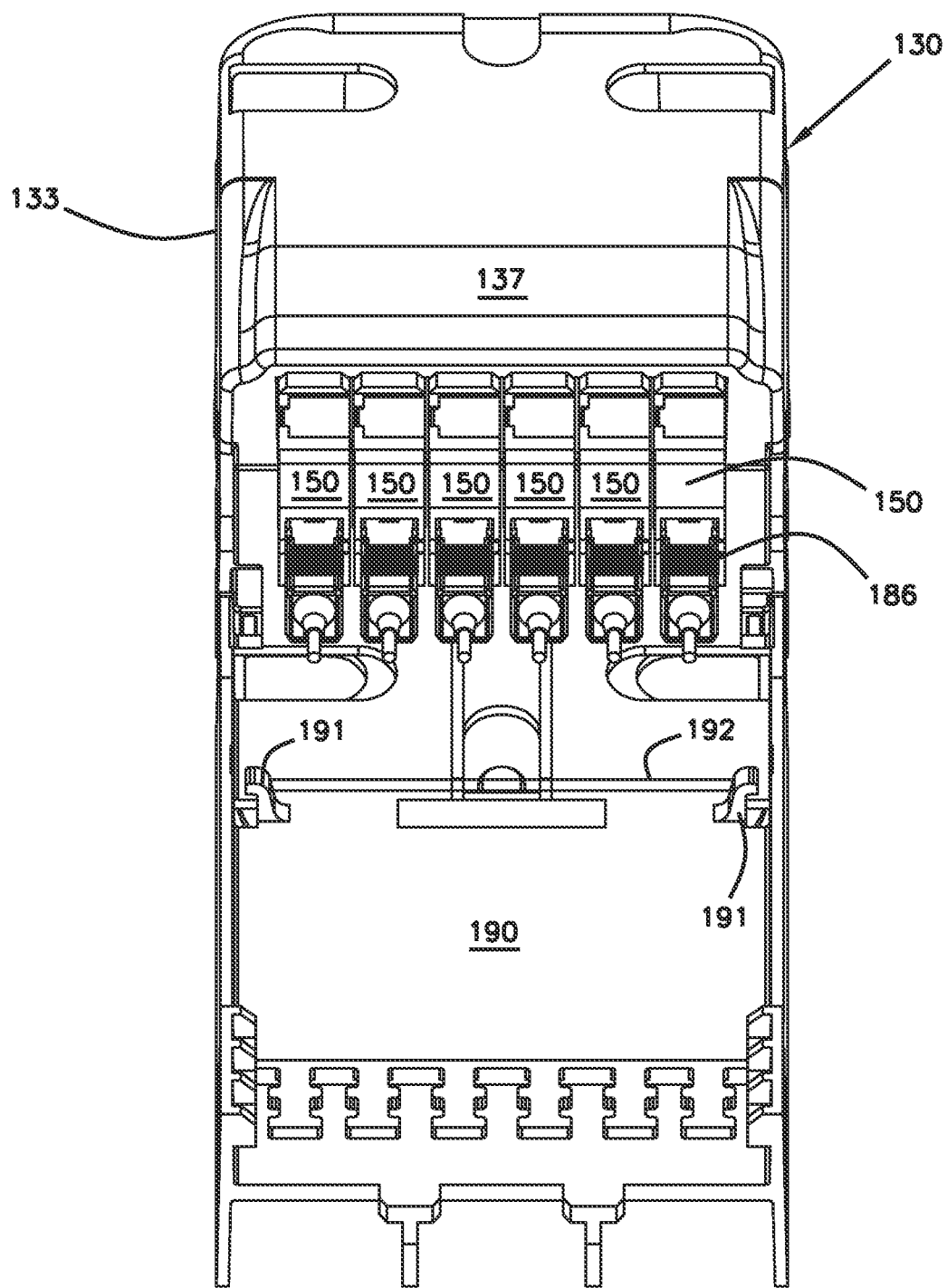
FIG. 7 is a front view of the management unit of FIG. 6.
Figure 8:
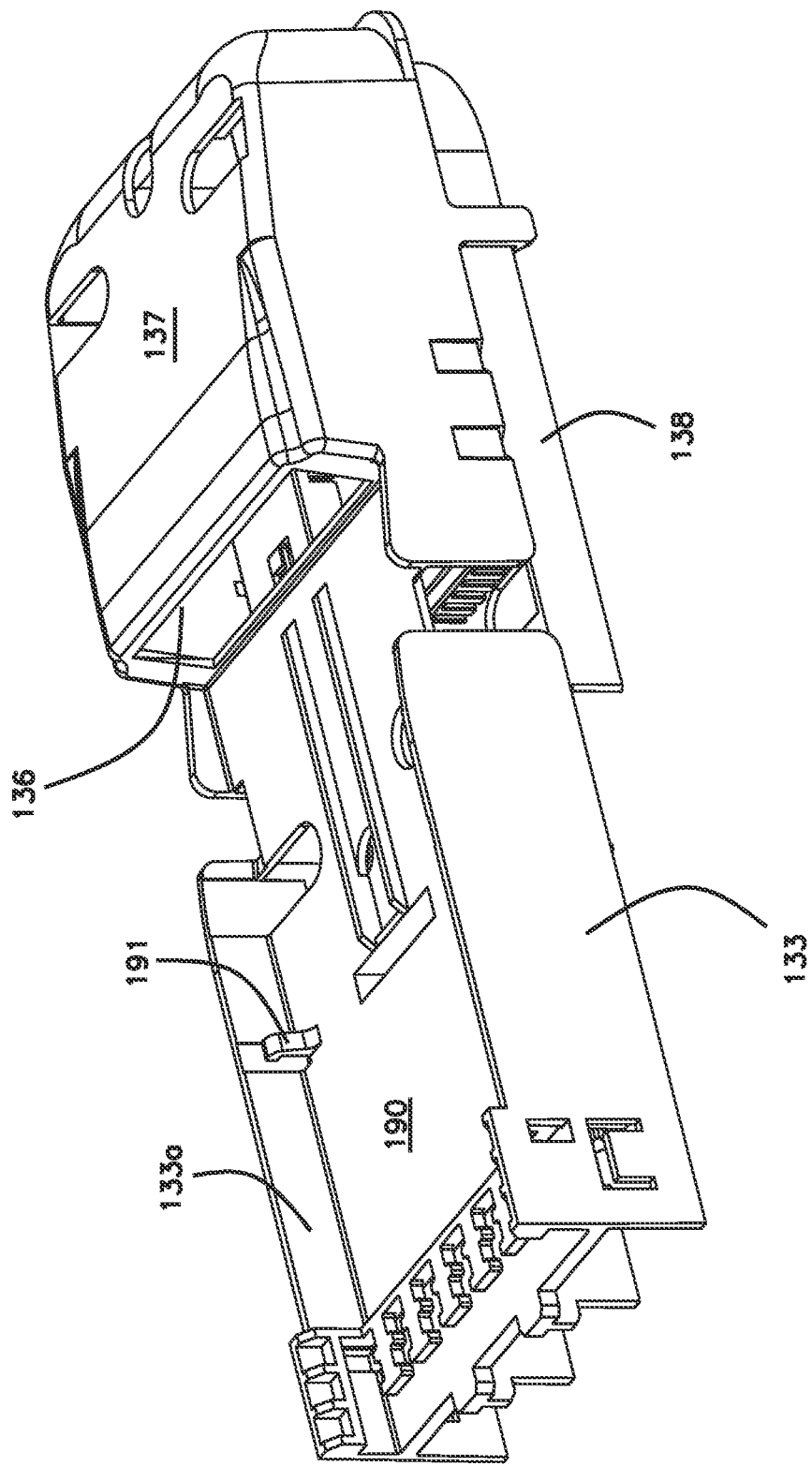
FIG. 8 is a front perspective view of the management unit of FIG. 6 with the bank of adapters removed.
Figure 9:
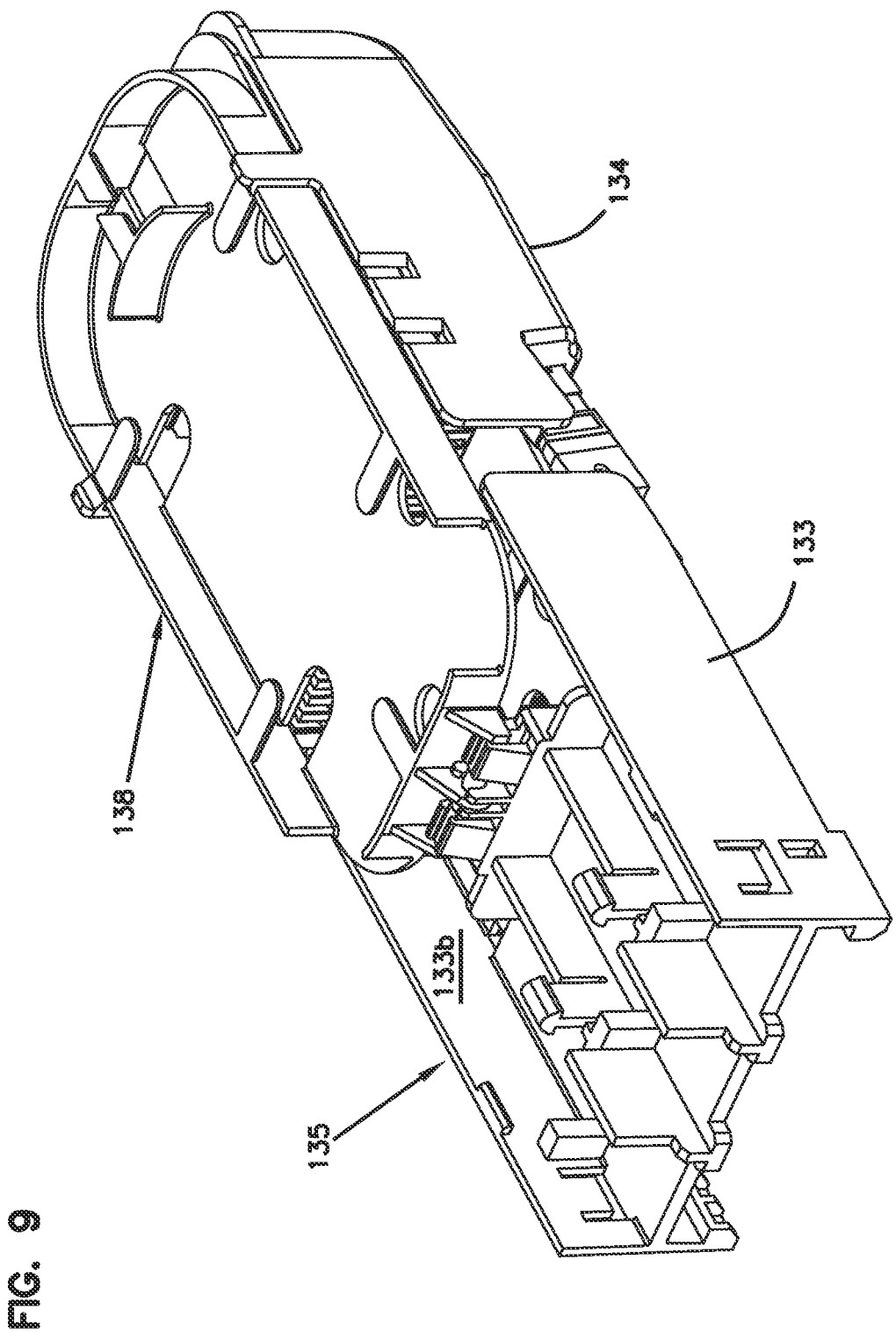
FIG. 9 is a rear perspective view of the management unit of FIG. 6.

As shown in FIGS. 7 and 8, a drop cable looping area 190 is provided at the front side 134 of the support infrastructure 133 between the second cable anchors 165 and the fiber optic adapters 150. In certain examples, retaining structure can be provided at the drop cable looping area 190 to hold excess length of the fibers of the drop cables 185 at the drop cable looping area 190. In an example, the retaining structure can include hooks 191 or loops to which a retainer 192 (e.g., a band, a strand, a zip tie) can be attached.

In certain implementations, the rear tray 138 and support infrastructure 133 include a detent structure that holds the rear tray 138 in the open and closed positions relative to the support infrastructure 133. In certain examples, the detent structure includes a flat-sided pivot component 166 of the rear tray 138 received within an elastic pivot holder 168 of the support infrastructure 133 (see FIG. 12). Details of the detent structure are disclosed in the pivot interlock 610 of the optical fiber management device 600 of FIGS. 26-46.

Figure 26:
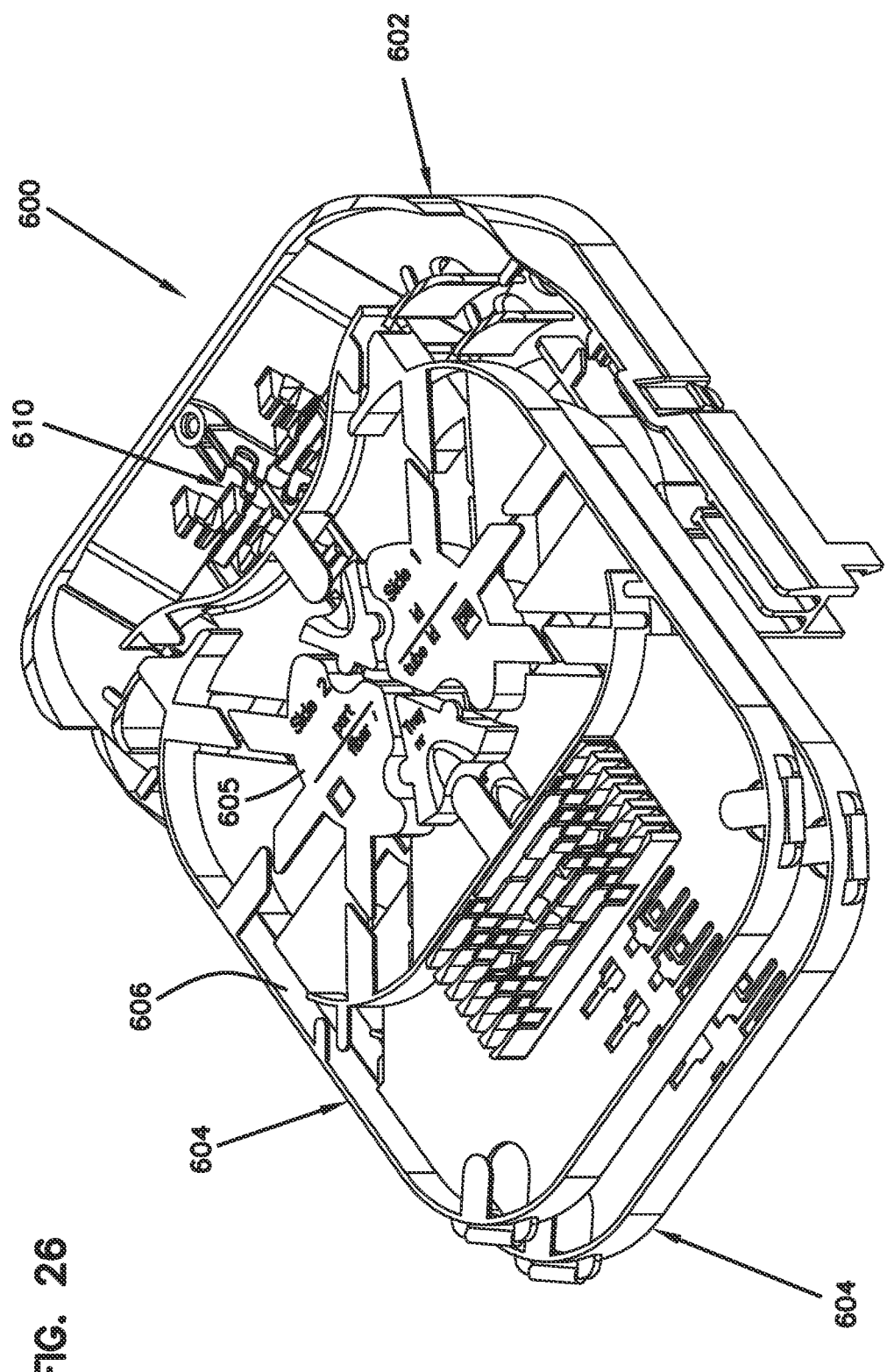
FIG. 26 is a perspective view of an example fiber management device including fiber management trays coupled to a tray mount using pivot interlocks configured in accordance with the principles of the present disclosure.
Figure 27:
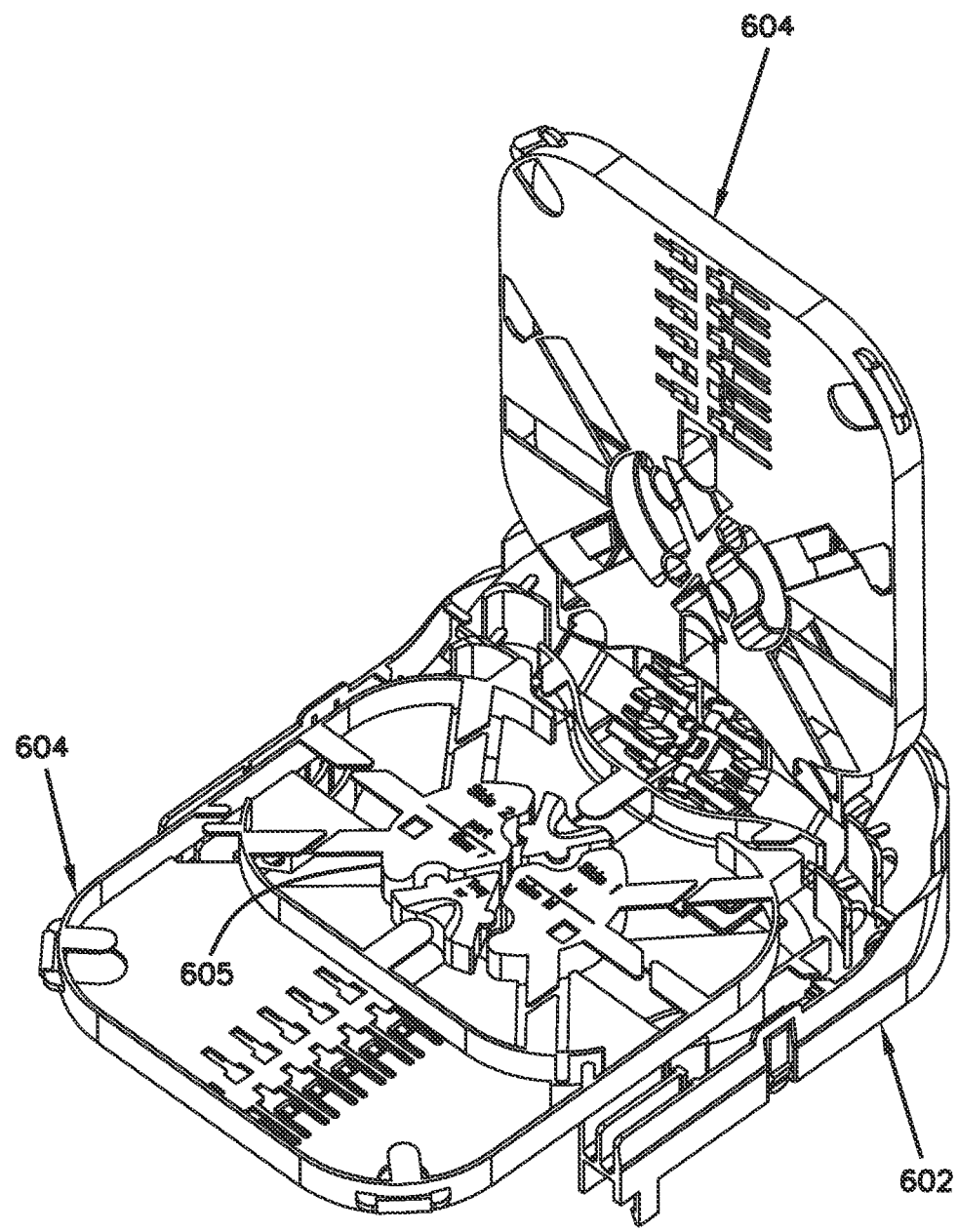
FIG. 27 shows the fiber management device of FIG. 26 with one of the trays disposed in a second position and another of the trays disposed in a first position.
Figure 28:
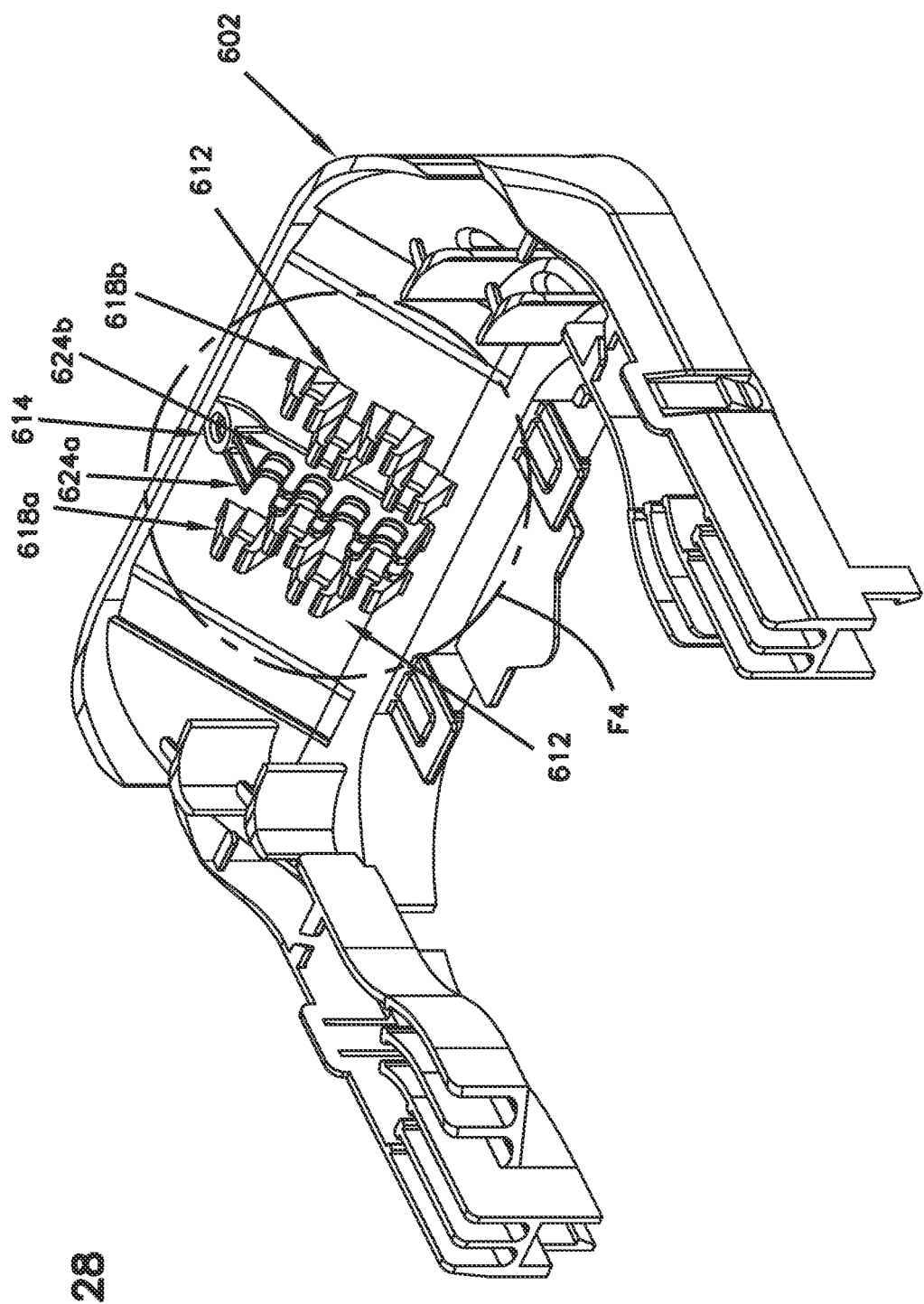
FIG. 28 is a perspective view of an example tray mount suitable for use in the fiber management device of FIG. 26.

FIG. 26 depicts an optical fiber management device 600 in accordance with the principles of the present disclosure. The optical fiber management device 600 includes a tray mount 602 and a plurality of fiber management trays 604 that pivotally connect to the tray mount 602. The fiber management trays 604 can be arranged in an overlapping, stacked relationship when coupled to the tray mount 602. Each of the fiber management trays 604 can have a molded, plastic construction and can define one or more fiber routing paths for routing optical fibers thereon. The fiber management trays 604 can include fiber bend radius limiters 605 which may be arranged for routing the optical fibers in storage loops or other paths without violating minimum bend radius requirements of the optical fibers. In some examples, the fiber management trays 604 can include side walls 606 that extend about perimeters of the tray. In some examples, the fiber management trays 604 can include structures for holding fiber optic components such as fiber optic splices enclosed within splice protectors, passive optical power splitters, wavelength division multi-plexers and the like.

The fiber management trays 604 are coupled to the tray mount 602 by pivot interlocks 610. The pivot interlocks 610 are configured to couple the fiber management trays 604 to the tray mount 602 in a manner in which the fiber management trays 604 are permitted to pivot relative to the tray mount 602 and also relative to one another. In one example, the pivot interlocks 610 allow each of the fiber management trays 604 to be pivoted between a first position (see FIG. 26) and a second positon (see FIG. 27). Each of the pivot interlocks 610 includes a detent pivot arrangement 612 and guide pivot arrangement 614. As will be discussed herein, the pivot interlock 610 can be integrated into any of the enclosures, insert units, trays, and components disclosed herein.

The detent pivot arrangement 612 includes first and second axially spaced-apart detent pivot pin portions 616a, 616b integrated with the fiber management tray 604, and first and second axially spaced-apart detent receptacle 618a, 618b integrated with the tray mount 602. The first and second detent receptacles 618a, 618b are configured to respectively receive the first and second detent pivot pin portions 616a, 616b when the pivot interlock 610 is interlocked. The detent pivot pin portions 616a, 616b each include a plurality of pin flat surfaces 620 positioned circumferentially about the detent pivot pin portions 616a, 616b. The detent receptacles 618a, 618b each define a plurality of receptacle flat surfaces 622.

The guide pivot arrangement 614 includes first and second cylindrical pivot pin portions 624a, 624b integrated with the fiber management tray 604, and first and second guide receptacles 626a, 626b integrated with the tray mount 602. The first and second cylindrical pivot pin portions 624a, 624b are positioned between and co-axially aligned with the first and second detent pivot pin portions 616a, 616b. The first and second guide receptacles 626a, 626b are positioned between and co-axially aligned with the first and second detent receptacles 618a, 618b. The first and second guide receptacles 626a, 626b are configured for respectively receiving the first and second cylindrical pivot pin portions 624a, 624b when the pivot interlock 610 is interlocked. The guide receptacles 626a, 626b each have an open end 630 positioned opposite from a closed end 632. The open ends 630 are configured to allow the cylindrical pivot pin portion 624a, 624b to be inserted into the guide receptacles 626a, 626b. The closed ends 632 include guide surfaces 634 having a concave curvatures that curve along (e.g., around) convex curvatures of the cylindrical pivot pin portions 624a, 624b when the pivot interlock 610 is interlocked.

Figure 40:
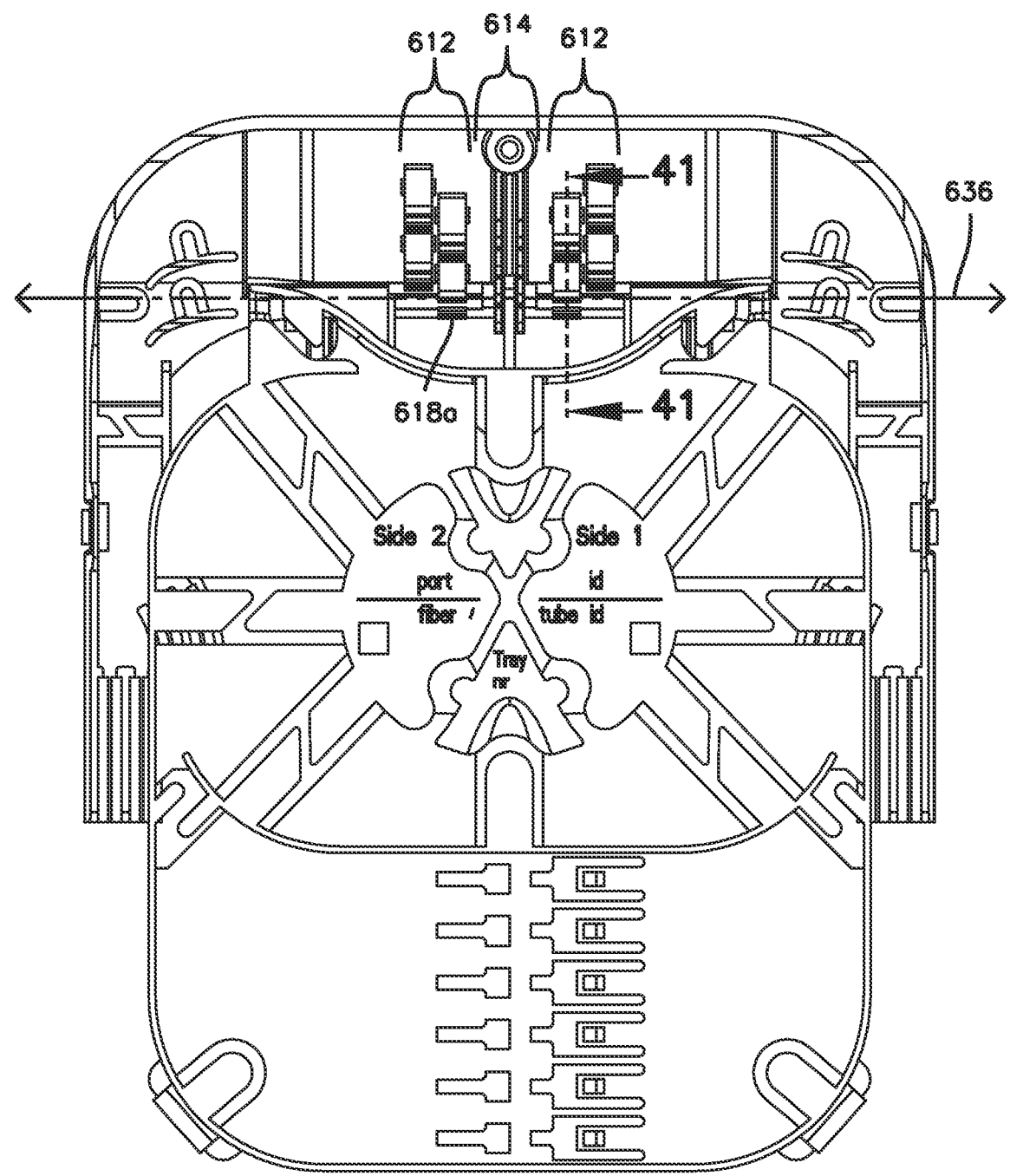
FIG. 40 is a top plan view of the fiber management device of FIG. 36.

When pivot interlock 610 is interlocked, the fiber management tray 604 can pivot relative to the tray mount 602 about a pivot axis 636 (FIG. 40). The pivot axis 636 extends axially though the cylindrical pivot pin portion 624a, 624b, the detent pivot pin portion 616a, 616b, the guide receptacles 626a, 626b and the detent receptacle 618a, 618b. When the fiber management tray 604 is pivoted between the first pivot position and the second pivot position, at least some of the pin flat surfaces 620 and the receptacle flat surfaces 622 engage one another to cause the detent receptacles 618a, 618b to elastically deform (e.g., expand) and the cylindrical pivot pin portions 624a, 624b to concurrently pivot within the guide receptacles 626a, 626b to guide pivoting about the pivot axis 636. The interaction between at least some of the pin flat surfaces 620 and the receptacle flat surfaces 622 provides a tray retention force for retaining the fiber management tray in the first and second pivot positions.

Figure 29:
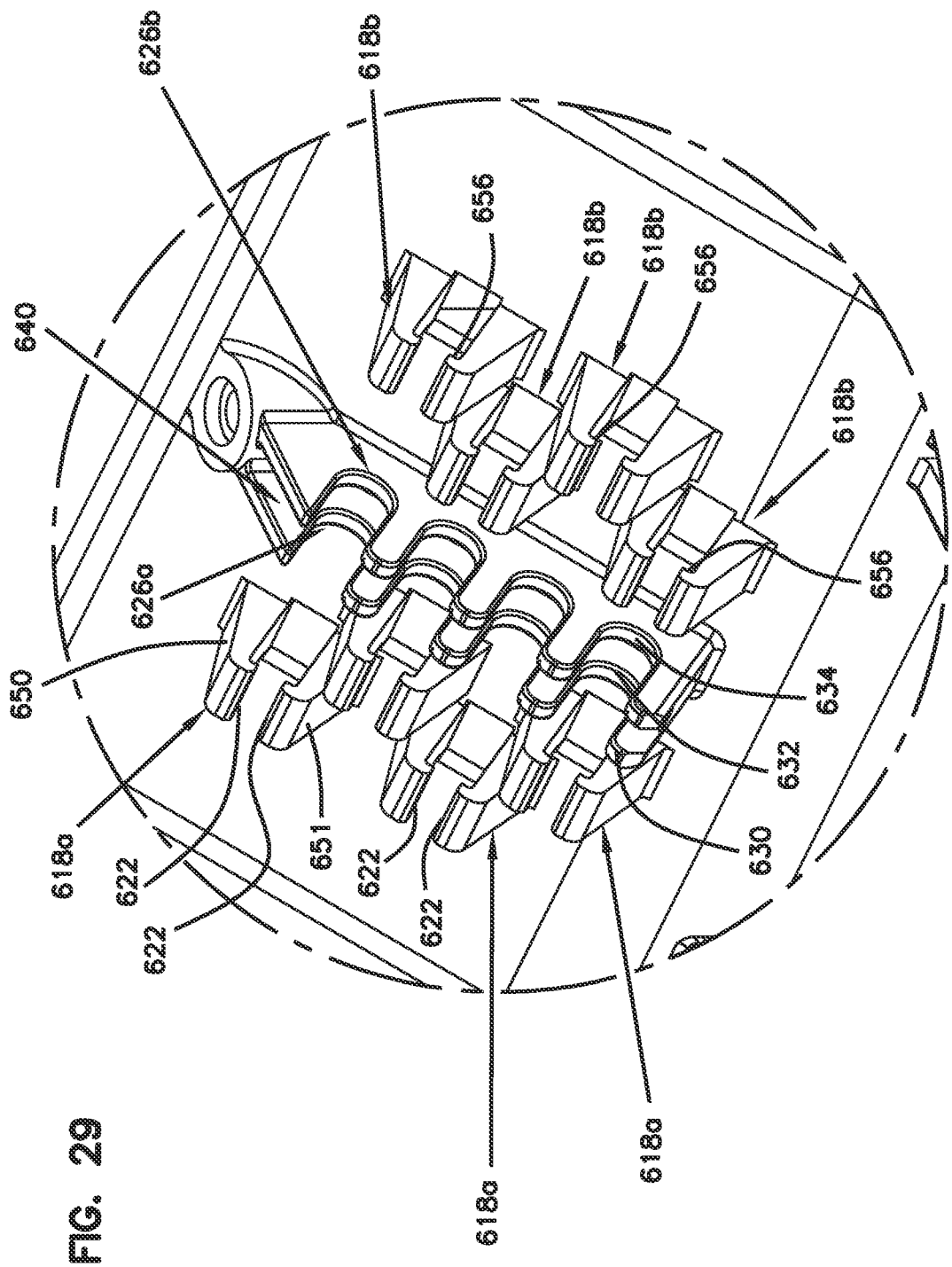
FIG. 29 is an enlarged view of a portion of FIG. 28.
Figure 30:
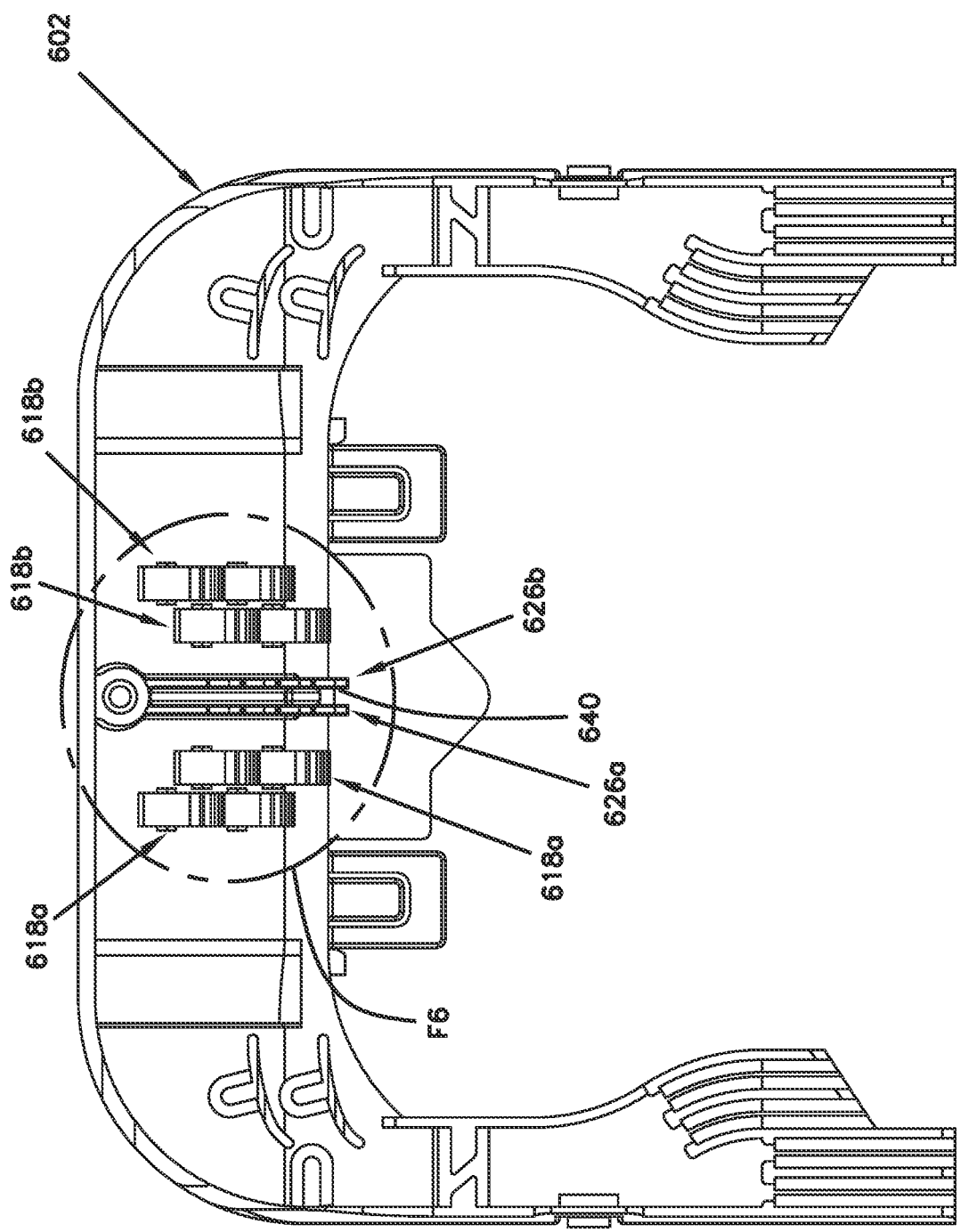
FIG. 30 is a top plan view of the tray mount of FIG. 28.
Figure 31:
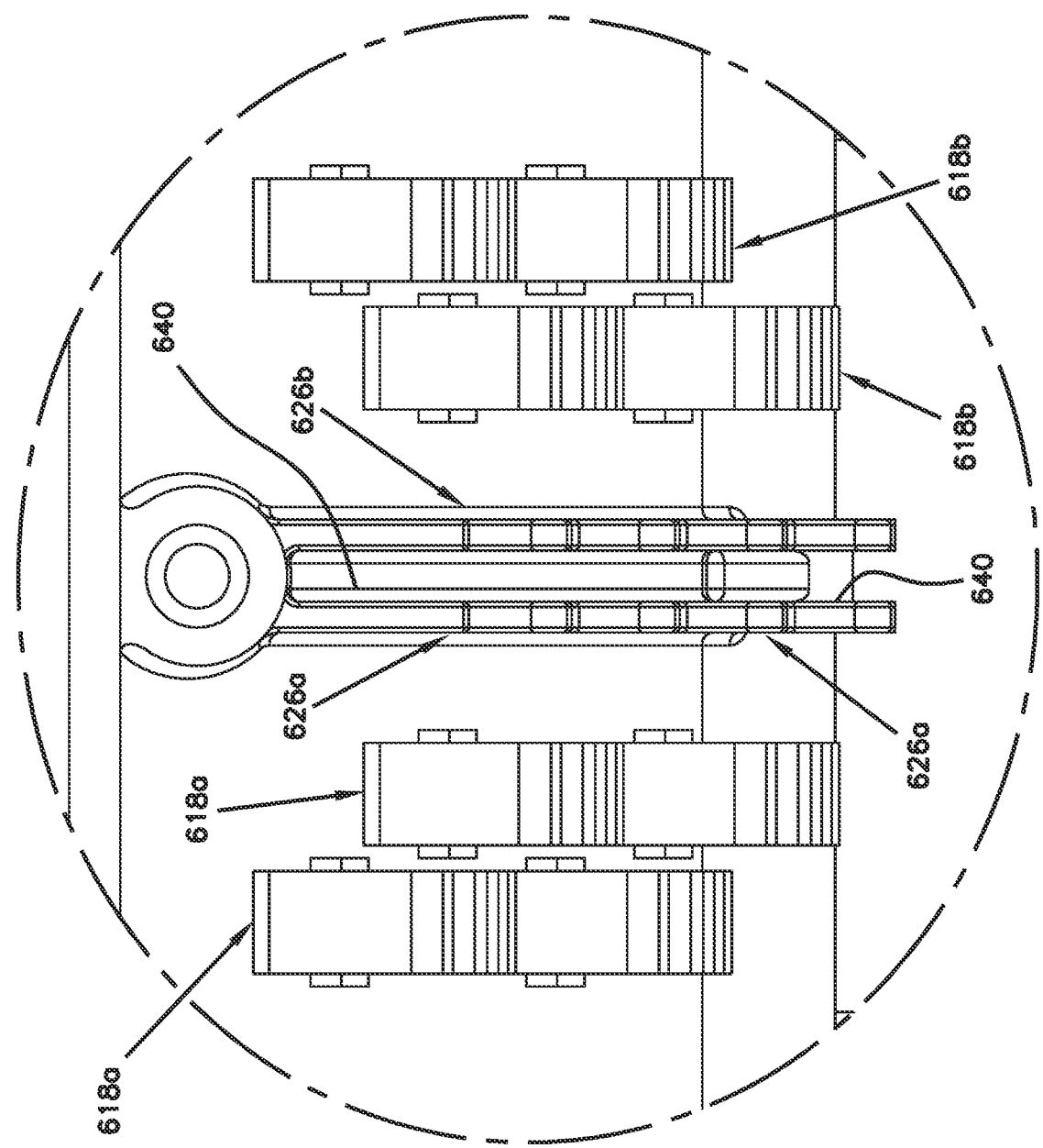
FIG. 31 is an enlarged view of a portion of FIG. 30.
Figure 32:
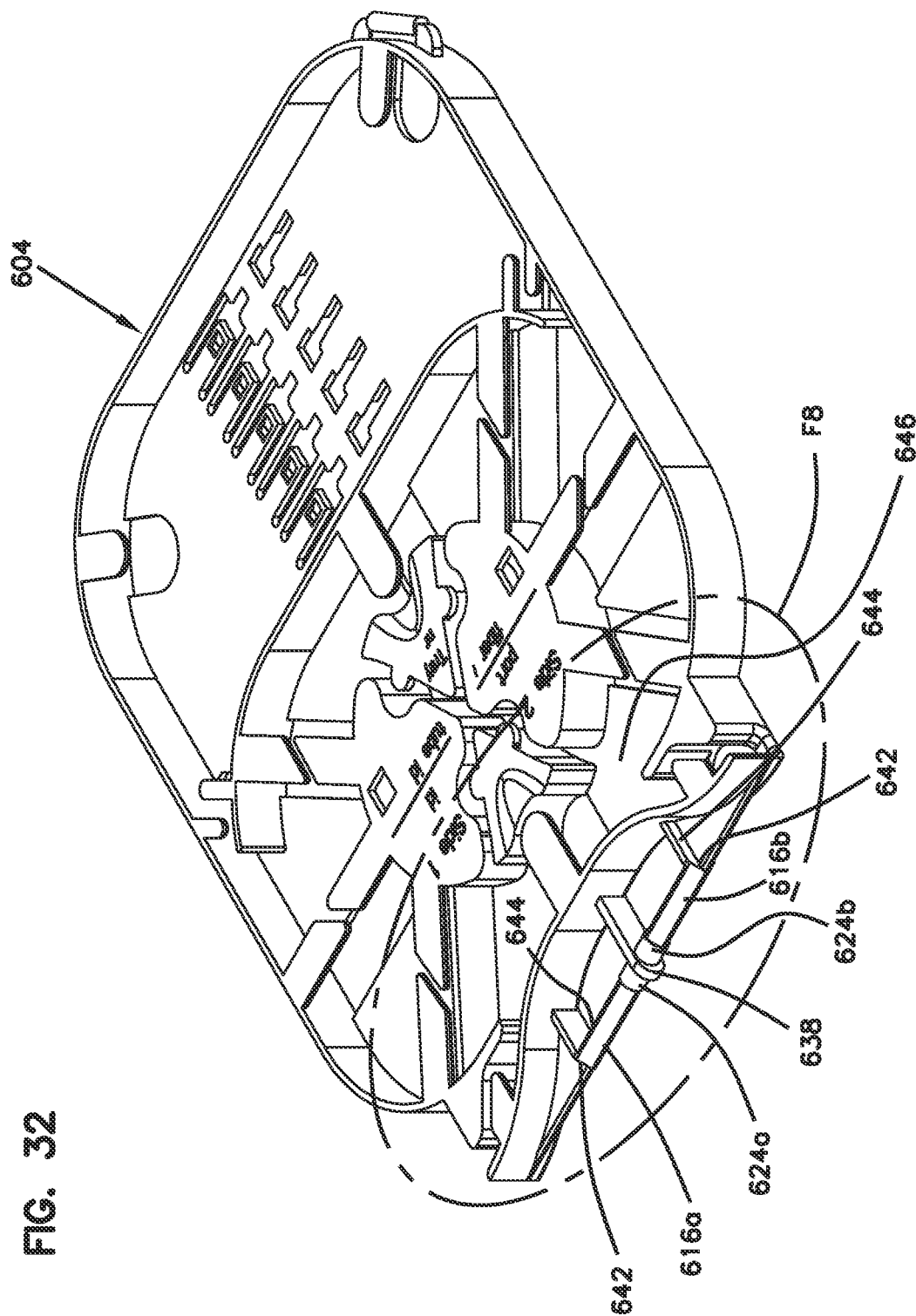
FIG. 32 is a perspective view of an example fiber management tray suitable for use in the fiber management device of FIG. 26.
Figure 33:
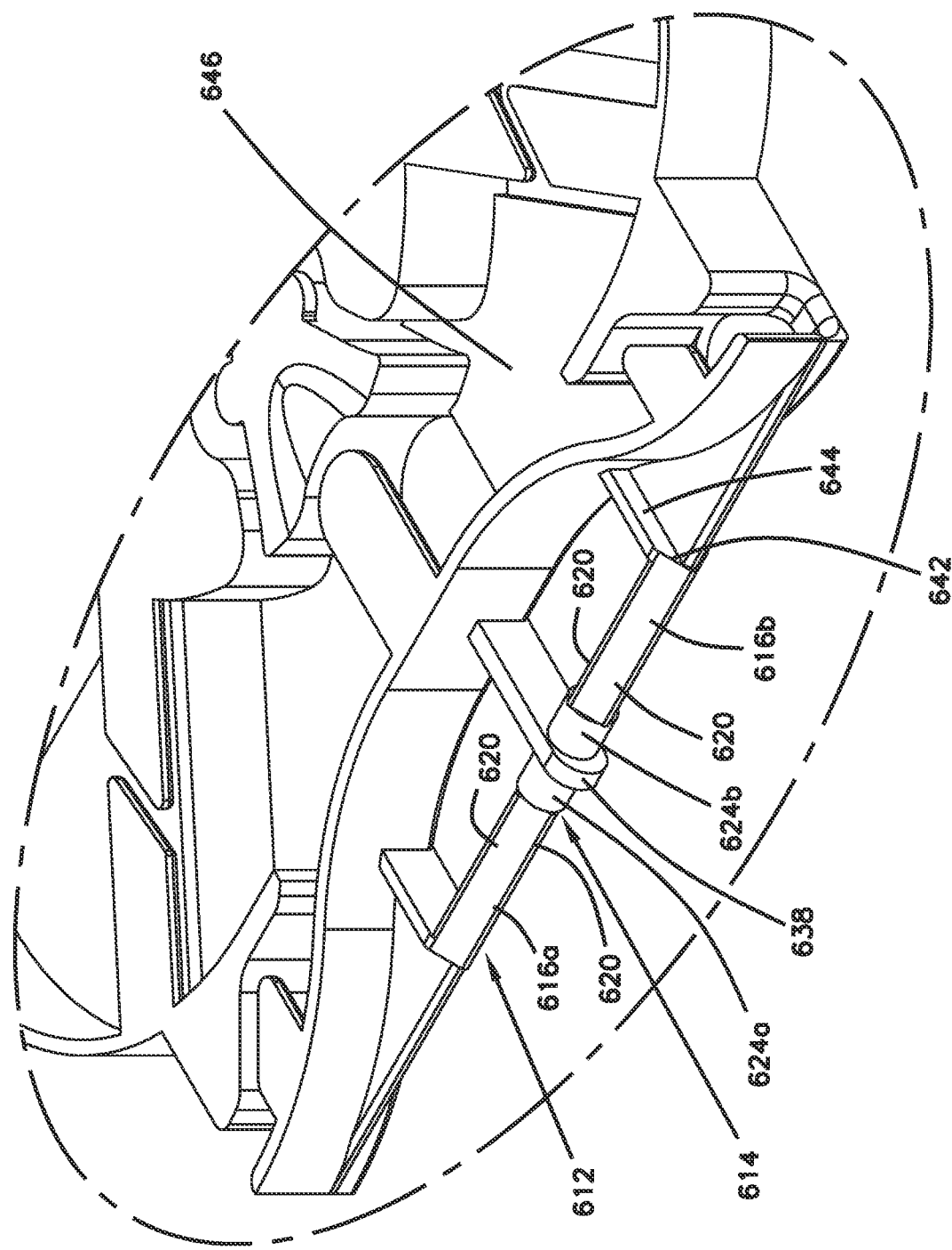
FIG. 33 is an enlarged view of a portion of FIG. 32.
Figure 34:
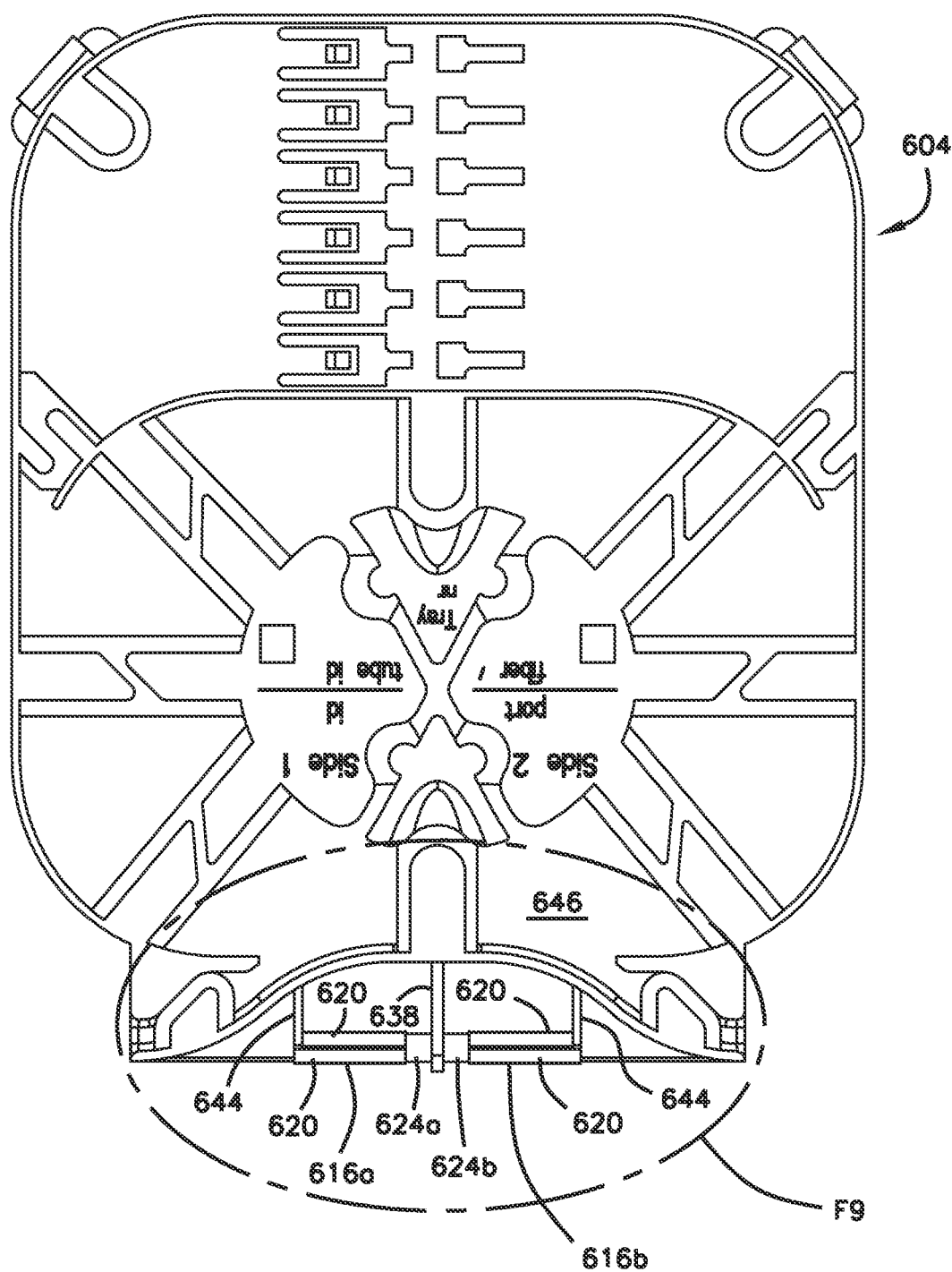
FIG. 34 is a top plan view of the fiber management tray of FIG. 32.
Figure 35:
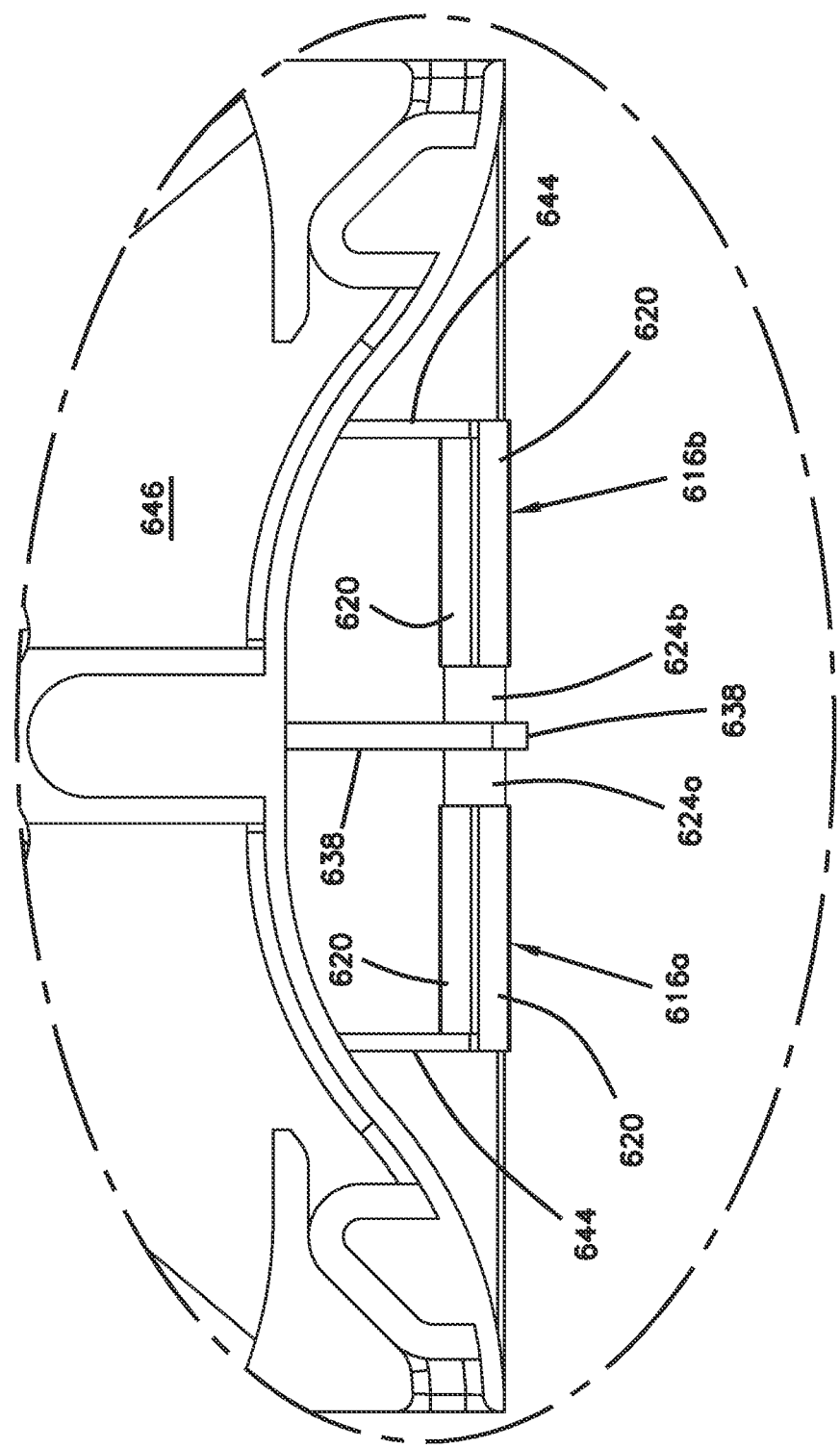
FIG. 35 is an enlarged view of a portion of FIG. 34.
Figure 36:
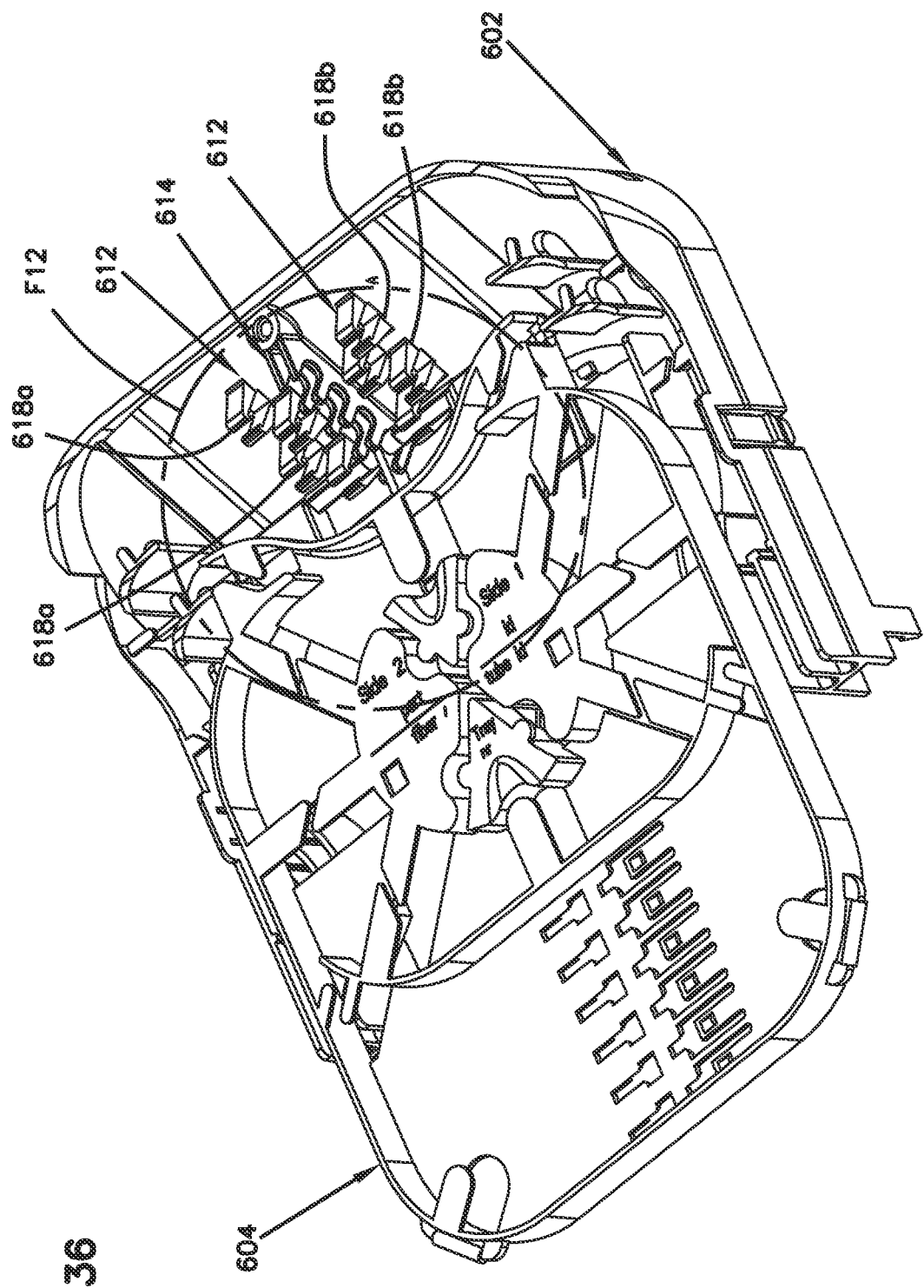
FIG. 36 shows the fiber management device of FIG. 26 with only one fiber management tray coupled to the tray mount and disposed in the first position.
Figure 37:
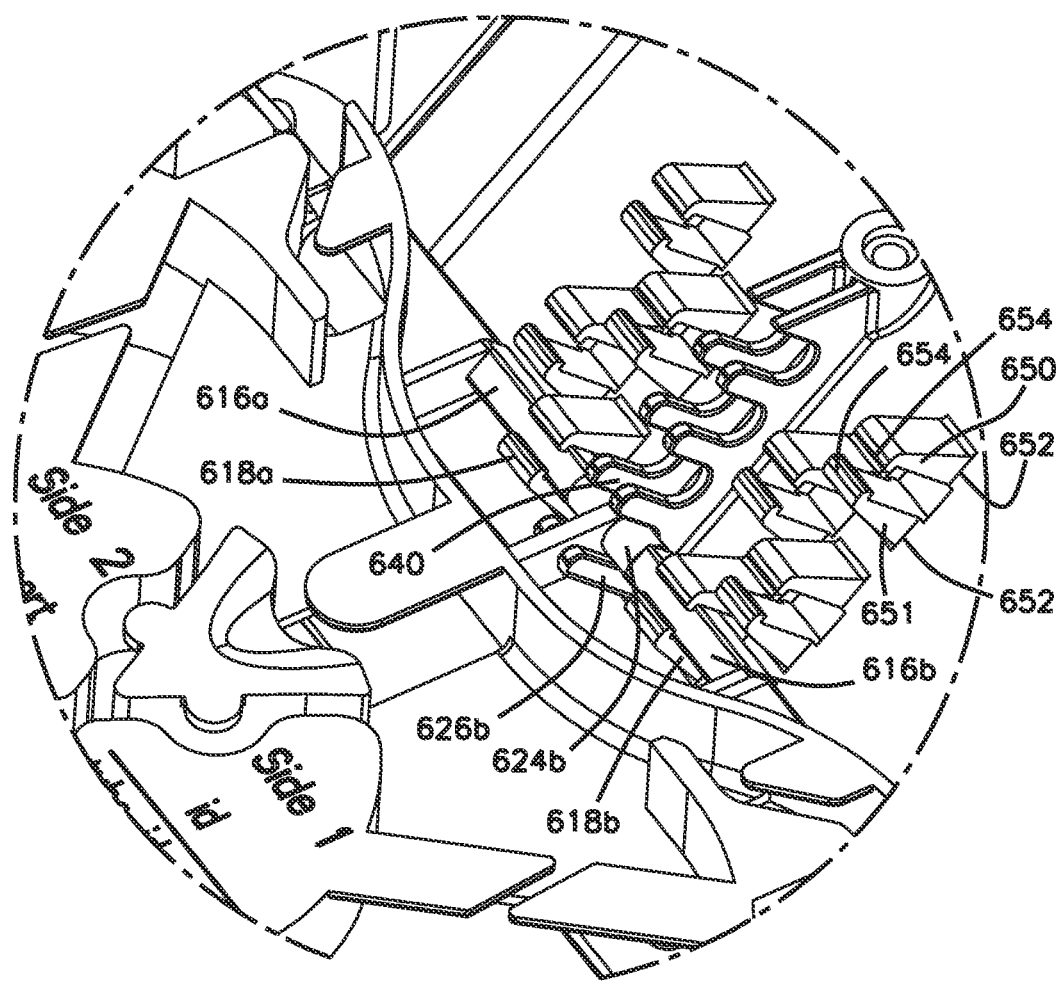
FIG. 37 is an enlarged view of a portion of FIG. 36.
Figure 38:
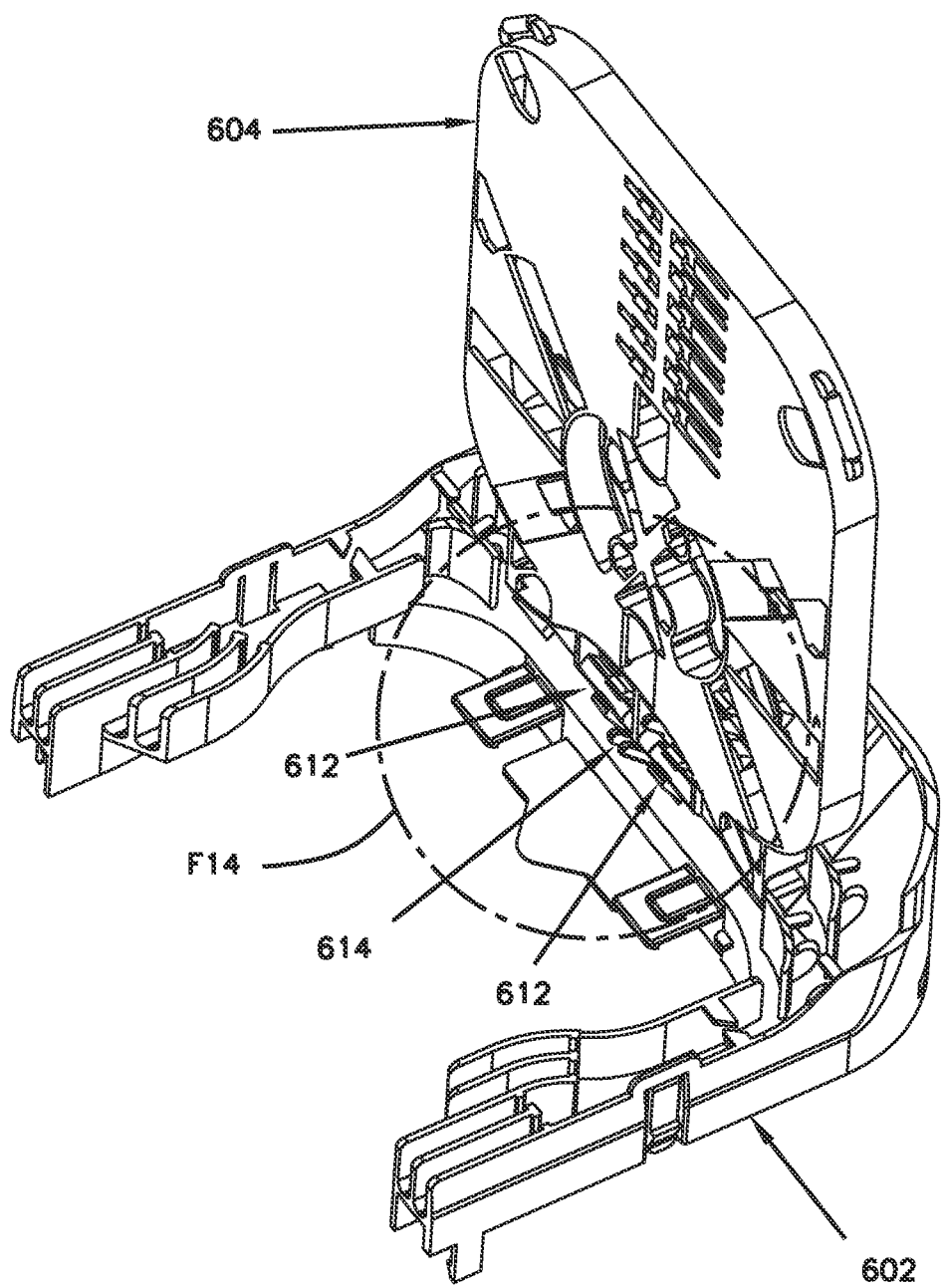
FIG. 38 shows the fiber management device of FIG. 36 with the fiber management tray disposed in the second position.
Figure 39:
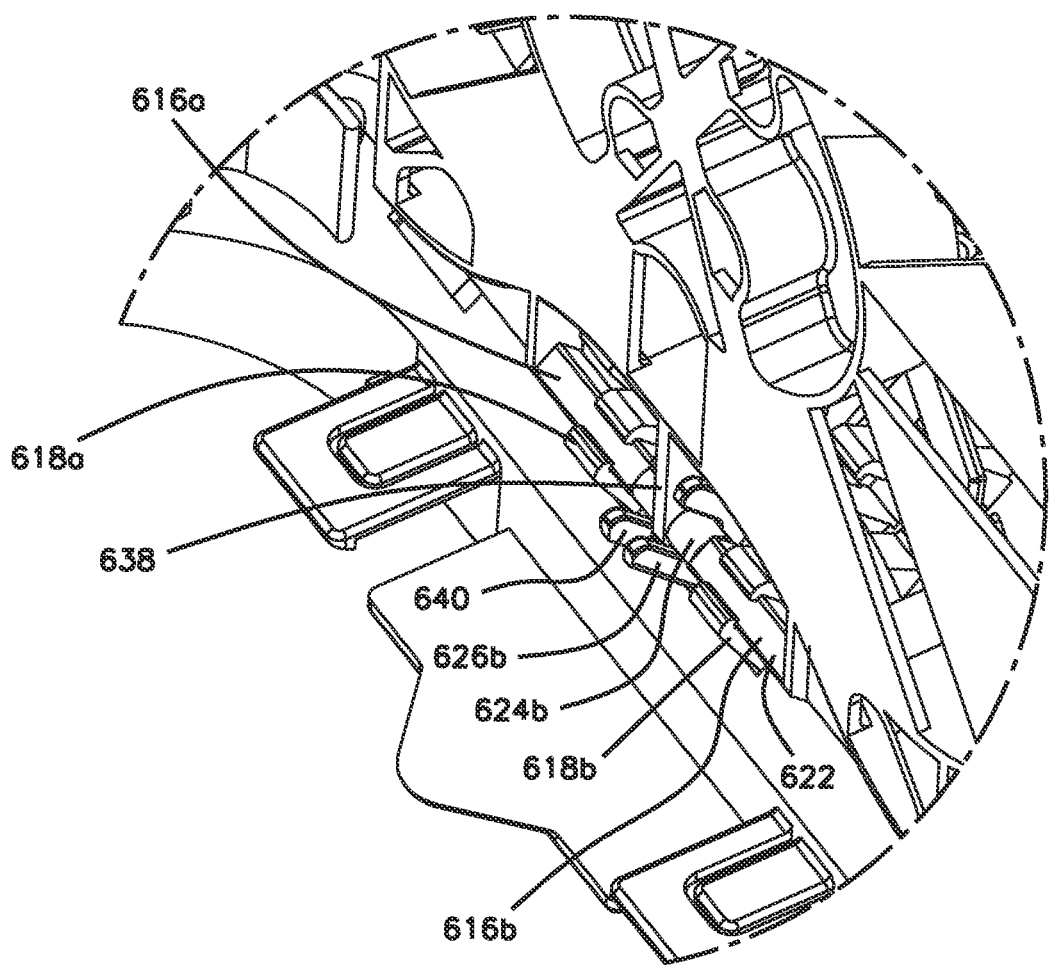
FIG. 39 is an enlarged view of a portion of FIG. 38.

Referring to FIGS. 29 and 32, the first and second cylindrical pivot pin portions 624a, 624b are separated by a central flange 638, and the first and second guide receptacles 626a, 626b are separated a central slot 640. When the pivot interlock 610 is interlocked, the central flange 638 fits within the central slot 640 to limit axial movement of the fiber management tray 604 relative to the tray mount 602 along the pivot axis 636 (e.g., see FIG. 37).

Outer ends 642 of the first and second detent pivot pin portions 616a, 616b are integrally coupled to end flanges 644 which are coupled to a main body 646 of the fiber management tray 604. Inner ends of the first and second detent pivot pin portions 616a, 616b are integrally coupled to outer ends of the first and second cylindrical pivot pin portions 624a, 624b. Inner ends of the first and second cylindrical pivot pin portions 624a, 624b are integrally connected to the central flange 638. The central flange 638 is coupled to the main body 646 of the fiber management tray 604. The central flange 636 and the end flanges 644 offset the first and second detent pivot pin portions 616a, 616b and the first and second cylindrical pivot pin portions 624a, 624b from the main body 646 of the fiber management tray 604.

In one example, the detent receptacles 618a, 618b elastically deform as the fiber management tray 604 is pivoted between the first and second pivot positions, and the guide receptacles 626a, 626b do not elastically deform as the fiber management tray 604 is moved between the first and second pivot positions. In one example, as the fiber management tray 604 is pivoted between the first and second pivot positions, a maximum deformation of the detent receptacles 618a, 618b occurs at a central pivot position (see FIG. 42) between the first and second pivot positions. The detent receptacles 618a, 618b are preferably in a stable state when the fiber management tray 604 is in the first and second pivot positions. When the detent receptacles 618a, 618b are in the stable state, the detent receptacles 618a, 618b are either not elastically deformed or have less elastic deformation as compared when the fiber management tray 604 has been pivoted to a pivot position between the first and second pivot positions. When the fiber management tray 604 is in a pivotal position between the central pivot position and the first pivot position, the detent arrangement biases the fiber management tray 604 toward the first position. When the fiber management tray 604 is in a pivotal position between the central pivot position and the second pivot position, the detent arrangement biases the fiber management tray 604 toward the second position.

Figure 41:
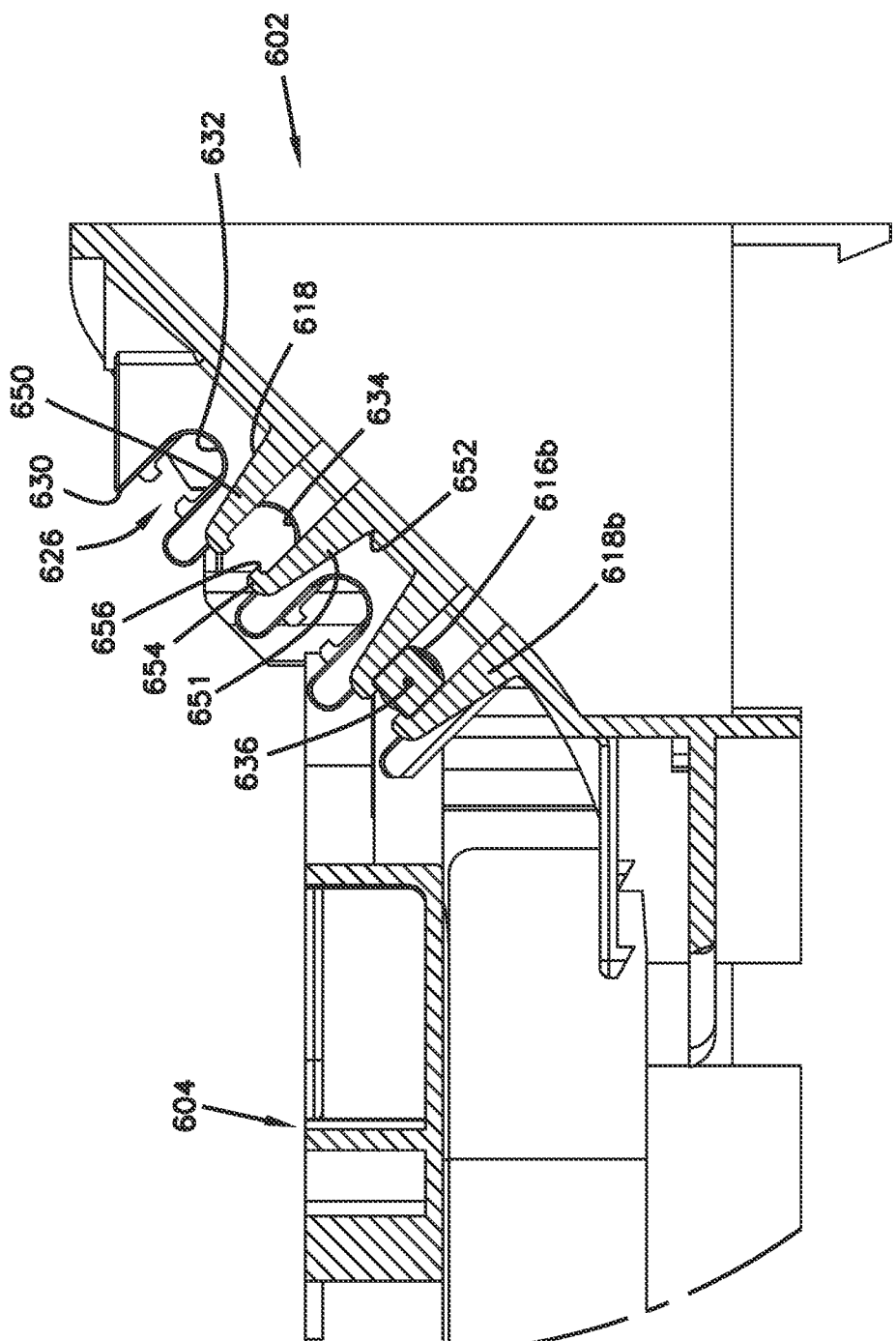
FIG. 41 is a cross-sectional view taken along the 41-41 line of FIG. 40, which cuts through one of the detent pivot arrangements, the tray is in the first pivot position.
Figure 42:
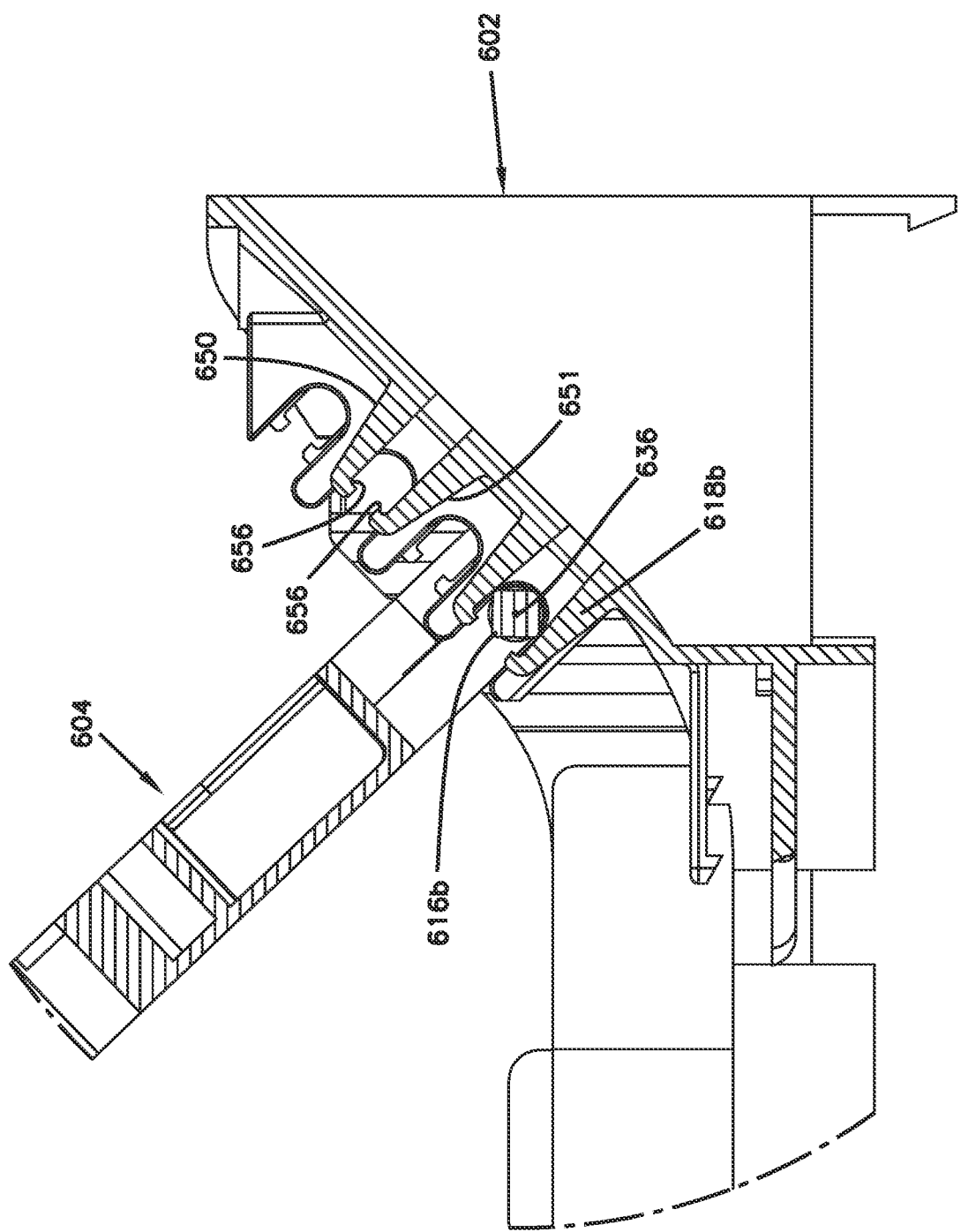
FIG. 42 shows the cross-sectional view of FIG. 41 with the tray moved to a pivotal position between the first and second position.
Figure 43:
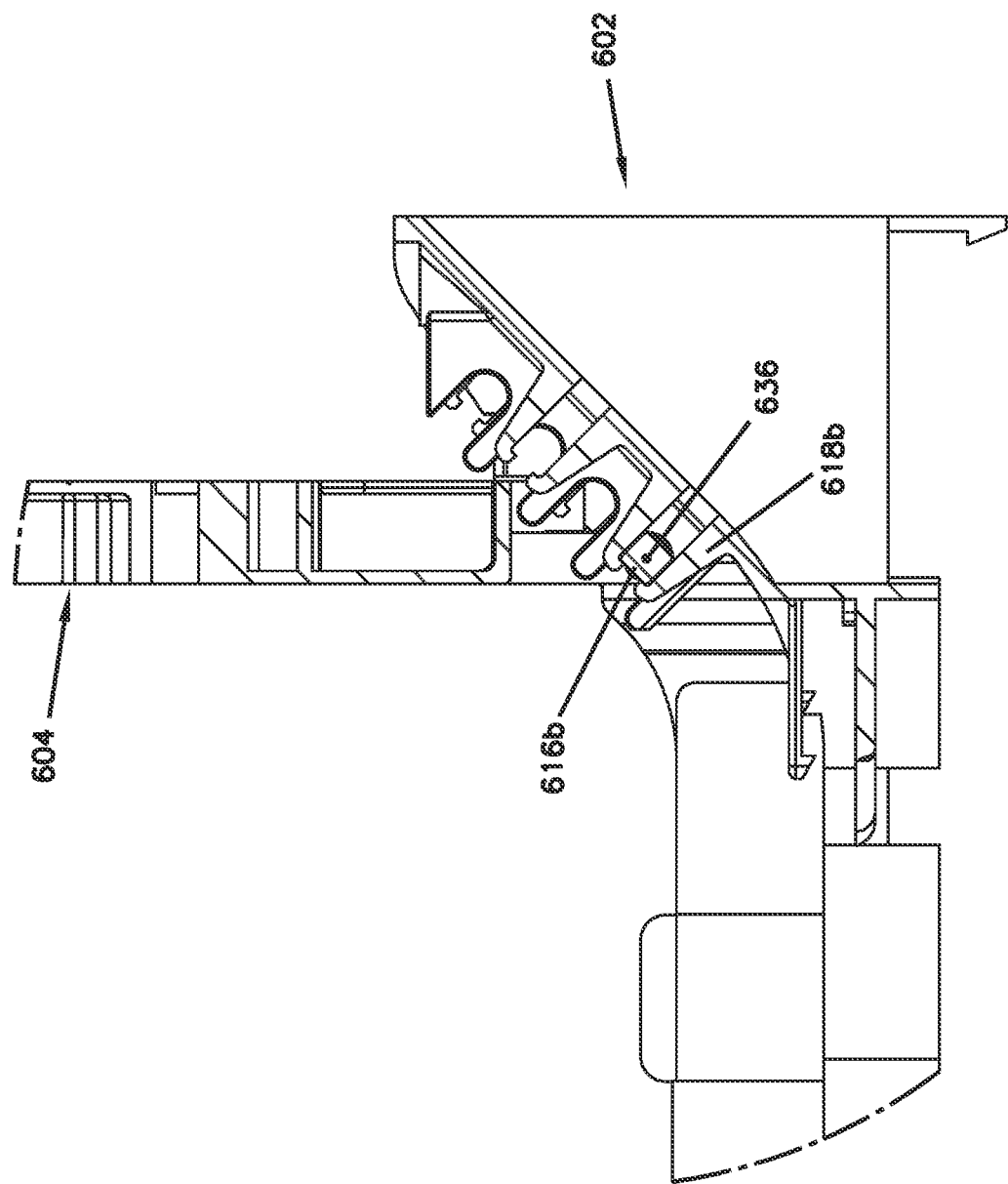
FIG. 43 shows the cross-sectional view of FIG. 41 with the tray moved to the second position.
Figure 44:
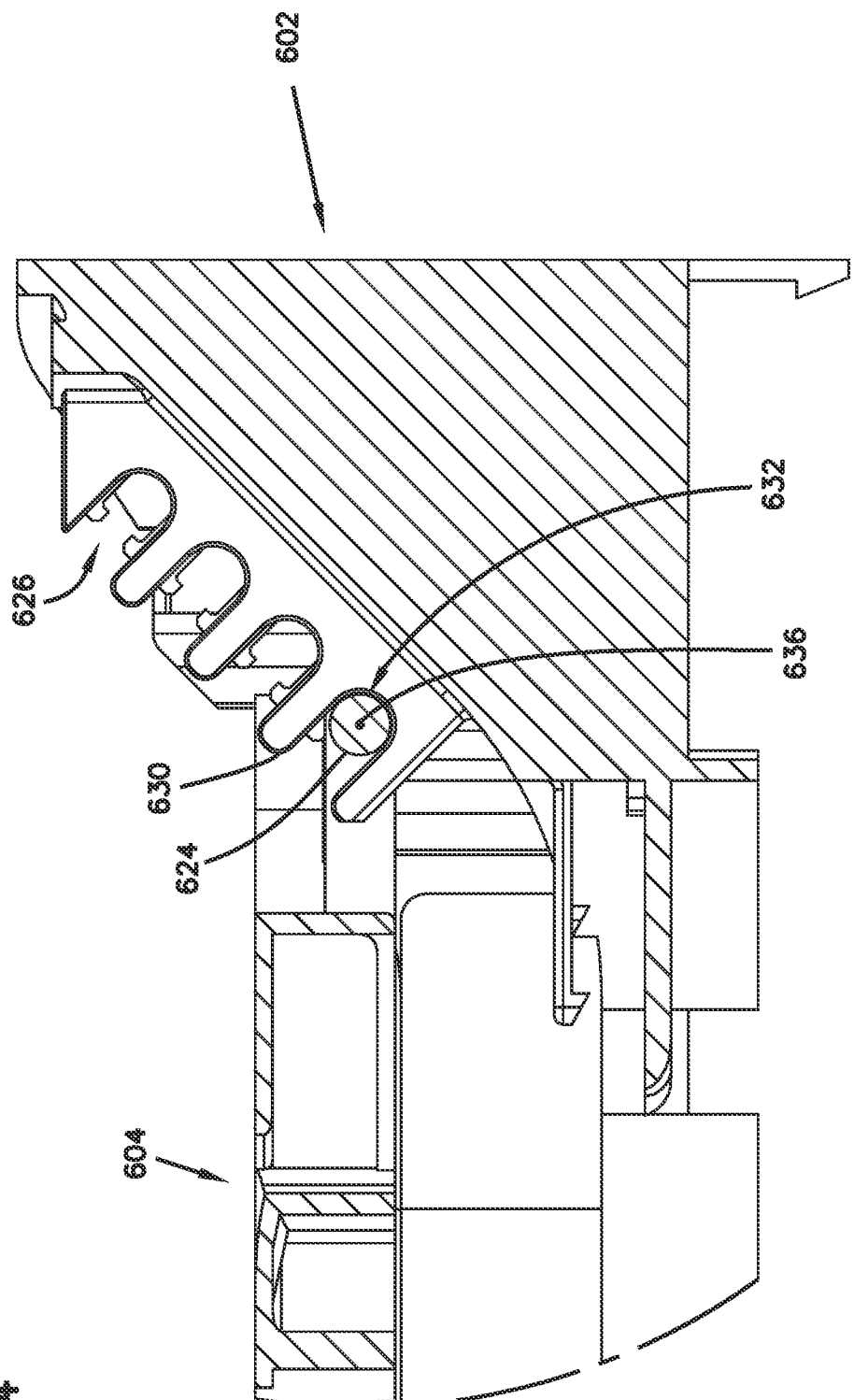
FIG. 44 is a cross-sectional view taken along section line 44-44 of FIG. 40, which cuts through one of the guide pivot arrangements, the tray is in the first pivot position.
Figure 45:
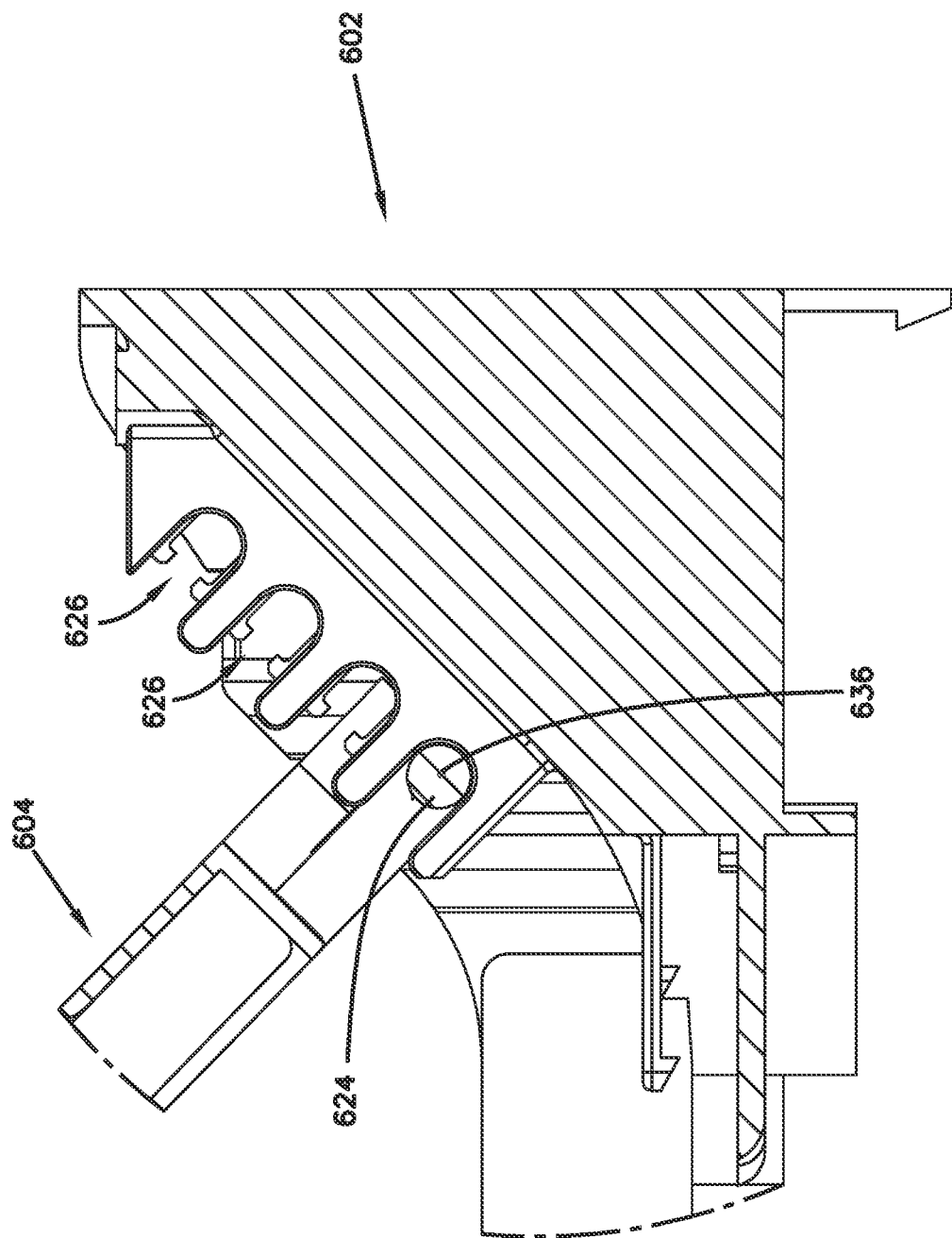
FIG. 45 shows the cross-sectional view of FIG. 44 with the tray moved to a pivotal position between the first and second position.
Figure 46:
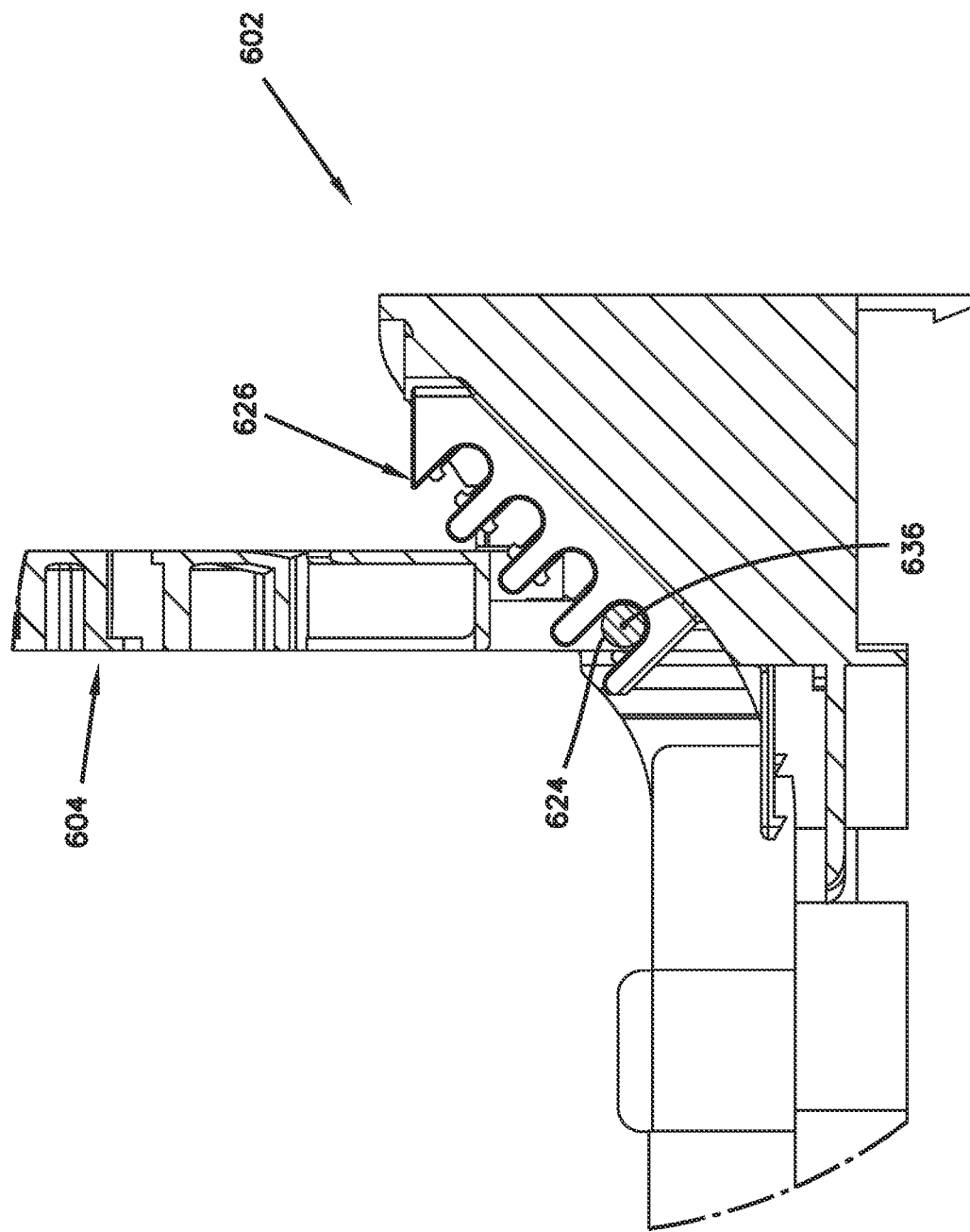
FIG. 46 shows the cross-sectional view of FIG. 44 with the tray moved to the second position.

In a preferred example, the detent pivot pin portions 616a, 616b have a square transverse cross-sectional shapes (see FIGS. 41-43). In a preferred example, the detent receptacles 618a, 618b each include first and second resilient arms 650, 651 having base ends 652 and free ends 654. The first and second resilient arms 650, 651 define the receptacle flat surfaces 622. The receptacle flat surfaces 622 corresponding to each of the first and second resilient arms 650, 6521 face toward each other. The first and second resilient arms 650, 651 flex outwardly about their base ends 652 as the fiber management tray 604 is moved between the first and second pivot positions. The first and second resilient arms 650, 651 have retainers 656 at the free ends 654 for retaining the detent pivot pin portions 616a, 616b within the detent receptacles 618a, 618b. The first and second resilient arms 650, 651 flex apart from a retaining position to an insertion position allow insertion of the detent pivot pin portions 616a, 616b past the retainers 656 and into the detent receptacles 618a, 618b. The first and second resilient arms 650, 651 resiliently return to the retaining position once the detent pivot pin portions 616a, 616b have been inserted past the retainers 656 and into the detent receptacles 618a, 618b.

Referring back to FIGS. 12-16, in certain implementations, the support infrastructure 133 includes a rear side wall structure 133b that extends around at least a portion of a perimeter of the management unit 130. The optical component holders 706 are mounted to the support brackets 141 attached to the rear side wall structure 133b. In the example shown in FIGS. 14-15, the support brackets 141 are mounted to the rear wall side structure 133b by slide interlock interfaces. For example, the support brackets 141 may include dovetails 142 or other projections that slide in grooves 145 defined in the rear wall side structure 133b. A flexible tab 146 and hook 146a may latch the support bracket 141 to the rear wall side structure 133b.

Figure 14:
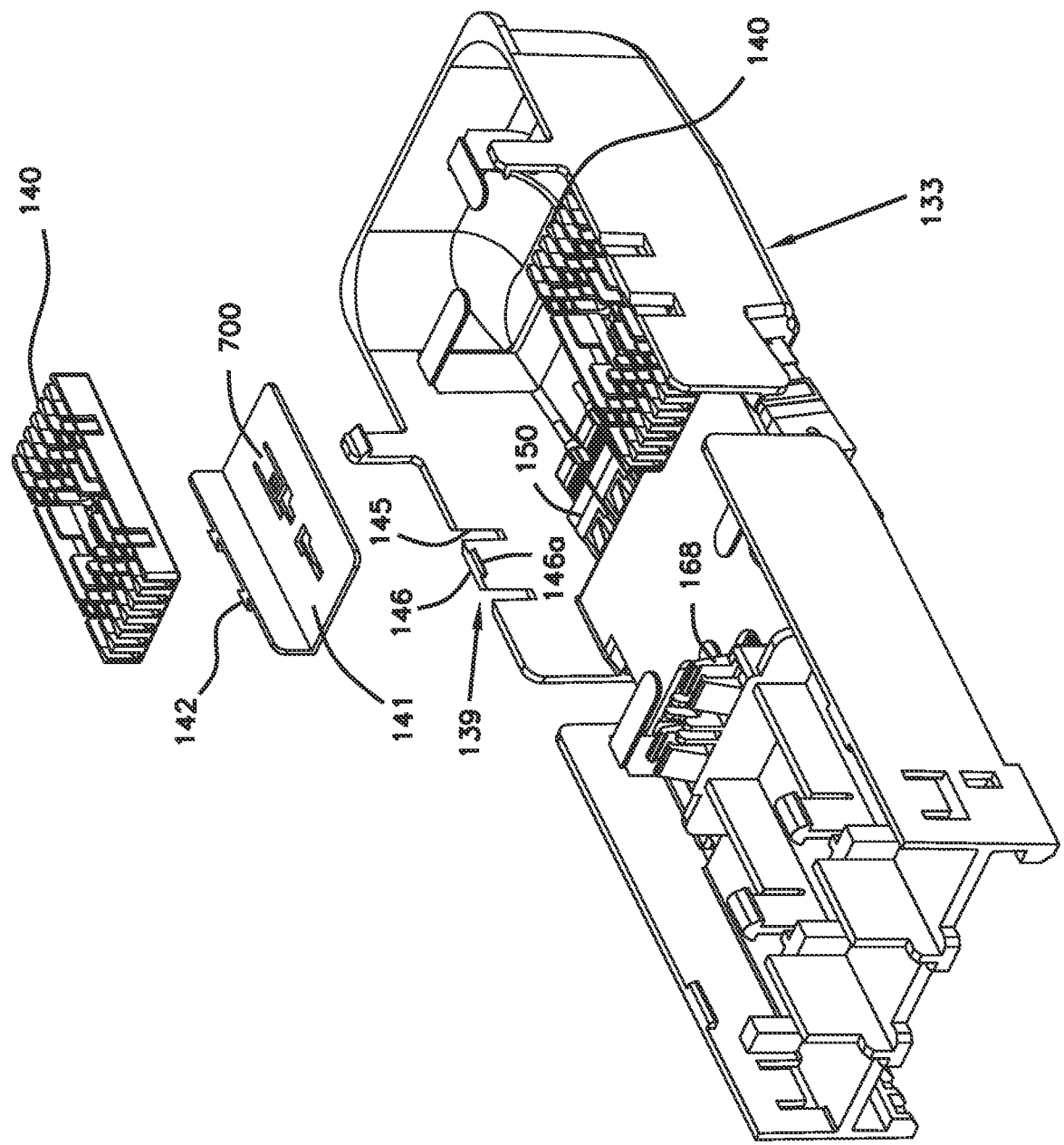
FIG. 14 is a rear perspective view of the management unit of FIG. 9 with the rear tray removed and the splice component and splice bracket exploded from the support infrastructure.
Figure 15:
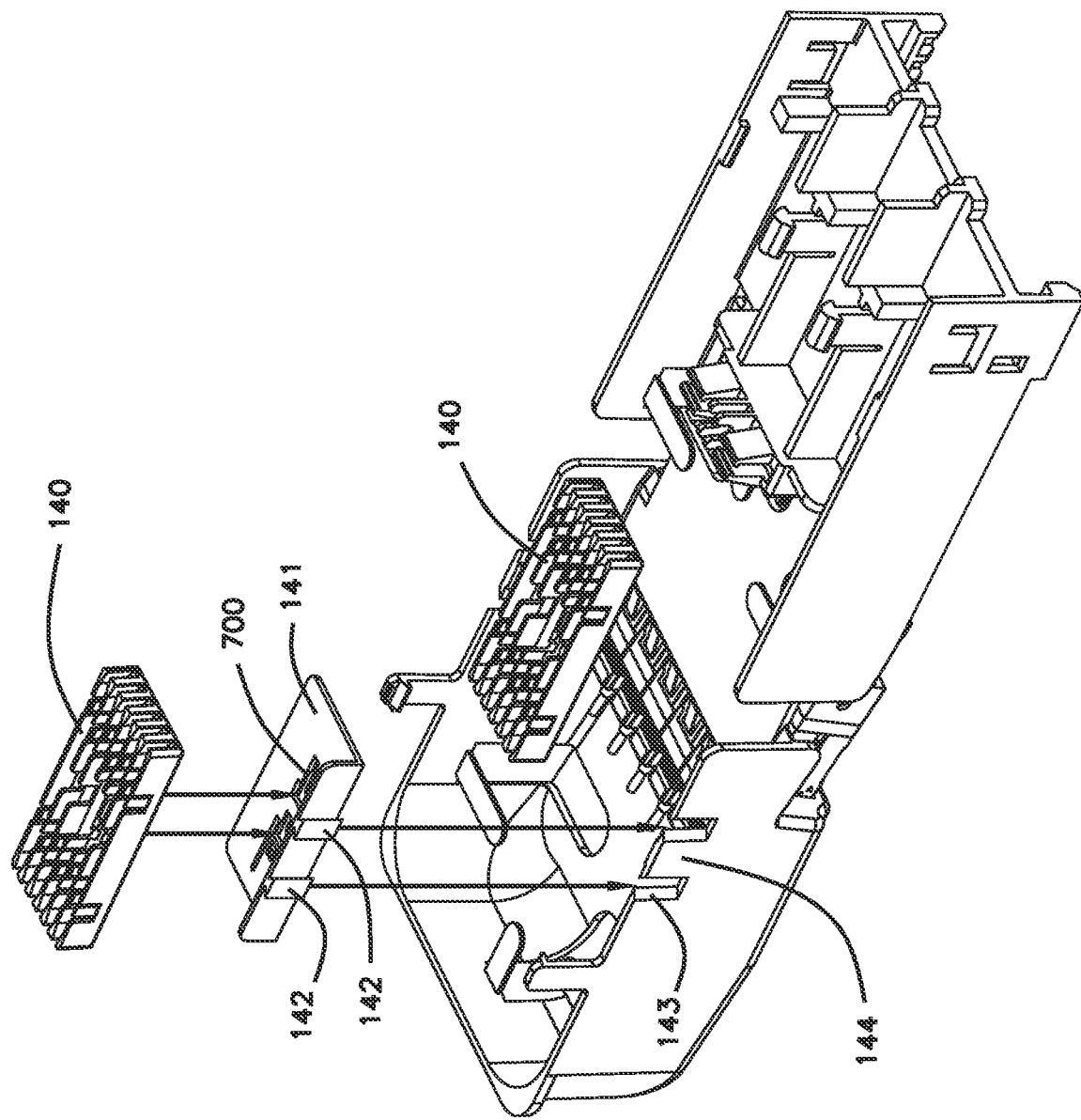
FIG. 15 shows the management unit of FIG. 14 from an opposite side.
Figure 16:
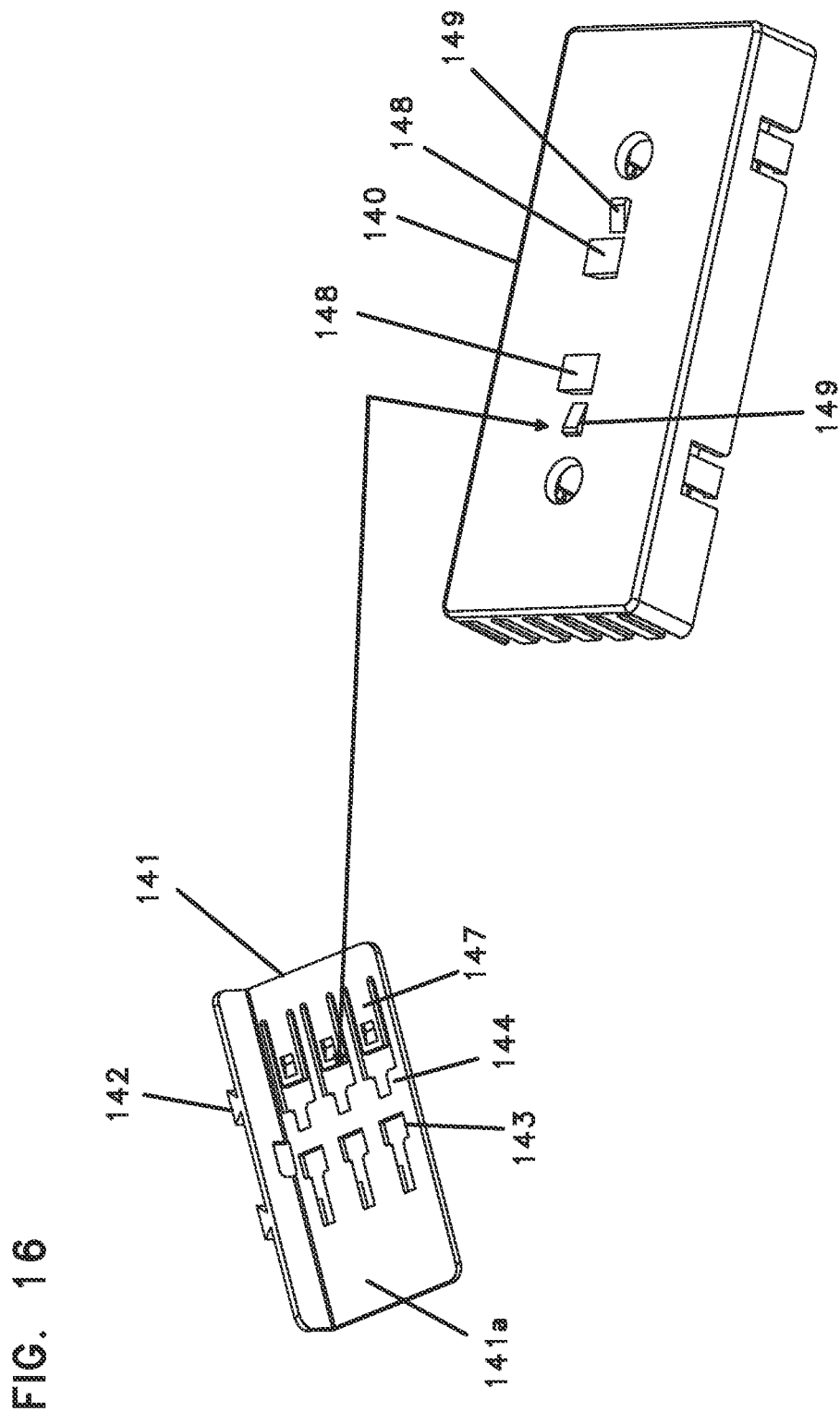
FIG. 16 shows an example interface between the splice component and the splice bracket.
Figure 18:
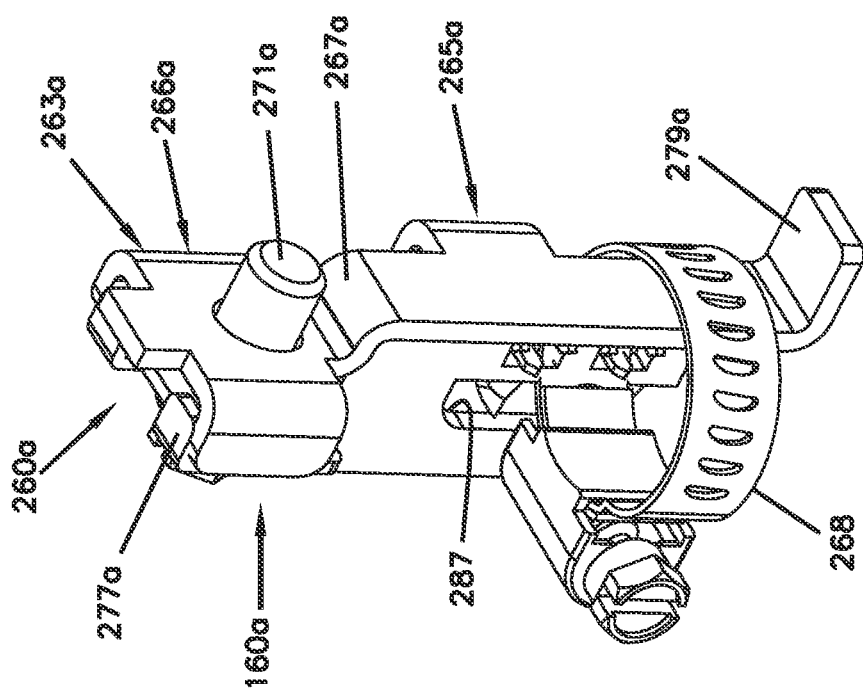
FIG. 18 is another perspective view of the cable anchor of FIG. 17.
Figure 17:
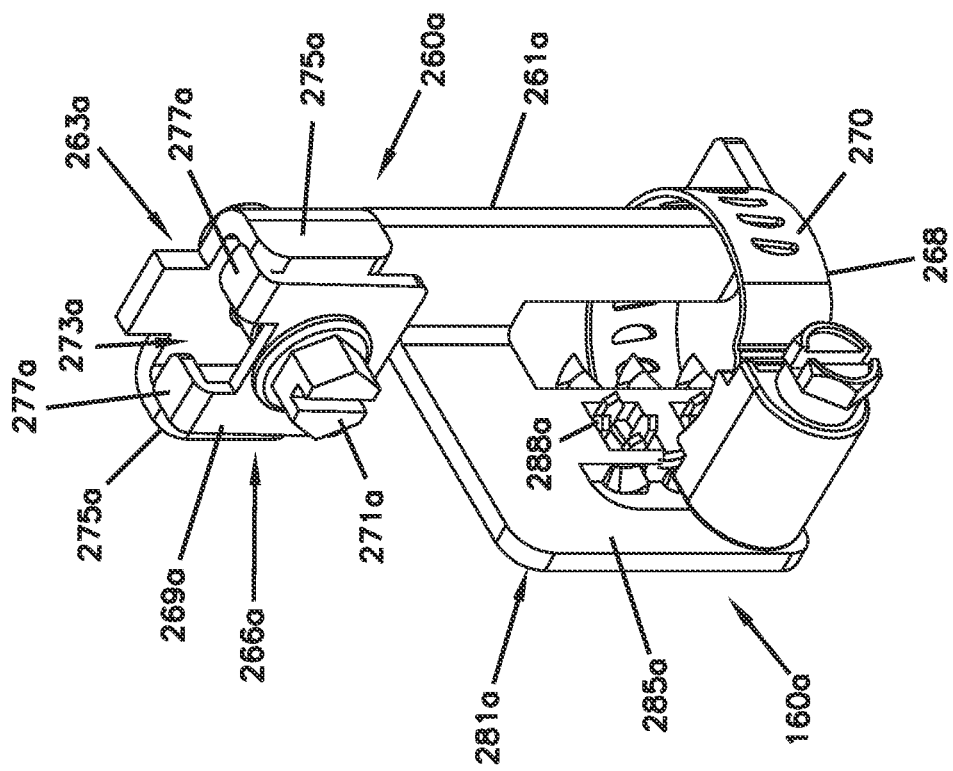
FIG. 17 is a perspective view of a cable anchor in accordance with the principles of the present disclosure.
Figure 21:
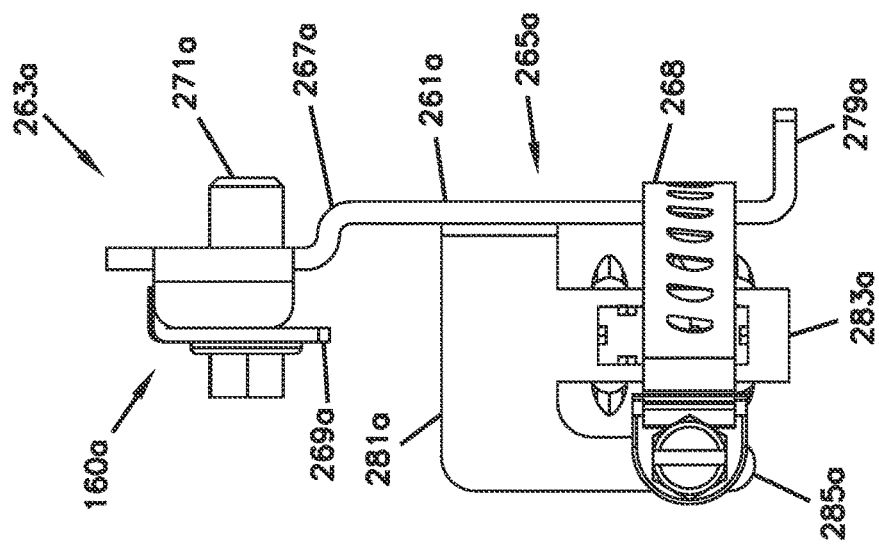
FIG. 21 is another side view of the cable anchor of FIG. 17 showing the opposite side as compared to the side of FIG. 20.
Figure 20:
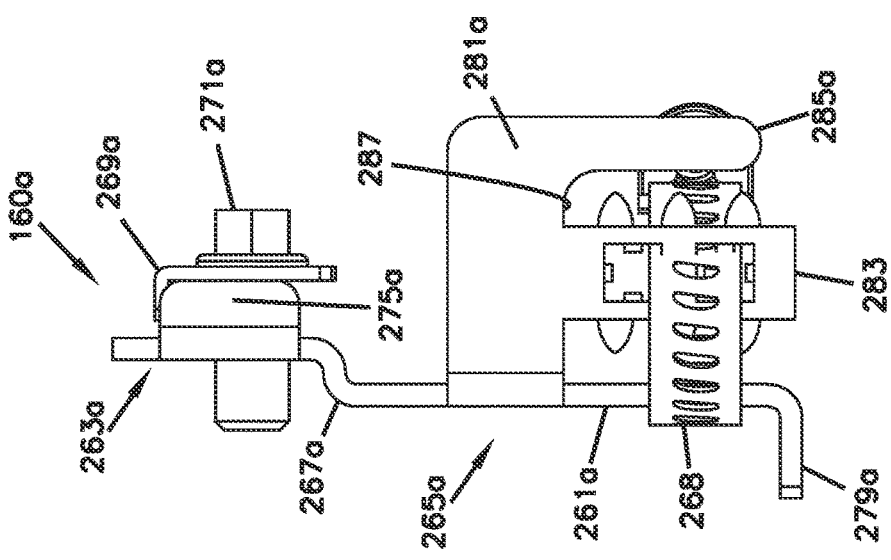
FIG. 20 is a side view of the cable anchor of FIG. 17.
Figure 19:
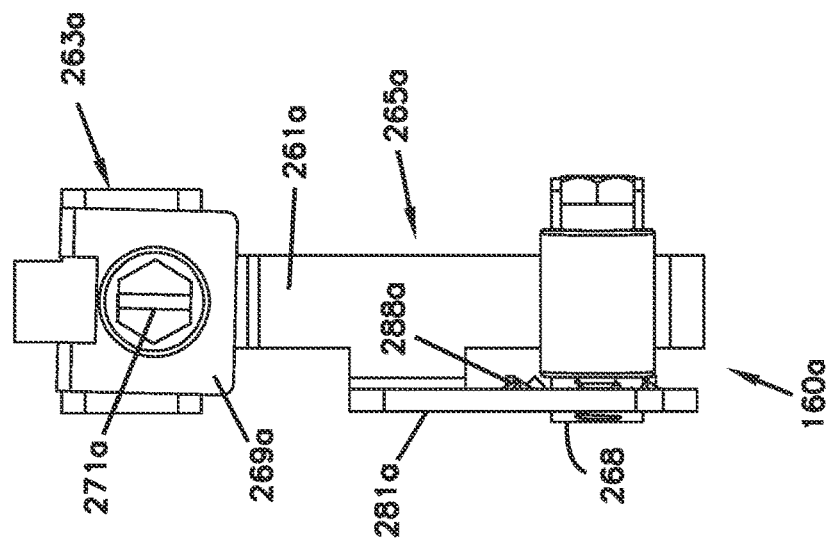
FIG. 19 is a front view of the cable anchor of FIG. 17.
Figure 25:
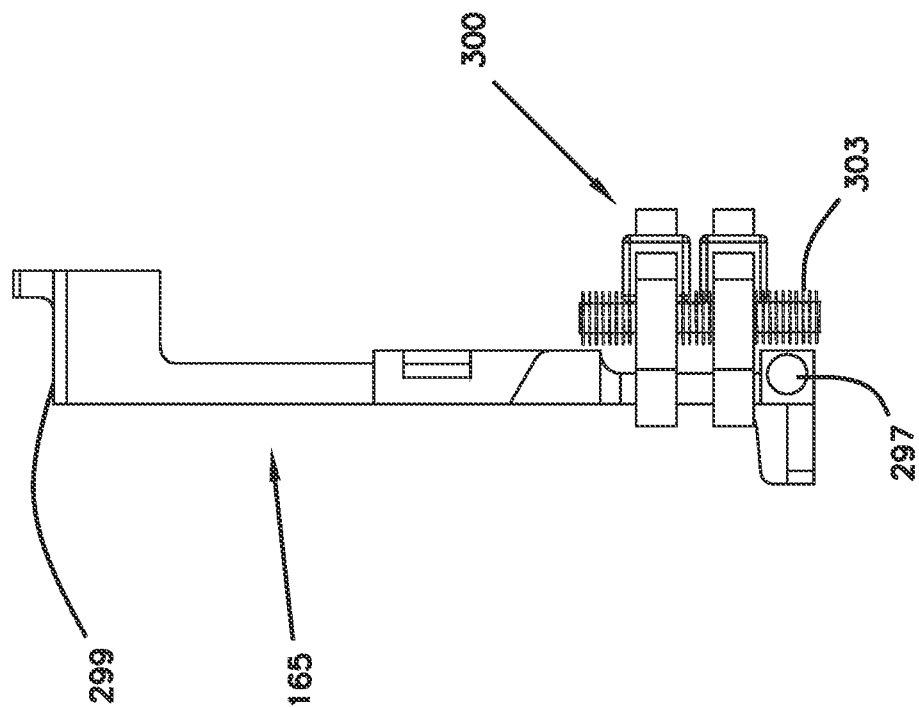
FIG. 25 is a side view of the cable anchor of FIG. 22.

In certain implementations, as shown at FIG. 14, each of the brackets 141 can include a first connection interface arrangement 700 that is part of a mechanical connection interface 702 (FIG. 16) in accordance with the principles of the present disclosure. The mechanical connection interface 702 also includes a second connection interface arrangement 704 included as part of each component holder 706 adapted for holding optical components such as a splice reinforcing sleeves for protecting optical fusion splices, passive optical splitters, wavelength division multiplexers, fiber optic adapters, or the like. FIGS. 47-57 disclose further details of the mechanical connection interface 702.

The first and second connection arrangements 700, 704 of the mechanical connection interface 702 are adapted to interlock to secure the component holder 706 to the bracket 141. In other examples, the connection arrangements 700, 704 can be reversed so that the first connection arrangement 700 is on the component holder 706 and the second connection arrangement 704 is on the bracket 141. It will be appreciated that the bracket 141 is just one example of a type of structure to which a component holder 706 can be secured using mechanical connection interfaces in accordance with the principles of the present disclosure. Other example structures include trays, flanges, shelfs, panels, housing walls, housing covers, housing bases, and the like.

Figure 47:
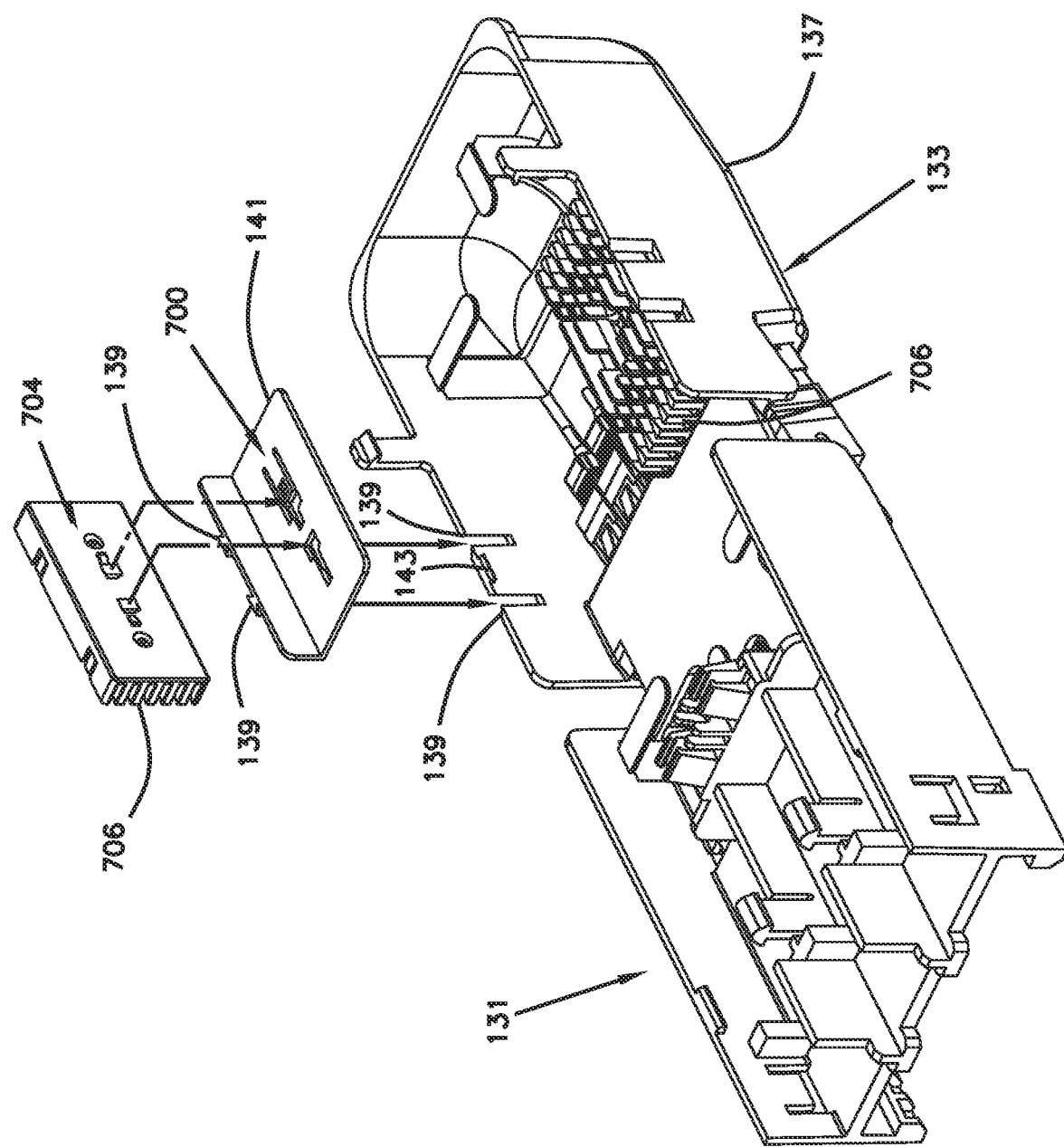
FIG. 47 shows the management unit of FIG. 2 with a bracket exploded upwardly from a main infrastructure of the management unit, the bracket includes a first connection interface arrangement adapted to interlock with a second connection interface arrangement corresponding to a component desired to be attached to the bracket.
Figure 48:
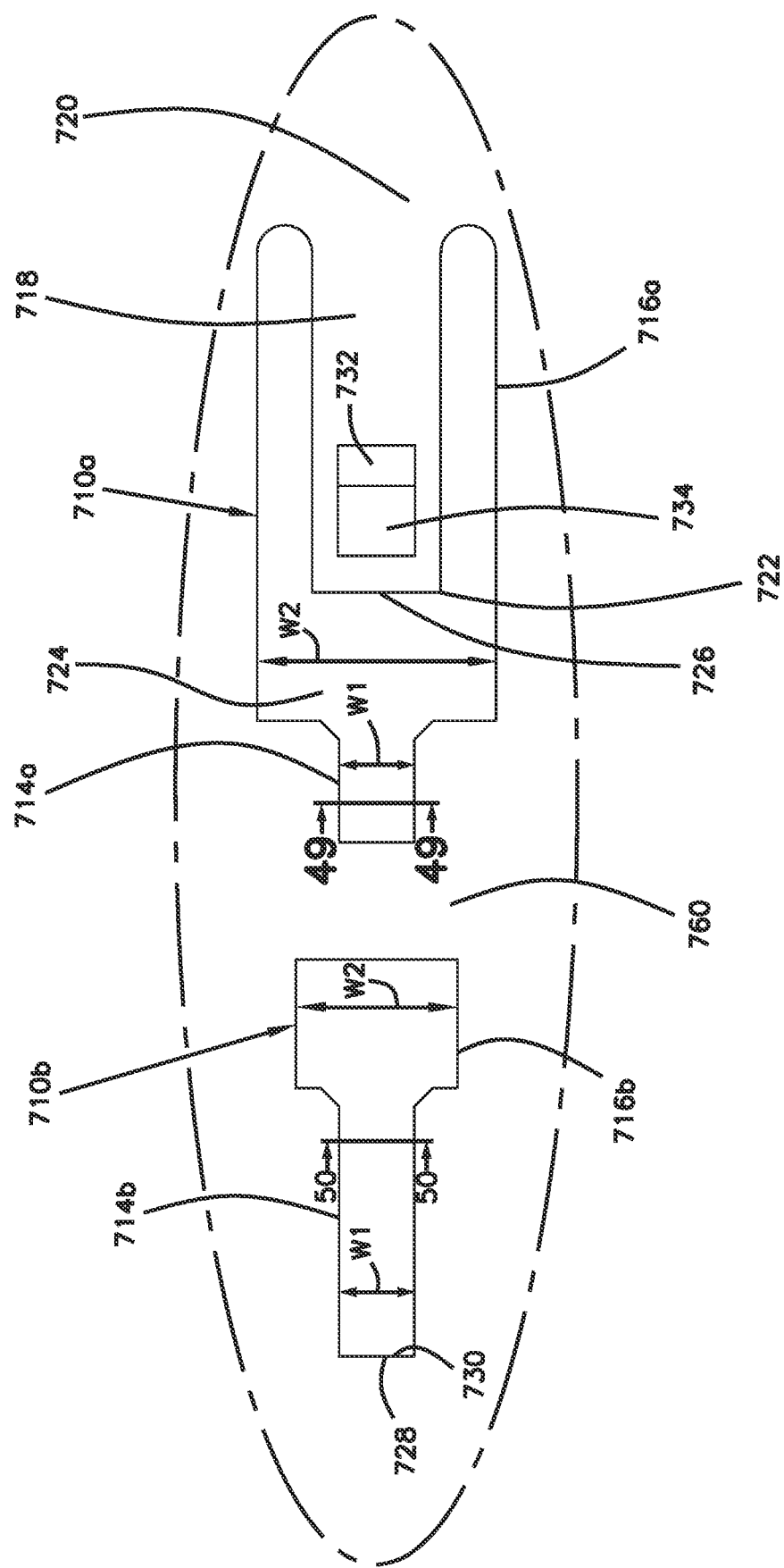
FIG. 48 is an enlarged plan view showing the first connection interface arrangement which corresponds to the bracket of FIGS. 15, 16 and 47.

Referring to FIGS. 47 and 48, the first connection interface arrangement 700 defines first and second attachment openings 710a, 710b aligned along a first reference line 712. The first and second attachment openings 710a, 710b each defining a groove portion 714a, 714b and an enlarged portion 716a, 716b. The groove portions 714a, 714b have lengths that extend along the first reference line 712 and first widths W1 that extend perpendicular to the first reference line 712. The enlarged portions 716a, 716b define second widths W2 that are larger than the first widths W1 and that are perpendicular to the first reference line 712. The first connection interface arrangement 700 further includes a flexible cantilever latch 718 positioned within the enlarged portion 716a of the first attachment opening 710a. The flexible cantilever latch 718 has a length that extends along the first reference line 712 between a base end 720 and a free end 722 of the flexible cantilever latch 718. The enlarged portion 716a of the first attachment opening 710a includes an interlock receiving portion 724 defined between the free end 722 of the flexible cantilever latch 718 and the groove portion 714a of the first attachment opening 710a. The free end 722 of the flexible cantilever latch 718 defines a first stop surface 726. The groove portion 714b of the second attachment opening 710b has an end 728 positioned opposite from the enlarged portion 716b of the second attachment opening 710b which defines a second stop surface 730. A top side of the flexible cantilever latch 718 defines a stop receptacle 732 including a ramp surface 734.

Figure 53:
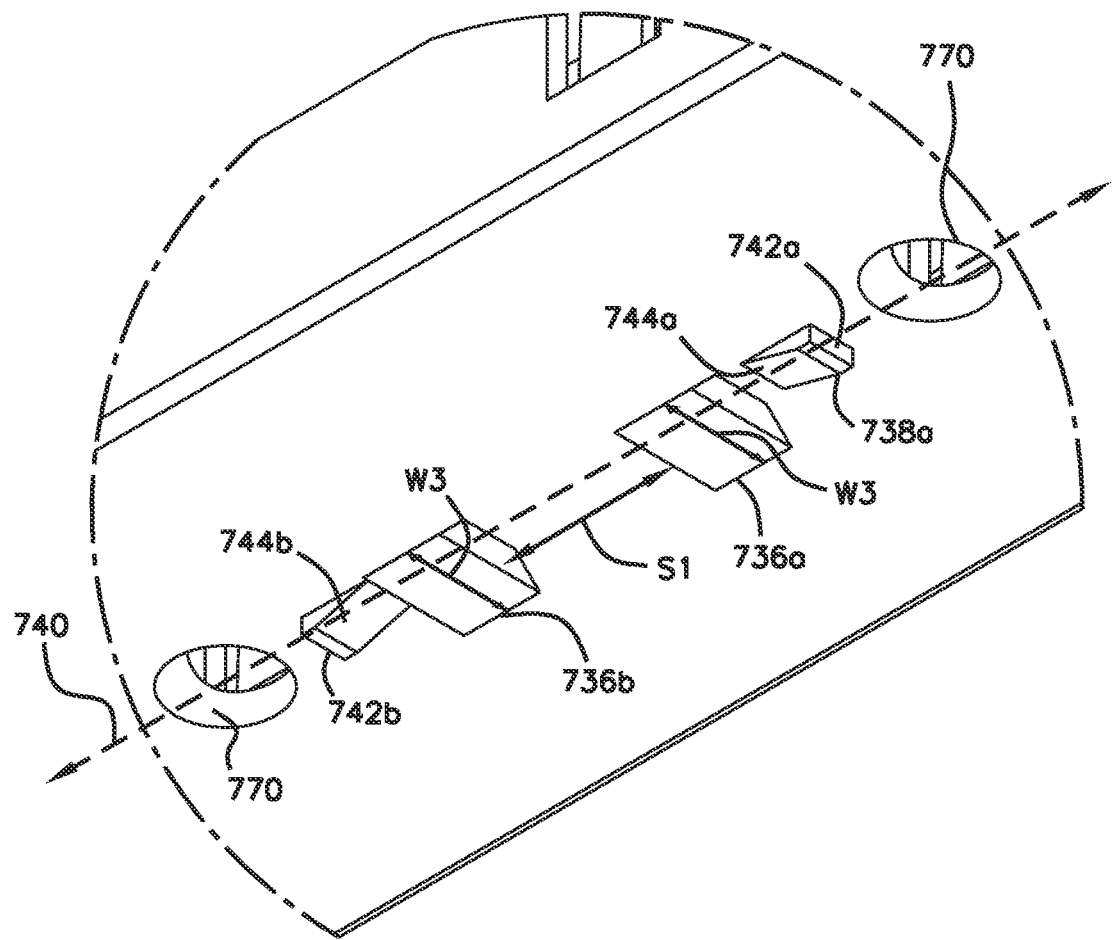
FIG. 53 is an enlarged view of the second connection interface arrangement of FIG. 52.

Referring to FIGS. 51-57, the second connection interface arrangement 704 integrated with the component holder 706 includes a first interlock 736a, a second interlock 736b, a first stop 738a and a second stop 738b all aligned along a second reference line 740 (FIG. 53). The first and second interlocks 736a, 736b are positioned between the first and second stops 738a, 738b. The first and second stops 738a, 738b include stop surfaces 742a, 742b that face at least partially away from the first and second interlocks 736a, 736b. The first and second stops 738a, 738b have ramp surfaces 744a, 744b that face at least partially toward the first and second interlocks 736a, 736b. The first and second interlocks 736a, 736b define third widths W3 that are perpendicular to the second reference line 740. The third widths W3 are smaller than the second widths W2 of the enlarged portions 716a, 716b of the first and second attachment openings 710a, 710b. The third widths W3 are larger than the first widths W1 of the groove portions 714a, 714b of the first and second attachment openings 710a, 710b. The first and second interlocks 736a, 736b are separated by a spacing S1 (FIG. 53) along the second reference line 740 that corresponds to a spacing S2 (FIG. 48) between the enlarged portions 716a, 716b of the first and second attachment openings 710a, 710b along the first reference line 712.

Figure 54:
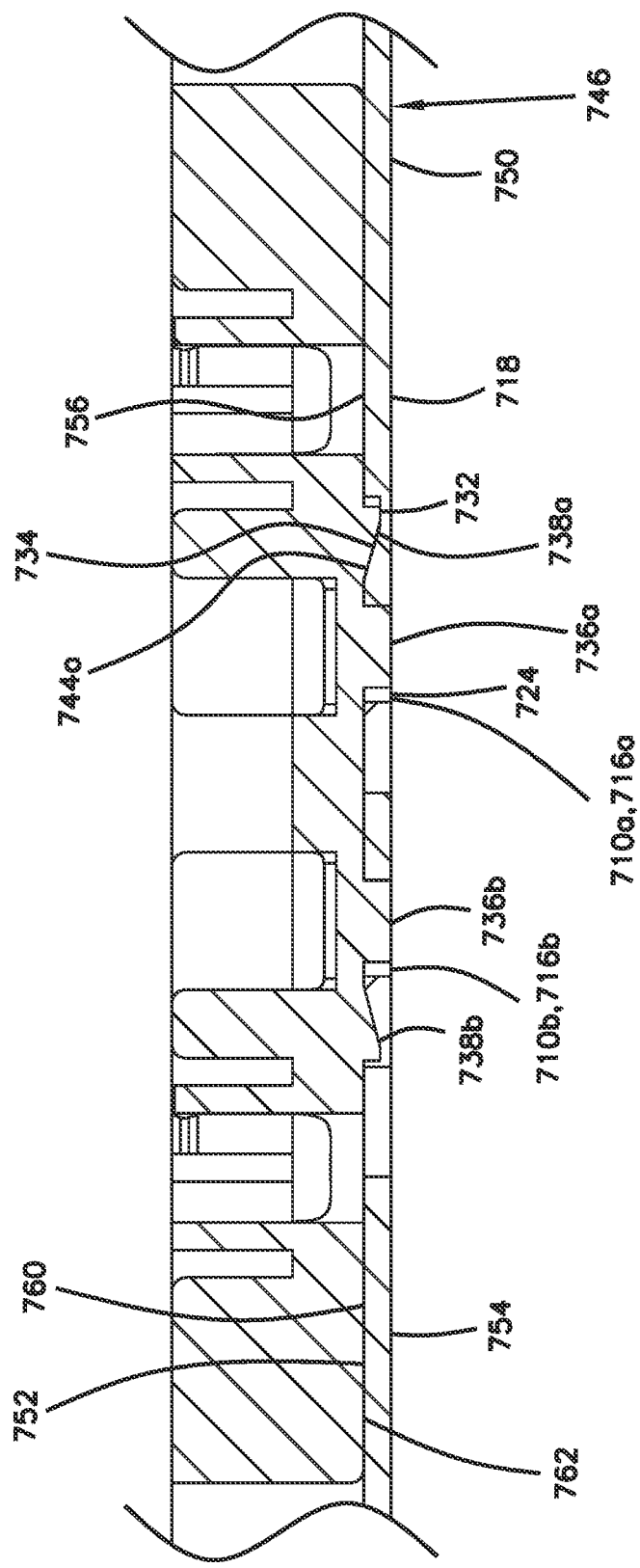
FIG. 54 shows the second connection interface arrangement in a first, pre-interlocked, position relative to the first connection interface arrangement.
Figure 55:
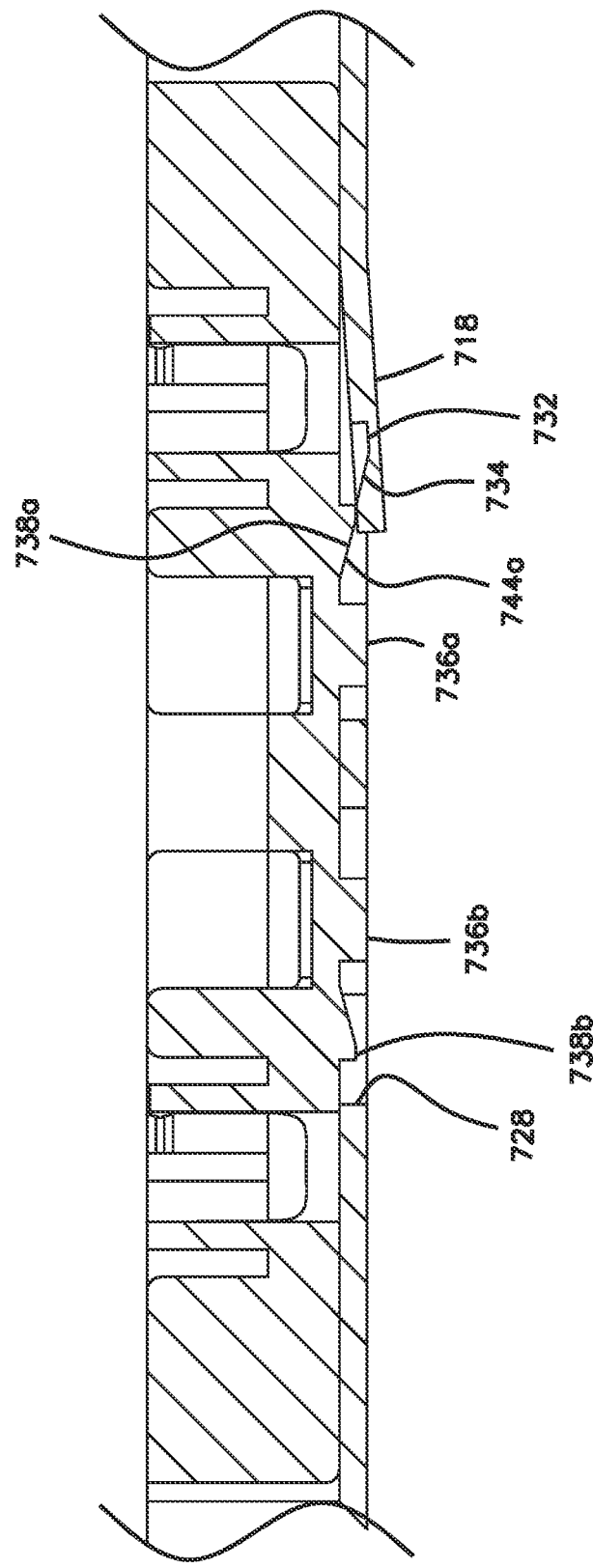
FIG. 55 shows the second connection interface arrangement in the process of being slid laterally relative to the first connection interface arrangement in a direction from the pre-interlocked first position of FIG. 54 toward a second, locked position.

The second connection interface arrangement 704 is connected to the first connection interface arrangement 700 by orienting the second connection interface arrangement 704 in a first position relative to the first connection interface arrangement 700 (see FIG. 54). In the first position, the first and second connections interface arrangements 700, 704 are relatively positioned such that: a) the first and second reference axes 712, 740 are aligned; b) the first interlock 736a is received within interlock receiving portion 724 of the enlarged portion 716a of the first attachment opening 710a; c) the second interlock 736b is received within the enlarged portion 716b of the second attachment opening 710b; and d) the first stop 738a is positioned within the stop receptacle 732 of the of the flexible cantilever latch 718 with the ramp surface 744a of the first stop 738a opposing the ramp surface 734 of the stop receptacle 732.

Figure 56:
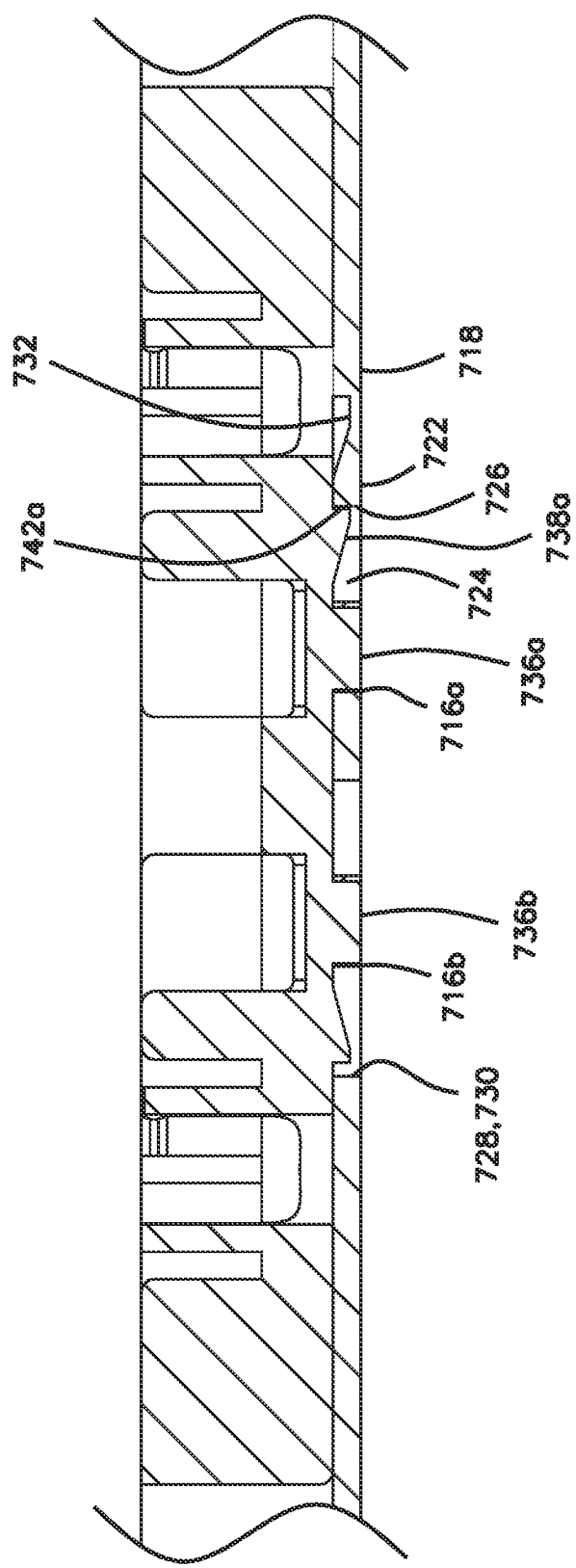
FIG. 56 shows the second connection interface in the locked, second position relative to the first connection interface.

After the first and second connection interface arrangements 700, 704 have been relatively oriented in the first position of FIG. 54, the second connection interface arrangement 704 is slid relative to the first connection interface arrangement 700 along the aligned first and second reference axes 712, 740 from the first position to a second position (see FIG. 56). In the second position of FIG. 56, the first and second connection interface arrangements 700, 704 are relatively positioned such that: a) the first interlock 736a is received within and interlocked with the groove portion 714a of the first attachment opening 710a; b) the first stop 738a is positioned within the interlock receiving portion 724 of the enlarged portion 716a of the first attachment opening 710a with the stop surface 742a of the first stop 738a opposing the first stop surface 726 at the free end 722 of the flexible cantilever latch 718; c) the second stop 738b is positioned within the groove portion 714b of the second attachment opening 710b with the stop surface 742b of the second stop 738b opposing the second stop surface 730 at the end of the groove portion 714b of the second attachment opening 710b; and d) the second interlock 736b is received within and interlocked with the groove portion 714b of the second attachment opening 710b.

As the second connection interface arrangement 704 is slid from the first position to the second position, the ramp surface 744a of the first stop 738a engages the ramp surface 734 of the stop receptacle 732 to cause deflection of the flexible cantilever latch 718 (see FIG. 55) from a latching position to an unlatched position. After the first stop 738a moves past the free end 722 of the flexible cantilever latch 718, the flexible cantilever latch 718 elastically returns from the unlatched position to the latching position.

Figure 49:
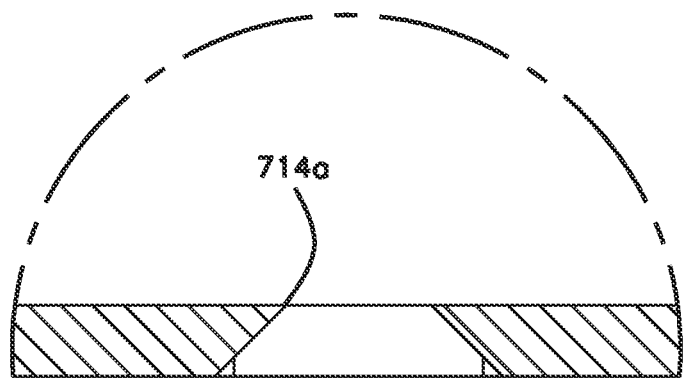
FIG. 49 is a cross-sectional view taken along section line 49-49 of FIG. 48.
Figure 50:
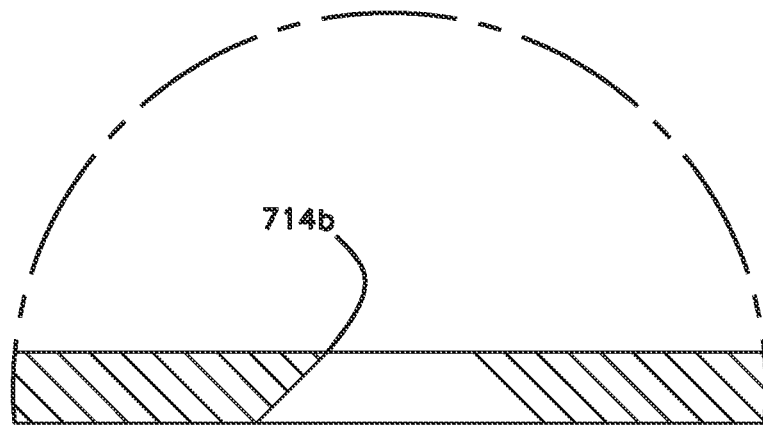
FIG. 50 is a cross-sectional view taken along section line 50-50 of FIG. 48.
Figure 51:
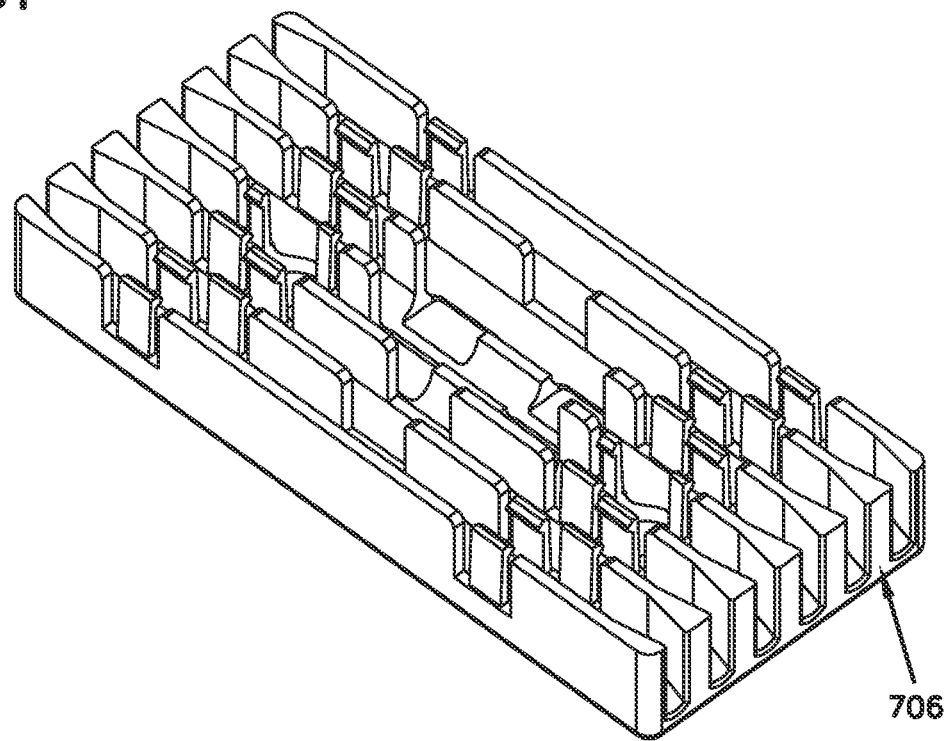
FIG. 51 is a perspective, primarily top view of the fiber optic component of FIGS. 15, 16 and 47.
Figure 52:
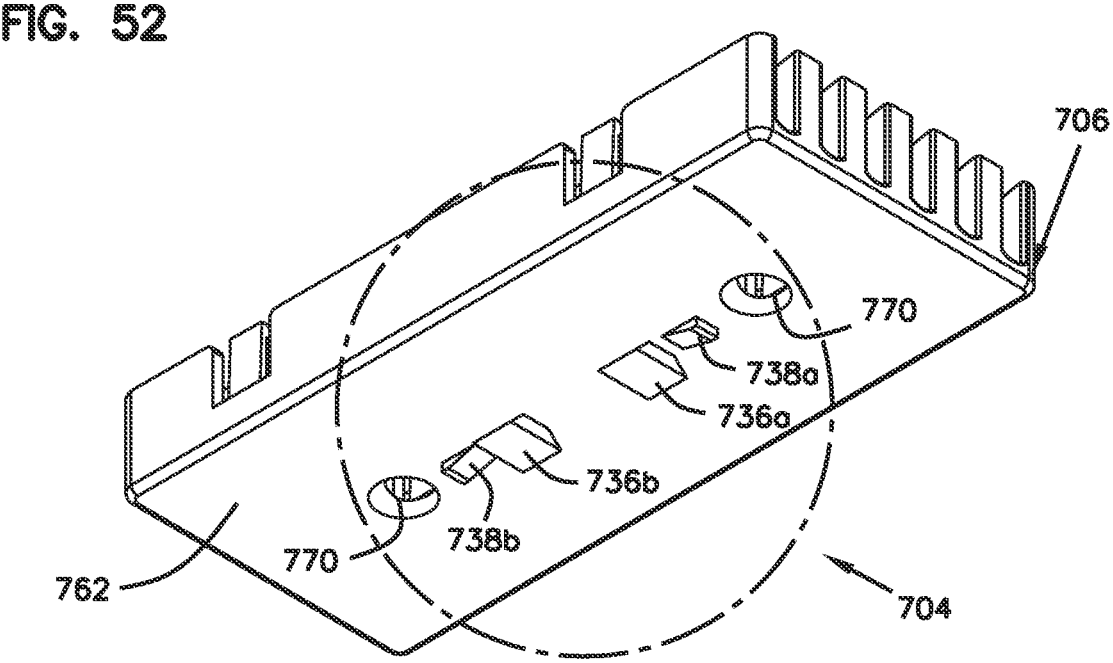
FIG. 52 is a perspective, primarily bottom view of the component of FIG. 51 showing the second connection interface arrangement adapted to interlock with the first connection interface arrangement of FIG. 48.

The groove portions 714a, 714b and the first and second interlocks 736a, 736b have dovetailed shapes in cross-sectional planes that are perpendicular to the first and second reference lines 712, 740 (see FIGS. 49 and 50). The stop surfaces 742a, 742b of the first and second stops 738a, 738b face at least partially in opposite directions. The ramp surfaces 744a, 744b of the first and second stops 738a, 738b face partially towards each other. The first and second stop surfaces 726, 730 of the first connection interface arrangement 700 face at least partially towards each other.

A main body 149 of the bracket 141 includes first portion 750 having a top side 752 and a bottom side 754. The base end 720 of the flexible cantilever latch 718 is unitarily formed with the main body 149. The first and second attachment openings 710a, 710b extend through the first portion 750 of the main body 149 from the top side 752 to the bottom side 754. The stop receptacle 732 of the flexible cantilever latch 718 is defined at a top side 756 of the flexible cantilever latch 718 that is coplanar with the top side 752 of the first portion 750 of the main body 149 when the flexible cantilever latch 718 is in the latching position. The stop receptacle 732 extends downwardly into the flexible cantilever latch 718 from the top side 756 of the flexible cantilever latch 718 so that the stop receptacle 732 extends lower than the top side 752 of the first portion 750 of the main body 149 when the flexible cantilever latch 718 is in the latching position.

The first connection interface arrangement 700 defines a first seating surface 760 (e.g., the top side 752 of the portion 750 of the main body 149) through which the first and second attachment openings 710a, 710b extend. The second connection interface arrangement 704 defines a second seating surface 762 (e.g., the underside of the component holder 706) from which the first interlock 736a, the second interlock 736b, the first stop 738a and the second stop 738b project. The first and second seating surfaces 760, 762 are flush when the second connection interface arrangement 704 is in the first position relative to the first connection interface arrangement 700 and are also flush when the second connection interface arrangement 704 is in the second position relative to the first connection interface arrangement 700. The flexible cantilever latch 718 is in the latching position when the second connection interface arrangement 704 is in the first position relative to the first connection interface arrangement 700, and the flexible cantilever latch 718 is also in the latching position when the second connection interface arrangement 704 is in the second position relative to the first connection interface arrangement 700. Release openings 770 are defined through the second sealing surface 762 for allowing the cantilever 718 to be depressed with a tool such that the cantilever is moved to the non-latching position thereby allowing the second connection interface arrangement 704 to be disengaged from the first connection interface arrangement 700 by sliding the component holder 706 from the second position (see FIG. 56) back to the first position (see FIG. 54).

Figure 57:
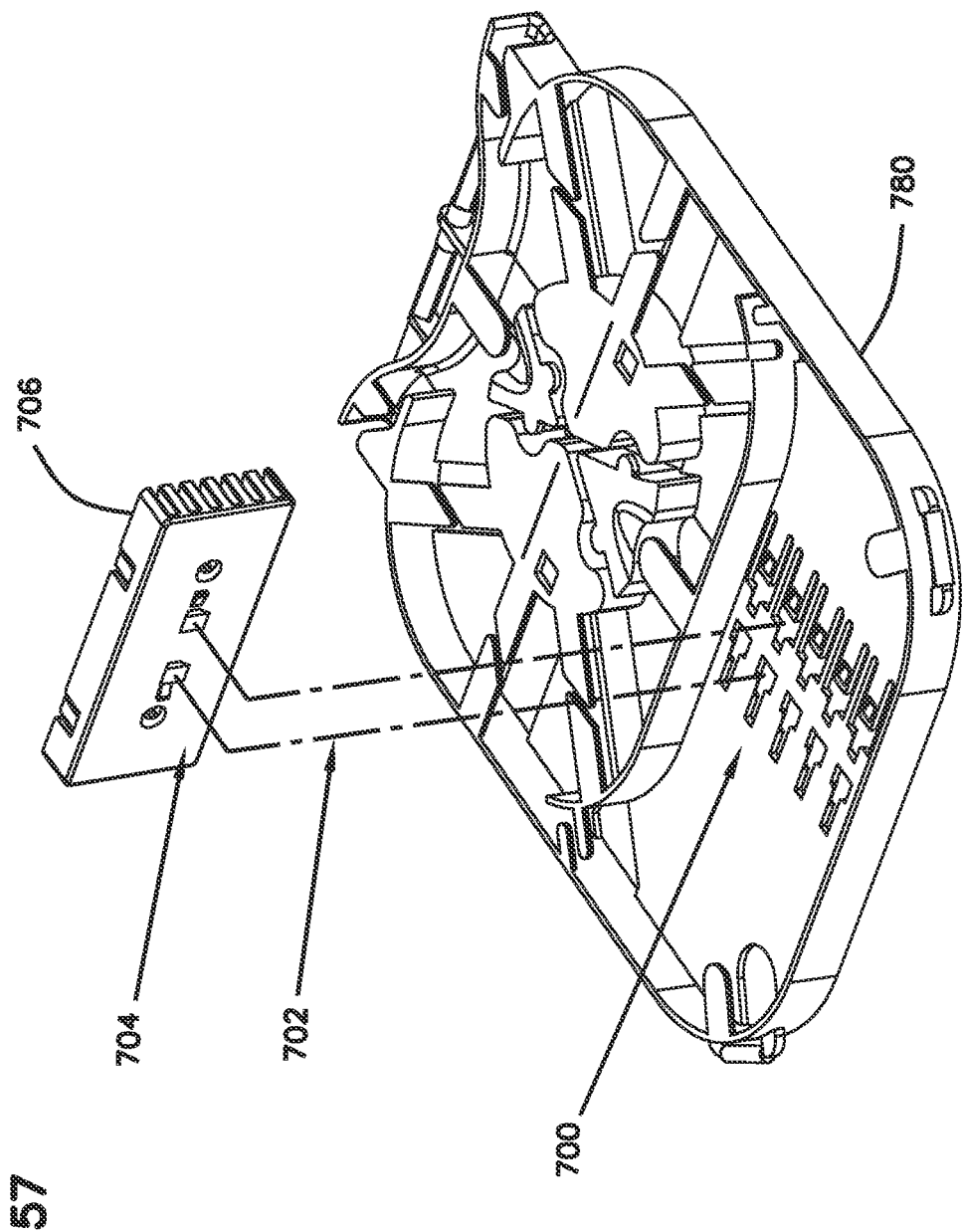
FIG. 57 shows the first connection interface integrated into a fiber management tray rather than into a bracket as shown in the previous examples.

FIG. 57, shows the first connection interface arrangement 700 integrated into a fiber management tray 780 so that the component holder 706 including the second connection interface arrangement 704 can be readily coupled to the fiber management tray 780 by the mechanical connection interface 702. In other examples, the first and second connection interface arrangements 700, 704 can be integrated into trays to allow the trays to be coupled together (e.g., back-to-back). In still other examples, one of the first and second connection interface arrangements 700, 704 can be integrated into a tray, and the other of the first and second connection interface arrangements 700, 704 can be integrated into a cable anchoring device (e.g., a strain relief device or other cable anchoring device examples of which are disclosed herein) to allow the cable anchoring device to be attached to the tray. In certain examples, the first and second connection interface arrangements 700, 704 can be used at the drop cable side and/or the feeder cable side of assemblies in accordance with the principles of the present disclosure for allowing cable anchors to be attached to the drop cable side and/or the feeder cable side.

FIGS. 58-65 depict an alternative tray assembly 400 that can be used with the management unit 130. The tray assembly 400 includes a main tray 402 and a supplemental tray 404 pivotally connected to the main tray 402. The tray assembly 400 has four levels (i.e., layers, sides, etc.) for providing different functionality. A first level can provide connectorized patching functionality. A second level can provide loop storage of non-accessed and uncut buffer tubes of a feeder cable routed through the device and optionally anchored to the main tray. A third level can provide for storage and management of uncut fibers accessed from a buffer tube of the feeder cable. A fourth level can provide splicing functionality for splicing optical fibers of the feeder cable to connectorized pigtails having connectorized ends plugged into ports of fiber optic adapters at the first layer or for splicing optical fibers of the feeder cable to input sides of optical splitters or wavelength division multi-plexers having outputs coupled to connectorized pigtails with connectorized ends that can be loaded within ports of fiber optical adapters at the first layer.

Figure 58:
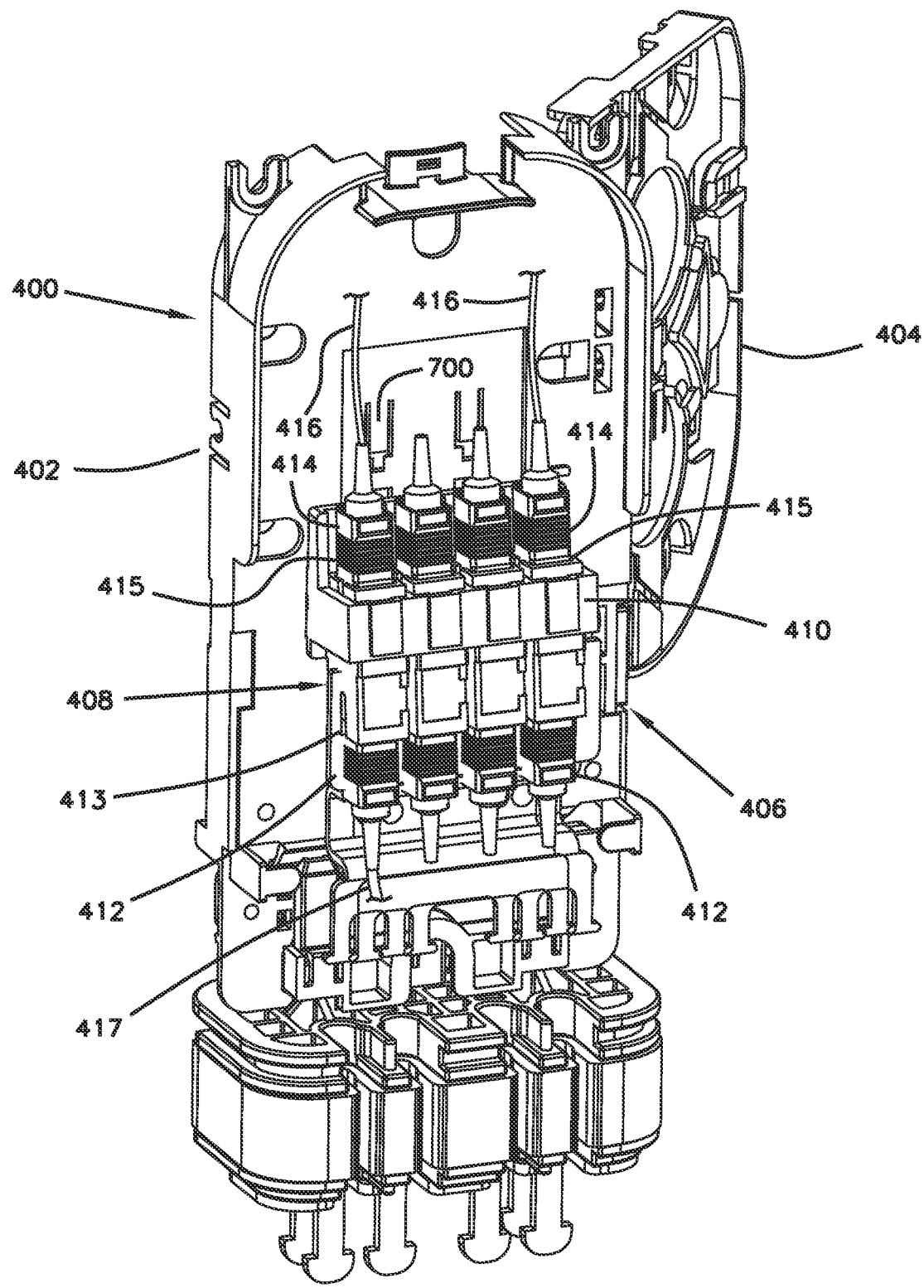
FIG. 58 is a front perspective view of an alternative tray assembly that can be used with the management unit of FIG. 1, the tray assembly including a main tray and a supplemental tray.
Figure 59:
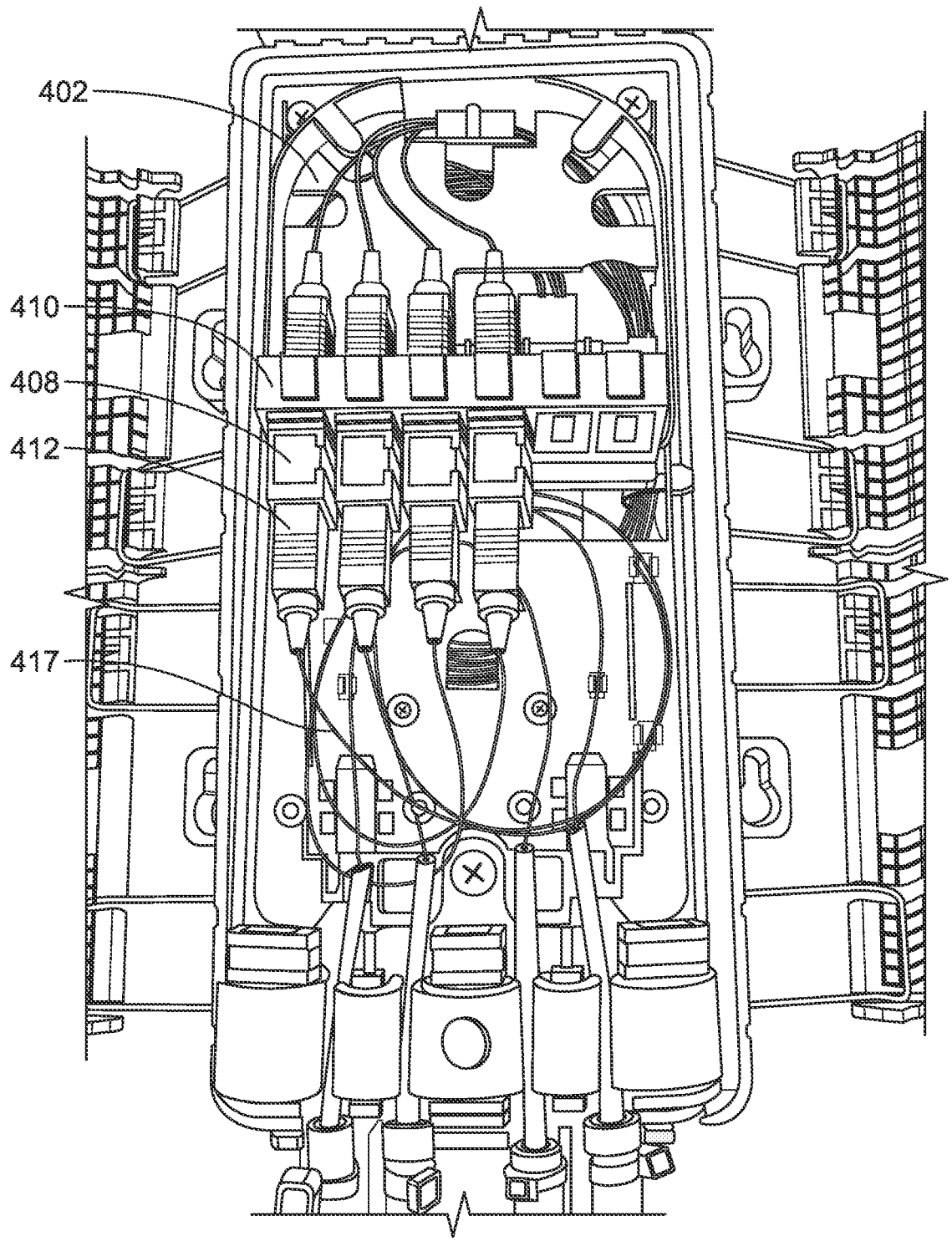
FIG. 59 is a front view of the tray assembly of FIG. 58.
Figure 65:
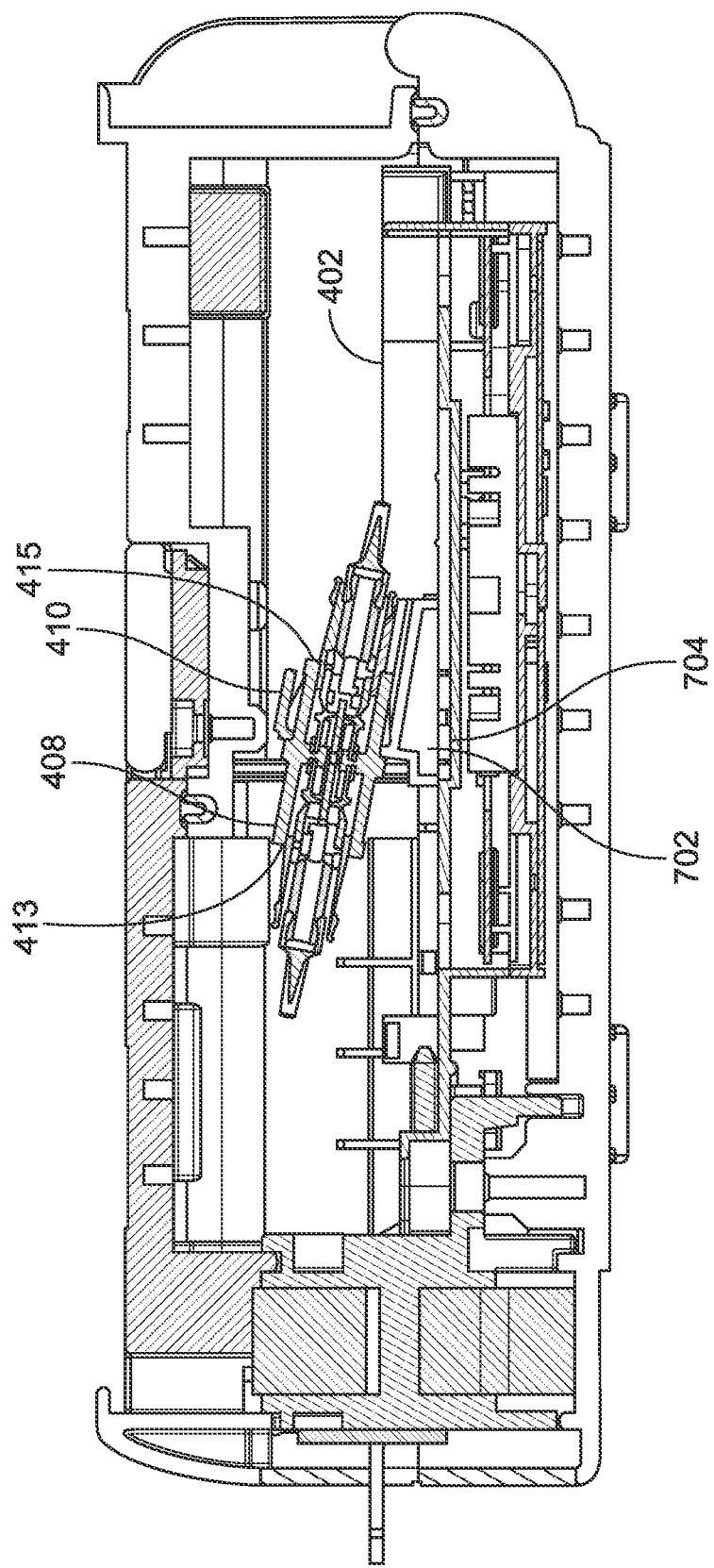
FIG. 65 is a cross-sectional view of the telecommunications enclosure of FIG. 1 with the alternative tray assembly of FIG. 58 and the cover moved relative to the base to a closed position.

Referring to FIGS. 58 and 59, the main tray 402 includes a first side 406 for providing connectorized patching functionality. A row or bank of fiber optic adapters 408 is mounted at the first side 406. The fiber optic adapters 408 are mounted within a holder 410, which is compatible with the mechanical connection interface 702. For example, as shown at FIG. 65, the holder 410 can include the second connection interface arrangement 704 adapted to interlock with the first connection interface arrangement 700 which is integrated with the main tray 402. Connectorized ends 412 of cables 417 (e.g., drop cables) can be plugged into first ports 413 of the fiber optic adapters 408. The cables 417 can be anchored to the first side 406 of the main tray 402. Connectorized ends 414 of fiber optic pigtails 416 can be plugged into second ports 415 of the fiber optic adapters 408 such that the fiber optic pigtails are optically coupled to the optical fibers of the cable 417.

Figure 60:
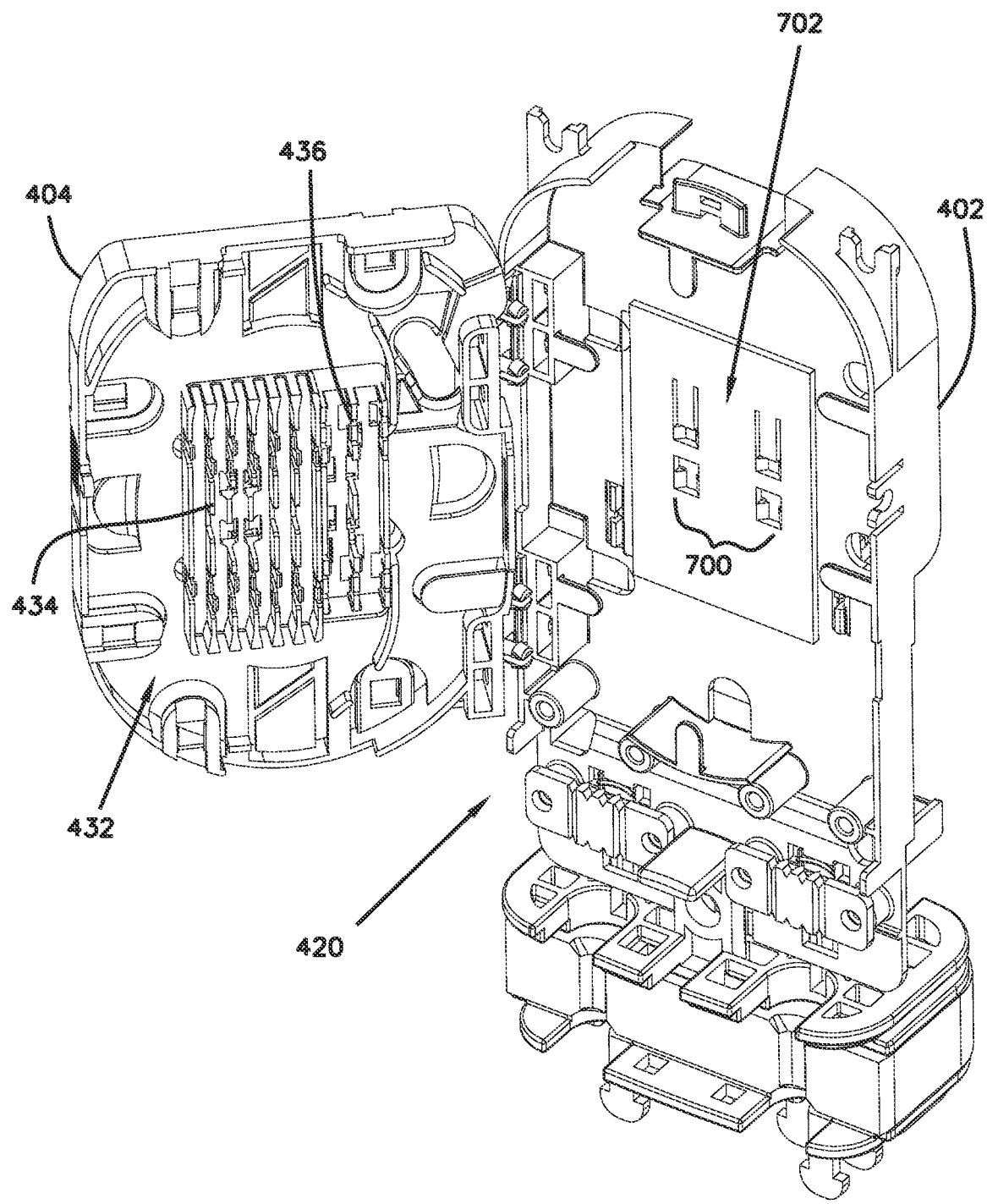
FIG. 60 is a rear perspective view of the tray assembly of FIG. 58.
Figure 61:
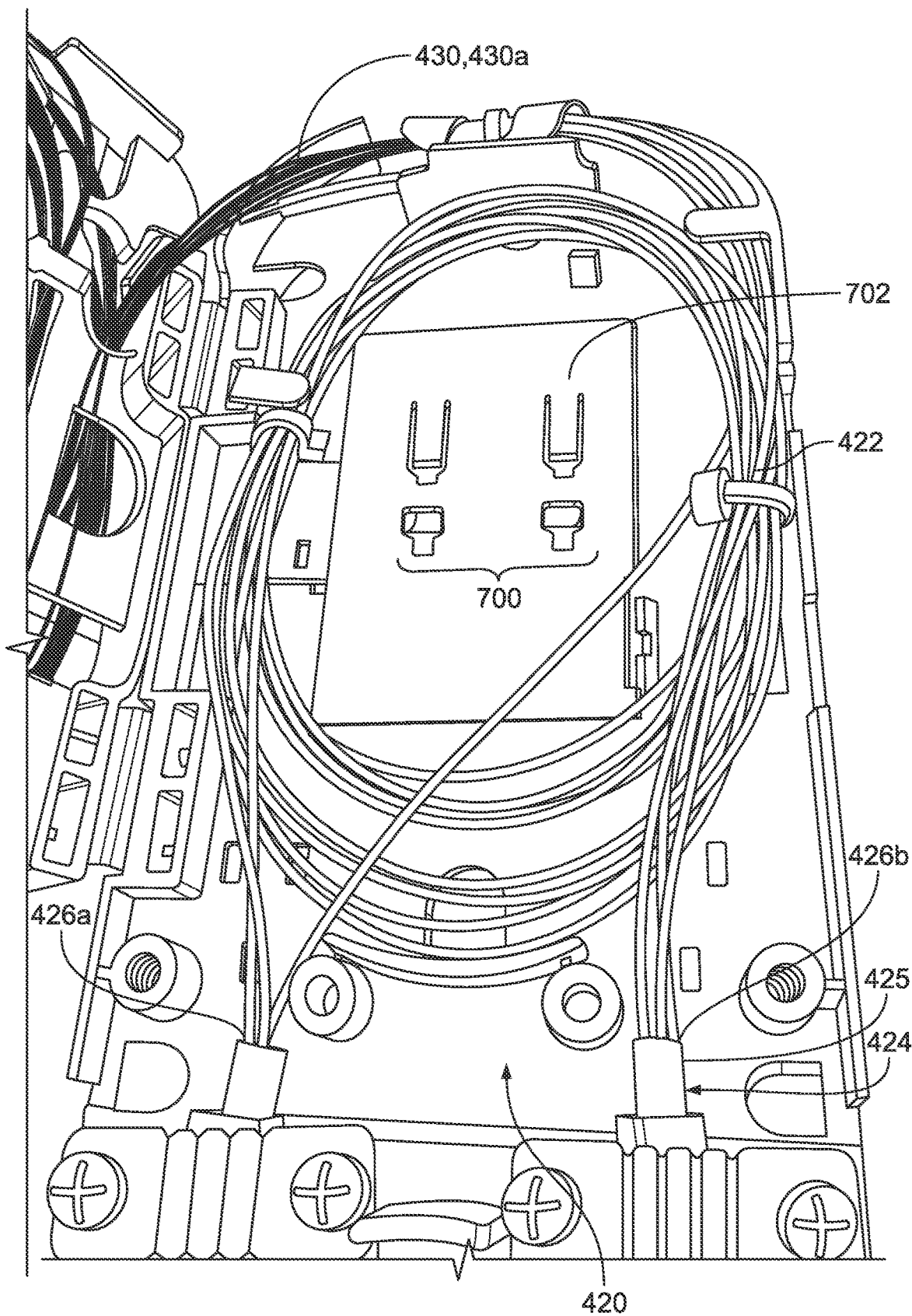
FIG. 61 is a rear view of the main tray assembly of FIG. 58.

Referring to FIGS. 60 and 61, a second side 420 of the main tray 402, which is opposite from the first side 406, is adapted for storing non-accessed buffer tubes 422 of a feeder cable 424 in a looped storage configuration. A jacket 425 of the feeder cable 424 has been stripped to expose the buffer tubes 422. The buffer tubes 422 are non-accessed because the buffer tubes have not been cut to access the optical fibers contained therein. Jacketed ends 426a, 426b of the feeder cable 424 are anchored to the second side 420 of the tray. Bend radius limiters, fiber routing guides and fiber retention fingers are provided at the second side 420 for facilitating managing and storing the buffer tubes 422 in a looped/coiled configuration.

Figure 62:
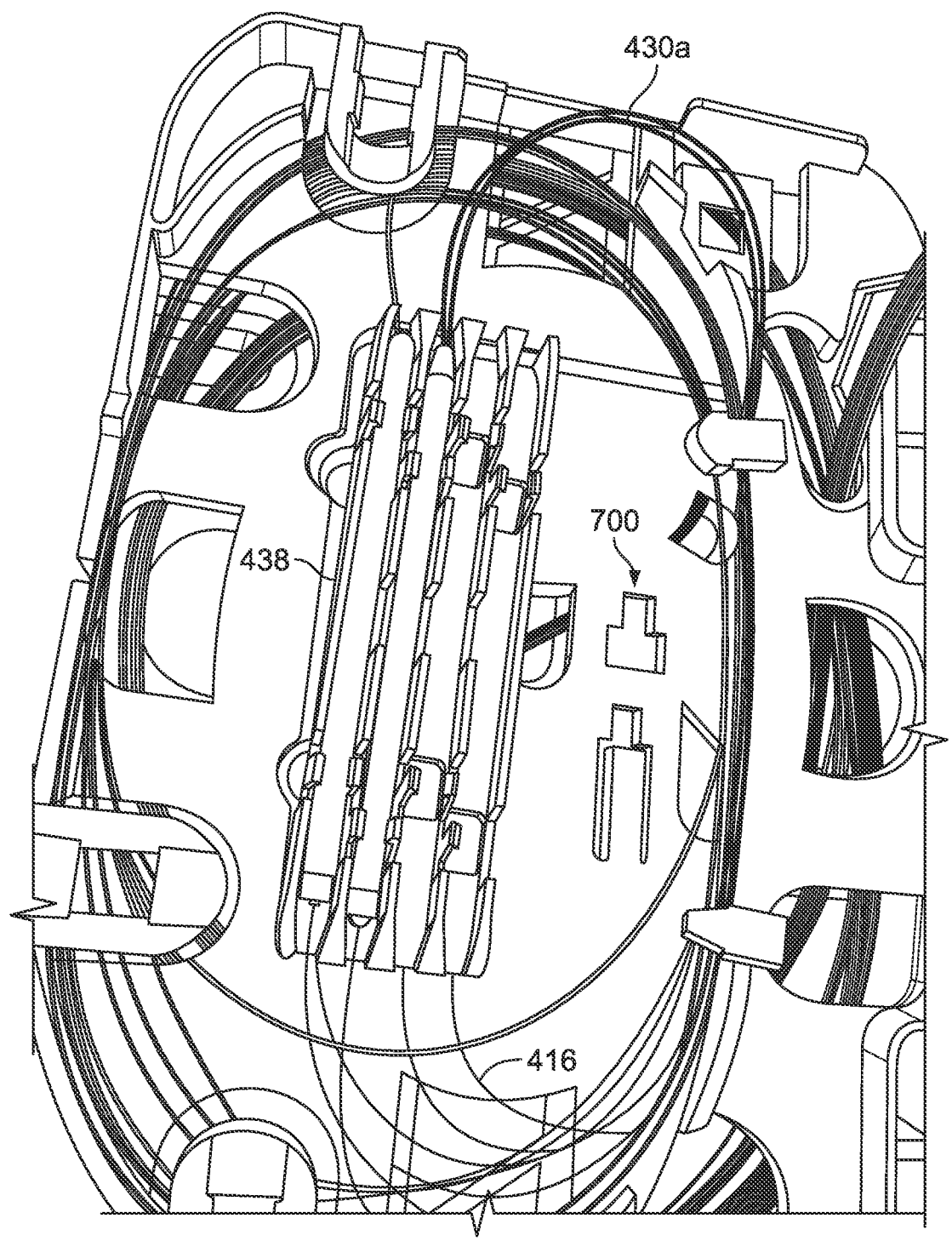
FIG. 62 is a view of the supplemental tray of FIG. 58.

Referring to FIGS. 60-62, at least one of the buffer tubes 422 is cut and the optical fibers 430 contained therein exposed. First ones 430a of the optical fibers 430 have been cut and routed to a first side 432 of the supplemental tray 404. The supplemental tray 404 has the first connection interface arrangement 700 for mounting component holders to the tray (see FIG. 62). As shown at FIG. 60, a splice holder 434 and a splitter/wavelength division multi-plexer holder 436 are shown mounted to the first side 432 of the tray 404. The holders 434, 436 preferably include integrated second connection interface arrangements 704 that interlock with the first connection interface arrangement 700 of the tray 404. The optical fibers 430a are shown spliced to the connectorized pigtails 416 at the splice holder 434 (see FIG. 62). Splice reinforcing sleeves 438 for supporting the splices are shown held by the splice holder 434. Fiber portions of the connectorized pigtails 416 are routed from the first side 406 of the main tray 402 to the first side 432 of the tray 404 for splicing to the fibers 430a.

Figure 63:
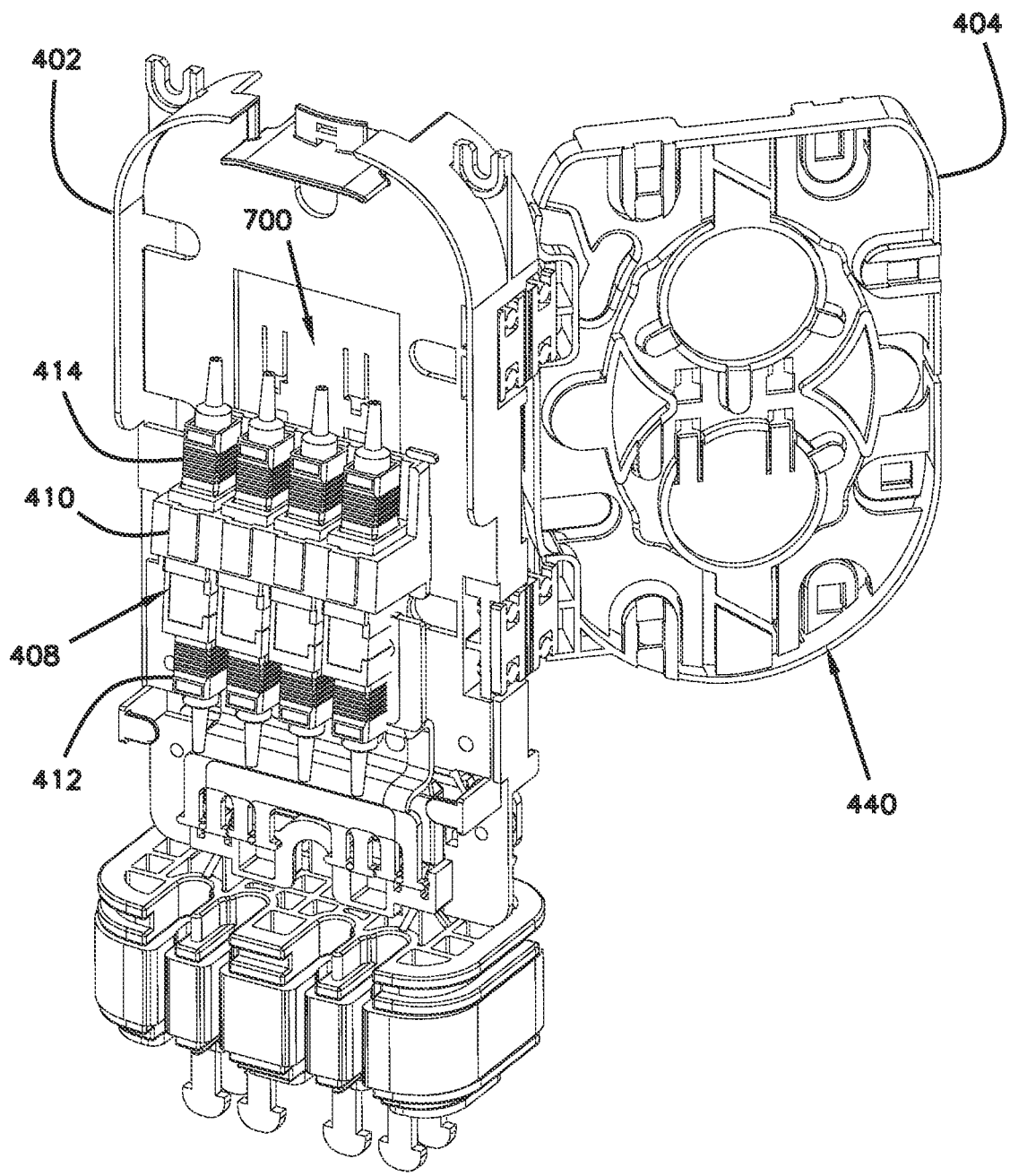
FIG. 63 is a perspective view of the tray assembly of FIG. 58.
Figure 64:
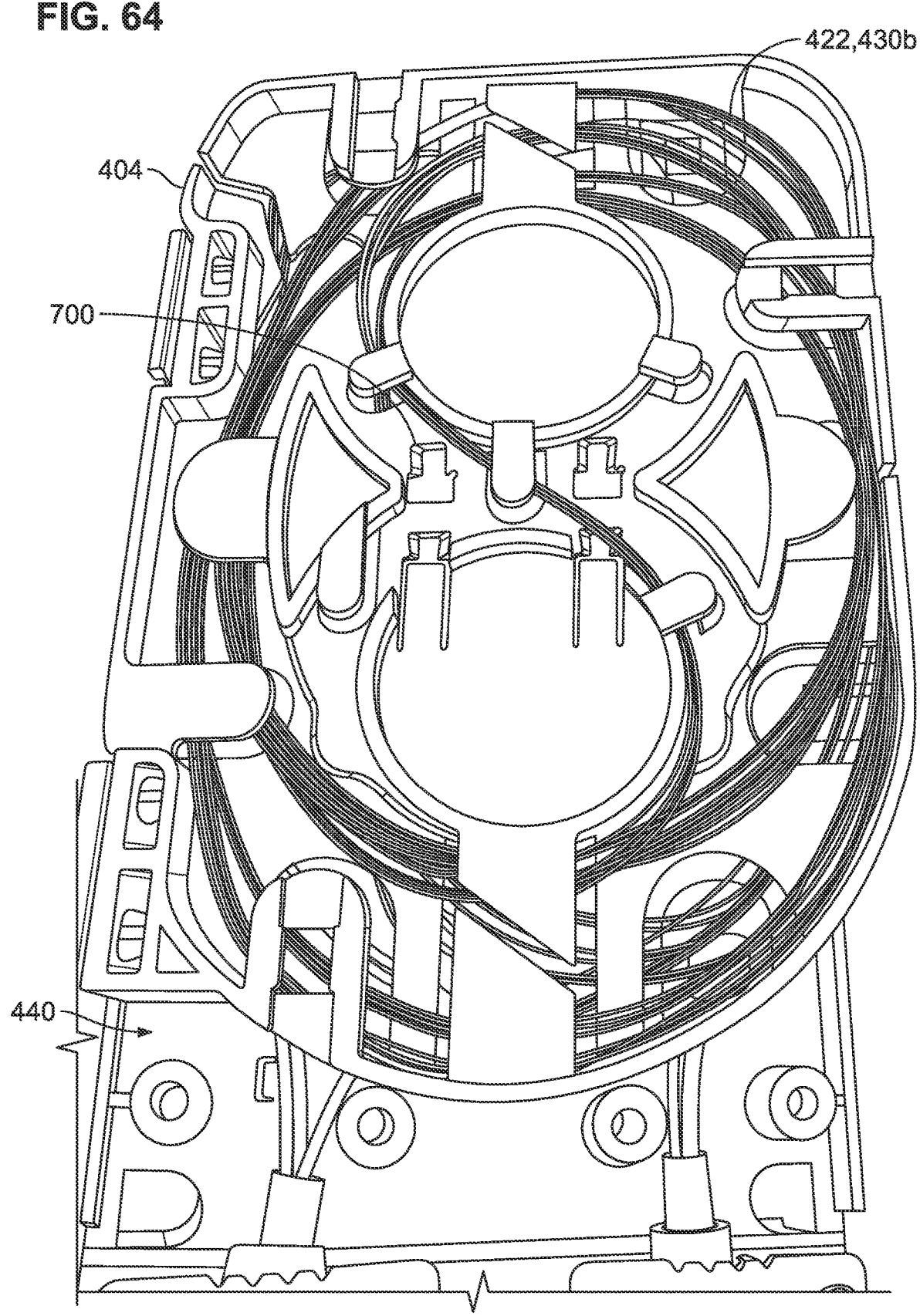
FIG. 64 is a rear view of the supplemental tray of FIG. 58.

Referring to FIGS. 63 and 64, second ones 430b of the optical fibers 430 of the buffer tubes 422 are uncut and are routed to a second side 440 of the supplemental tray 404 for storage and management. The second side 440 is opposite from the first side 432 of the tray 404. By managing the fibers 430b at the second side 440 of the tray 404, the fibers 430b are well managed and readily available for later access when needed for splicing. The second side 440 incudes fiber routing paths, fiber reversing paths, fiber looping paths, bend radius limiters, fiber retention fingers and other fiber management structures.

The supplemental tray 404 is smaller than the main tray 402 and is pivotally moveable relative to the main train 402 between an open position and a closed position. The first side 432 of the supplemental tray 404 faces toward the second side 420 of the main tray 402 when the supplemental tray 404 is in the closed position. The main tray 402 and the supplemental tray 404 are parallel or generally parallel when the supplemental tray 404 is in the closed position.

Figure 66:
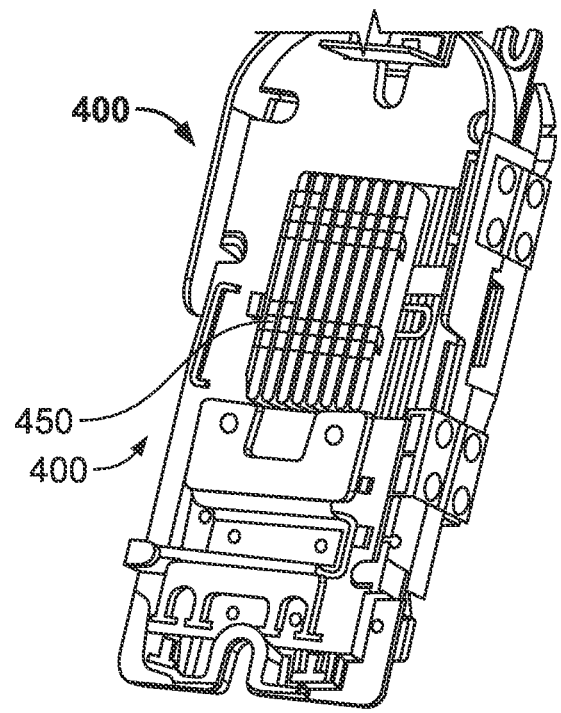
FIG. 66 is a perspective view of an alternative version of the tray assembly of FIG. 58 where the adapter holder at the first side of the main tray has been replaced with a splice holder.
Figure 67:
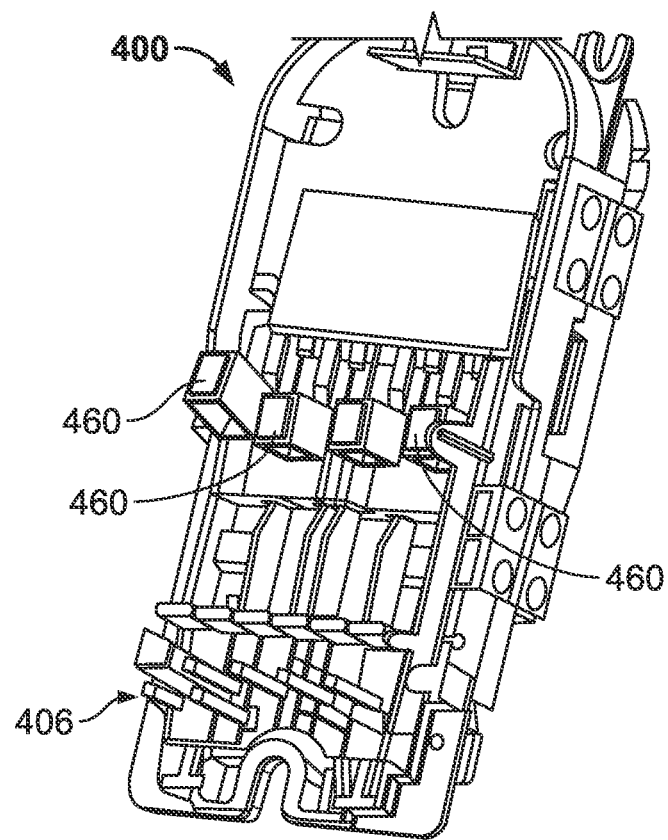
FIG. 67 is a perspective view of a further version of the tray assembly where the adapter holder at the first side of the main tray has been replaced with pivotal adapters.

FIG. 66 shows an alternative version of the tray assembly 400 where the adapter holder 410 at the first side 406 of the main tray 402 has been replaced with a splice holder 450 (or a passive optical splitter holder or a wavelength division multi-plexer holder). The splice holder 450 includes an integrated second connection interface arrangement 704 that interlocks with the first connection interface arrangement 700 at the first side 406 of the main tray 402. FIG. 67 shows a further version of the tray assembly 400 where the adapter holder 410 at the first side 406 of the main tray 402 has been replaced with pivotal adapters 460 arranged in a configuration of the type disclosed in PCT Publication No. WO 2007/039585, which is hereby incorporated by reference in its entirety.

Figure 68:
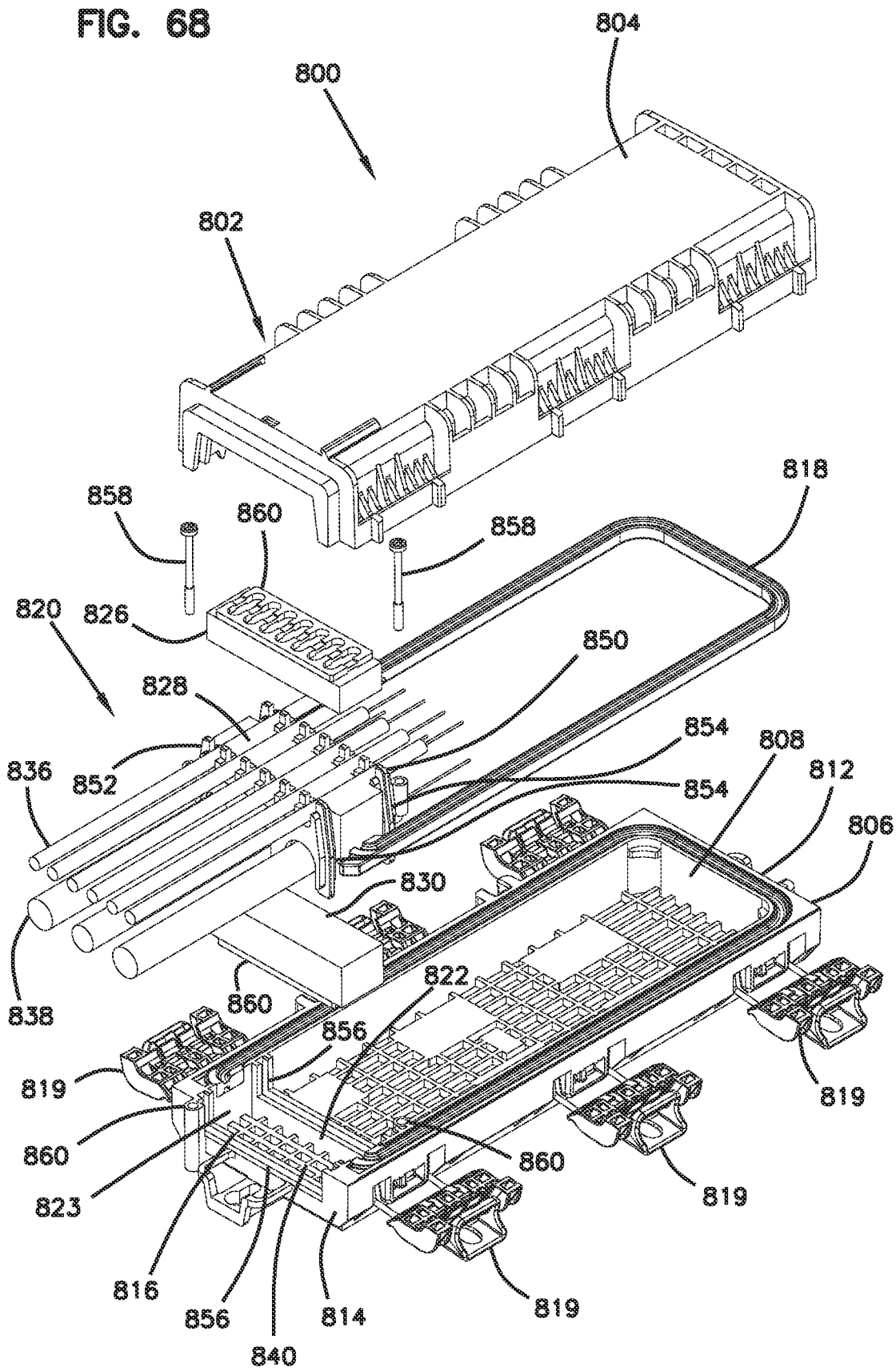
FIG. 68 depicts a closure in accordance with the principles of the present disclosure.

FIG. 68 depicts a sealed enclosure 800 having cable sealing in accordance with aspects of the present disclosure. The enclosure 800 includes a housing 802 including first and second housing pieces 804, 806 (e.g., a cover and a base) that mate to define an interior 808 of the housing 802. The housing pieces 804, 806 each extend from a first end 812 to a second end 814 of the housing 802. The first end 812 is depicted as closed and the second end 814 defines an opening 816 through which cables can be routed in and out of the housing. A perimeter seal 818 extends around a perimeter of the housing 802 and is adapted to seal between the pieces 804, 806 when the pieces 804, 806 are secured together. In certain examples, the pieces 804, 806 can be connected together by a slideable hinge as disclosed in PCT Publication No. WO 2017/046187. Clamps 819 are provided at both elongate sides of the housing for securing the first and second housing pieces 804, 806 together and for compressing the perimeter seal 818. In other examples, both ends of the housing 802 can be configured for passing through cables. In other examples, other housing shapes (e.g., shapes that are not elongate) can be used.

Figure 69:
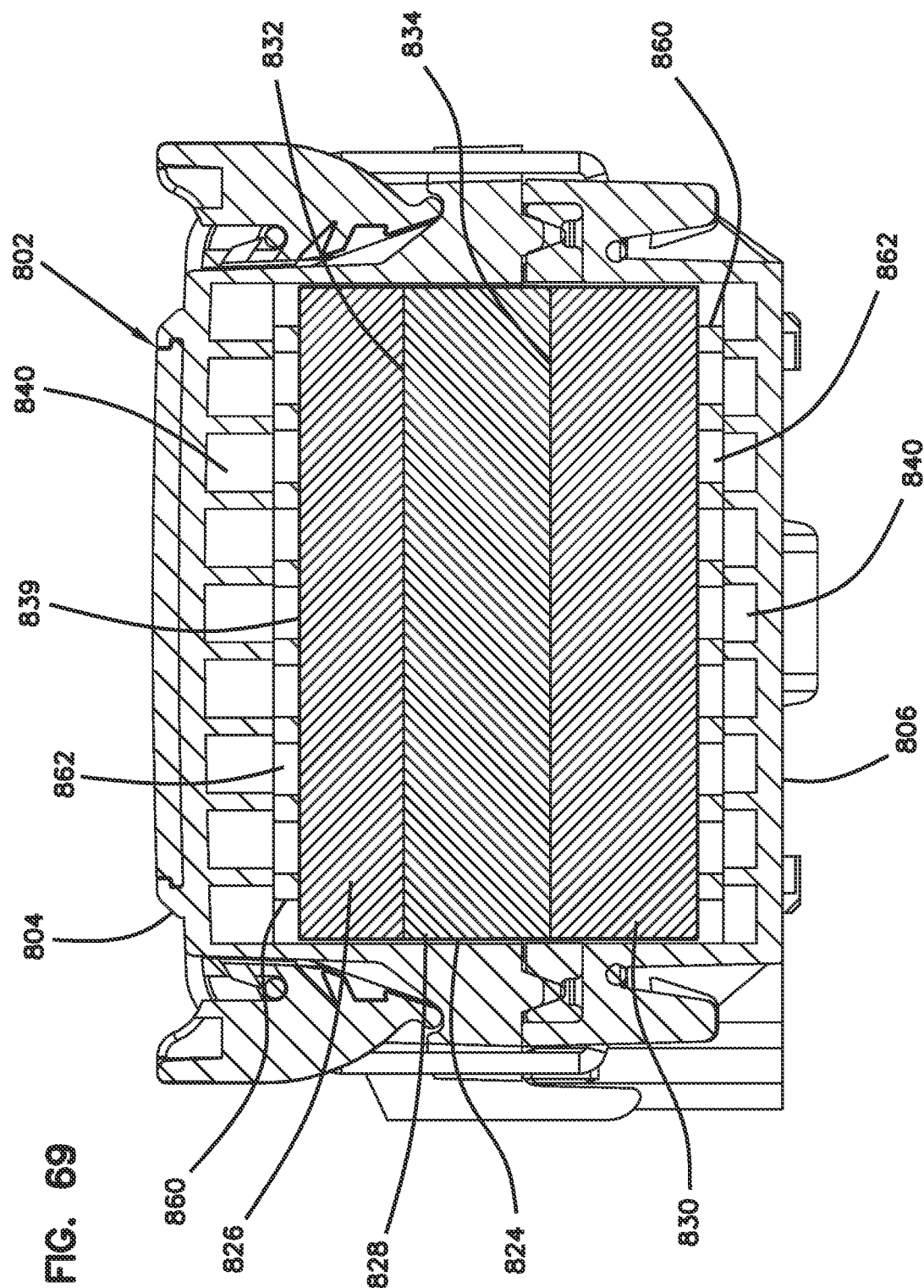
FIG. 69 is cross-sectional view cut through a gel block of the closure of FIG. 68, the gel block is used in combination with open sided volume compensation plates.

A cable sealing arrangement 820 positioned within the opening 816 is in communication/contact with ends of the perimeter seal 818. The cable sealing arrangement 820 engages the housing 802 (e.g., axial seal faces 822 of the housing; or lateral facing faces of the housing 823) and the perimeter seal 818 to seal about the opening 816. The cable sealing arrangement 820 including a block of gel 824 defining a total gel volume. The cable sealing arrangement 820 includes first, second and third gel sections 826, 828, 830 which define the block of gel 824. The second gel section 828 is between the first and second gel sections 826, 830. The cable sealing arrangement 820 includes a first cable pass-through location 832 defined at an interface between the first and second gel sections 826, 828; and a second cable pass-through location 834 is defined at an interface between the second and third gel sections 828, 830 (see FIG. 69). Drop cables 836 are shown routed axially through the first cable pass-through location 832 and feeder cables 838 are shown routed axially through the second cable pass-through location 834. The first and second gel sections 826, 828 are configured to form seals about drop cables 836 and the second and third gel sections 828, 830 are configured to form seals about the feeder cables 838. The gel volume has first outer boundary 839 (see FIG. 69) which is the outer boundary of the block of gel 824 when the gel has not been deformed to accommodate any cables at the pass-through location or locations. FIG. 69 shows the cable sealing arrangement enclosed within the end of the housing but with no cables routed through the cable sealing arrangement, and therefore depicts the first outer boundary 839. The first outer boundary can also be referred to as a pre-cable sealing outer boundary or an unoccupied cable sealing boundary. As shown at FIG. 69, open space 840 is provided to accommodate deformation of the block of gel 824 when the gel is pressurized while one or more cables is present at the cable pass-through location. In one example, the open space 840 has a volume that is at least 5 percent as large as the total gel volume. In another example, the open space 840 has a volume that is at least 10 percent as large as the total gel volume. In another example, the open space 840 has a volume that is at least 12.5 percent as large as the total gel volume. In still another example, the open space 840 has a volume that is at least 15 percent as large as the total gel volume.

In other examples, the gel sealing arrangement can include only one cable pass-through location, or more than two cable pass-through locations. In certain examples, the first and third gel sections 826, 830 can be respectively molded (e.g., injection molded) within portions of the first and second housing pieces 804, 806 that define the opening 816 (e.g., in the volume defined by the axial faces and the lateral faces which effectively define gel receiving cavities). The gel of the cable sealing arrangement preferably has sealing and mechanical properties of the type disclosed in U.S. Pat. No. 8,642,891, which is hereby incorporated by reference in its entirety. In one example, the gel is a dry silicone gel.

In certain examples, at least a portion of the open space 840 is located laterally outside the first outer boundary 839. In certain examples, a majority of the open space 840 is located laterally outside the first outer boundary 839. As depicted, the open space 840 is defined laterally between the first outer boundary 839 and an interior surface of the housing 802. In the depicted example, the open space 840 is defined at least in part by an open cell grid pattern 842 within the first and second housing pieces on opposite sides of the cable sealing arrangement 820 (e.g., laterally outside the first and third gel sections 826, 830).

In certain examples, at least a portion of the open space is within the first outer boundary 839 at a location offset from the cable pass-through location. For example, at least a portion of the open space can be within the first outer boundary 839 at a location encapsulated within one of the first, second or third gel sections 826, 828, 830 at a location offset from the cable pass-through location. In one example, open space is provided within the second gel section 828. For example, a sealed volume compensator (e.g., see FIG. 72) can be embedded or otherwise positioned within the second gel section 828. Similar sealed volume compensators could also be positioned in the first and/or third gel sections 826, 830.

In one example, the block of gel 824 is pressed between the first and second housing pieces 804, 806 to fully pressurize and deform the cable sealing arrangement 820. In certain examples, the housing pieces 804, 806 are clamped by the perimeter clamps together to close the housing 802, and the perimeter clamps apply the necessary force for fully pressurizing the block of gel. In a preferred example, a dedicated actuator (i.e., an actuator provided only for pressurizing the cable sealing gel) is not provided for pressurizing the block of gel. In other examples, a dedicated actuator may be used. In a preferred example, a dedicated actuator including a spring (e.g., a coil spring) is not provided for maintaining the block of gel in compression. In some examples, springs may be integrated into the housing.

Referring to FIG. 69, no predefined cable receiving positions are defined by the first, second and third gel sections 826, 282, 830 at the cable pass-through locations 832, 834. In one example, the cable pass-through locations seals 832, 834 are sealed without requiring a plug in a condition in which the block of gel is pressurized and no cable is present at the cable pass-through location. In certain examples, a volume of gel displaced by cabling passing through the block of gel is at least 90 percent of a total volume defined by the cabling within the block of gel. In certain examples, the volume of gel displaced by cabling passing through the block of gel is generally equal to the total volume defined by the cabling within the block of gel. In certain examples, the first and second cable pass-through location can accommodate cables having a diameter across a full range from 0-14 millimeters. In certain examples, the cable pass-through locations 832, 834 can each accommodate at least a 14 millimeter range in cable diameter.

Referring to FIG. 68, inner and outer axial containment walls 850, 852 are provided for axially containing the block of gel 824 during pressurization. In one example, the inner and outer axial containment walls 850, 852 are axially fixed relative to each other when the block of gel is pressurized. In one example, the inner and outer axial containment walls 850, 852 are axially fixed relative to the housing when the block of gel is pressurized. For example, the walls 850, 852 can each include peripheral portions 854 (i.e., laterally extending portions) that fit within peripheral slots 856 defined within the interior of the housing 802 by the first and second housing pieces 804, 806. Fasteners such as bolts 858 can engage corresponding fastener openings 860 defined by the second housing piece 806 to secure the walls 850, 852 thereto.

Referring to FIG. 68, volume compensation plates 860 are positioned at the first outer boundary 839 of the block of gel. The volume compensation plates 860 each define a plurality of gel receiving openings 862 into which gel flows when the block of gel 824 is pressurized while cabling is present at one or more of the cable pass-through locations. The plates 860 are positioned between the interior of the housing 802 and the block of gel 824. One of the plates 860 is shown between the first gel section 826 and the first housing piece 804 and the other plate 860 is shown between the third gel section 830 and the second housing piece 806. The openings 862 allow gel to flow or extrude therethrough to move into the open space defined within the interior of the housing. In this way, space is provided for accommodating gel when the gel deforms during gel pressurization to conform to the shape of the fiber optic cables routed through the cable pass-through locations. In certain examples, at least some of the gel extrudes through the gel receiving openings 862 into a region defined between the housing and the volume compensation plate.

Figure 70:
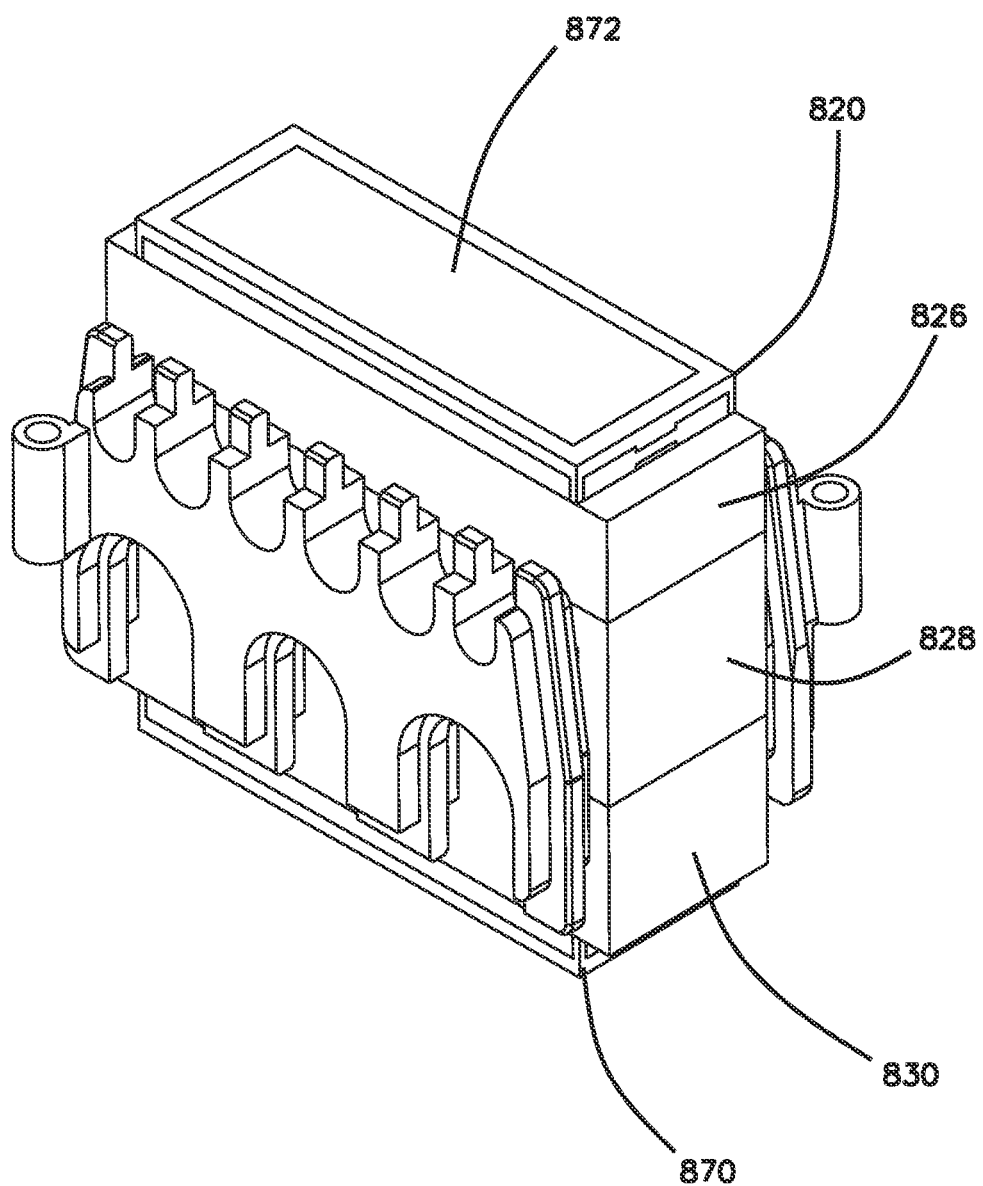
FIG. 70 depicts a gel block suitable for use with the closure of FIG. 68, the gel block is shown in combination with sealed/covered volume compensation plates.
Figure 71:
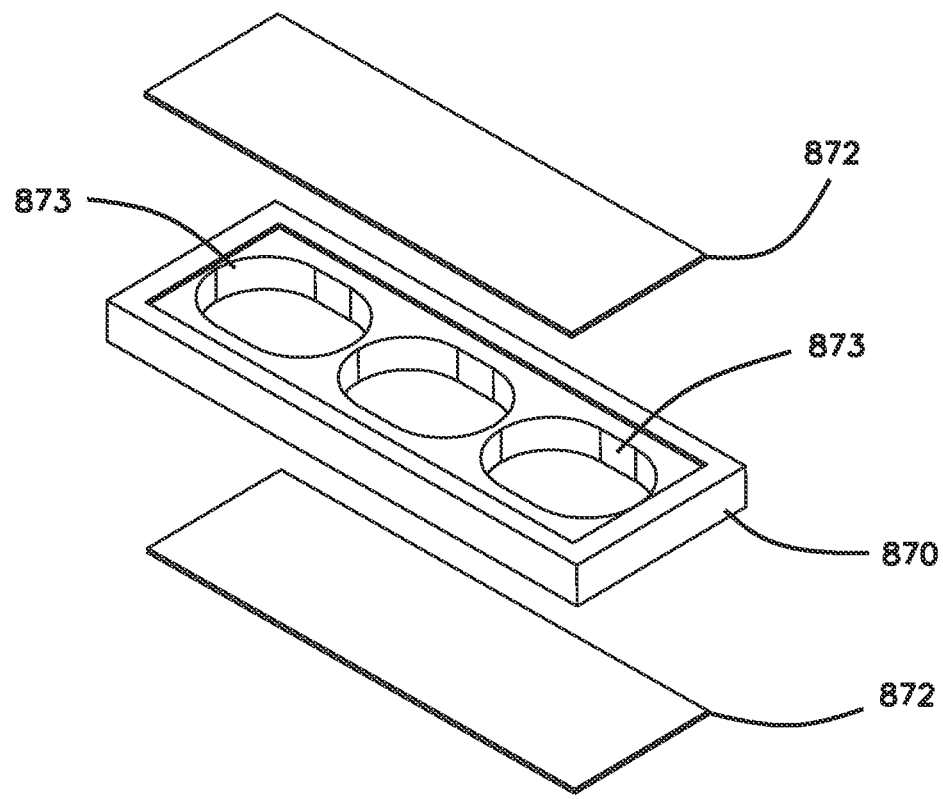
FIG. 71 is an exploded view of the one of the sealed volume compensation plates.
Figure 72:
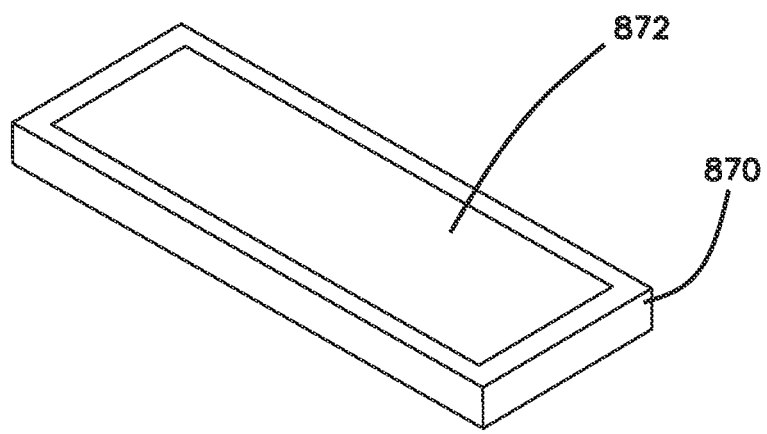
FIG. 72 is an assembled view of the sealed volume compensation plate of FIG. 71.

FIGS. 70-72 show another volume compensation plate 870 which has been modified to include one or more cover layers 872 attached to the volume compensation plate 870 and which covers the gel receiving openings. The cover layers 872 flex, stretch or break to allow the portion of the gel to enter or pass-through the gel receiving openings when the gel is pressurized. The cover layers 872 prevent gel from flowing through the gel receiving openings 873 during manufacturing of the enclosure. For example, the layers 872 allow the first and third gel sections 826, 830 to be injection molded into the housing pieces 804, 806 without filling the gel receiving openings or the open space needed to receive gel during gel pressurization during the manufacturing process. In some examples, only one side of the plate 870 may be covered. The double sided covering version is useful for providing volume compensation (e.g., open space for receiving gel during gel pressurization) within a volume of gel. The gel receiving openings can pass through the volume compensation plate from a first side to a second side, and the cover layers which cover the gel receiving openings are attached to the volume compensation plate at the first and second sides of the volume compensation plate.

Figure 73:
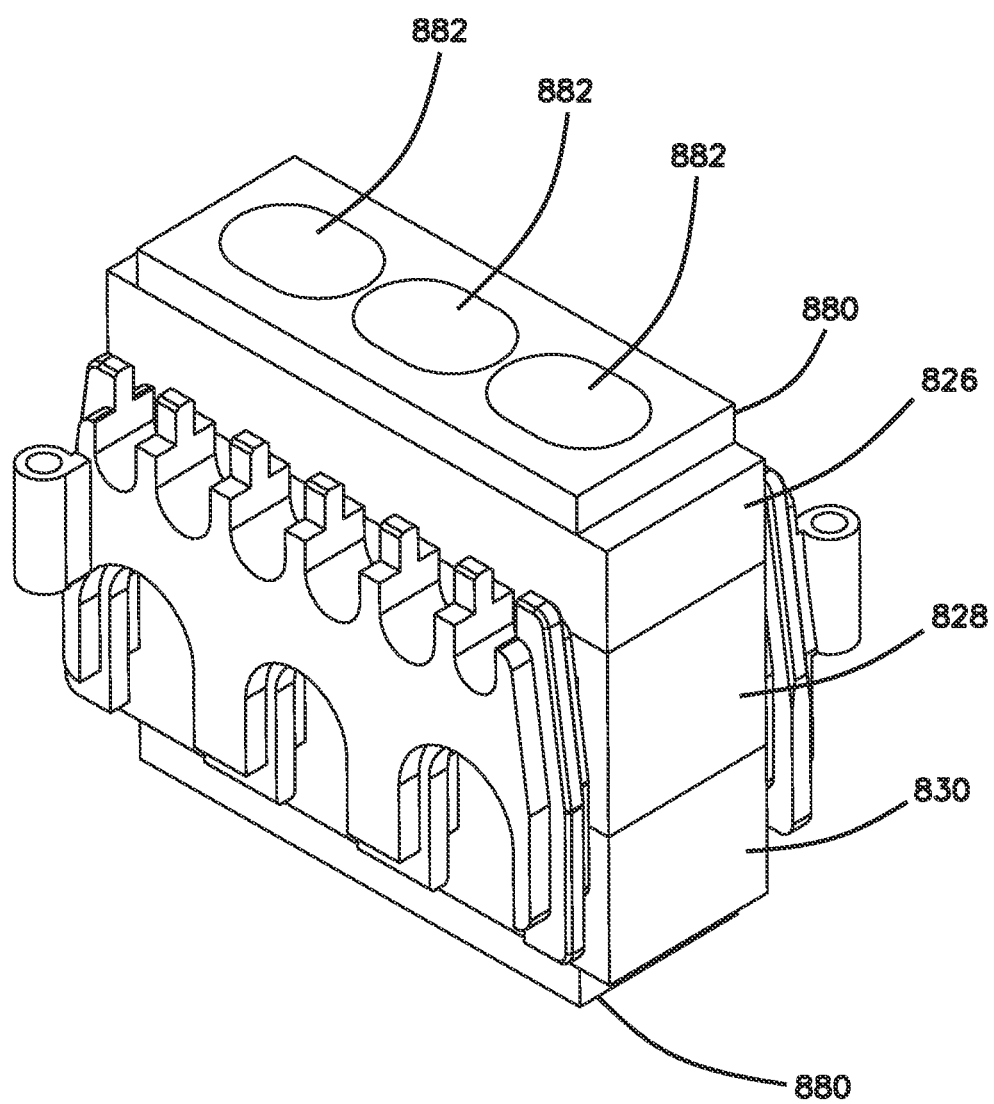
FIG. 73 depicts a gel block suitable for use with the closure of FIG. 68, the gel block is shown in combination with volume compensation plates having openings filled with resilient materials such as foam.
Figure 74:
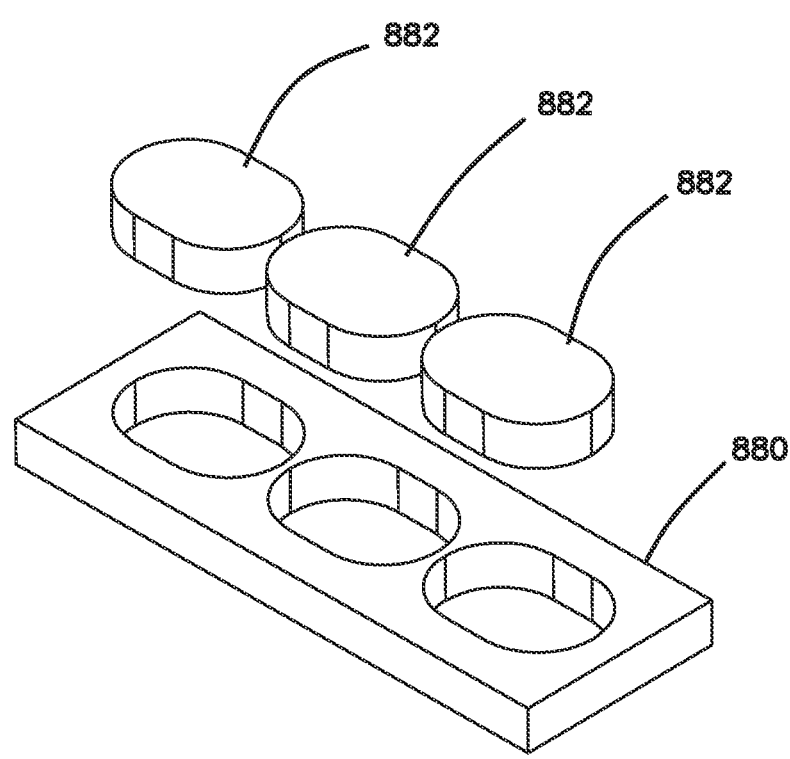
FIG. 74 is an exploded view of one of the volume compensation plates of FIG. 73.
Figure 75:
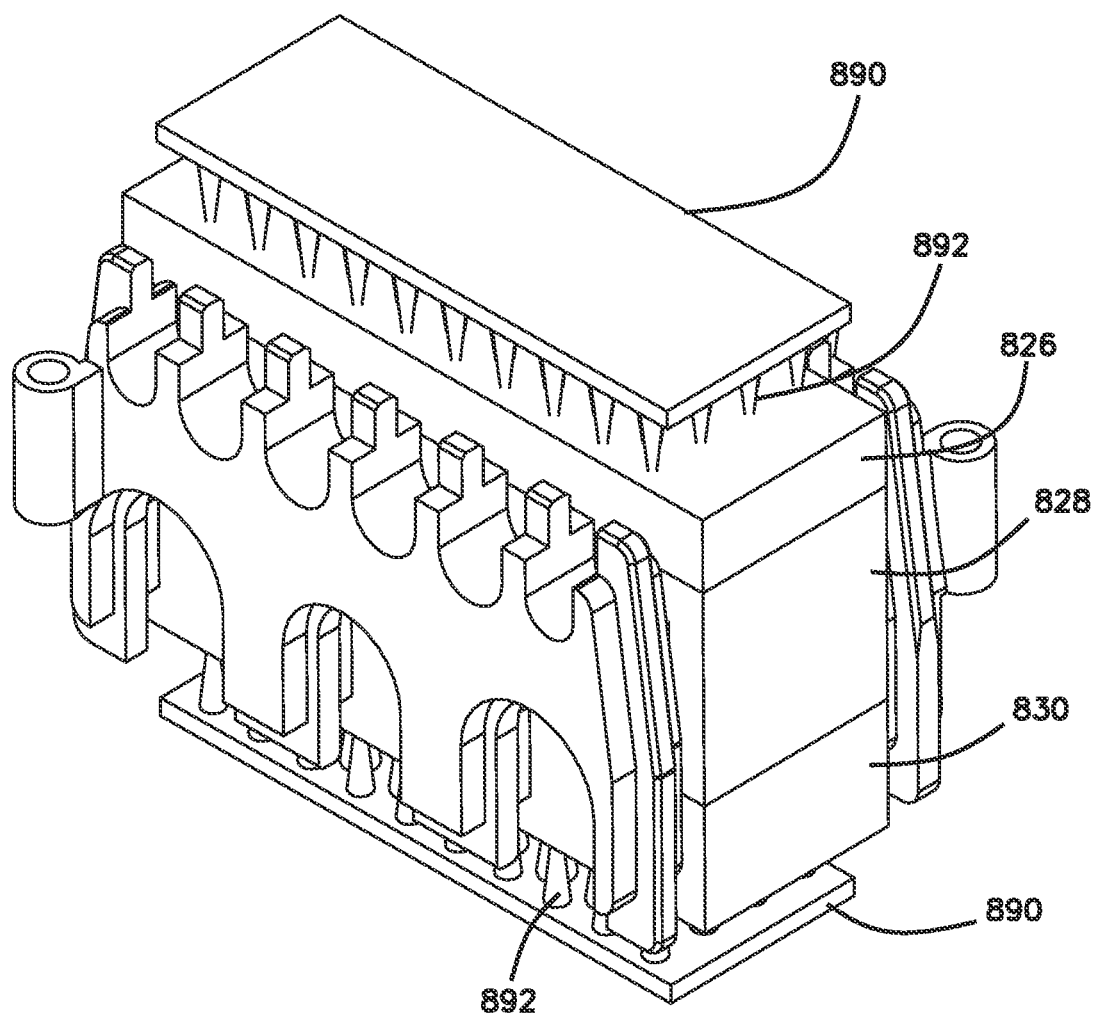
FIG. 75 depicts a gel block suitable for use with the closure of FIG. 68, the gel block is shown in combination with volume compensation plates having open gel receiving space defined between tapered projections.

FIGS. 73-74 show another volume compensation plate 880 which has been modified to include resilient inserts 882 (e.g., foam inserts or plugs) that fit within the gel receiving openings 884 of the volume compensation plate 880. During gel pressurization, the inserts 882 can deform to allow gel to flow into the openings 884.

Figure 76:
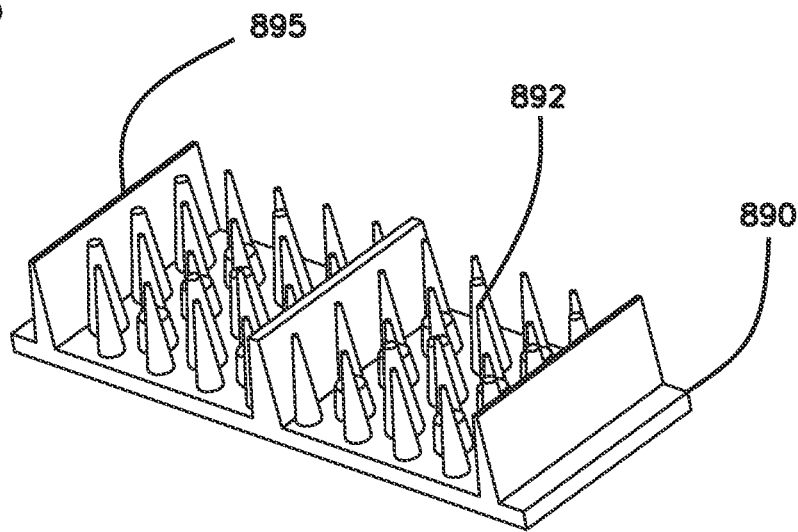
FIG. 76 shows one of the volume compensation plates of FIG. 75.
Figure 77:
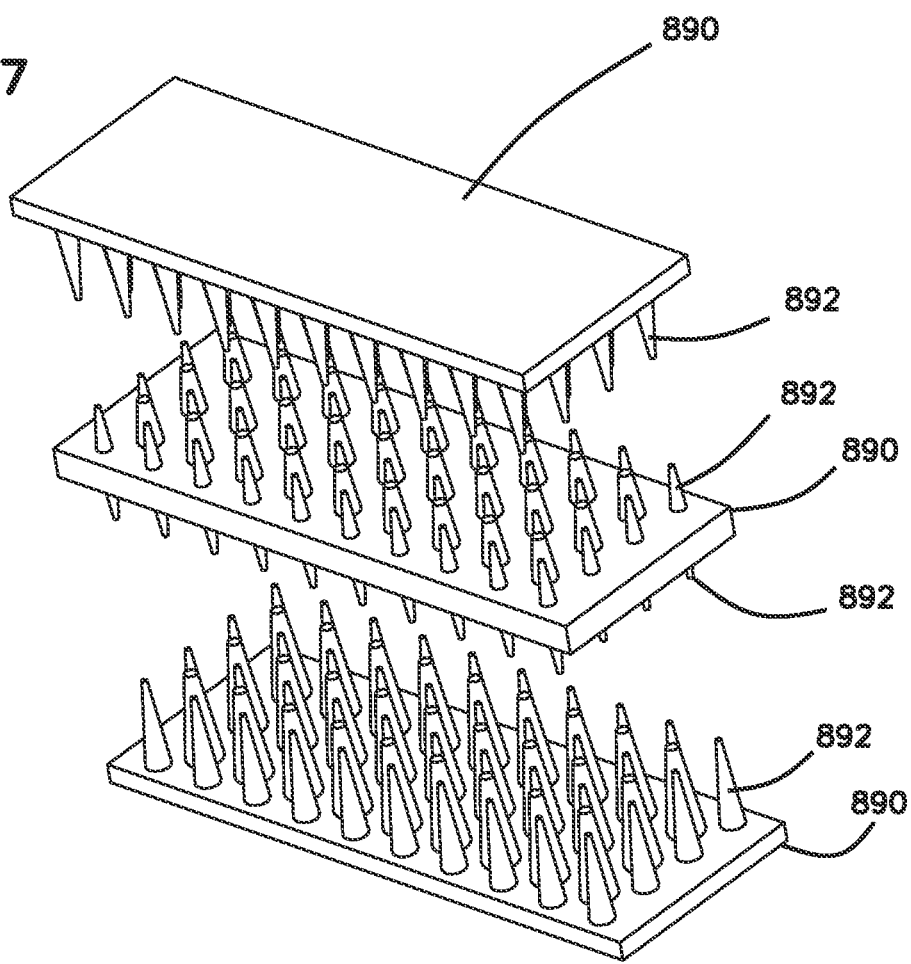
FIG. 77 shows another volume compensation arrangement.
Figure 78:
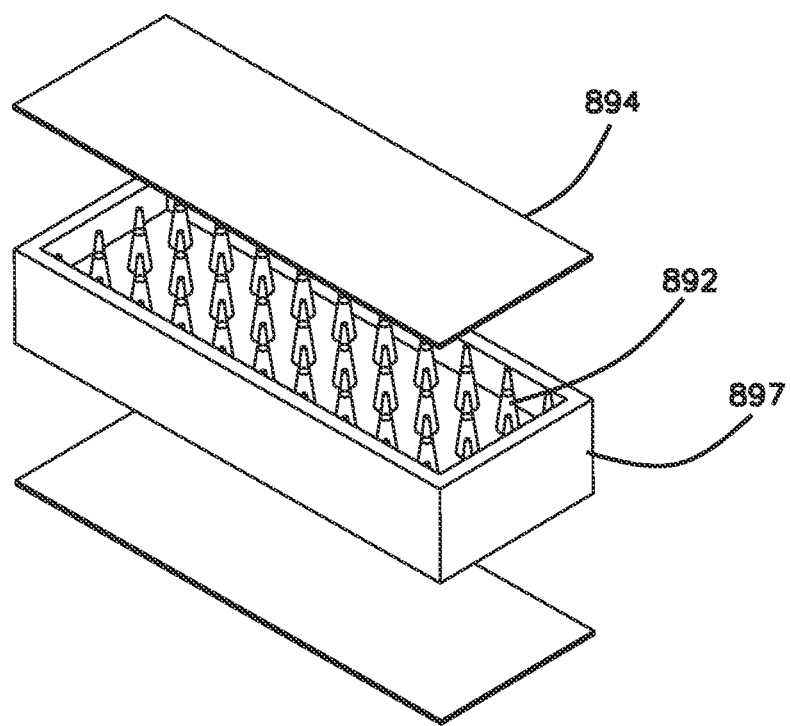
FIG. 78 shows a sealed volume compensation plate having tapered projections.

FIGS. 75-78 show another volume compensation plate 890 which has been modified to include open space between tapered projections 892 into which gel of the block of gel flows when the block of gel 824 deforms during sealing. The tapered projections 892 are configured such that a cross-sectional area of the open space reduces as the gel flows into the open space. The tapered projections have free ends at minor ends of the tapered projections and base ends at major ends of the tapered projections. The base ends of the tapered projections are formed with a plate. The tapered projections can be cone-shaped or truncated coned-shaped. When the gel presses between the projections during deformation, the gel moves from the minor ends toward the major ends. In this way, the reduction in the cross-sectional area of the void space between the projections caused by the taper generates a force which biases the deformed gel toward the minor ends. FIG. 77 shows a version where plates 890 are positioned between the first and third gel sections 826, 830 and the first and second housing pieces 804, 806, and a plate with double sided tapered projections is also used within the second gel section 828. FIG. 78 shows a version were the cones 892 are surrounded by a volume defining wall 897 and the empty space within the wall 897 is cover by at least one cover layer 894. Also, as shown at FIG. 76, tapered spring member projections 895 can be configured to flex when contacted by pressurized gel to apply spring load to the gel.

Figure 79:
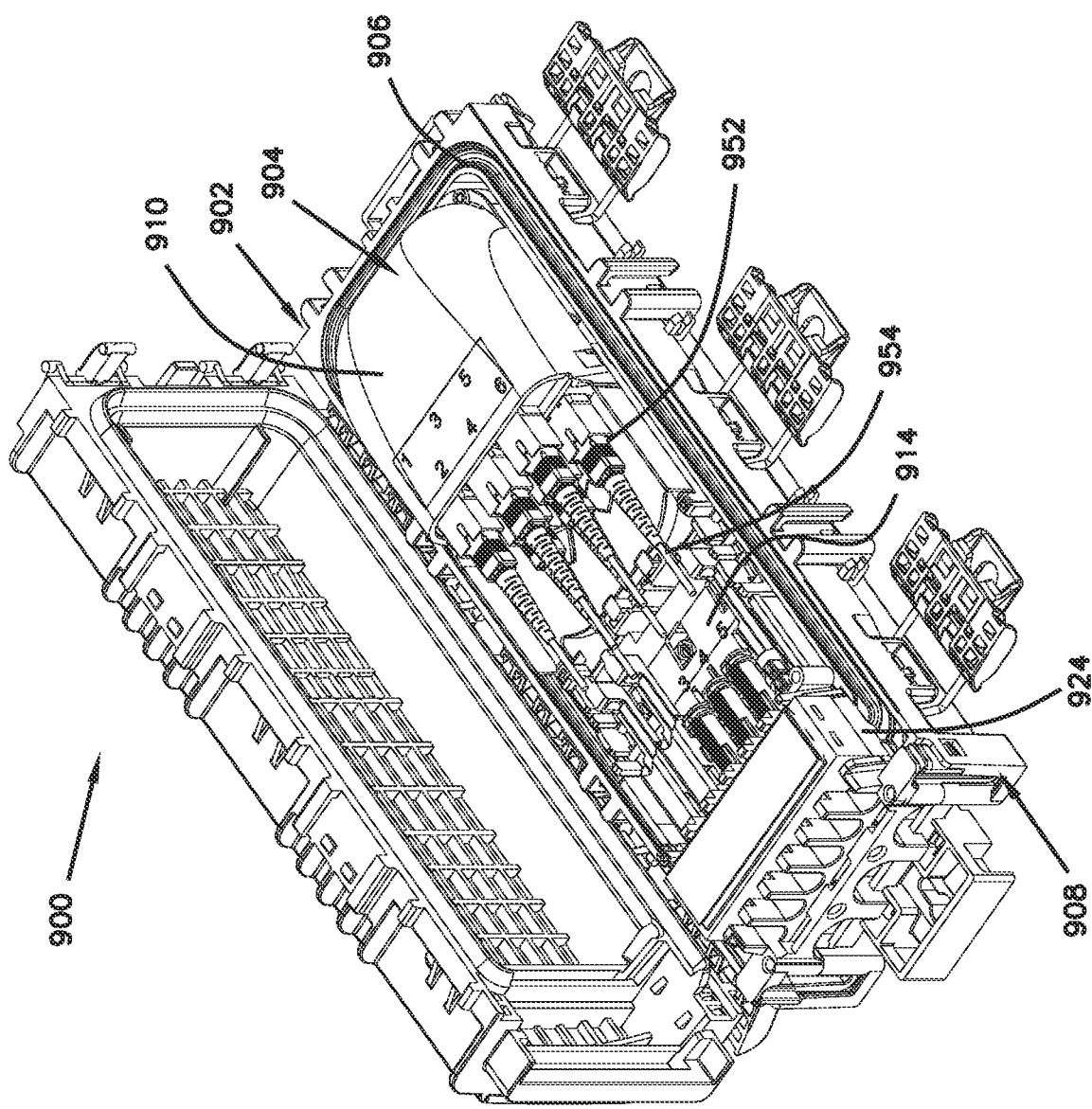
FIG. 79 depicts a telecommunications device in accordance with the principles of the present disclosure, the telecommunications device includes a re-enterable enclosure and an insert unit that mounts within the enclosure.
Figure 80:
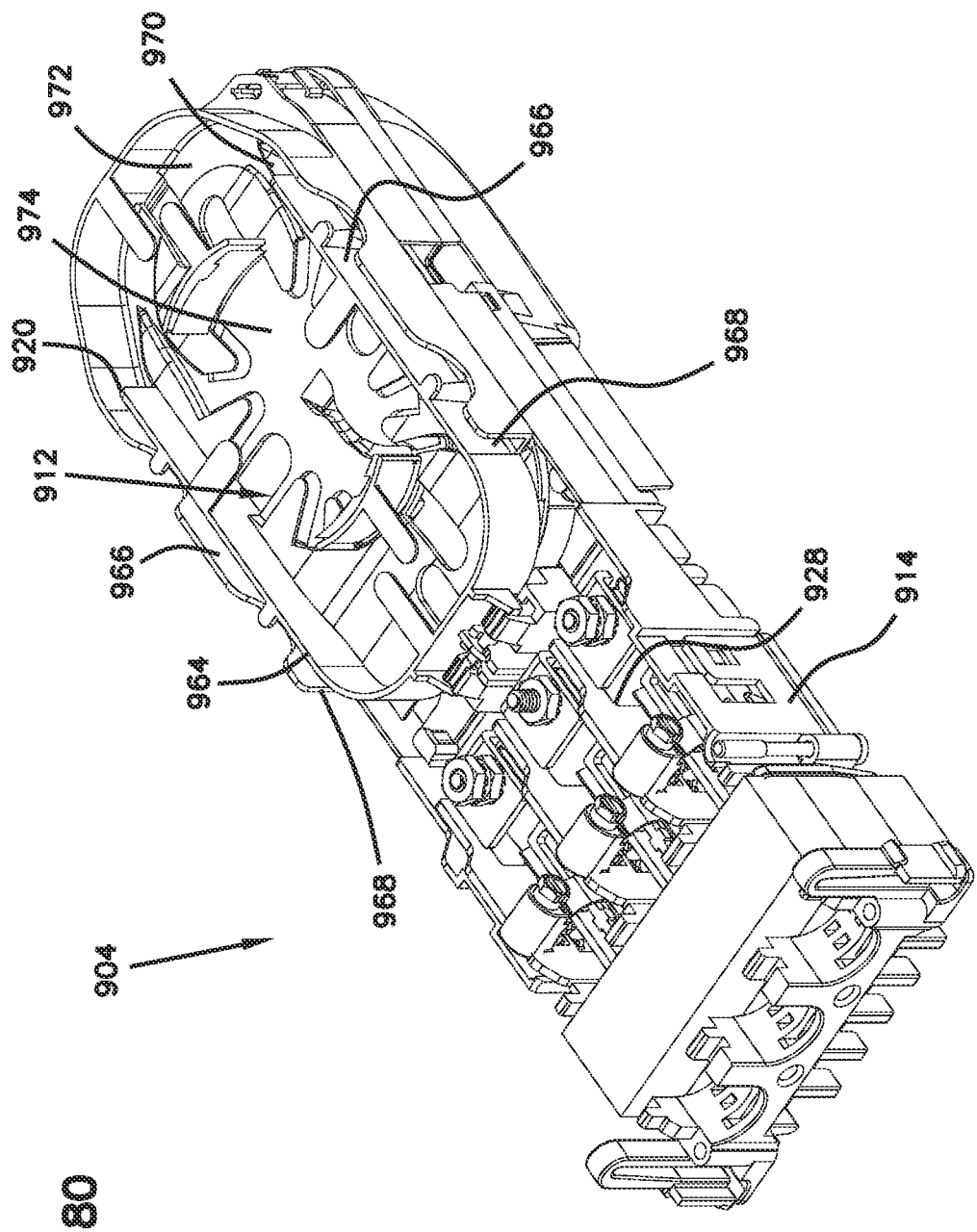
FIG. 80 is a perspective view showing a bottom side of the insert unit of the telecommunications device of FIG. 79.

FIG. 79 depicts a telecommunications device 900 in accordance with the principles of the present disclosure. The telecommunications device 900 includes a re-enterable enclosure 902 containing an insert unit 904. The enclosure 902 is preferably environmentally sealed and includes a gasket 906 for providing perimeter sealing between a base and a cover of the enclosure 902. The enclosure 902 has a cable access end 908 through which cables (e.g., drop cables and feeder cables/pass-through cables) can be routed into an interior of the enclosure 902. The insert unit 904 is configured to provide a variety of functions within the enclosure 902. For example, the insert unit 904 supports and contains sealant for sealing the cable access end 908 of the enclosure 902 and for providing seals around cables routed into the enclosure 902 through the cable access end 908. The insert unit 904 also provides cable anchoring functionality for providing strain relief for cable attachment within the enclosure 902. For example, the insert unit 904 can include structure for attachment of cable strength members (e.g., flexible yarn-like strength members such as Aramid yarn or more rigid strength members such as a fiberglass re-enforced epoxy rods) to anchoring locations fixed relative to the enclosure 902. In certain examples, a first side 910 (e.g., a top side) of the insert unit 904 is adapted for sealing and anchoring cables such as drop cables, and a second side 912 (e.g., a bottom side as shown at FIG. 80) can be adapted for sealing and anchoring cables such as pass-through or feeder cables. In certain examples, the first side 910 of the insert unit 904 can also provide connectorized patching capabilities that may include demateable optical connection locations between optical fibers of drop cables and optical fibers of feeder or pass-through cables. In certain examples, the demateable fiber optic connection locations can include fiber optic connectors (e.g., SC connectors, LC connectors, etc.) interconnected by fiber optic adapters. In certain examples, the second side 912 of the insert unit 904 can provide for management of pass-through optical fibers and can also provide for management of optical fibers accessed from feeder cables which are adapted to be optically coupled to fibers corresponding to drop cables. The insert unit 904 can define fiber routing paths or pass-throughs that extend through the insert unit between the first and second sides 910, 912. In certain examples, the insert unit 904 can also include optical splicing capabilities for splicing optical fibers of feeder cables either directly to optical fibers of drop cables or to connectorized optical pigtails that are routed to the demateable connection locations at the first side 910 of the insert unit 904. In certain examples, the insert unit 904 can include a separate tray supporting splice holders for holding splice protection sleeves. It will be appreciated that the splices may be single fiber splices or mass-fusion splices. In certain examples, the insert unit 904 can also include passive optical power splitting and/or wavelength division multiplexing capabilities. For example, the insert unit 904 may support passive optical power splitters for power splitting optical signals from feeder cables and directing the power split signals to drop cables, or may include wavelength division multiplexers for separating optical signals from feeder cables based on wavelength and directing the separated signals to separate drop cables. In certain examples, the enclosure has a relatively small size. For example, in one example, when the enclosure is fully immersed within water, the enclosure displaces two liters or less of the water.

Referring to FIGS. 79-82, the insert unit 904 includes a cable anchoring and sealant containment frame 914 that is preferably positioned adjacent to the cable access end 908 of the enclosure 902 when the insert unit 904 is mounted within the enclosure 902. Referring to FIGS. 83-90, the cable anchoring and sealant containment frame 914 includes first and second opposite ends 916, 918. The first end 916 of the cable anchoring and sealant containment frame 914 includes outer and inner walls 920, 922 for containing sealant 924 adapted for sealing the cable access end 908 of the enclosure 902, and for providing seals around any cables routed through the cable access end 908 of the enclosure 902 into the interior of the enclosure 902. It will be appreciated that the configuration of the sealant 924 can have any of the sealant configurations previously described herein. The outer and inner walls 920, 922 can define openings or passages for allowing cables to be routed there through. In certain examples, the walls 920, 922 can include structure for axially retaining or locking the walls in place relative to the outer housing of the enclosure 902. As depicted, the walls 920, 922 can include rails 923 that vertically slide within corresponding vertical channels within the interior of the enclosure 902 when the insert 904 is loaded therein to provide an interlock. In other examples, the walls 920, 922 can define vertical channels that receive rails defined by the enclosure 902.

The cable anchoring and sealant containment frame 914 is preferably secured within the enclosure 902 by a mechanical interface such as a snap-fit interface, an interlocking interface (described above), a mating interface, or other interface that allows axial load to be transferred from the cable anchoring and sealant containment frame 914 to the enclosure 902. In this way, cables such as drop cables and feeder cables can be anchored to the cable anchoring and sealant containment frame 914 and thereby axially fixed relative to the enclosure 902. As depicted, opposite minor sides of the frame 914 can include resilient side cantilever latches 915 defining openings 917 for receiving retention catches or tabs within the enclosure 904. The latches 915 extend horizontally (e.g., in a direction between the first and second ends 916, 918) from base ends to free ends. The latches 915 are accessible from the top side (e.g., the first side 910) of the insert and can be manually flexed toward one another to disengage the openings 917 from the retention tabs of the enclosure 902. Additionally, at the first end 916 of the frame 914 can further include corner latches 919 at the opposite minor sides of the frame 914. The corner latches 919 are cantilevers with retention tabs 921 adapted to engage corresponding retainer provided within the enclosure 902 when the insert is loaded therein. The cantilevers of the latches 919 extend vertically from base ends to free ends. The retention tabs 921 are positioned intermediate the base ends and the free ends, and release members 925 are at the free ends. The release members 925 are at the first side 910 of the insert 904 so as to be readily accessible when the insert 904 is mounted within the enclosure 902. By flexing the latches 919 toward each other via release members 925, the latches 919 can be disengaged from the enclosure 902 to allow the insert 904 to be removed from the enclosure 902.

In certain examples, the cable anchoring and sealant containment frame 914 can include a first cable anchoring region 926 at the first side 910 of the insert unit 904. A plurality of cable anchoring units for anchoring drop cables to the cable anchoring and sealant containment frame 914 can be mounted at the first cable anchoring region 926. The cable anchoring units can have configurations of the type previously described herein, or other configurations. In certain examples, the cable anchoring units can be secured to the first cable anchoring region 926 by fasteners, by snap-fit interfaces, by interlocking interfaces, or by other interfaces. As depicted, the first cable anchoring location 926 includes a plurality of cable tie arms 927 about which cable ties can be wrapped to cable tie cables to the first side 910 of the insert unit 904. The arms 927 include central longitudinal portions 929, side notches 931 and T-shaped free ends 933. The T-shaped ends 933 oppose retaining shoulders 935 defined by the frame 914. In addition to allowing cables to be secured to the frame 914 with cable ties, the arms 927 and the retaining shoulders 935 also provide a slide-lock interface compatible with a mating slide-lock interface 939 provided on a cable anchor such as the cable anchor 1024 of FIG. 99. The slide-lock interface 939 includes the snap-fit latches 1026 and an axial retention tab 1027. By inserting the cable anchor 1024 downwardly over one of the arms 927 so that the latches 1026 fit within the side notches 931, the latches 1026 are configured straddle the central longitudinal portion 929. Once the cable anchor 1024 has been inserted over the arm 927, the anchor 1024 can be slid axially along the central longitudinal portion 929 toward the first end 916 of the frame 914 to a position where catches 1029 of the latches 1026 move beneath retaining tabs of the arms 927. As the cable anchor 1024 is slid axially, the retention tab 1027 snaps past the retaining shoulder 935 so that interference between the tab 1027 and the shoulder 935 prevents the anchor 1024 from being moved in an axial direction toward the second end 918 of the frame 914. By manually flexing the arm 927 upwardly, the retention tab 1027 can be disengaged from the shoulder 935 to allow the anchor 1024 to be slid axially toward the second end 918 of the frame 914 back to the position where the latches 1026 align with the side notches 931 and the anchor 1024 can be lifted upwardly from the frame 914 to detach the anchor 1024 from the frame 914.

The cable anchoring and sealant containment frame 914 also includes a second cable anchoring region 928 positioned at the second side 912 of the insert unit 904. It will be appreciated that feeder cables and/or pass-through cables can be secured to the cable anchoring and sealant containment frame 914 at the second cable anchoring region 928. In certain examples, cable anchoring units can be secured to the second cable anchoring region 928 by interfaces such as snap-fit connections, interlocking interfaces, fastener-based interfaces or other interfaces. It will be appreciated that the cable anchoring units can be of the type previously described herein or can have alternative configurations. In certain examples, the cable anchoring units can also provide a cable grounding function and can be electrically connected to electrical components (e.g., shields) of the feeder/pass-through cables if such shields are present.

Figure 86:
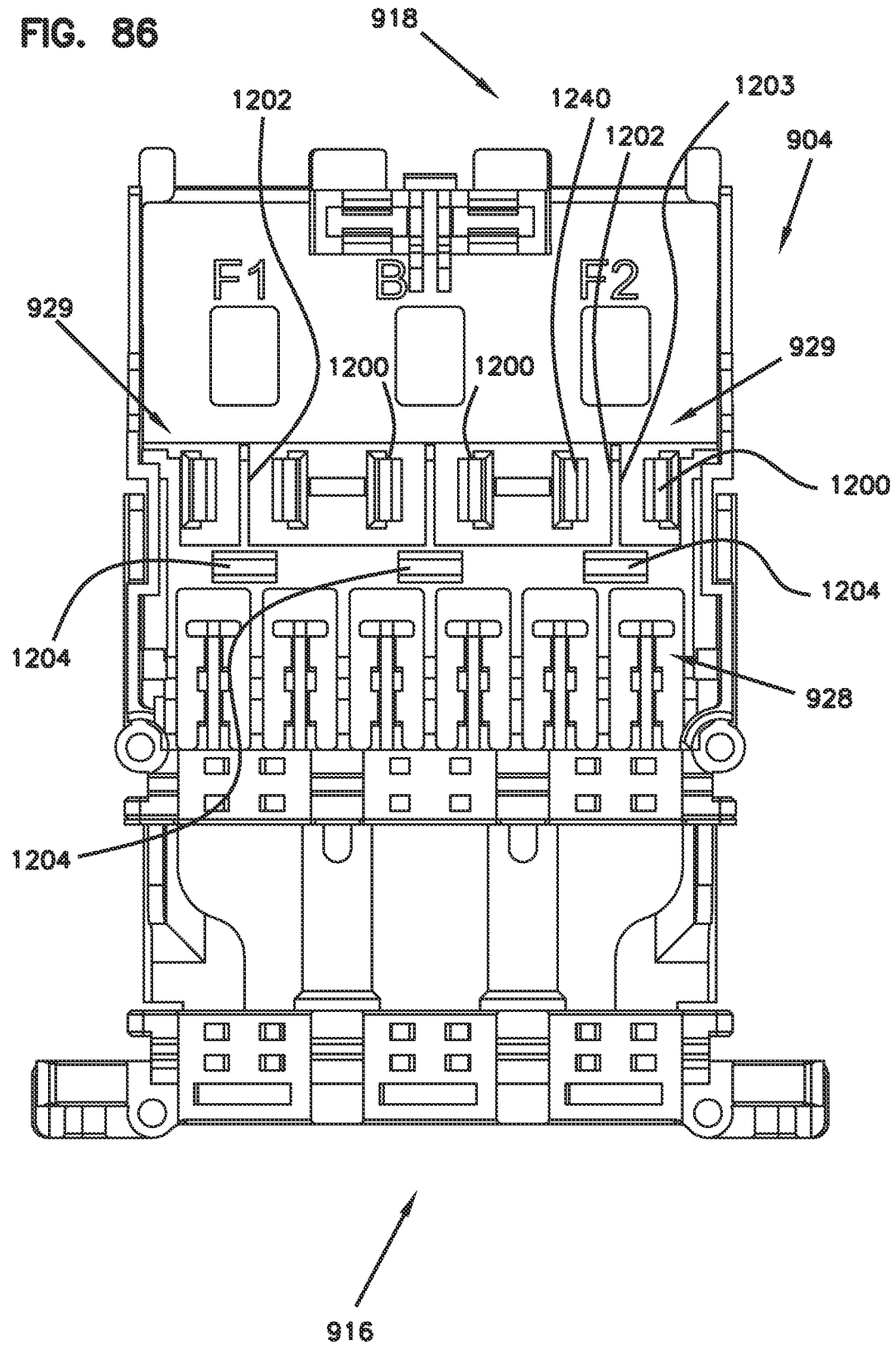
FIG. 86 is a bottom view of the cable anchoring and sealant containment frame of FIG. 83.
Figure 87:
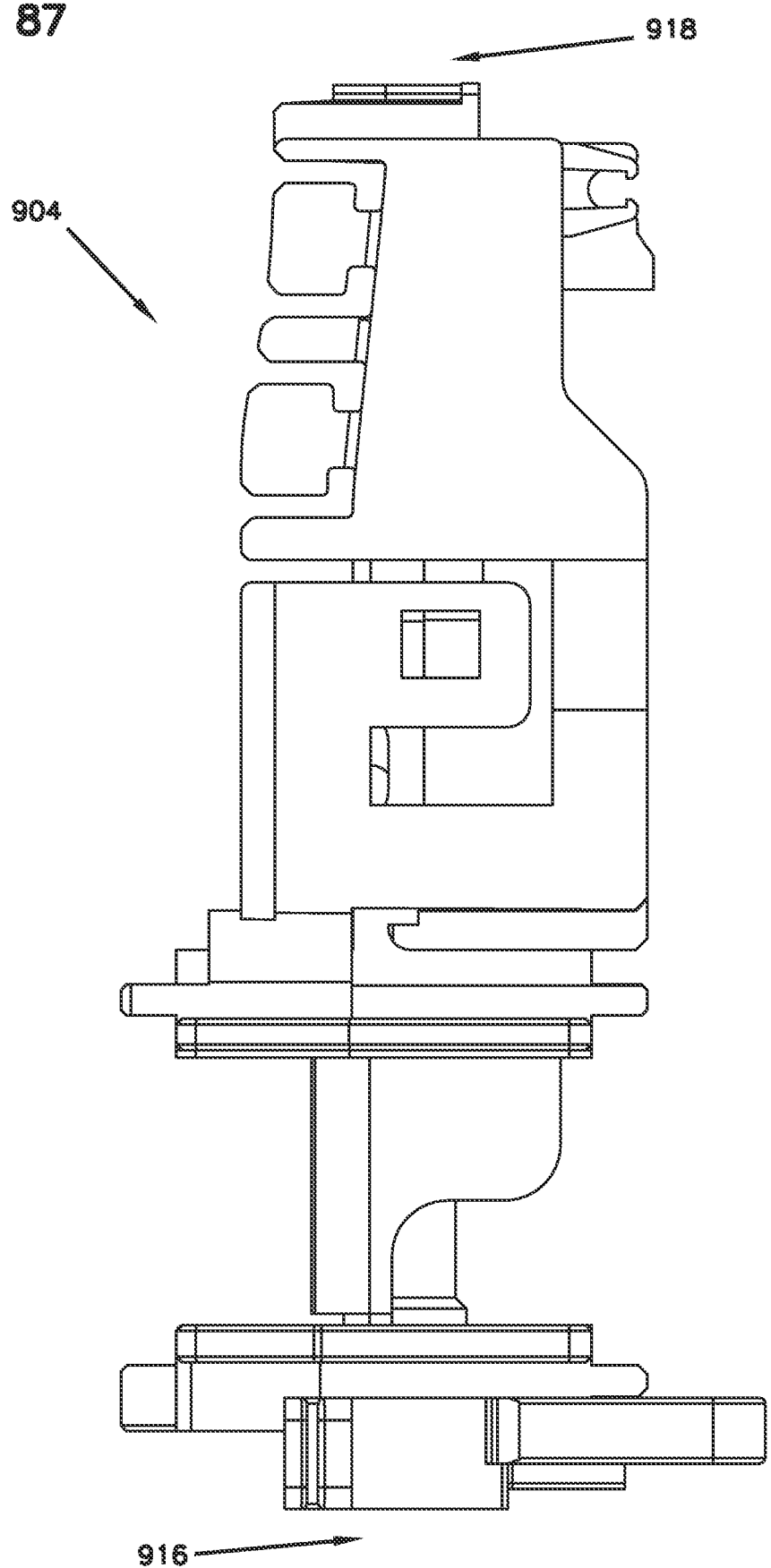
FIG. 87 is a first side view of the cable anchoring and sealant containment frame of FIG. 83.
Figure 88:
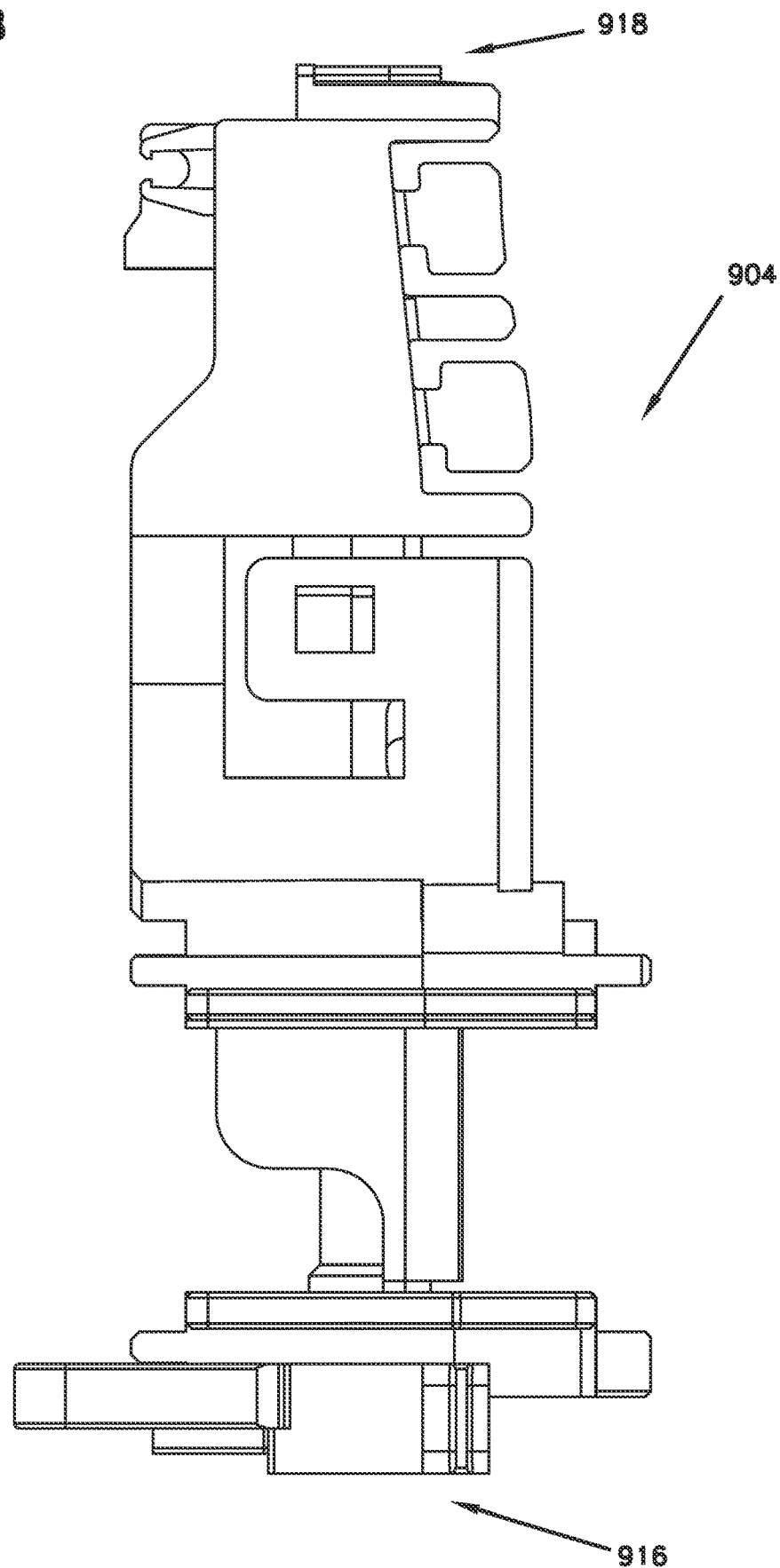
FIG. 88 is a second side view of the cable anchoring and sealant containment frame of FIG. 83.
Figure 89:
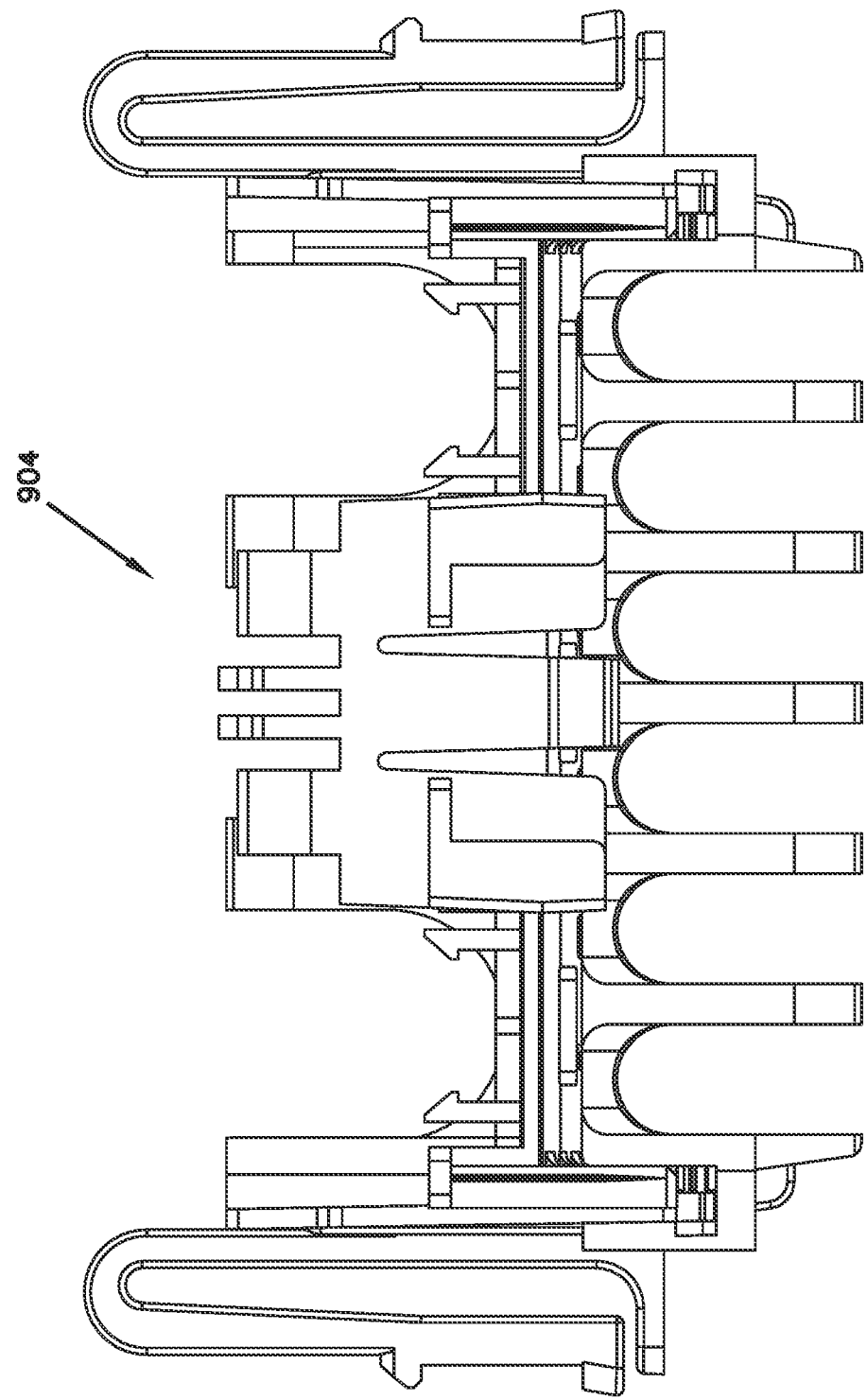
FIG. 89 is a first end view of the cable anchoring and sealant containment frame of FIG. 83.
Figure 90:
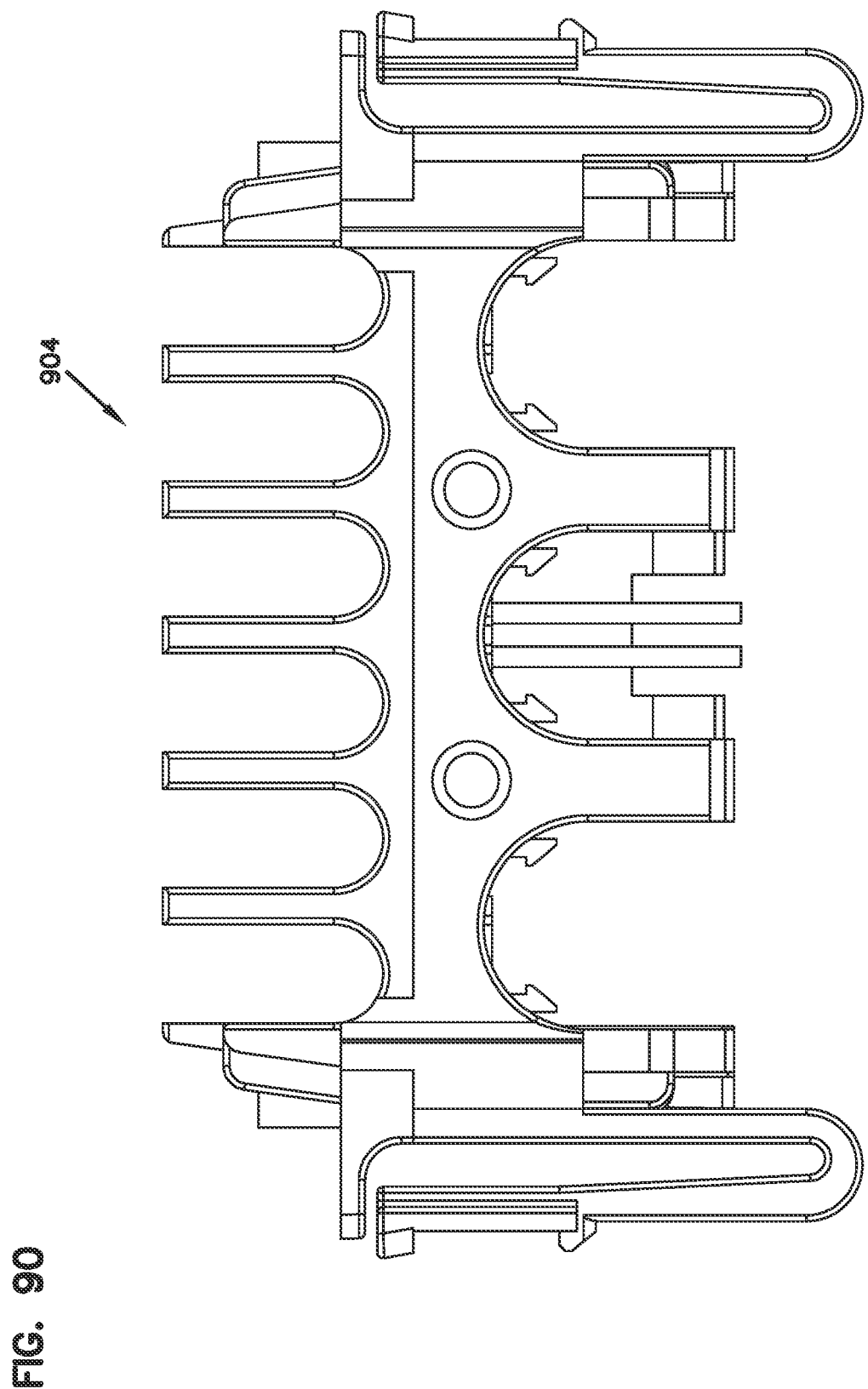
FIG. 90 is a second end view of the cable anchoring and sealant containment frame of FIG. 83.
Figure 104:
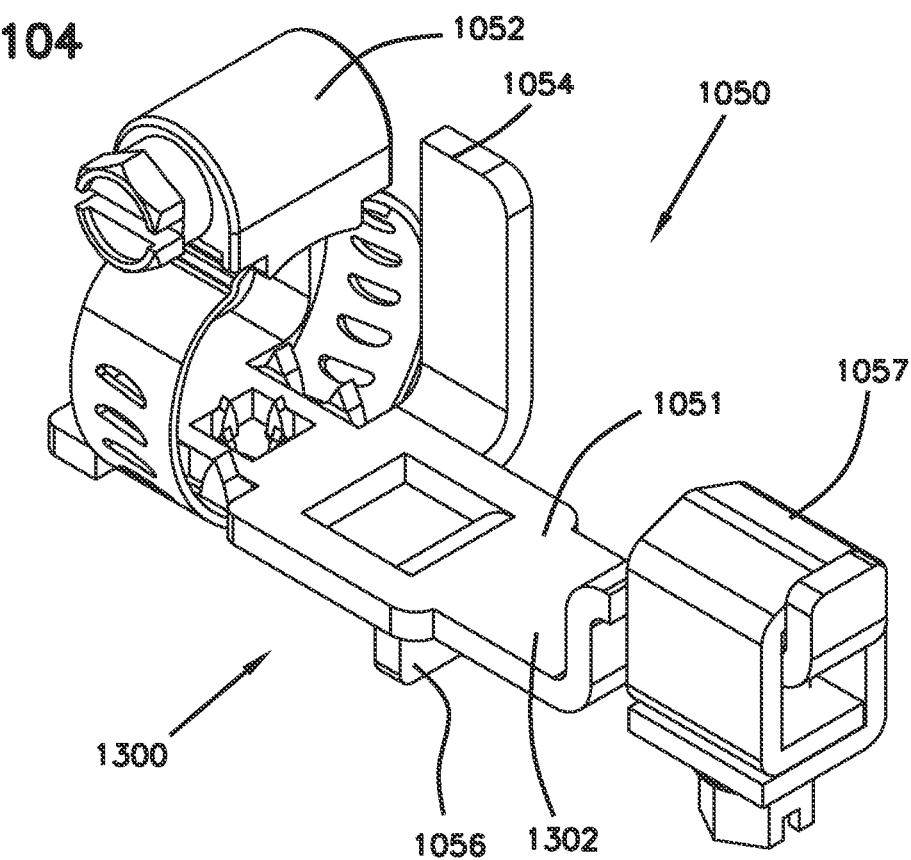
FIG. 104 is a perspective view of a cable anchoring unit adapted to be secured to the bottom side of the cable anchoring and sealant containment frame of FIGS. 83-91.
Figure 105:
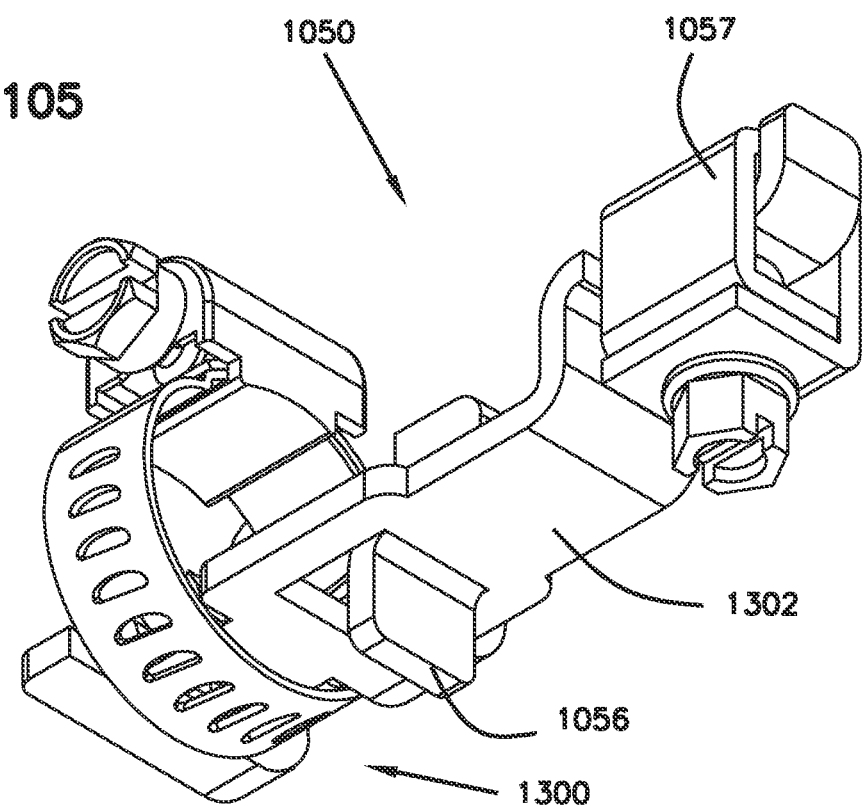
FIG. 105 is another perspective view of the cable anchoring unit of FIG. 104.

Referring to FIG. 86, the second cable anchoring region 928 includes anchor connection interfaces 929 including pairs of latches 1200 between which cable anchors can be secured. Support ribs 1202 for supporting the anchors are located in anchor receiving regions 1203 between each pair of latches 1200. Axial locking openings 1204 are defined in axial alignment with the anchor receiving regions 1203 and the ribs 1202. FIGS. 104 and 105 show an example anchor connection interface 1300 compatible with the anchor connection interfaces 929. The connection interface 1300 includes a central portion 1302 configured to be snapped into one of the anchor receiving regions 1203 between a pair of the latches 1200. When snapped between the latches 1200, the bottom of the central portion 1302 seats or rests on the top of the support rib 1202. The connection interface 1300 also includes the downwardly extending retention tab 1056 that fits within the corresponding axial locking opening 1204 to resist axial movement of the anchor 1050 relative to the frame 914. By flexing the pair of latches 1200 apart, the anchor 1050 can be removed from the anchor receiving region 928 and detached from the frame 914.

Figure 119:
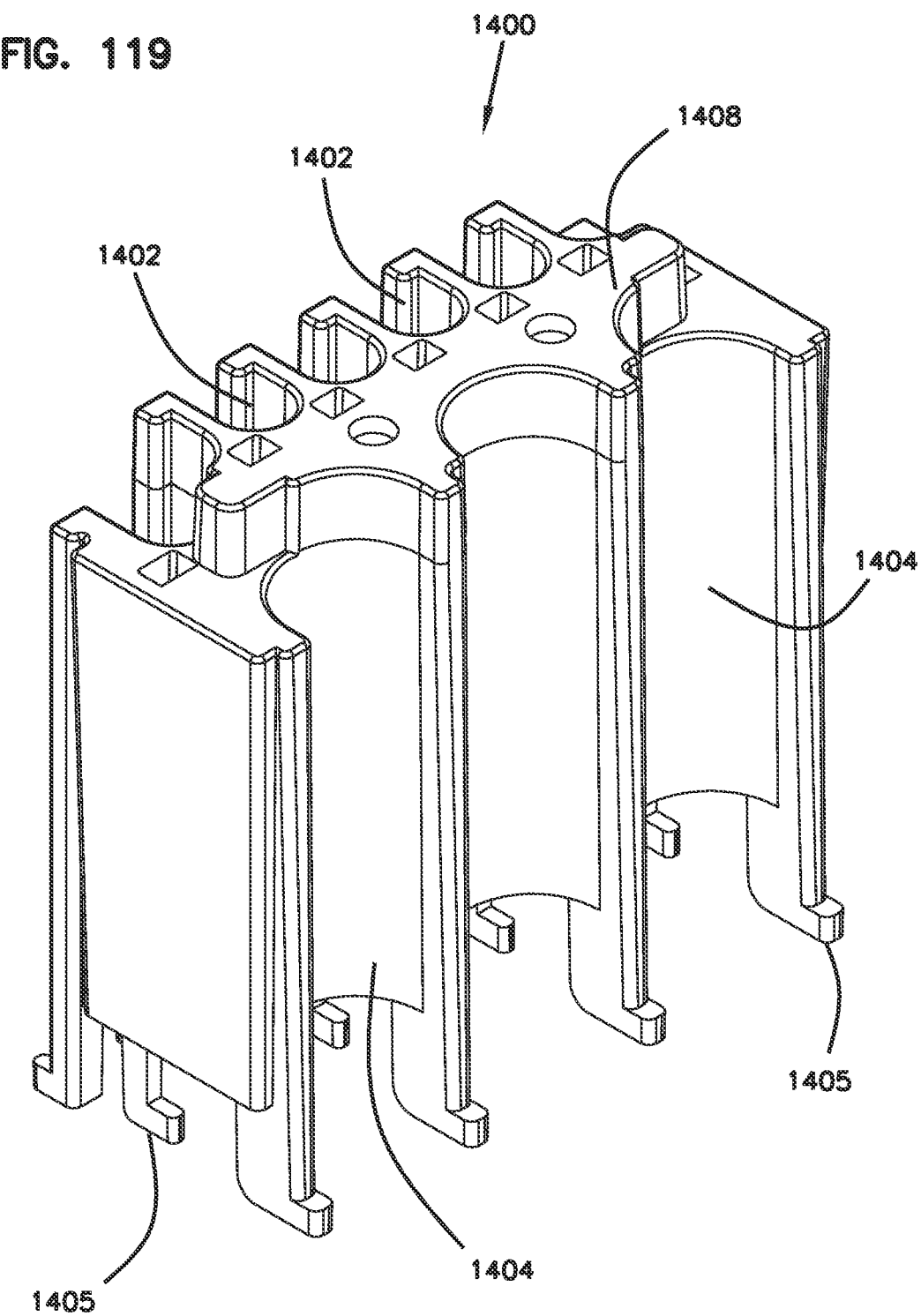
FIG. 119 is a perspective view of an exterior cable anchoring component adapted for use with any of the enclosures and insert units disclosed herein in accordance with the principles of the present disclosure.
Figure 120:
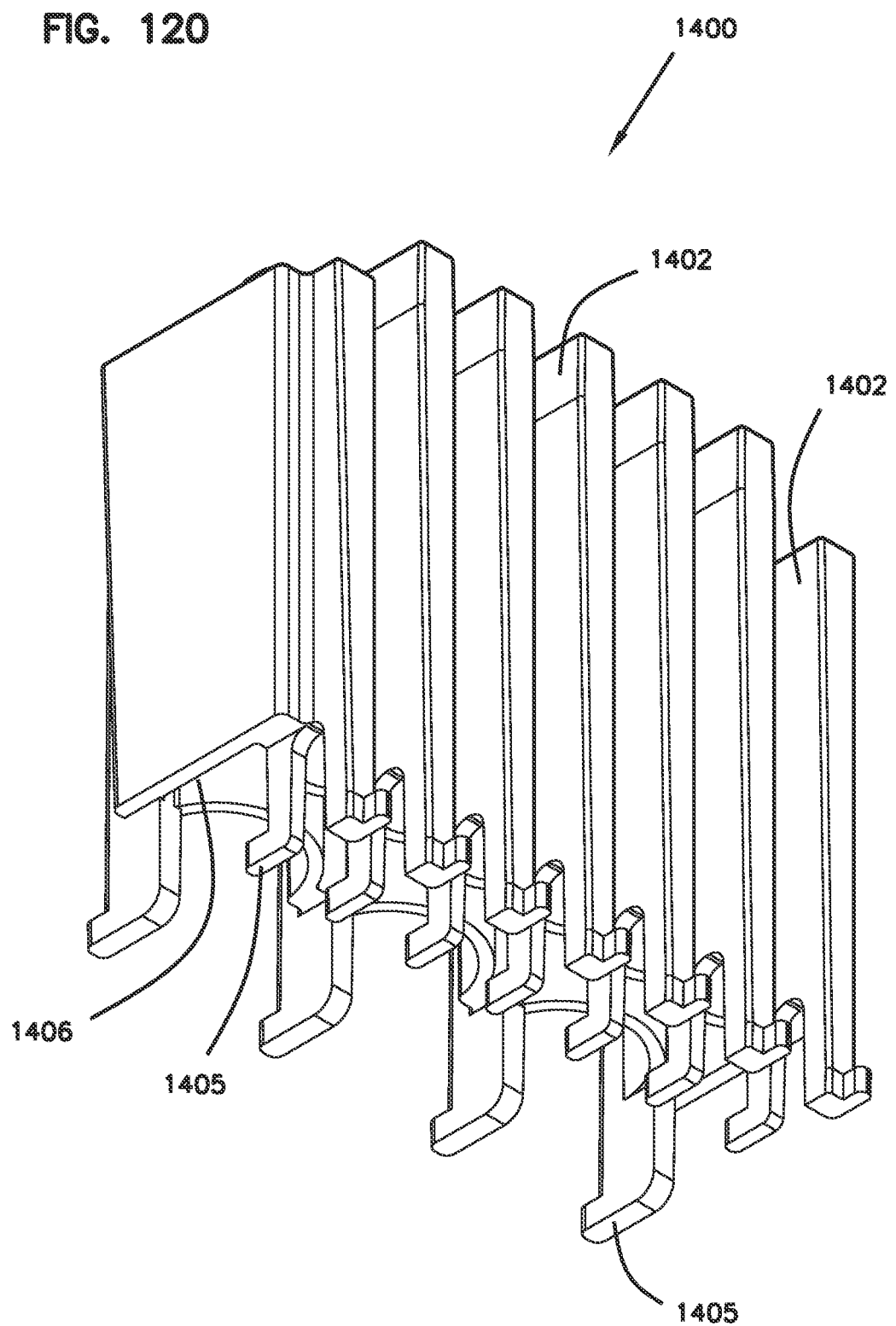

Referring to FIGS. 119 and 120, a cable anchoring structure 1400 can be fastened to the first end 916 of the frame 914. The structure 1400 includes a top side having parallel drop cable channels 1402 and a bottom side having parallel feeder cable channels 1404 that are larger in width than the drop cable channels 1402. Cable tie attachment locations 1405 are located at an outer end 1406 of the structure 1400. An inner end 1408 of the structure 1400 can be attached to the first end 916 of the frame 914 by fasteners such as bolt or screws received within openings 1410 (FIG. 84) of the frame 914. When the insertion unit 904 is loaded in the enclosure 902, the structure 1400 is located outside the interior of the enclosure 902. Thus, exterior cable anchoring locations and cable guiding/organizing is provided by the structure 1400, and interior cable anchoring is provided at the cable anchoring locations 926, 928 of the frame 914.

Figure 82:
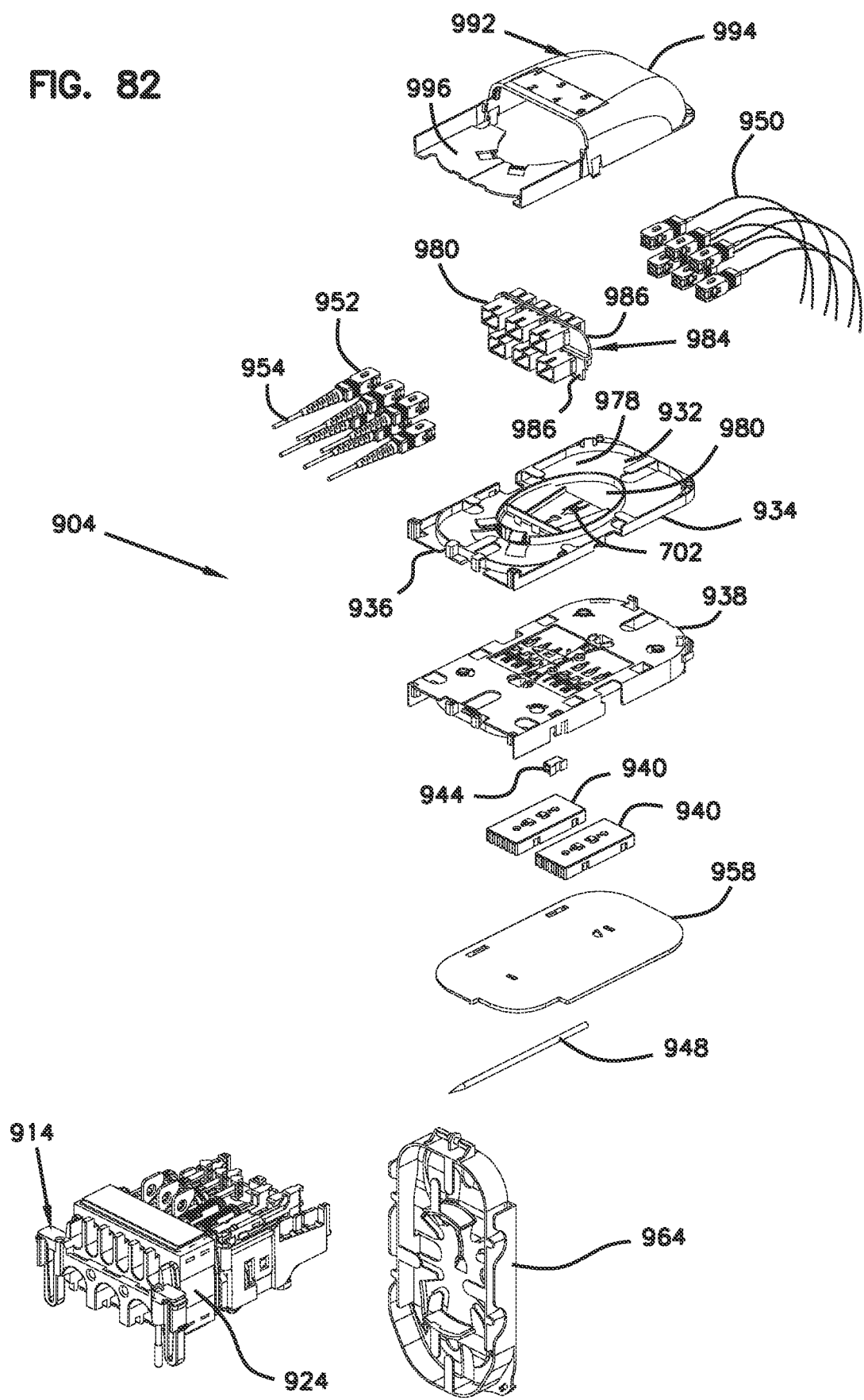
FIG. 82 is an exploded view of the insert unit of the telecommunications device of FIG. 79.

The second end 918 of the cable anchoring and sealant containment frame 914 includes a mechanical connection interface arrangement used to mechanically secure one or more trays or components to the cable anchoring and sealant containment frame 914. The mechanical connection interface can include structures such as one or more snap-fit connection arrangements. Referring to FIG. 82, the insert unit 904 includes a variety of components that attach to the second end 918 of the cable anchoring and sealant containment frame 914.

Figure 81:
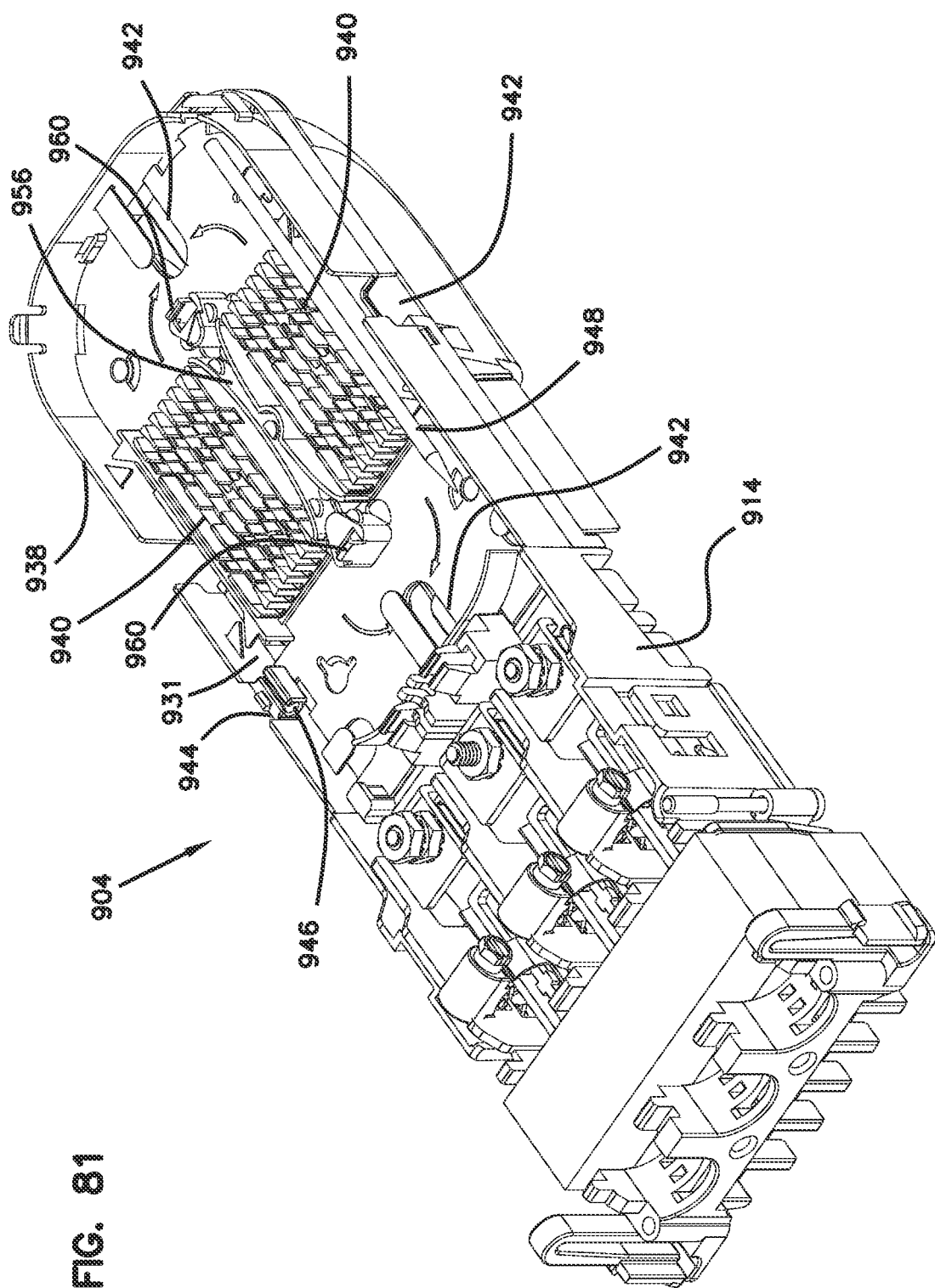
FIG. 81 shows the insert unit of FIG. 80 with the bottom tray removed to show a bottom side of an intermediate tray.

One example component that attaches to the second end 918 of the frame 914 is an intermediate tray 930 including a first side 932 (e.g., a top side) and an opposite second side 934 (e.g., a bottom side). An end 936 of the tray 930 mechanically attaches to the second end 918 of the cable anchoring and sealant containment frame 914. A splice tray 938 mounts to the second side 934 of the intermediate tray 930. As shown at FIG. 81, the bottom side of the splice tray 938 can support a plurality of splice holder modules 940 that can each be secured to the splice tray 938 by a snap-fit interface, such as the mechanical connection interface 702. It will be appreciated that passive power splitter holders and/or wavelength division multiplexer holders can also be mounted to the bottom side of the tray 938. Thus, the tray 938 is not limited to splicing functionality.

The bottom side of the tray 938 also includes fiber management functionalities such as fiber routing functionality. For example, the tray 930 defines a fiber routing path 931 (FIG. 81) that extends around a perimeter of the tray. Fiber retaining structures such as tabs, fingers or like structures can be provided for retaining optical fibers within predefined fiber routing paths. Also, bend radius protection structures can be provided for retaining optical fibers within predefined fiber routing paths. Bend radius protection structures can also be provided on the tray. In certain examples, the tray 930 can define pass-through openings 942 for allowing optical fibers to be routed between different layers or sides of the insert unit 904. In certain examples, a central cable routing channel 956 is defined between the splice module mounting locations for mounting the splice holder modules 940. Bend radius limiters can be provided at the ends of the channel 956 and tabs can be provided for retaining optical fibers within the channel.

Referring still to FIG. 81, a module 944 is shown snapped into a perimeter wall of the splice tray 938. The module 944 includes a pocket 946 that is preferably defined by one or more resilient elements. In certain examples, the pocket 946 can be used for holding an element such as a fiber pick 948. Alternatively, the module 944 can be used to mount another structure to the tray 938. For example, a supplemental module or component can be snapped into the pocket 946. In one example, a pivot pin of a supplemental tray can be secured within the pocket 946.

In certain examples, the tray 938 can provide splicing functionality for splicing optical fibers of the feeder cables or pass-through cables at the second side 912 of the insert unit 904 either directly to optical fibers of drop cables at the first side 910 of the insert unit 904, or to connectorized pigtails 950 capable of providing demateable connections with connectorized ends 952 of drop cables 954 routed across the first side 910 of the insert unit 904. Pass-through openings 942 are provided at opposite ends of the tray 938. The pass-through openings 942 can be configured for routing the connectorized pigtails 950 to the first side 910 of the insert unit 904. Additionally, the pass-through openings 942 can be used to route optical fibers corresponding to the feeder/pass-through cables at the second side 912 of the insert unit 904 to the splice tray 938. A cover 958 (FIG. 82) can be removably attached to the bottom side of the splice tray 938. In certain examples, latches 960 of the splice tray 938 engage receptacles 962 on the cover 958 to secure the cover 958 to the bottom side of the splice tray 938. In certain examples, the fiber pick 948 can be mounted to the bottom side of the cover 958 by a holder or like structure integrated with the cover 958.

Referring again to FIG. 82, the insert unit 904 also includes a feeder/fiber management tray 964 that couples to the second end 918 of the cable anchoring and sealant containment frame 914. In a preferred example, the feeder fiber management tray 964 pivotally connects to the second end 918 of the cable anchoring and sealant containment frame 914. In one example, the pivotal connection can include a structure such as one of the pivot interlocks 610.

Referring to FIG. 80, the feeder fiber management tray 964 includes outer channels 966 that extend along outer sides of the tray 964 and include open ends 968 that face toward the second cable anchoring region 928 and open ends 970 that open into an interior of the tray 964. The outer channels 966 are configured for managing optical fibers routed between the second cable anchoring region 928 and the tray 964. The interior of the tray 964 includes an outer fiber loop 972 for routing pass-through optical fibers that are not cut. The pass-through optical fibers extend from one cable secured at the second cable anchoring region 928, are routed onto the tray 964 such that the excess fiber length can be coiled at the outer fiber loop 972, and then are routed from the tray 964 back to a second cable at the second cable anchoring region 928.

Optical fibers from cables at the second cable anchoring region 928 that are accessed and cut within the enclosure 902 are routed to an interior fiber management region 974 surrounded by the outer fiber loop 972. A recessed channel 976 can be used to route the accessed optical fibers through a pass-through location located adjacent the hinge of the tray 964 to the splice tray 938. The tray 964 is movable between a first position where the tray 964 covers the bottom side of the splice tray 938 and a second position where the tray 964 is perpendicular to the splice tray 938 and the bottom side of the splice tray 938 is readily accessible. The feeder fiber management tray 964 includes numerous fiber retention fingers that project over the fiber routing regions and channels to provide fiber retention, and also includes numerous bend radius limiters for preventing excessive bending of optical fibers on the tray. Additionally, the feeder fiber mounting tray 964 can include a variety of fiber pass-through locations for routing the optical fibers to different locations. However, to limit fiber stress, it is preferred for fibers to be routed through the feeder/fiber mounting tray 964 at locations adjacent the pivotal hinge between the feeder fiber mounting tray 964 and the cable anchoring and sealant containment frame 914.

Referring back to FIG. 82, the first side 932 of the intermediate tray 930 includes an outer fiber routing path 978 that allows for looped storage of portions of the connectorized pigtails 950. The outer fiber routing path 978 surrounds a central region 980. A snap-fit interface such as one of the interfaces 702 is used to secure an adapter mounting panel 984 to the first side 932 of the intermediate tray 930. The adapter mounting panel 984 has a first side 986 that faces toward the first cable anchoring region 926 of the cable anchoring and sealant containment frame 914, and a second side 988 that faces away from the second cable anchoring region 928. Fiber optic adapters 990 are secured within openings defined by the adapter mounting panel 984.

The fiber optic adapters 990 include adapter ports at the first side 986 of the adapter mounting panel 984 for receiving the connectorized ends 952 of the drop cables 954, and also include adapter ports at the second side 988 of the adapter mounting panel 984 for receiving connectorized ends of the connectorized pigtails 950.

The first side 932 of the intermediate tray 930 is covered by a removable cover component 992. The removable cover component 992 can be secured to the first side 932 of the intermediate tray 930 by a snap-fit connection or other type of mechanical interlock. The removable cover component 992 includes a dome-portion 994 that covers the adapter mounting panel 984 and also covers the portion of the intermediate tray 930 that is located on the second side 988 of the adapter mounting panel 984. The dome portion 994 has a height that generally matches the height of the adapter mounting panel 984 and provides a relatively large clearance area relative to the first side 932 of the intermediate tray 930 such that the connectorized pigtails 950 can be routed through the area and plugged into the fiber optic adapters 990. The removable cover component 992 also includes a base platform portion 996 that covers the portion of the intermediate tray 930 that extends from the first side 986 of the adapter mounting panel 984 to the second end 918 of the frame 914. The base platform portion 996 closely covers the intermediate tray 930 and aligns with the bottom of the adapter mounting panel 984. The drop cables 954 are routed over the base platform portion 996 to reach the adapter mounting panel 984.

Figure 91:
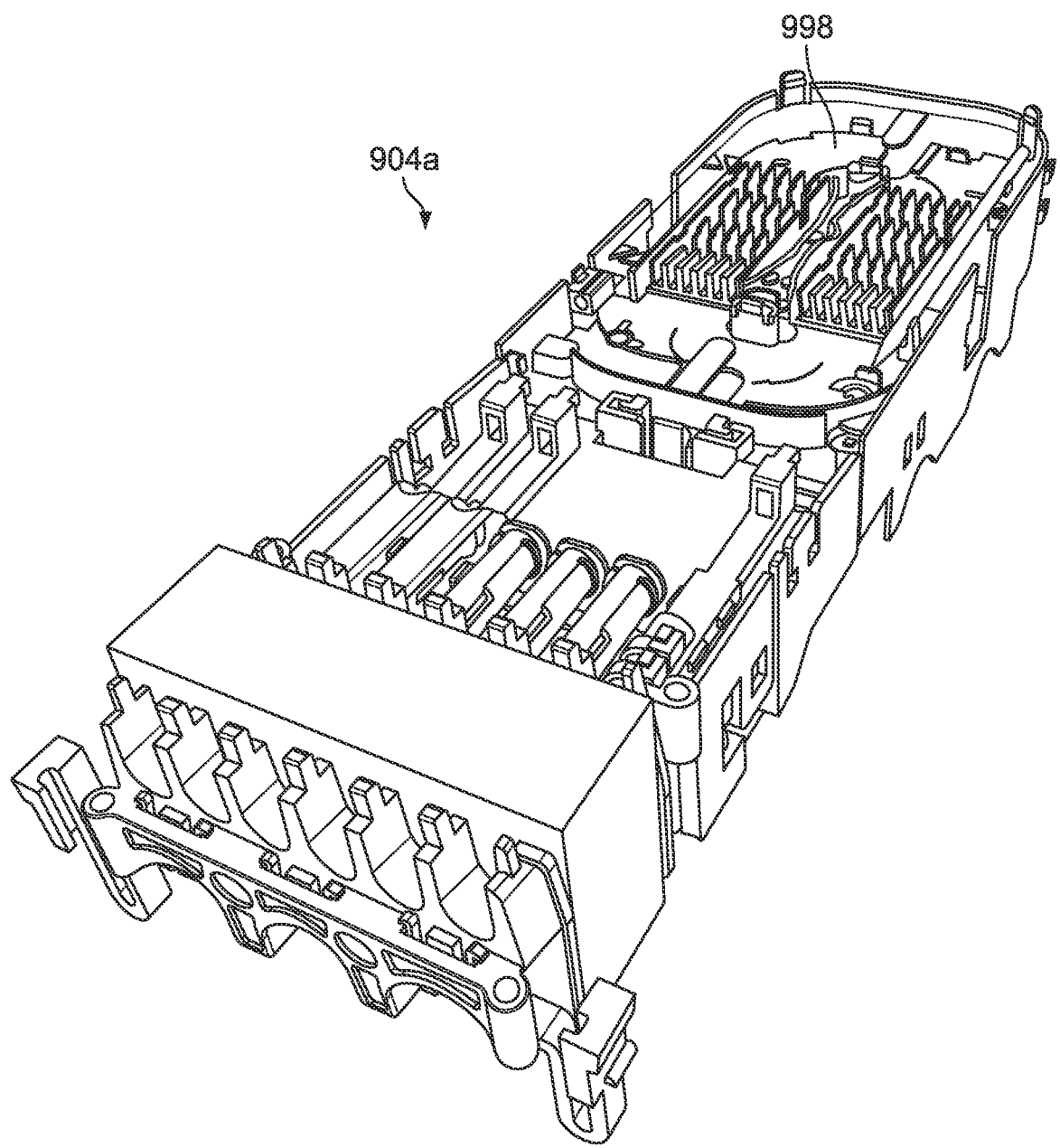
FIG. 91 shows an alternative insert unit in accordance with the principles of the present disclosure that is adapted to be received within the re-enterable enclosure of FIG. 79.
Figure 92:
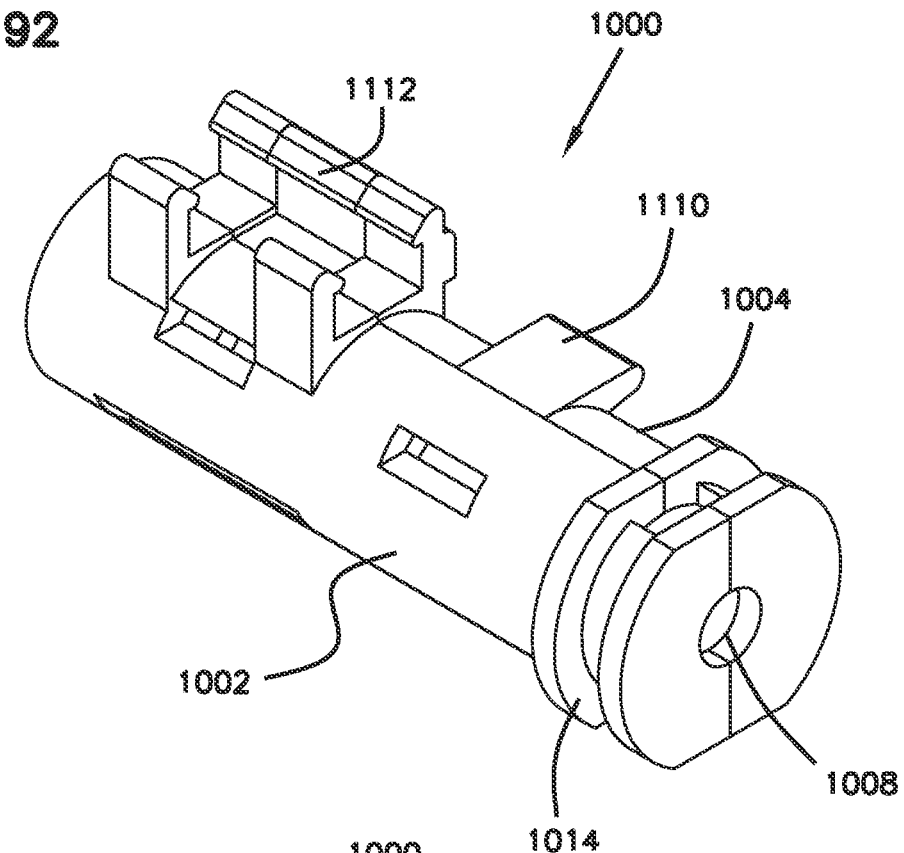
FIG. 92 is a perspective view showing a bottom side of a cable anchoring unit adapted to be secured to a top side of the cable anchoring and sealant containment frame of FIGS. 83-91.
Figure 93:
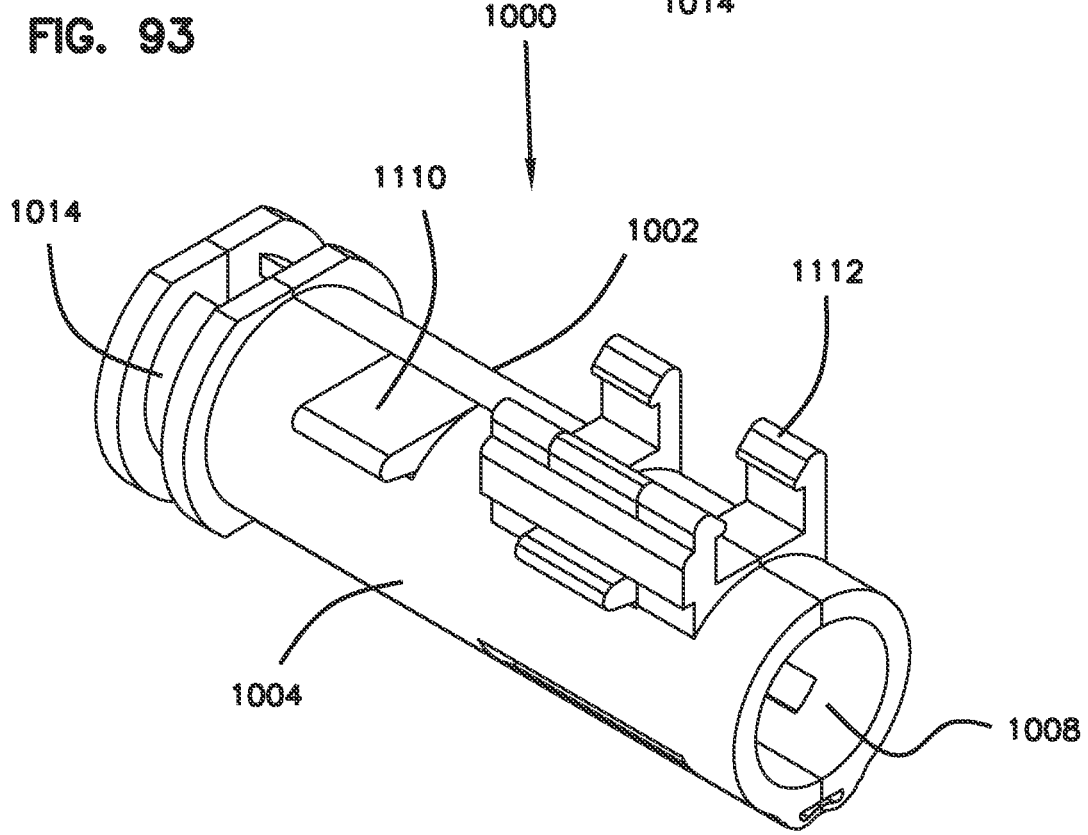
FIG. 93 is another perspective view showing the bottom side of the cable anchoring unit of FIG. 92.
Figure 94:
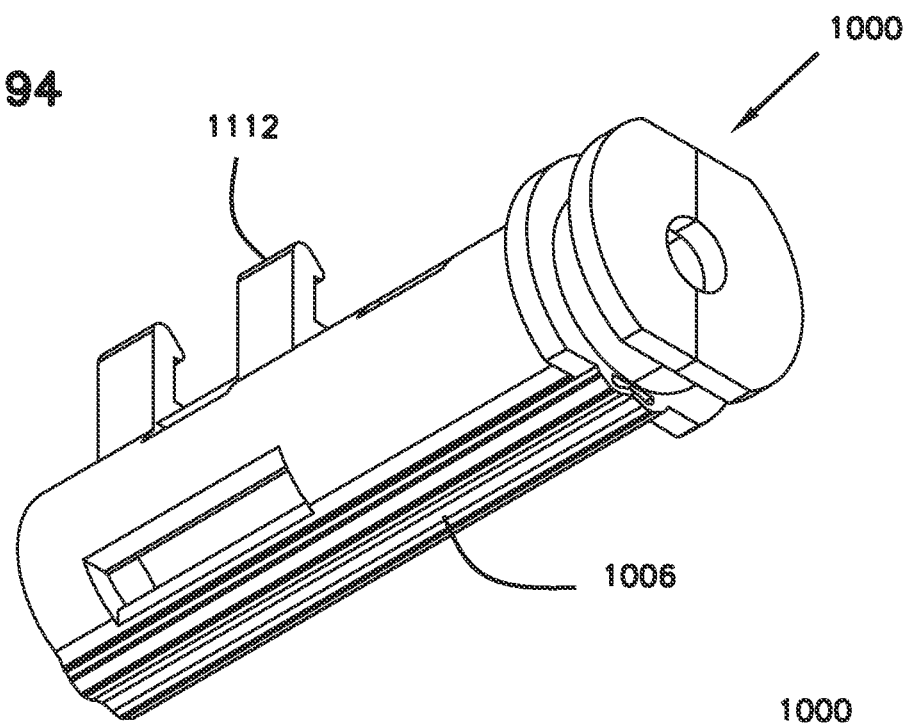
FIG. 94 is a perspective view showing a top side of the cable anchoring unit of FIG. 92.
Figure 95:
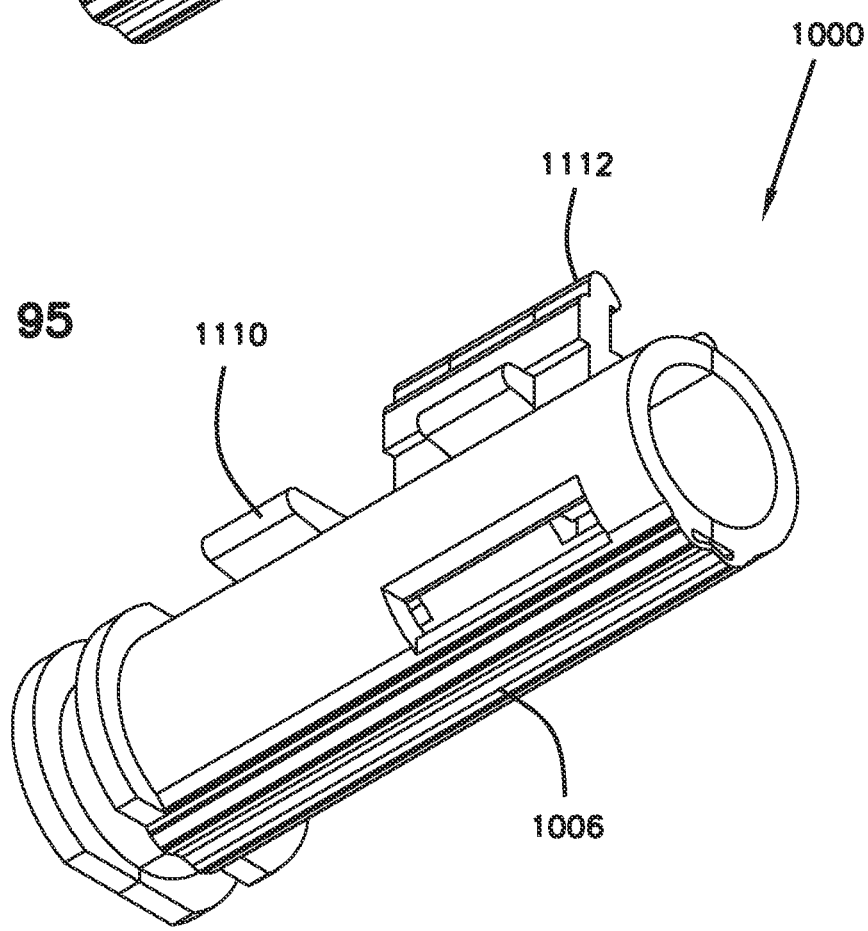
FIG. 95 is another perspective view showing a top side of the cable anchoring unit of FIG. 92.

FIG. 91 shows an alternative insert unit 904a having the same basic construction as the insert unit 904, except the demateable patching functionality at the first side of the insert unit has been replaced with optical splicing functionality. For example, an optical splicing tray 998 is shown mounted at the first side of the insert unit 904a.

FIGS. 92-95 show an example cable anchoring unit 1000 that can be mounted at the first cable anchoring region 926 of the cable anchoring and sealant containment frame 914. The cable anchoring unit 1000 includes first and second pieces 1002, 1004 connected by a living hinge 1006. The cable anchoring unit 1000 includes a central pass-through opening 1008 defined in part by the first piece 1002 and in part by the second piece 1004. By opening the anchoring unit 1000, a cable can be laid within the cable anchoring unit and the cable anchoring unit can be wrapped around the optical cable to position the cable within the opening 1008. Thus, the cable anchoring unit 1000 has a wrap-around configuration. A latch 1010 can be used to secure the first and second pieces 1002, 1004 in a closed orientation around the fiber optic cable. Flexible snap-fit latches 1012 can be used to secure the cable anchoring unit 1000 to the first cable anchoring region 926 of the cable anchoring and sealant containment frame 914. It will be appreciated that the cable anchoring unit 1000 is best suited for use with fiber optic cables having strength members having a string or yarn-like configuration. In such examples, the strength members can be wrapped around the flexible hinge while the first and second pieces 1002, 1004 are open, and then wrapped around one of the first and second pieces 1002, 1004 at a strength member wrapping region 1014. In this way, the strength member can be secured to the cable anchoring unit 1000.

Figure 96:
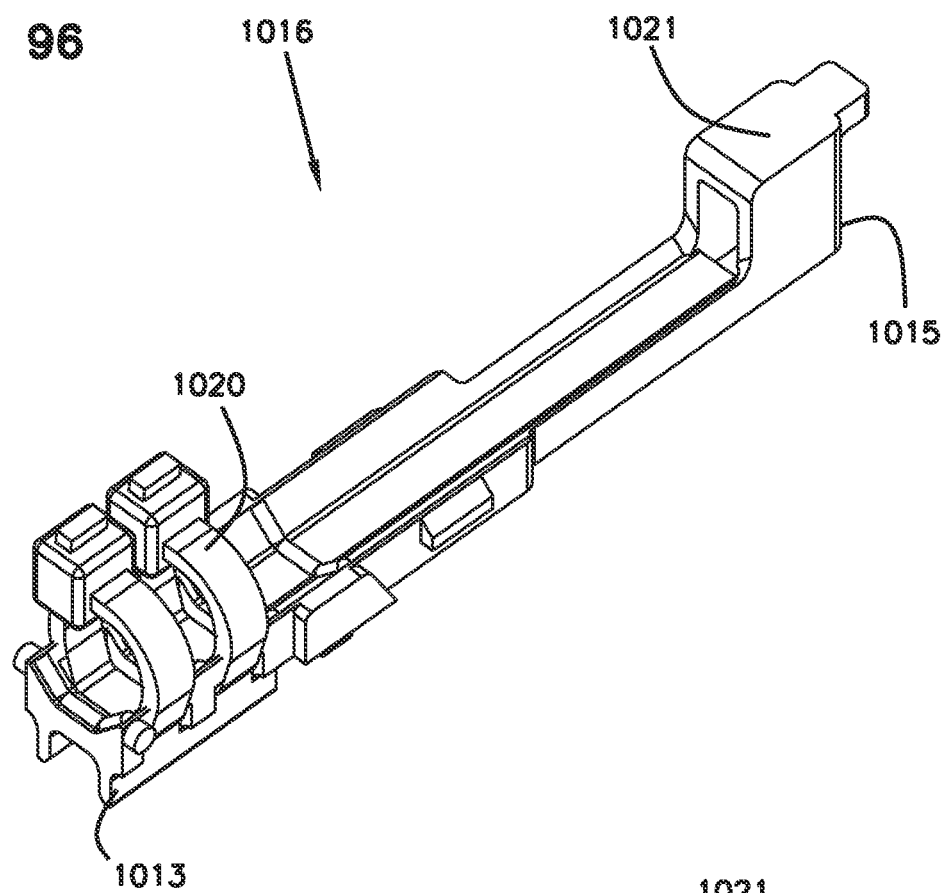
FIG. 96 is a perspective view showing a top side of another cable anchoring unit adapted to be secured to the top side of the cable anchoring and sealant containment frame of FIGS. 83-91.
Figure 97:
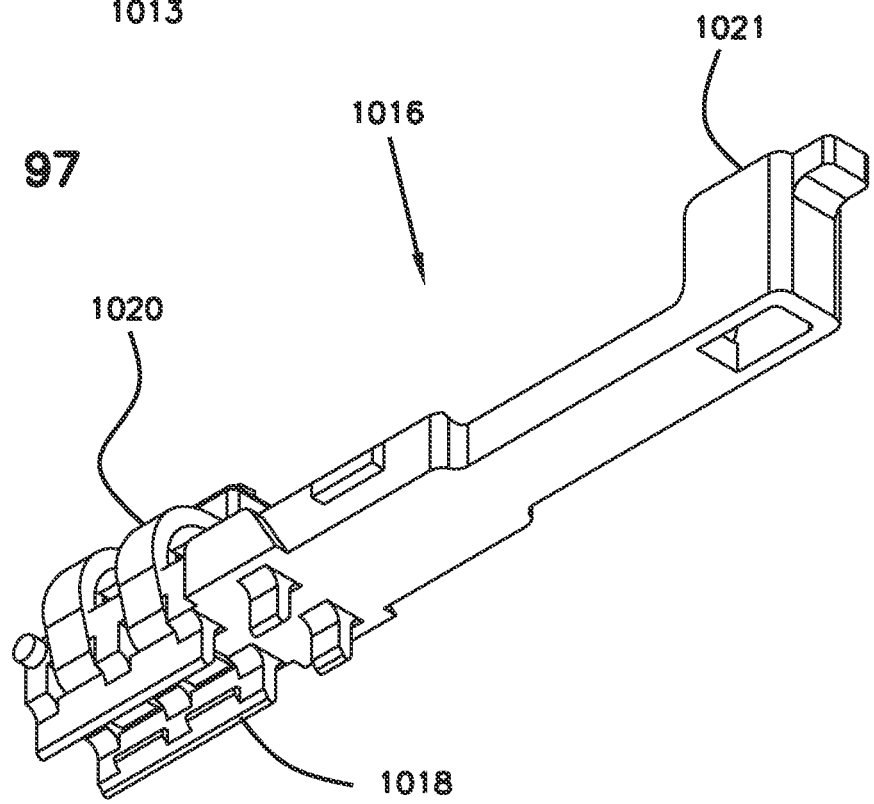
FIG. 97 is a perspective view showing a bottom side of the cable anchoring unit of FIG. 96.

FIGS. 96 and 97 show another cable anchoring unit 1016 that can be secured to the first cable anchoring region 926 of the cable anchoring and sealant containment frame 914. The cable anchoring unit 1016 has a main body having first and second ends 1013, 1015. The unit 1016 includes snap-fit latches 1018 near the first end 1013 for securing the cable anchoring unit 1016 to the first cable anchoring region 926. Cable ties 1020 can be used to secure a jacketed portion of the cable to the cable anchor 1016 near the first end 1013. The ties 1020 can extend though slots in the main body of the unit 1016. Fasteners can be used to secure strength members of the fiber optic cable to a strength member attachment region 1021 at the second end 1015 of the cable anchor 1016.

Figure 98:
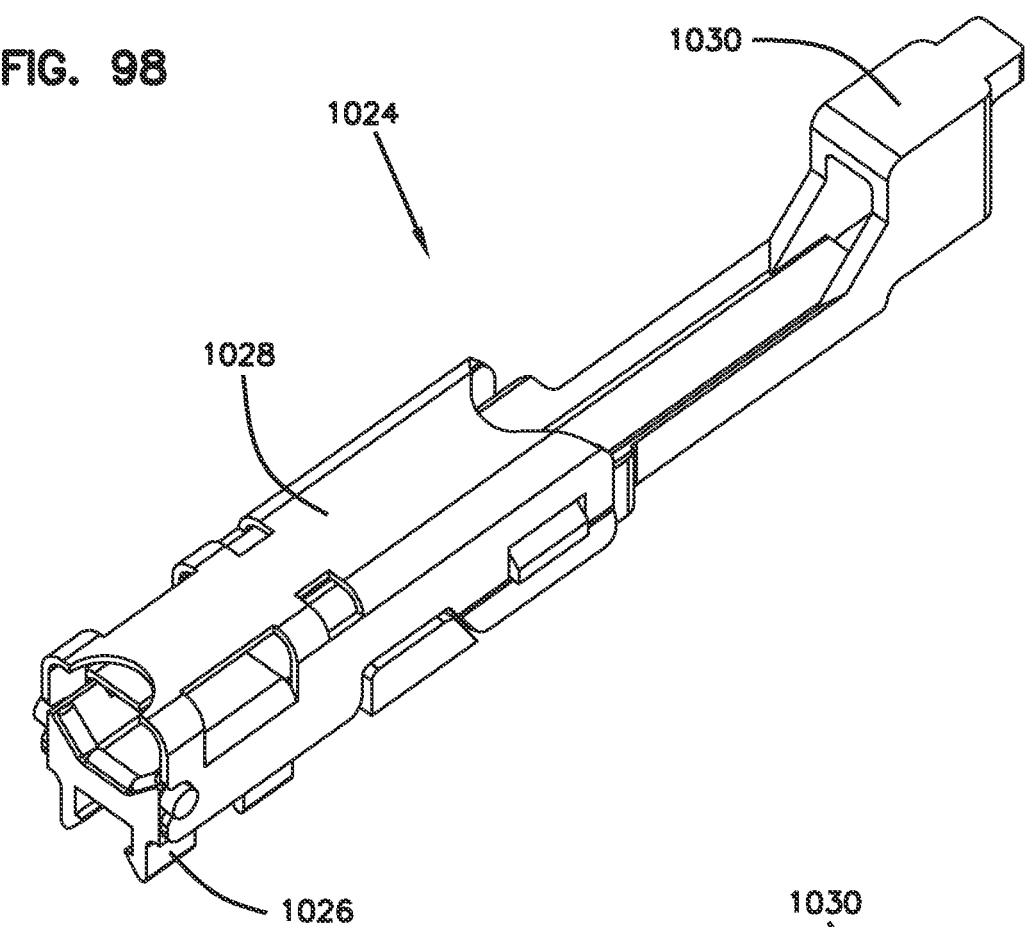
FIG. 98 is a perspective view showing a top side of another cable anchoring unit adapted to be secured to a top side of the cable anchoring and sealant containment frame of FIGS. 83-91.
Figure 99:
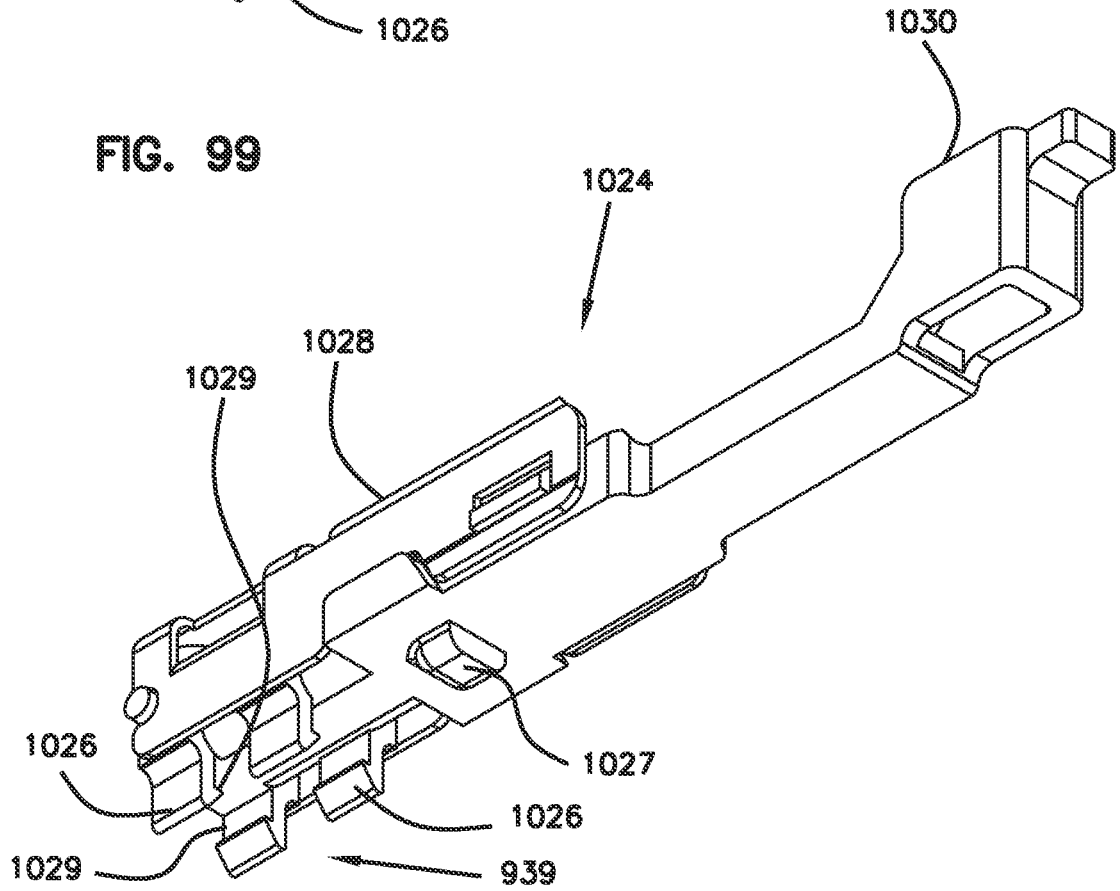
FIG. 99 is a perspective view showing a bottom side of the cable anchoring unit of FIG. 98.

FIGS. 98 and 99 show another cable anchor 1024 configured to be secured at the first cable anchoring region 926 of the cable anchoring and sealant containment frame 914. The cable anchor 1024 includes snap-fit latches 1026 for securing the cable anchor 1024 to the first cable anchoring region 926. The cable anchor 1024 includes a clamp 1028, which can be a pivotal clamp, for securing a jacketed portion of a fiber optic cable to the cable anchor 1024. A fastener can be used to secure a strength member of the cable to a strength member securement region 1030 of the cable anchor 1024.

Figure 100:
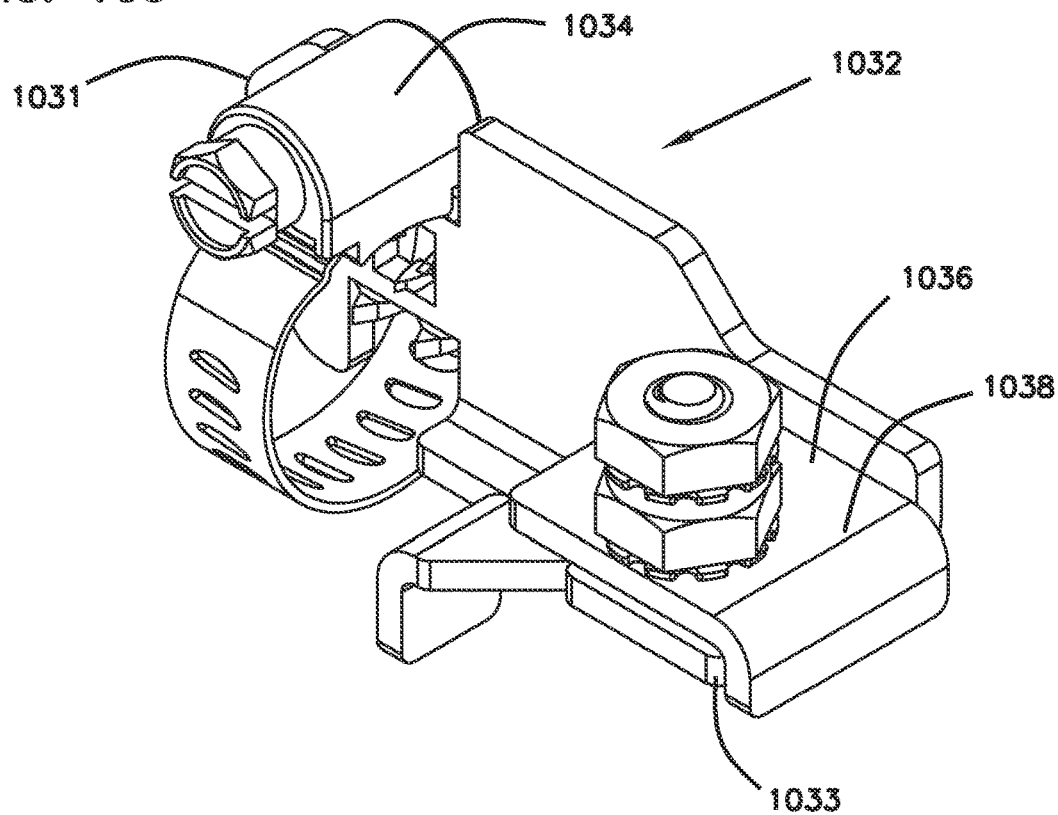
FIG. 100 is a perspective view showing a cable anchoring and grounding unit adapted to be mounted to the bottom side of the cable anchoring and sealing containment frame of FIGS. 83-91.
Figure 101:
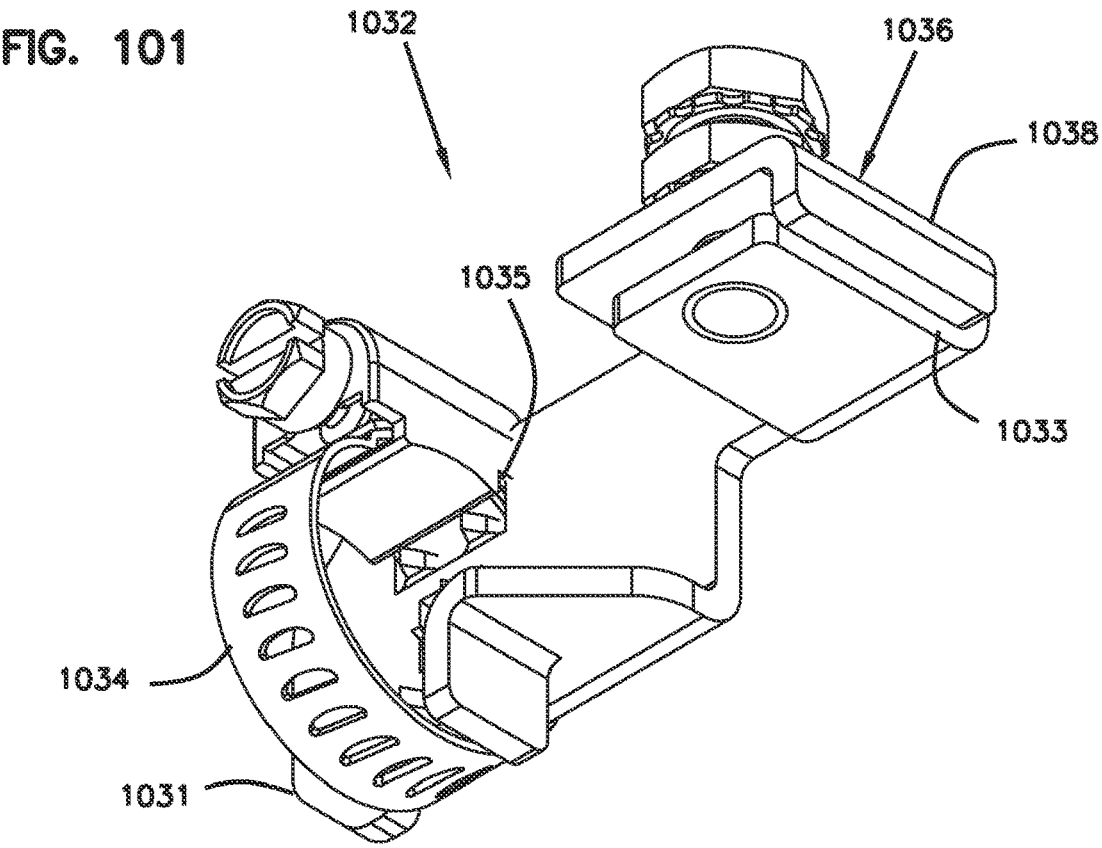
FIG. 101 is another perspective view of the cable anchoring and grounding unit of FIG. 100.

FIGS. 100 and 101 show a cable anchoring unit 1032 adapted to be secured at the second cable anchoring region 928 of the cable anchoring and sealant containment frame 914. The cable anchoring unit 1032 includes main body having a first end 1031 and a second end 1033. A hose clamp 1034 for securing a jacketed portion of a cable to the cable anchoring unit 1032 is mounted in a notched region 1035 of a sidewall of the main body. The notched region 1035 is near the first end 1031. In certain examples, the hose clamp 1034 can also make electrical contact with an electrically conductive shield of the cable to provide a grounding contact with the cable. The cable anchoring unit 1032 also includes a strength member securement region 1036. The strength member securement region 1036 is at the second end 1033 includes a clamping plate 1038 for clamping a strength member of the fiber optic cable against the main body of the cable anchoring unit 1032. The plate 1038 has a down-turned end that overhangs the second end 1033 and mounts on a lateral tab that projects from the side wall. A fastener such as a bolt can be used to clamp the plate 1038 against the strength member. The fastener can also be used to electrically connect the cable anchoring unit 1032 to a grounding wire or a conductive plate. In certain examples, the grounding wire can be routed out of the enclosure 902 through one of the cable ports at the cable access end 908. In certain examples, a conductive plate can be used to electrically connect multiple cable anchoring units 1032 together at the fasteners so that one grounding wire can be used to ground all of the cable anchoring units. The main body also includes a down-turned mounting tab 1039.

Figure 102:
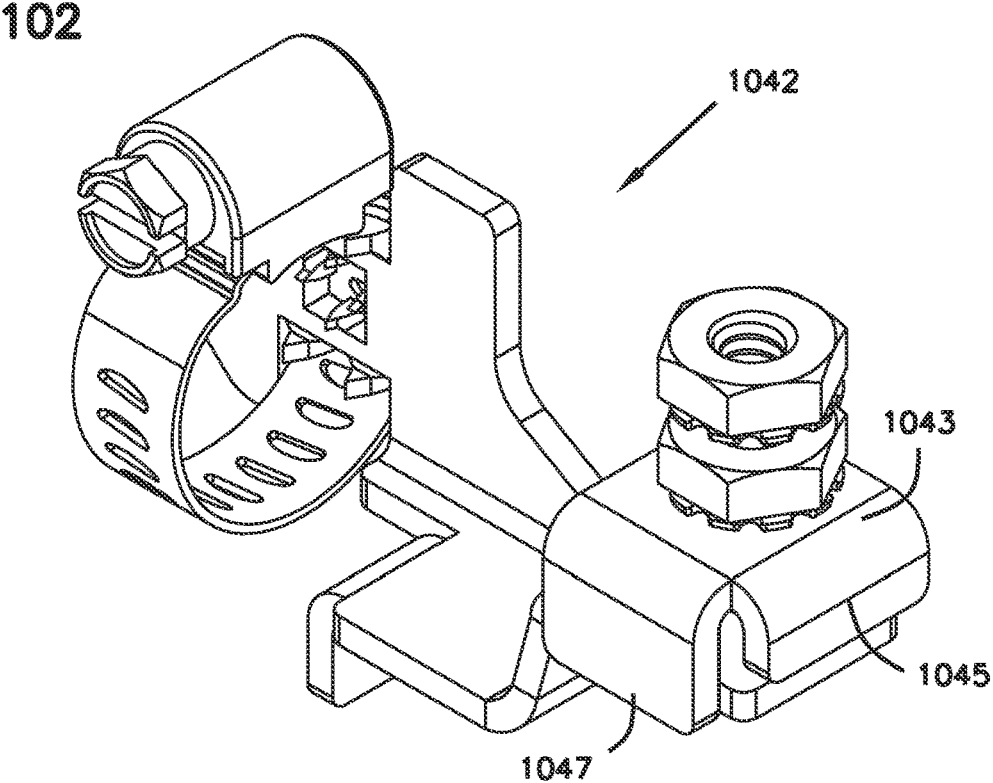
FIG. 102 is perspective view showing another cable anchoring and grounding unit adapted to be secured to the bottom side of the cable anchoring and sealant containment frame of FIGS. 83-91.
Figure 103:
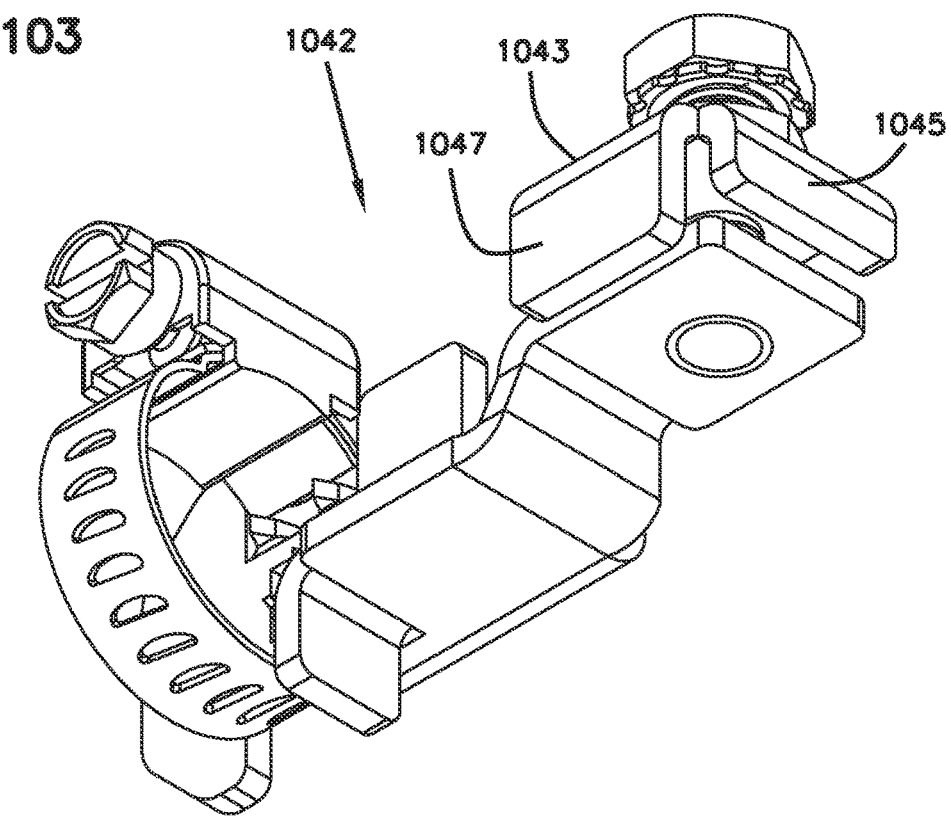
FIG. 103 is another perspective view of the cable anchoring and grounding unit of FIG. 102.

FIGS. 102 and 103 show another cable anchoring unit 1042 having a similar configuration as the anchoring unit 1032 except the cable anchoring unit 1042 has a clamping plate 1043 with multiple down-turned tabs 1045, 1047 arranged orthogonally with respect to one another, and includes a main body having a reduced height adjacent the strength member securement location. The strength member securement location is provided at a forward extension of a base of the main body which has a stepped-up configuration.

FIGS. 104 and 105 show a further cable anchoring unit 1050 having a main body 1051. A hose clamp 1052 is mounted at one end of the main body 1051 for securing a jacketed end of a fiber optic cable to the main body 1051 and fits within notches of a base of the main body. The hose clamp 1052 mounts between upward fingers 1054 of the main body 1051. The main body includes a downward tab 1056. A strength member clamp 1057 is mounted at an end of the main body 1051 that is opposite from where the hose clamp 1052 is mounted.

Figure 106:
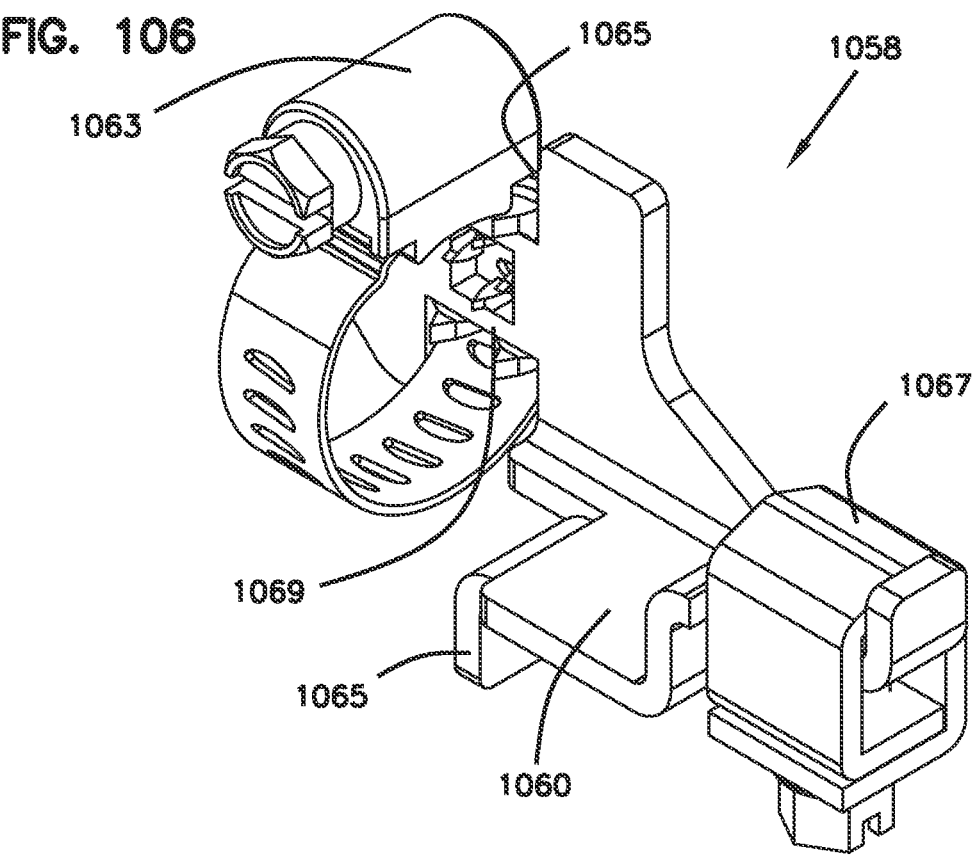
FIG. 106 is a perspective view of another cable anchoring unit adapted to be secured to the bottom side of the cable anchoring and sealant containment frame of FIGS. 83-91.
Figure 107:
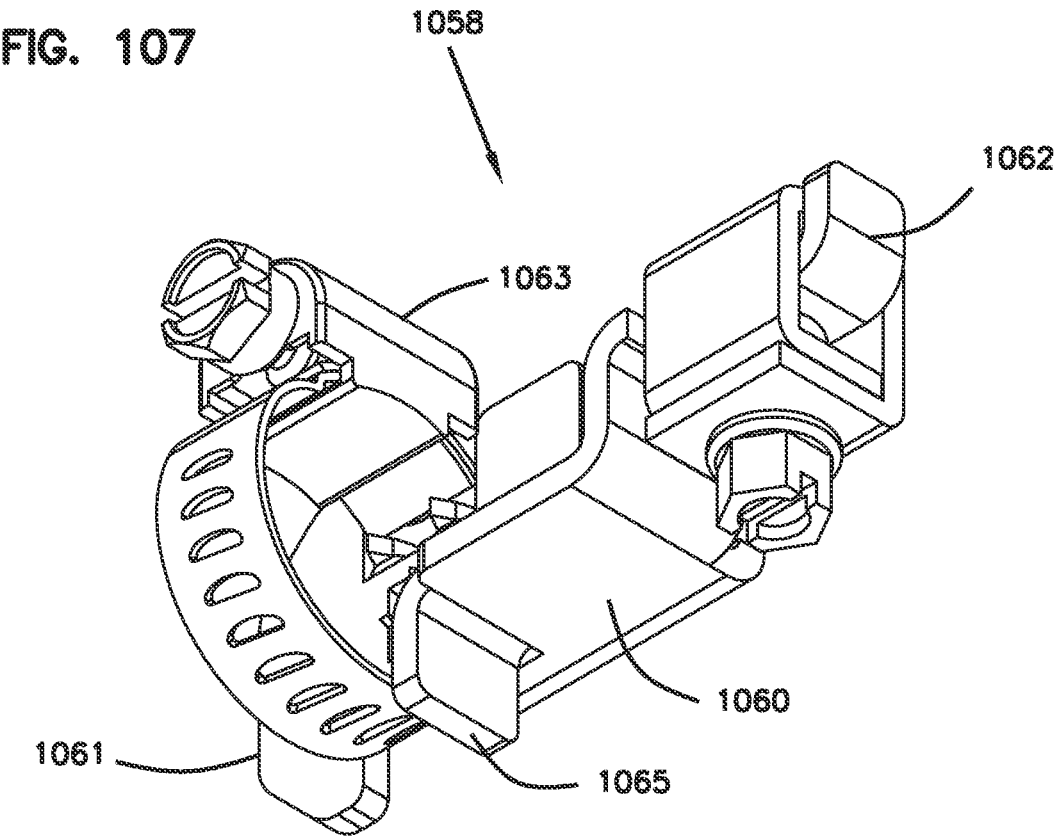
FIG. 107 is another perspective view of the cable anchoring unit of FIG. 106.

FIGS. 106 and 107 show another cable anchoring unit 1058 adapted to be mounted at the second cable anchoring region 928. The cable mounting unit 1058 includes a main body 1060 having a first end 1061 and an opposite second end 1062. A hose clamp 1063 mounts adjacent the first end 1061. The hose clamp 1063 is configured to attach a jacketed portion of a cable to a side wall of the main body 1060. The hose clamp extends through notches 1065 in the side wall and is adapted to secure the jacketed portion of the cable to a bridge portion 1069 that extends between major portions of the side wall. The main body 1060 also includes a downward tab 1065 that projects downwardly from a base of the main body. The hose clamp does not engage the base of the main body. A strength member clamp 1067 is mounted at the second end of the main body 1060.

Figure 83:
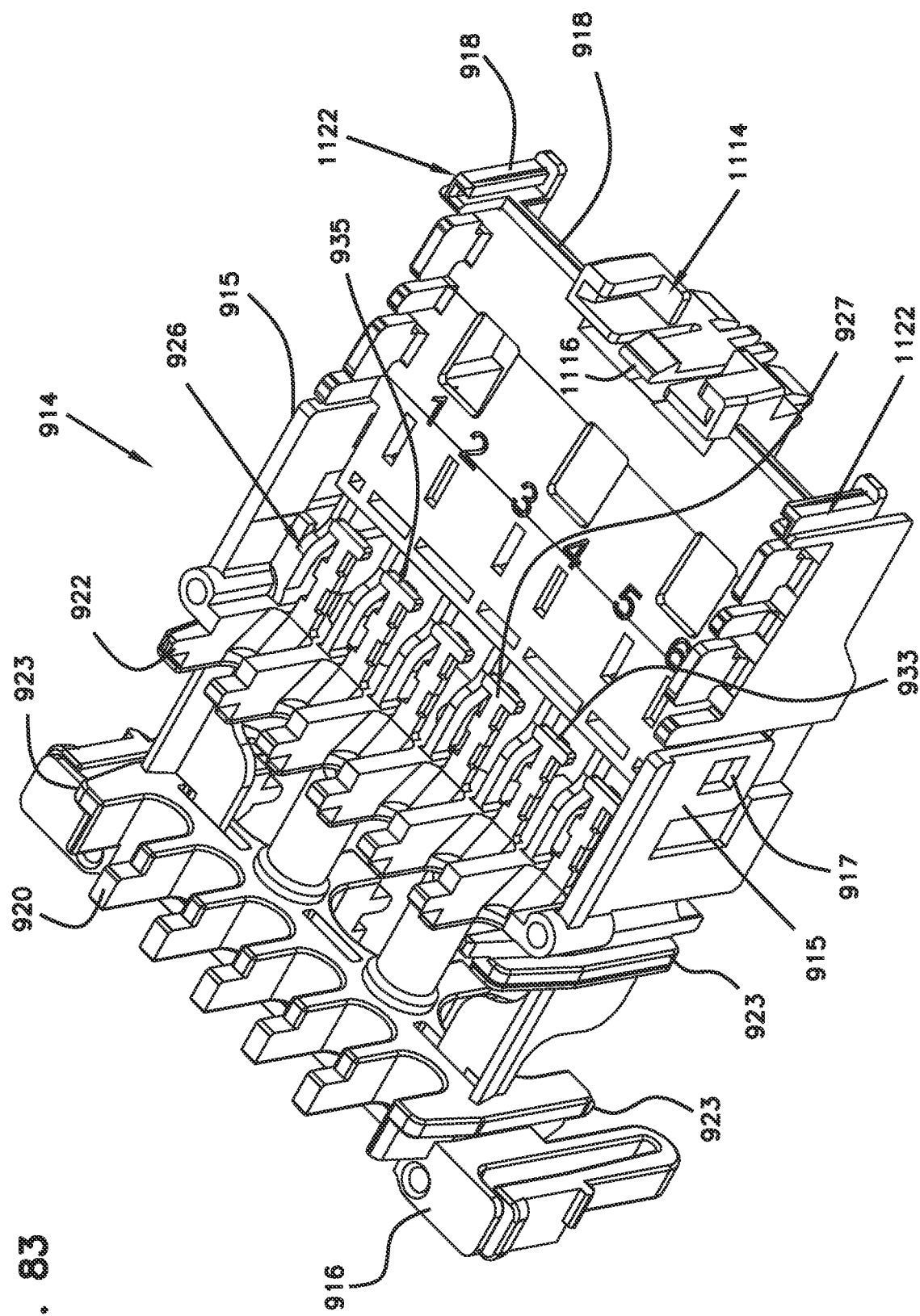
FIG. 83 is a perspective view showing a top side of a cable anchoring and sealant containment frame of the insert unit of the telecommunications device of FIG. 79.
Figure 84:
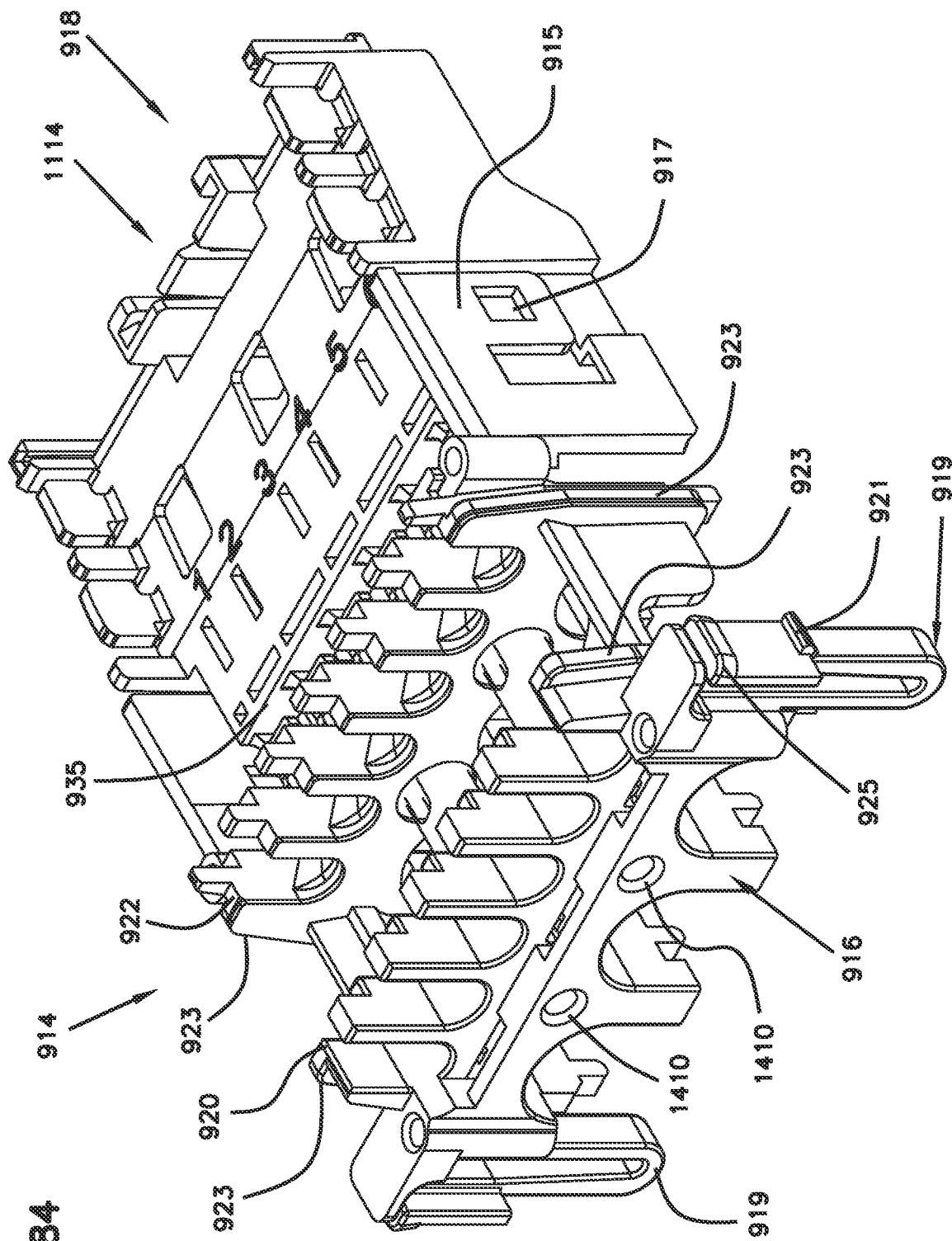
FIG. 84 is another perspective view showing the top of the cable anchoring and sealant containment frame of FIG. 83.
Figure 85:
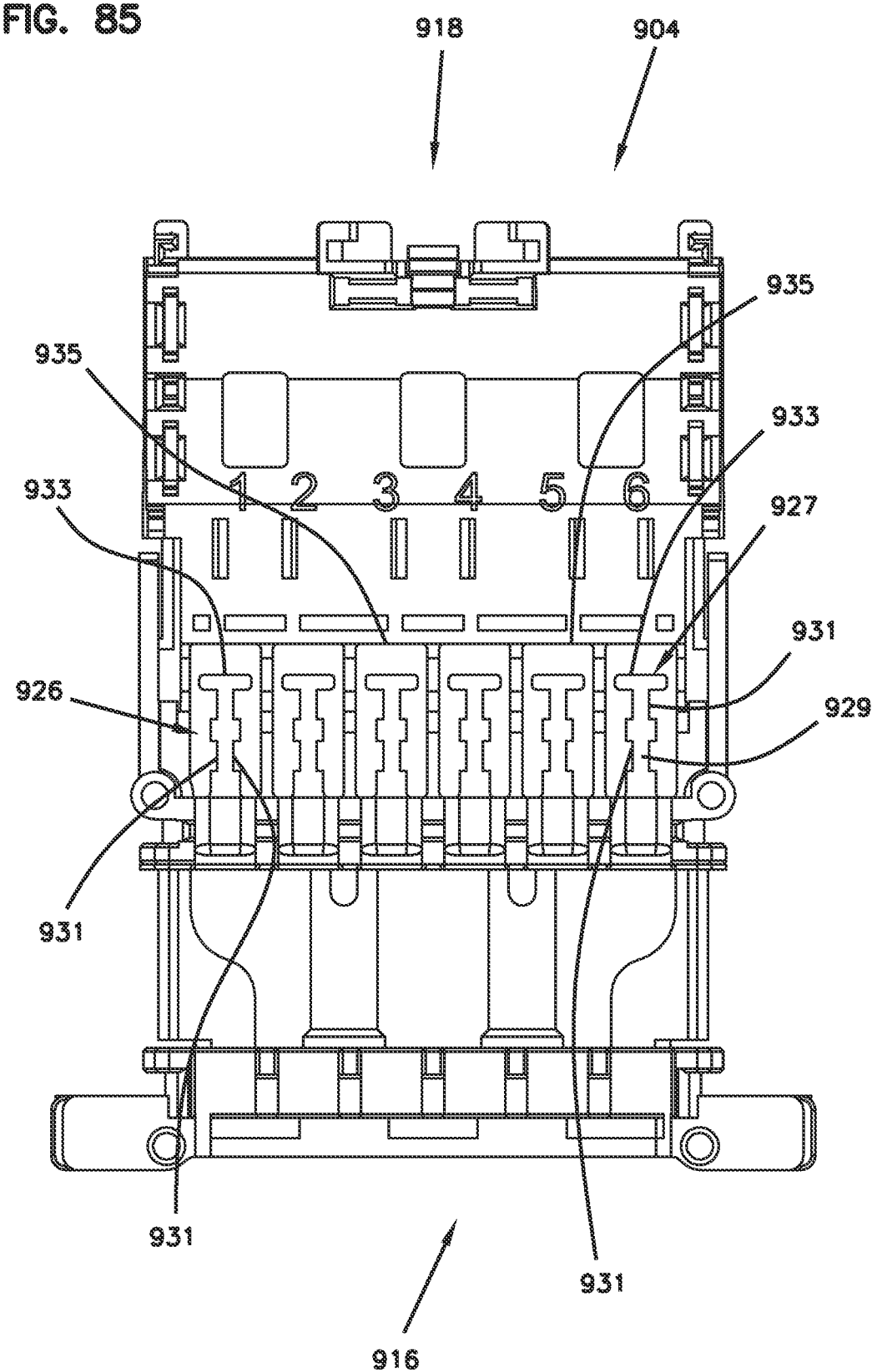
FIG. 85 is a top view of the cable anchoring and sealant containment frame of FIG. 83.

FIGS. 108-118 show a fiber management component 1100 adapted to be attached to the second end 918 of the frame 914 (see FIG. 83). Similar to previously described fiber management components, the fiber management component 1100 can provide splicing and/or splicing functionality between optical fibers of feeder cables at one side of the assembly and drop cable/subscriber cable fibers at the other side of the assembly. Similar to previously described examples, the optical fiber of the feeder cables can be managed by the tray 964 pivotally coupled to the frame 914. The fiber management component 1100 includes a patching tray 1102 coupled back-to-back with a splicing tray 1104. The fiber management component 1100 includes a first end 1106 and an opposite second end 1108, and first major side 1187 (e.g., an upper side, see FIGS. 108 and 112) and an opposite second major side 1189 (e.g., a bottom side, see FIG. 113 and FIGS. 110 and 111 where a cover 1185 is covering the second side 1189). The first end 1106 includes an interlock interface 1110 (see FIG. 108) adapted to interlock with respect to the second end 918 of the cable anchoring and sealant containment frame 914. The interlock interface 1110 includes a central portion 1112 adapted to vertically slide into and interlock with a mating receptacle 1114 (see FIG. 83) provided at the second end 918 of the frame 914. In certain examples, when the interlock interface 1110 is mated with the interlock receptacle 1114, the frame 914 and the fiber management component 1100 are prevented from being axially separated. In certain examples, at least one resilient latch 1116 is provided for locking the fiber management component 1100 vertically in place with respect to the frame 914. As depicted, the latch 1116 is provided at the second end 918 of the frame 914 and is adapted to engage a rib 1118 (see FIG. 108) of the interlock interface 1110. The interlock interface 1110 can also include side interlocks 1120 (see FIG. 108) provided at the minor sides of the fiber management component 1100. The side interlocks 1120 are adapted to slidingly engage with corresponding side interlocks 1122 (see FIG. 83) provided at the second end 918 of the frame 914. By disengaging the cantilever latch 1116 from the rib 1118, it will be appreciated that the fiber management component 1100 can be slid vertically relative to the frame 914 to detach the fiber management component 1100 from the frame 914.

As indicated above, the patch tray 1102 is shown coupled back-to-back or stacked with respect to the splice tray 1104. In certain examples, the first and second connection arrangements 700, 704 (see FIGS. 117 and 118) of the mechanical connection interface 702 can be integrated with the main bodies of the patch tray 1102 and the splice tray 1104 so that the mechanical connection interfaces 702 can be used to connect the patch tray 1102 and the splice tray 1104 together in a snap-fit relationship.

Figure 108:
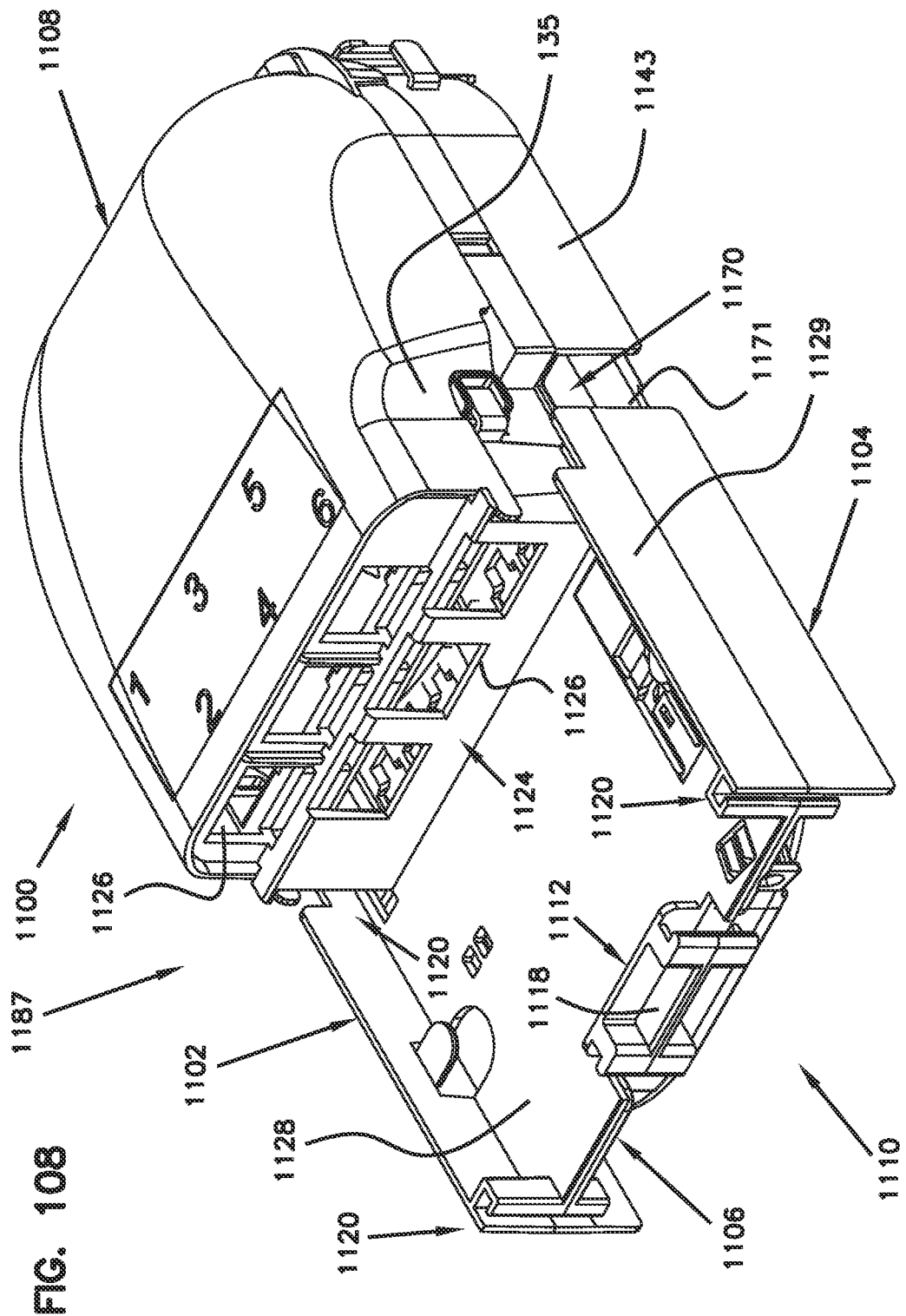
FIG. 108 is a top, perspective view of a fiber management component that can be integrated as part of any of the insert units disclosed herein in accordance with the principles of the present disclosure.
Figure 109:
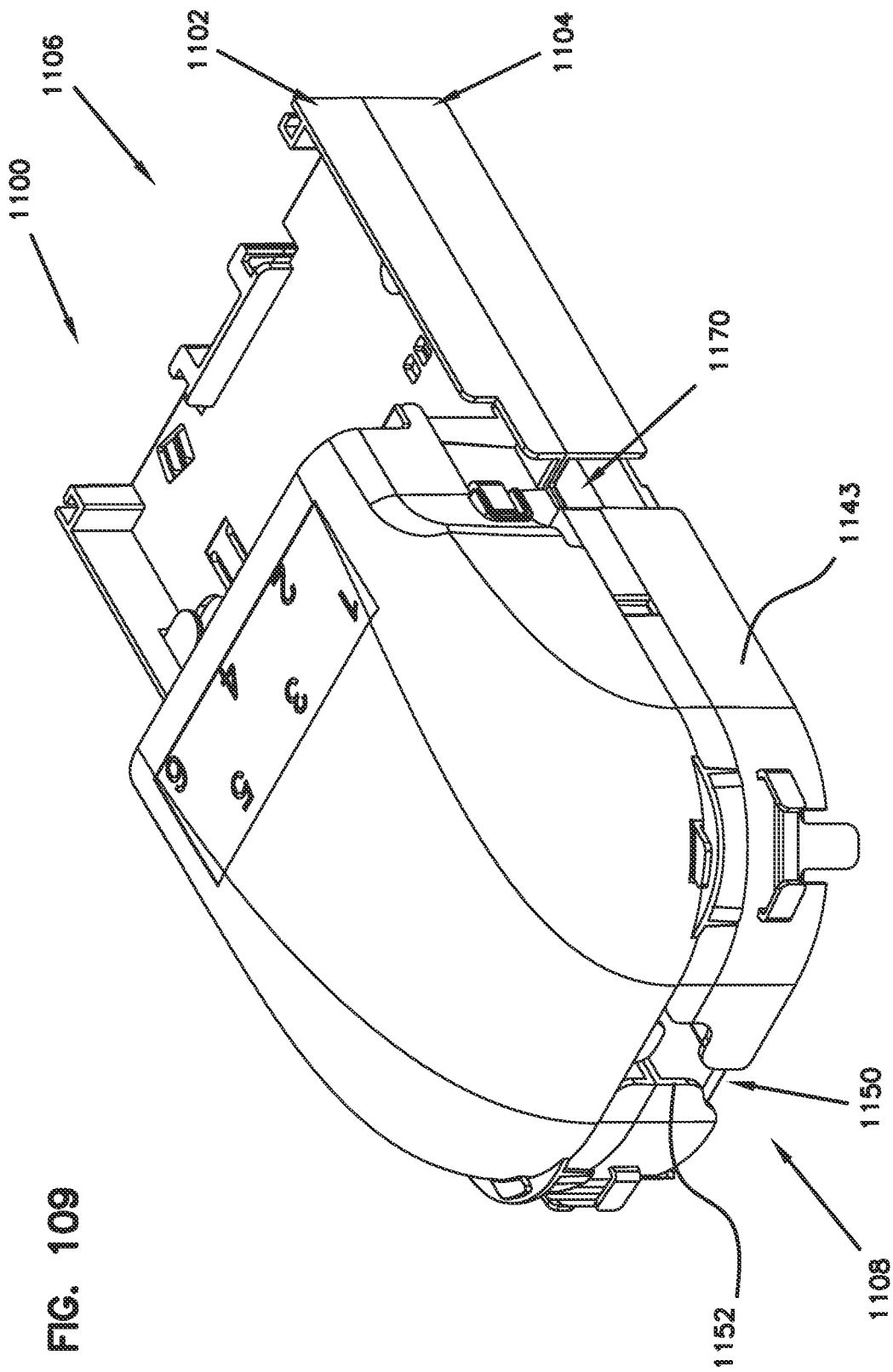
FIG. 109 is another top, perspective view of the fiber management component of FIG. 108.
Figure 110:
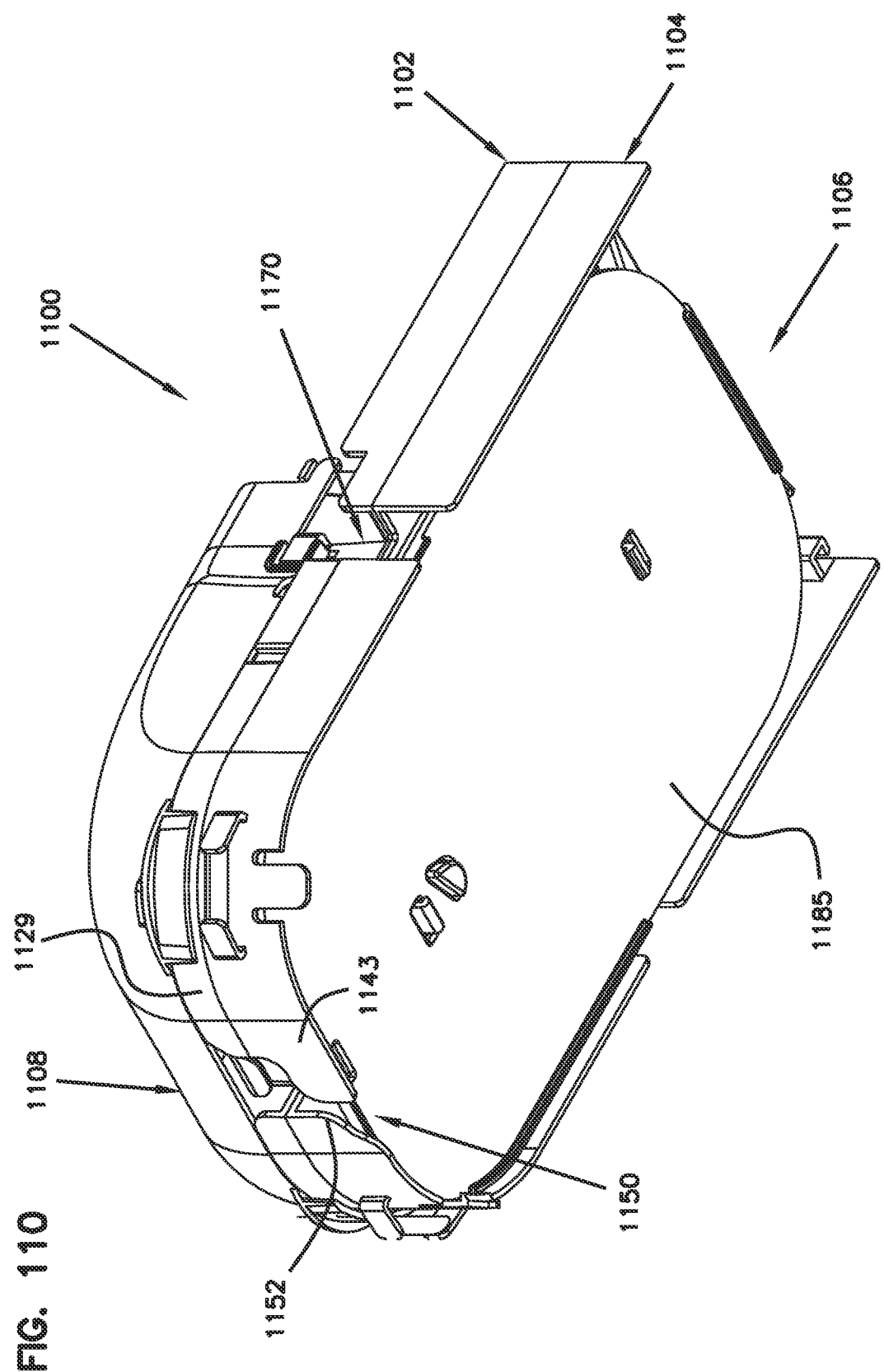
FIG. 110 is a bottom, perspective view of the fiber management component of FIG. 108.
Figure 111:
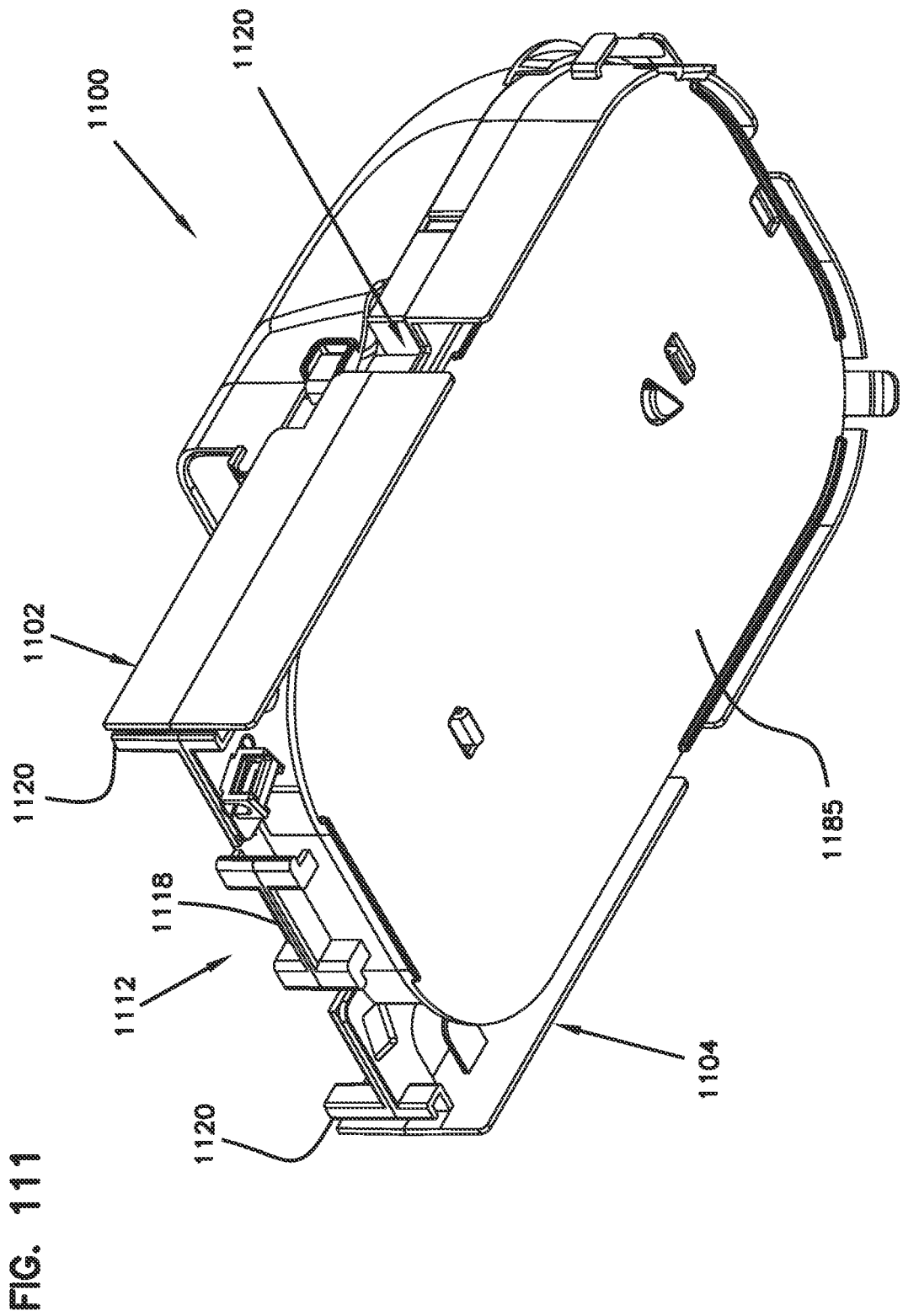
FIG. 111 is another bottom, perspective view of the fiber management component of FIG. 108.
Figure 112:
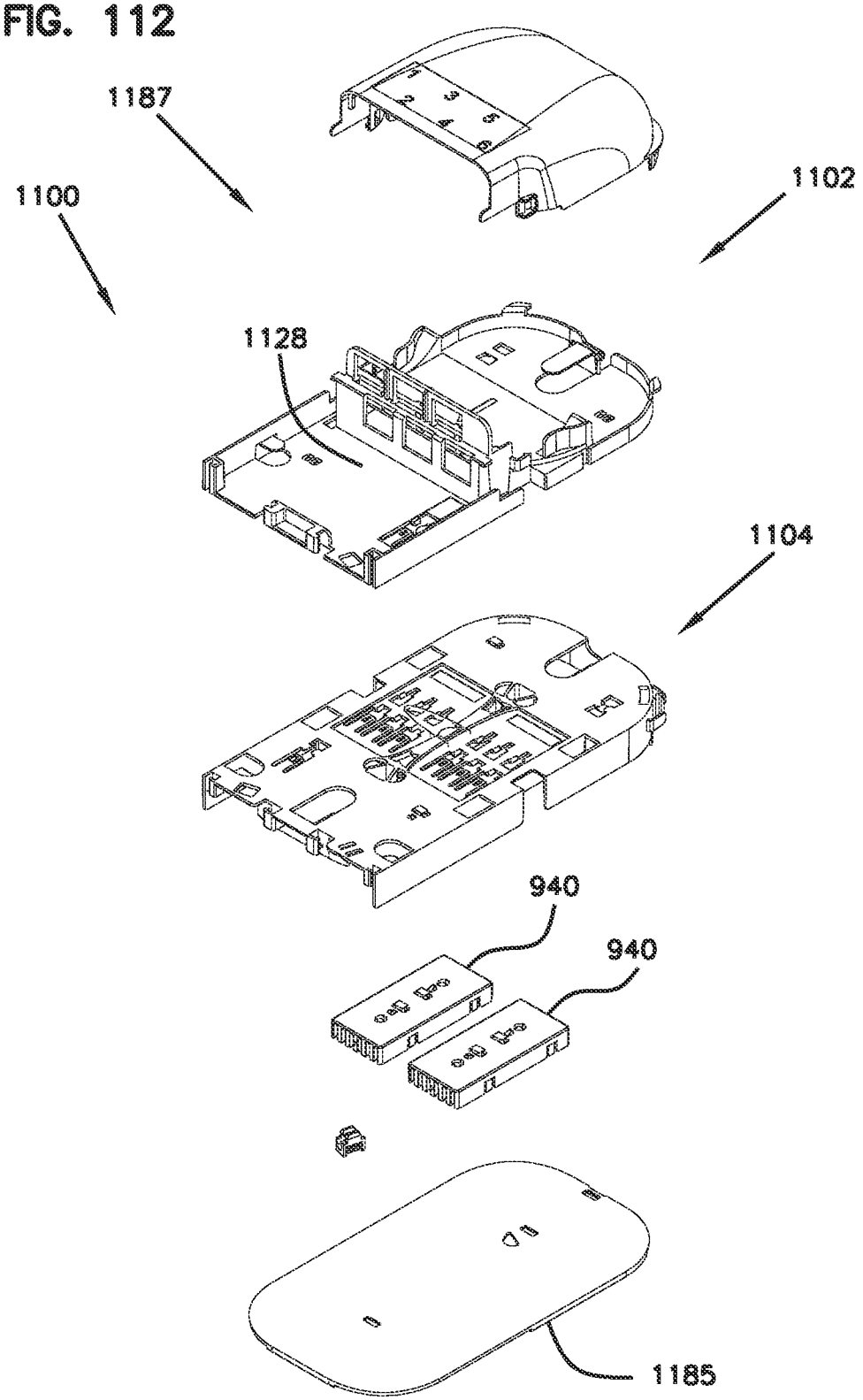
FIG. 112 is a top, exploded perspective view of the fiber management component of FIG. 108.
Figure 113:
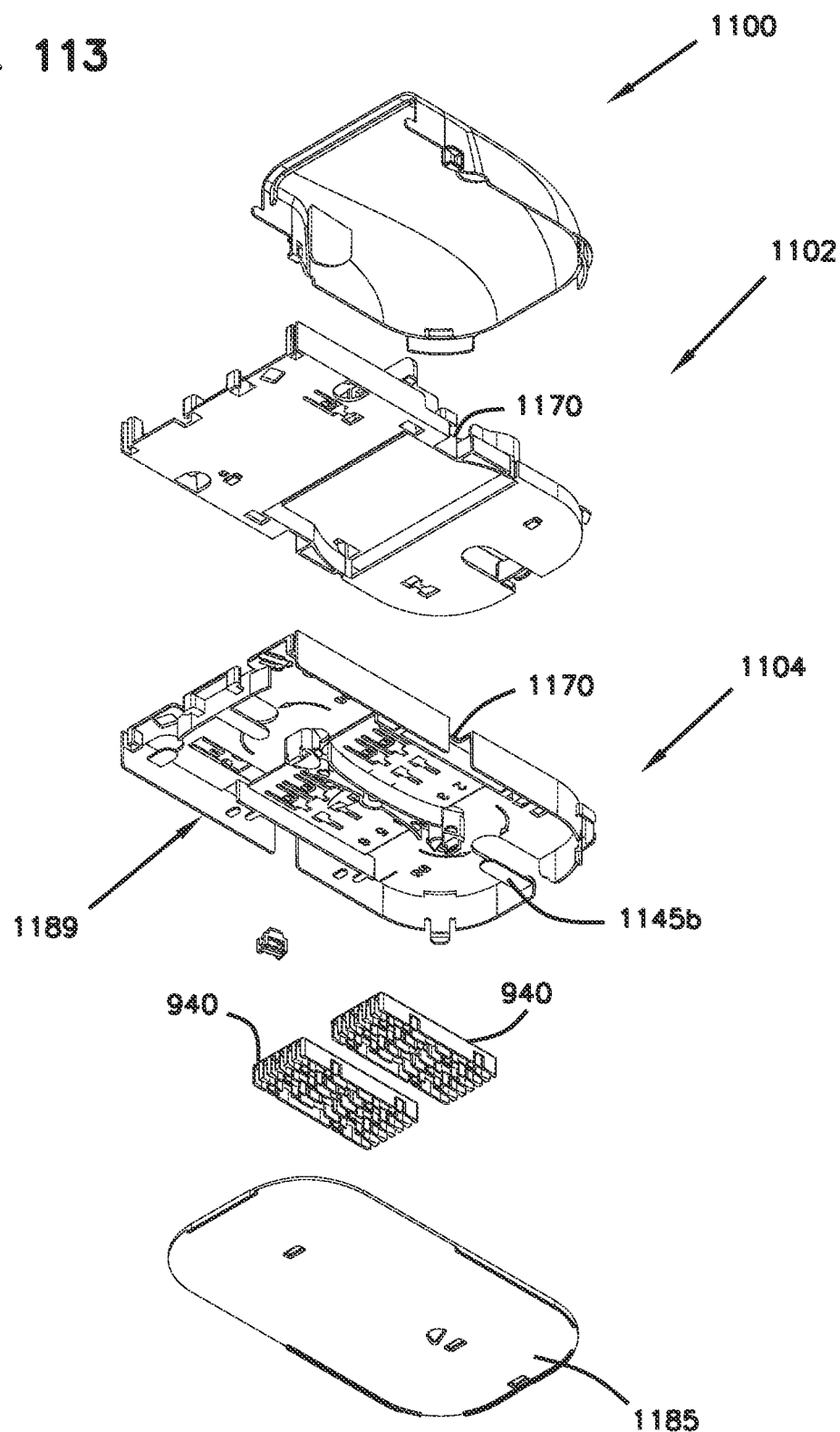
FIG. 113 is bottom, exploded perspective view of the fiber management component of FIG. 108.
Figure 114:
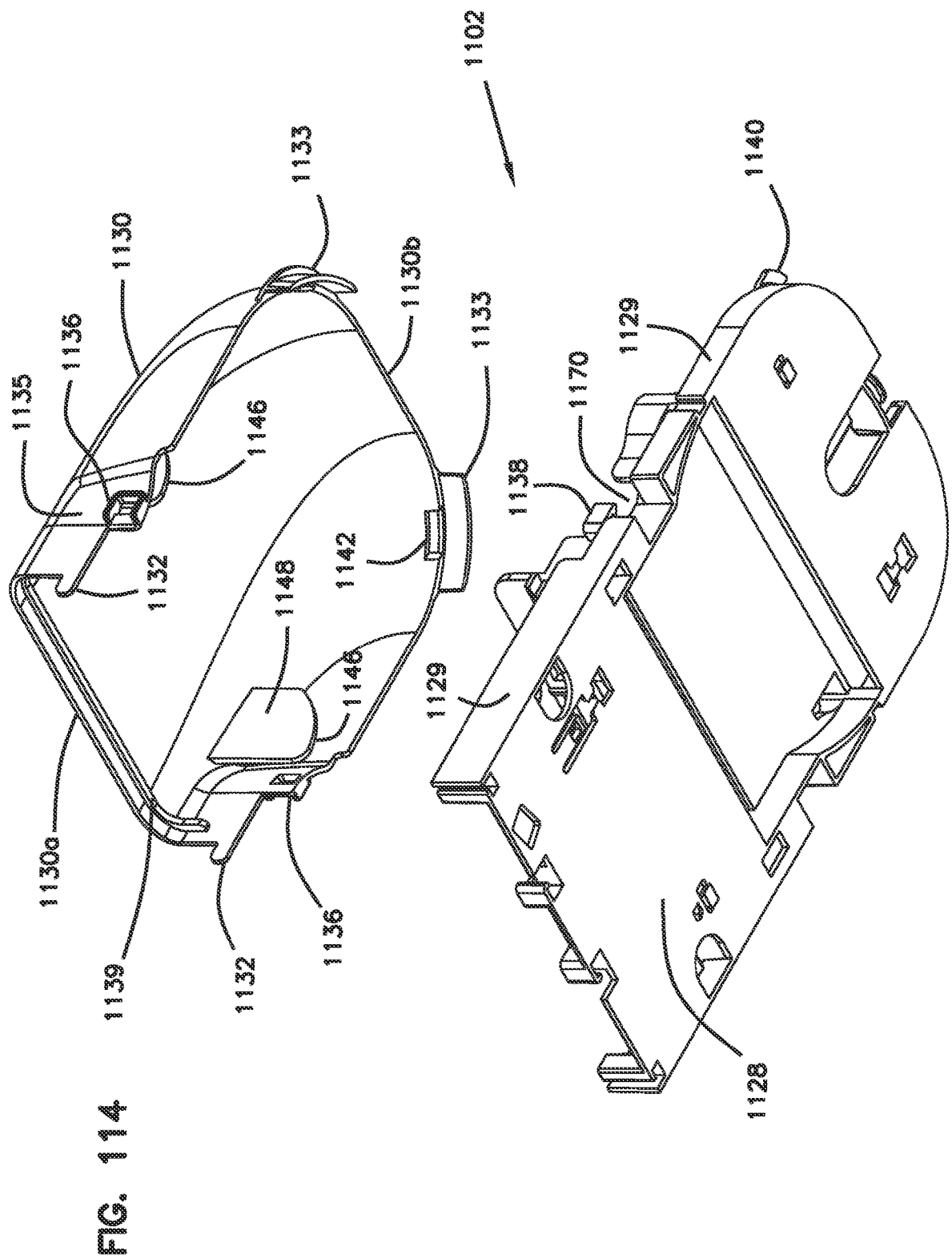
FIG. 114 is a bottom, perspective view of a patching tray that is part of the fiber management component of FIG. 108.
Figure 115:
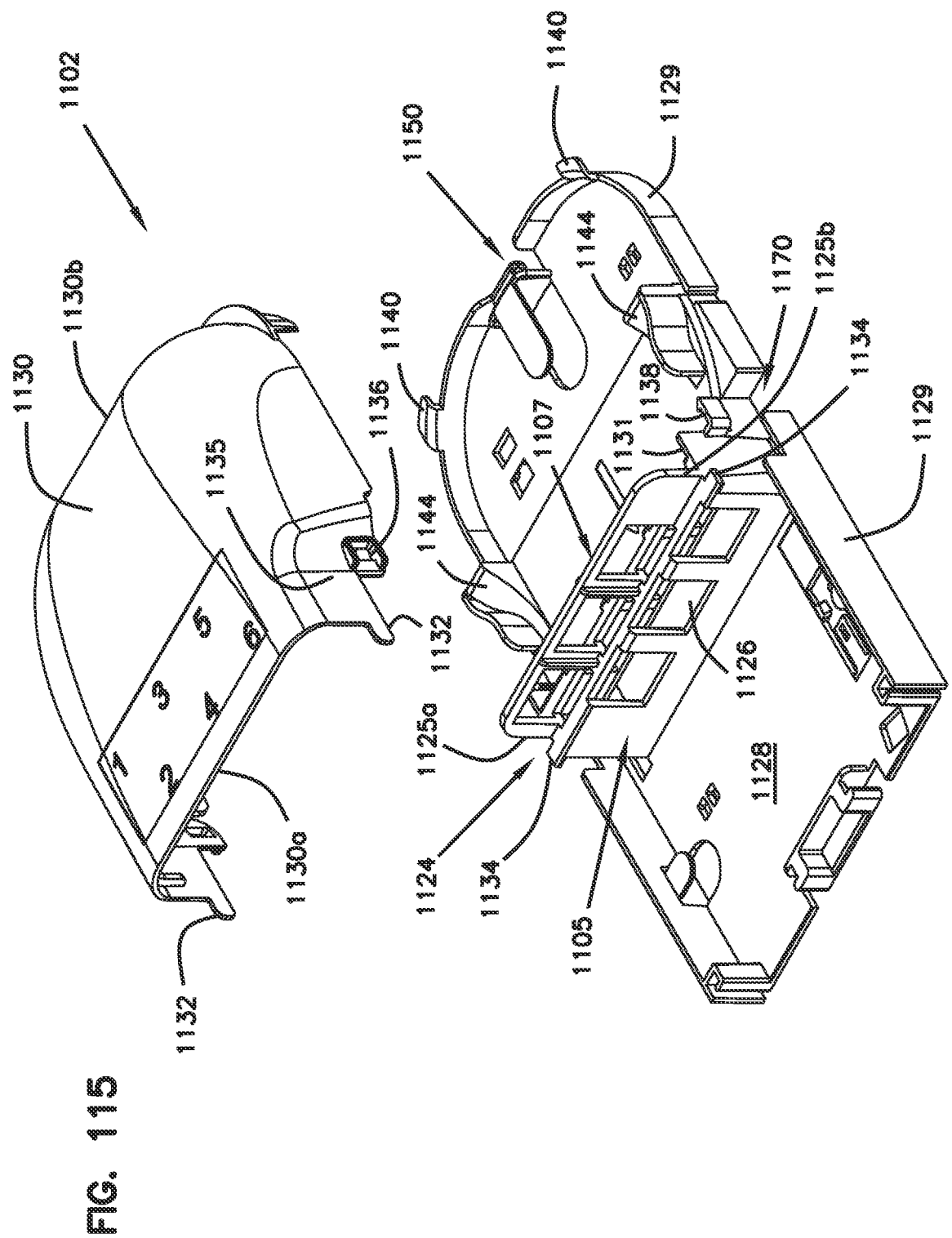
FIG. 115 is top, perspective view of the patching tray of FIG. 114.
Figure 116:
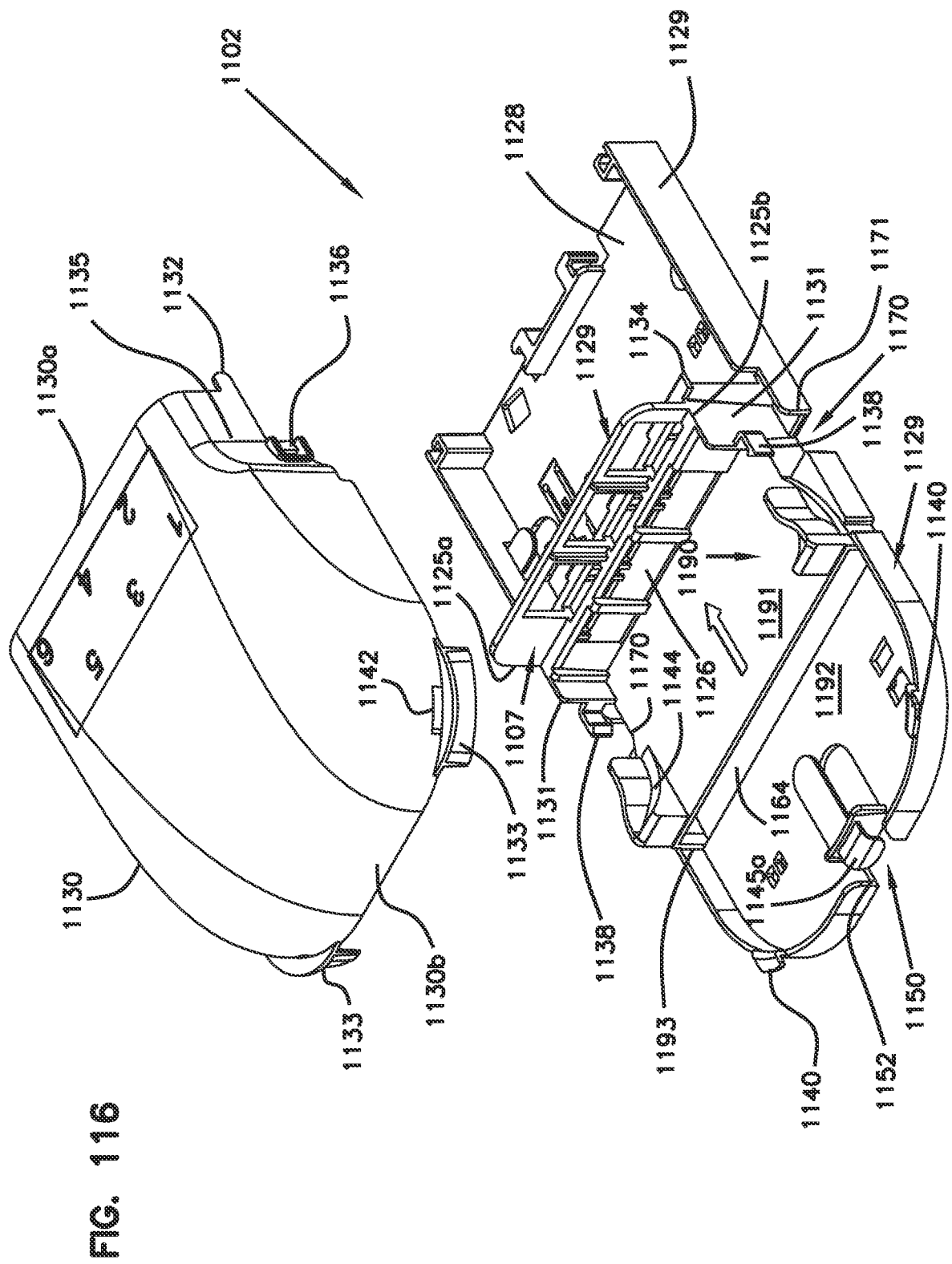
FIG. 116 is another top, perspective view of the patching tray of FIG. 114.
Figure 117:
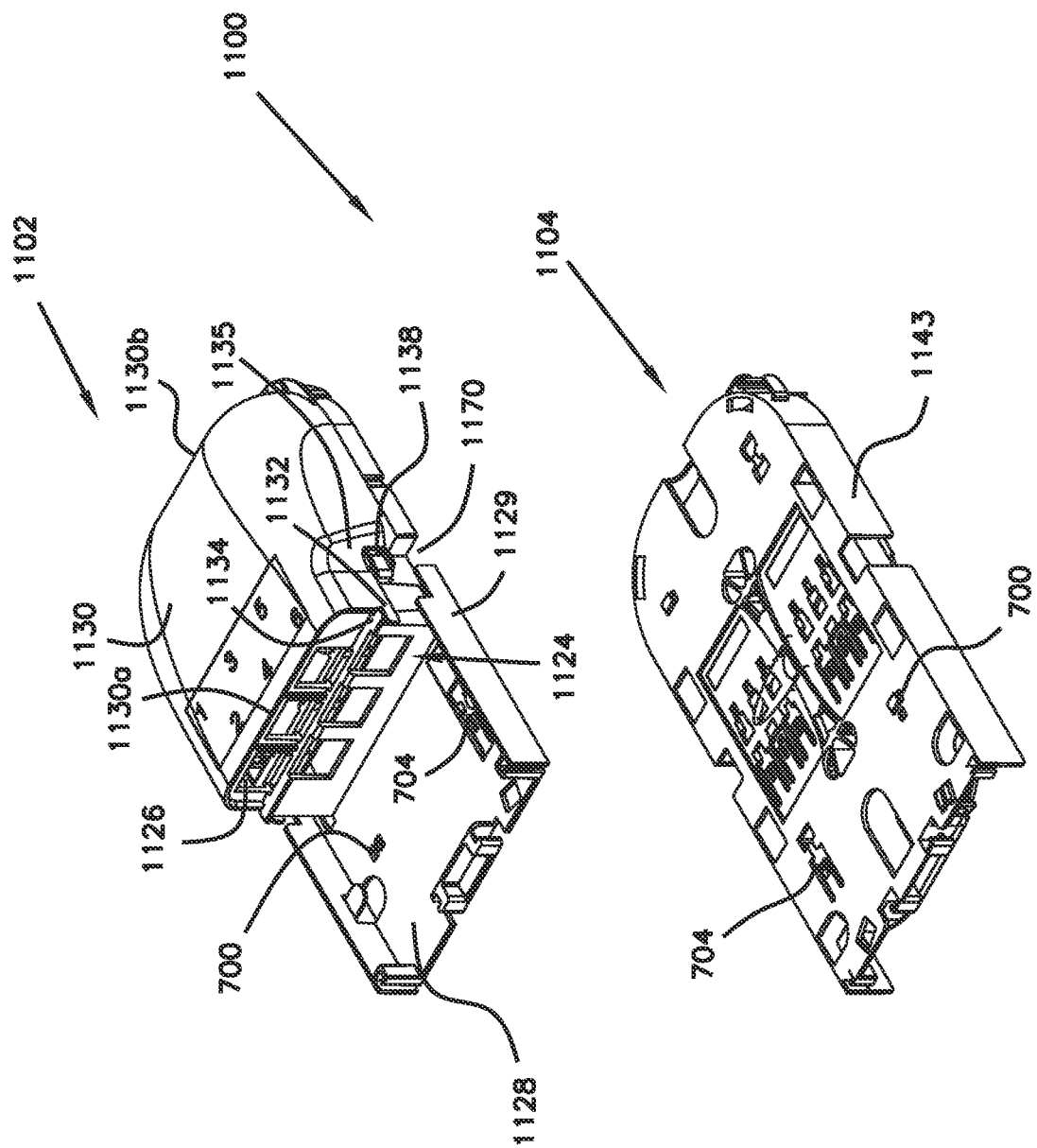
FIG. 117 is a top, perspective, exploded view of the fiber management component of FIG. 108.
Figure 118:
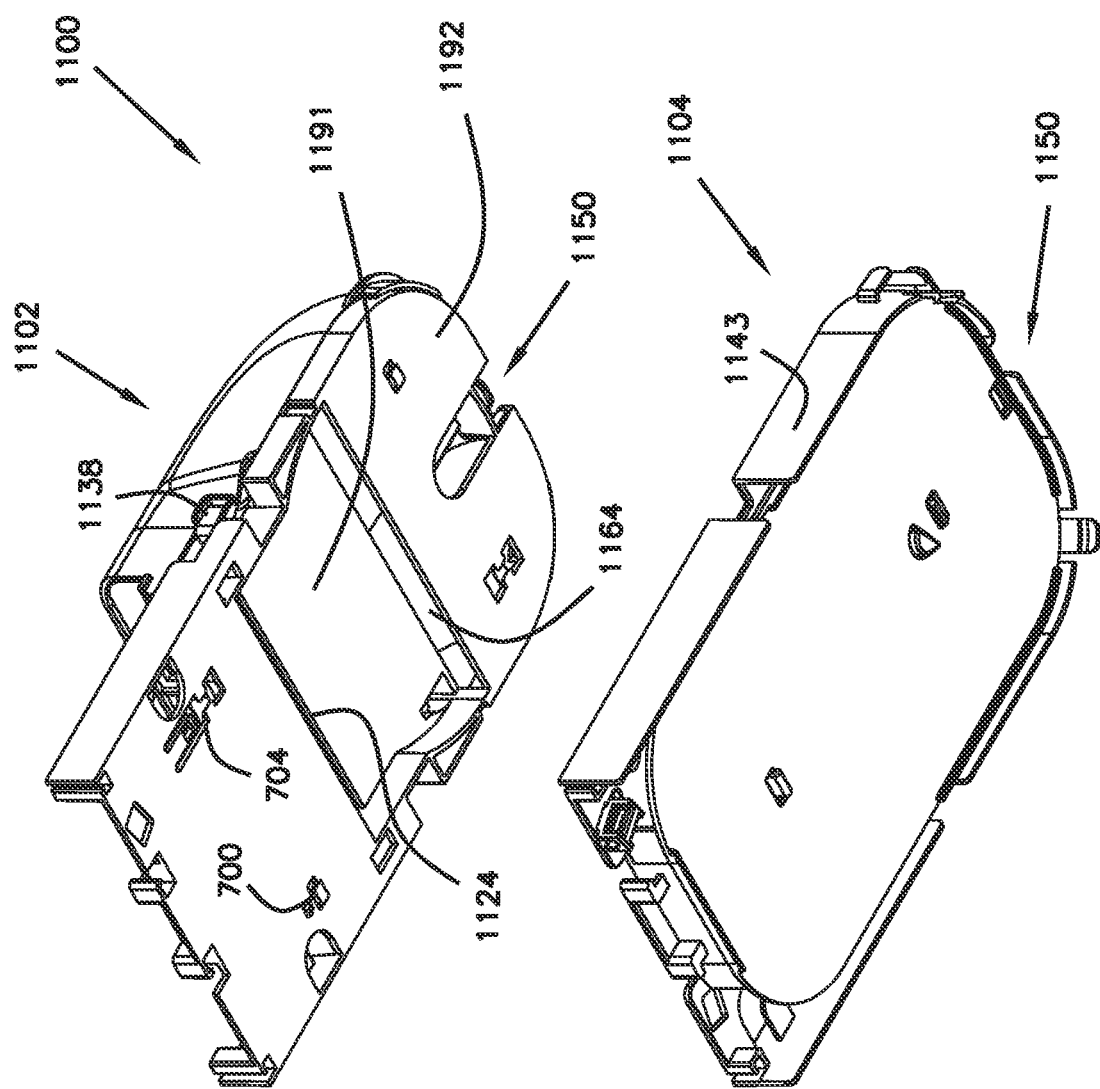
FIG. 118 is a bottom, perspective, exploded view of the fiber management component of FIG. 108.

Referring to FIGS. 108 and 115, the patch tray 1102 includes a vertical adapter mounting panel 1124 including a plurality of adapter mounting locations 1126 for mounting fiber optic adapters of the type previously described herein. The panel 1124 has a first side 1105 (FIG. 115) that faces toward the first end 1106 of the component 1100, and a second side 1107 (FIG. 116) that faces toward the second end 1108 of the component 1100. When the fiber optic adapters are mounted to the adapter mounting panel 1124, first ports of the fiber optic adapters face toward the first end 1106 of the fiber management component 1100 and are adapted for receiving the connectorized ends of fibers corresponding to drop cables. When the fiber optic adapters are mounted to the adapter mounting panel 1124, second ports of the adapters face toward the second end 1108 of the fiber management component 1100 and are adapted to receive connectorized ends of pigtails that may be optically coupled to optical fibers of a feeder cable. For example, as previously described in other multi-layer insert units disclosed herein, the connectorized pigtails can be spliced to optical fibers of the feeder cable or cables located at the bottom side of the splice tray 1104. It will be appreciated that the bottom side of the splice tray 1104 (which is shown covered in FIGS. 110 and 111, but is visible in FIG. 113) can have the same general configuration previously described with respect to the splice tray 938. For example, splice holder modules 940 (see FIG. 112) and like structures can be mounted at the bottom side of the splice tray 1104. Also, fiber guiding, looping, protecting, storing and managing features of the type previously described herein with respect to the splice tray 938 or elsewhere can also be provided at the bottom side of the splice tray 1104.

In certain examples, the adapter mounting panel 1124 can have a stepped configuration in which a top row of the adapter mounting openings 1126 can be offset in a direction toward the second end 1108 of the fiber management component 1100 relative to a bottom row of the adapter mounting locations 1126.

Referring to FIGS. 114-117, it will be appreciated that the patching tray 1102 can include a main tray body 1128 which is unitarily formed with the adapter mounting panel 1124. Additionally, the patching tray 1102 can include a removable cover 1130 that attaches to the main tray body 1128 by a snap-fit connection or by other means. As depicted, the removable cover is shaped to define a dome-like arrangement that contours toward the second end 1108 of the fiber management component 1100. The cover 1130 has a first end 1130a that is positioned at the adapter mounting panel 1124 and a second end 1130b that is positioned at the second end 1108 of the component 1100. Referring to FIGS. 114-117, the removable cover 1130 includes retention tabs 1132 at the first end 1130a of the cover 1130 that are positioned to be located adjacent to minor sides of the fiber management component 1100 and that are configured to hook beneath retainers 1134 that project laterally from opposite ends 1125a, 1125b of the adapter mounting panel 1124. A rail 1139 (see FIG. 114) of the cover 1130 is positioned at the first end of the cover 1130 and is adapted to hook over a top end of the adapter mounting panel 1124. The rail 1139 extends across a width of the cover 1130 and projects downwardly from an inner side of the cover 1130. The removable cover 1130 also includes side catches 1136 that provide a snap-fit connection with respect to corresponding cantilever latches 1138 of the main tray body 1128. The cantilever latches 1138 can have base ends unitarily formed with side walls 1131 of the adapter mounting panel 1124 that project from ends 1125a, 1125b of a main panel body 1125 of the adapter mounting panel 1124 toward the second end 1108 of the component 1100. The main panel body 1125 of the adapter mounting panel 1124 extends across a width of the main tray body 1128 and the ends 1125a, 1125b are inwardly offset from a perimeter wall 1129 of the main tray body 1128. The side walls 1131 are parallel to and inwardly offset relative to side portions of the perimeter wall 1129. The cover 1130 includes contoured, side inset portions 1135 that extend inwardly to define laterally inwardly recessed regions at the outside of the cover 1130 adjacent the first end 1130a. The inwardly recessed regions are inwardly inset relative to side portions of the perimeter wall 1129 of the main tray body 1128 when the cover 1130 is attached to the main tray body 1128.

The main tray body 1128 also includes retention tabs 1140 at the second end 1108 of the fiber management component 1100 that project outwardly from the perimeter wall 1129 and fit within corresponding retention openings 1142 defined by the removable cover 1130 adjacent contoured/domed end portion. The cover 1130 can include corner projections 1133 which reinforce the corners of the cover 1130 and function as handles or release elements that can be manually pulled outwardly to resiliently flex the cover 1130 to disengage the retention openings 1142 from the retention tabs 1140 to detach the cover 1130 from the main tray body 1128. In certain examples, when the cover 1130 is moved between an attached position and a detached position relative to the main tray body 1128, the cover pivots generally at the location of the rail 1139 to unhook the retention tabs 1132 from the retainers 1134. In certain examples, the main tray body 1128 can include curved support surfaces 1144 that engage curved free ends 1146 of downward reinforcing projections 1148 integrated with the removable cover 1130. The interface between the curved free ends 1146 and the curved support surfaces 1144 guides pivoting motion of the cover 1130 relative to the main tray body 1128 as the cover 1130 is pivoted between the detached and attached positions.

In certain examples, the second end 1108 of the fiber management component 1100 can include a fiber routing notch 1150 (see FIGS. 109, 110 and 116) for allowing the connectorized pigtails to be routed from the bottom side of the splice tray 1104 to the top side of the main tray body 1128 of the patch tray 1102. The fiber routing notches 1150 can have outer portions 1152 that extend through the perimeter wall 1129 of the main tray body 1128 and a perimeter wall 1143 of the splice tray 1104 such that connectorized pigtails can be routed laterally into the notch 1150 without requiring the fiber optic connectors to be threaded through the notch 1150. Thus, the notch has an open outer side through the perimeter walls 1129, 1143, and also extends through the main tray walls of the trays 1102, 1104 between the upper and lower sides of the fiber management component 1100. Fiber retention tabs 1145a, 1145b (see FIGS. 113 and 116) can be provided at the notch 1150 adjacent the top and bottom sides of the fiber management component 1100.

It is preferred for the connectorized pigtails to be routed from the bottom side of the splice tray 1104, through the open-sided notch 1150 or other through-passage (e.g., passage 1164) to the top side of the patching tray 1102 where the connectorized ends of the pigtails are plugged into the adapter ports at the second side 1107 of the fiber optic adapter panel 1124. The connectorized pigtails typically include overlength that is preferably coiled with the coiled portions stored under the cover 1130 in a fiber routing and storage region between the panel 1124 and the second end 1108 of the fiber management component 1100. In certain examples, the main tray body 1128 can include a tray platform 1190 including an elevated platform portion 1191 (see FIGS. 116 and 118) adjacent the second side 1107 of the adapter mounting panel 1124 that is elevated relative to a recessed platform portion 1192 (see FIGS. 116 and 118) adjacent to the second end 1108 of the fiber management component 1100. A vertical step 1193 (see FIG. 116) is defined between the platform portions 1191, 1192. An opening 1164 can be defined at the step 1193. The opening 1164 has a length that extends across a width of the main tray body 1128. In certain examples, the opening 1164 provides access to a region located vertically between the bottom side of the elevated platform portion 1191 and the top side of the splice tray 1104. In certain examples, the coiled portions of the connectorized pigtails can extend through the opening 1164 and into the region between the elevated platform portion 1191 and the top side of the splice tray 1104. For example, first portions (e.g., about half-portions) of the coiled portions can be located over the recessed platform portion 1192 and second portions (e.g., about half-portions) can be located under the elevated platform portion 1191. In this way, the coiled portions can be separated from the portions of the connectorized pigtails that are routed and plugged into the ports of the fiber optic adapters at the second side 1107 of the adapter mounting panel 1124 to facilitate fiber management. In other examples, portions of at least some of the coil portions may be routed over the elevated platform portion 1191 as well.

In certain examples, it may be desirable to route fibers directly from the bottom side of the splice tray 1104 to the top side of the patching tray 1102 without passing through the interior region of the fiber management component 1100 covered by the cover 1130. For example, it may be desired to route fibers directly between the bottom side of the splice tray 1104 and portion of the top side of the patching tray 1102 located between the first end of the component 1100 and the first side 1105 of the fiber optic adapter panel 1124. One example may be a situation in which a drop fiber is desired to be spliced directly to a feeder fiber. To accommodate this, bypass paths 1170 are provided at each of the minor sides of the fiber management component 1100 adjacent the opposite ends 1124a, 1124b of the adapter mounting panel 1124. The bypass paths 1170 are enabled at least in part by the inwardly inset positioning of the ends 1125a, 1125b and side walls 1131 of the adapter mounting panel 1124 relative to the perimeter wall 1129 of the main tray body 1128, as well as the side inset portions 1135 of the cover 1130.

The bypass paths 170 extend around the ends 1124a, 1124b of the adapter mounting panel 1124 and then from the top side of the patching tray 1102 to the bottom side of the splicing tray 1104 through the main platforms of the trays 1102, 1104. The bypass paths 1170 have open outer sides 1171 that extend through the outer perimeter wall 1129 of the main tray body 1128 of the tray 1102 as well as the perimeter wall 1143 of the tray 1104. The bypass paths 1170 allow the optical fibers to bypass the adapter mounting panel 1124 and bypass the enclosed region which is enclosed by the removable cover 1130. This allows the fiber to be routed from the frame 914, across a first region of the patching tray 1100 defined between the first end 1106 of the patching tray 1102 and the first side 1105 of the adapter mounting panel 1124 to the bypass path 1170. The bypass path allows the optical fiber to be routed downwardly through the bypass path from the top side of the patch tray 1102 to the bottom side of splice tray 1104 to allow for management (e.g., fiber storage, splicing, etc.) of the optical fiber at the bottom side of splice tray 1104.

Figure 122:
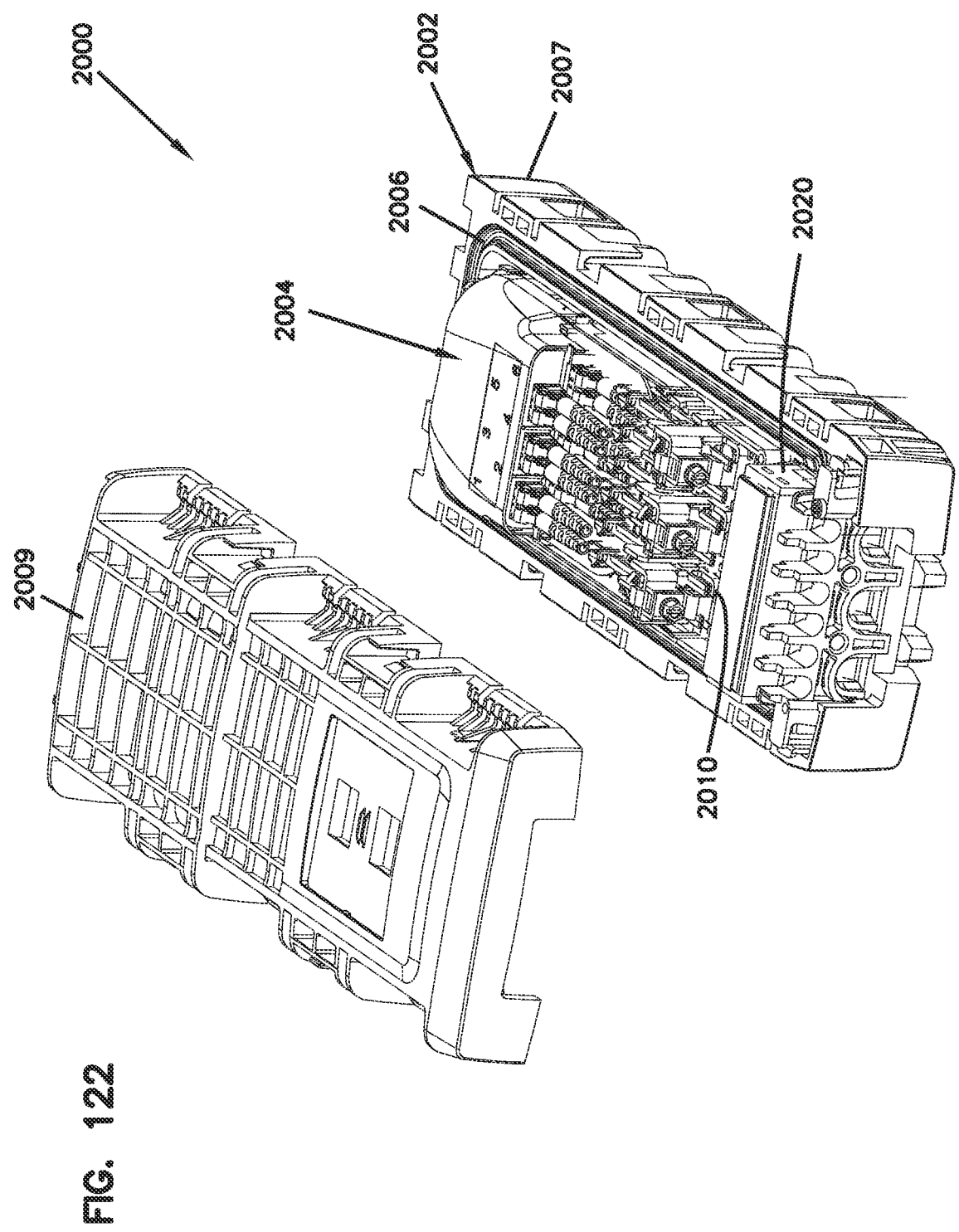
Figure 123:
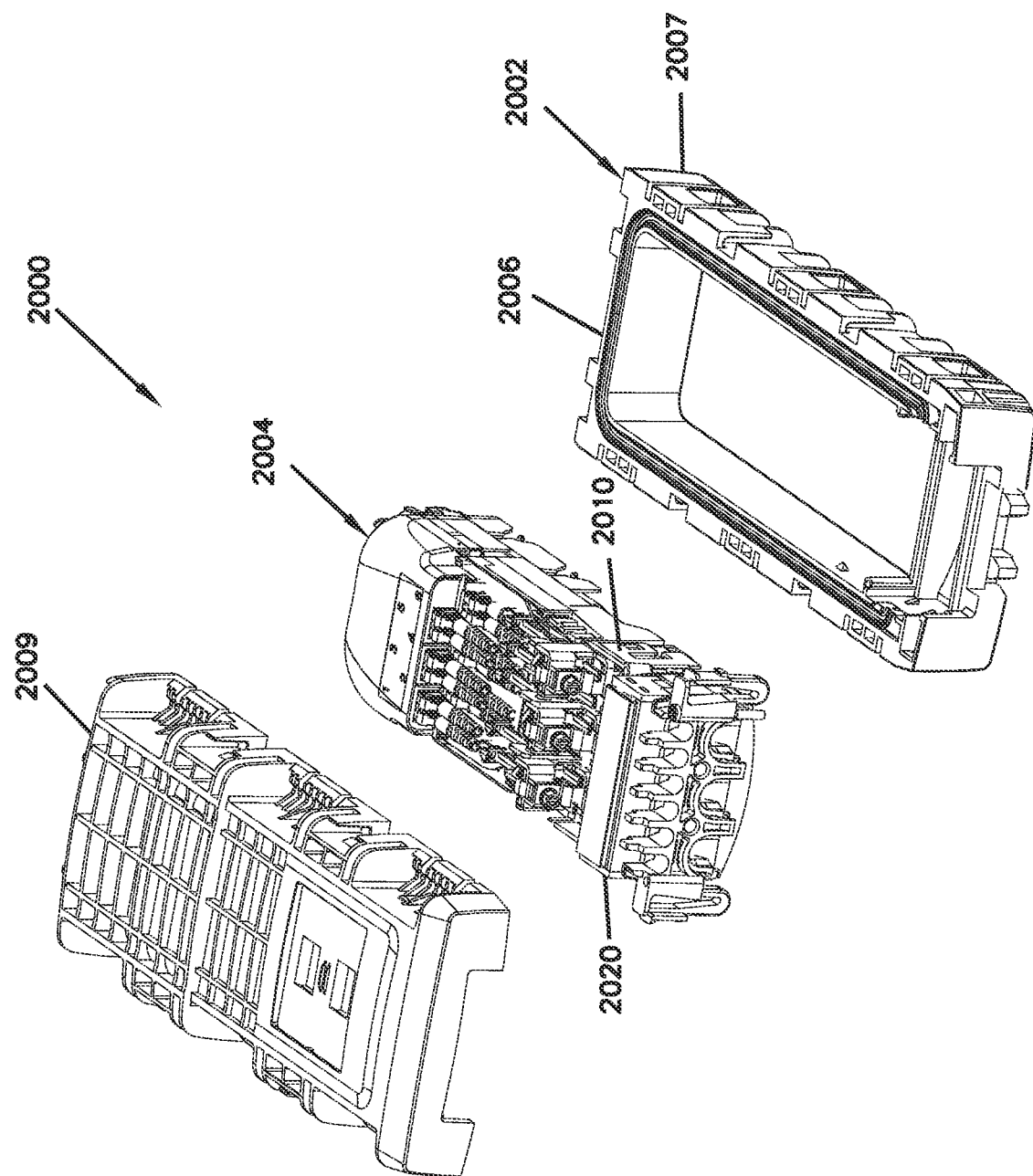
Figure 130:
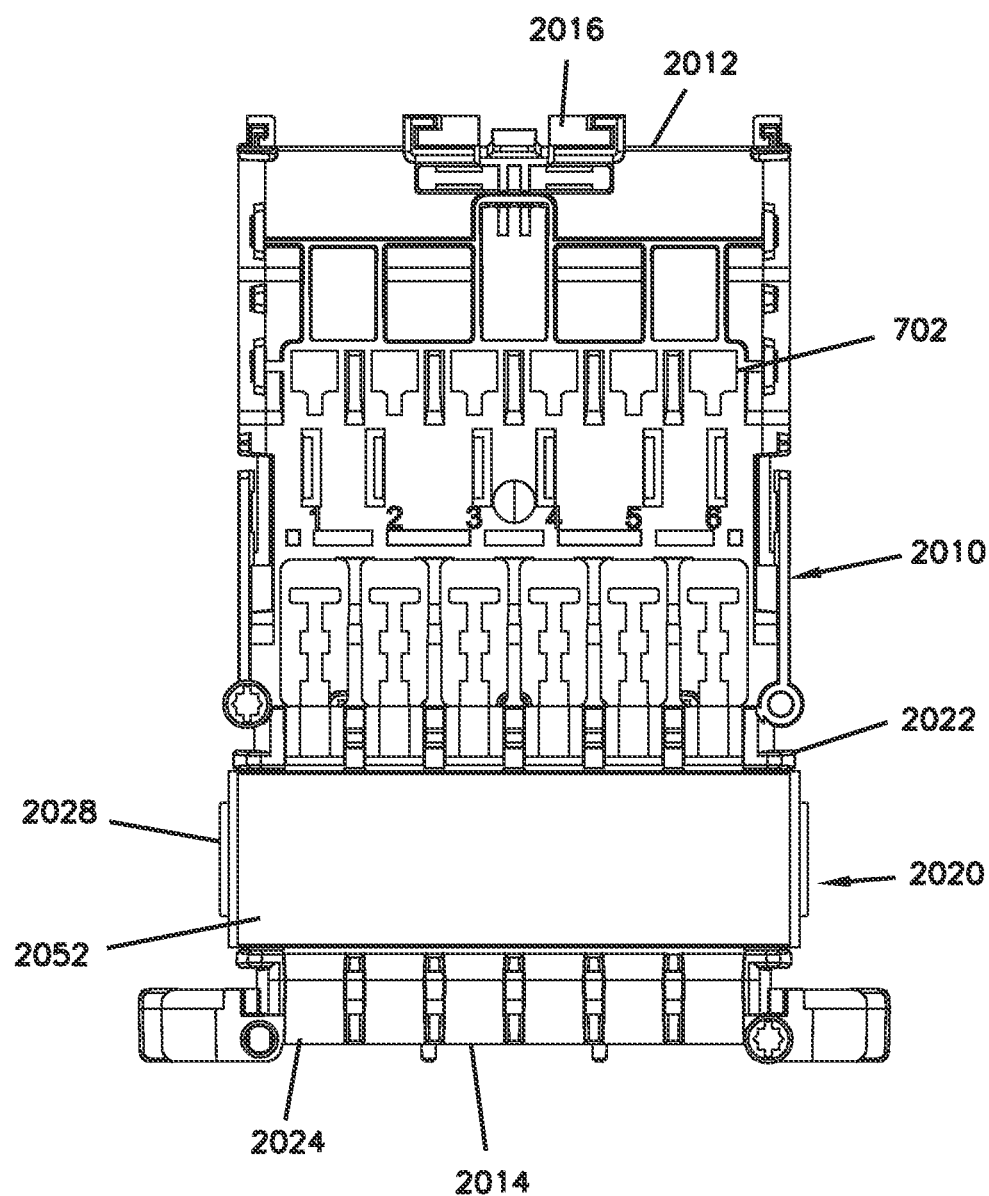
Figure 131:
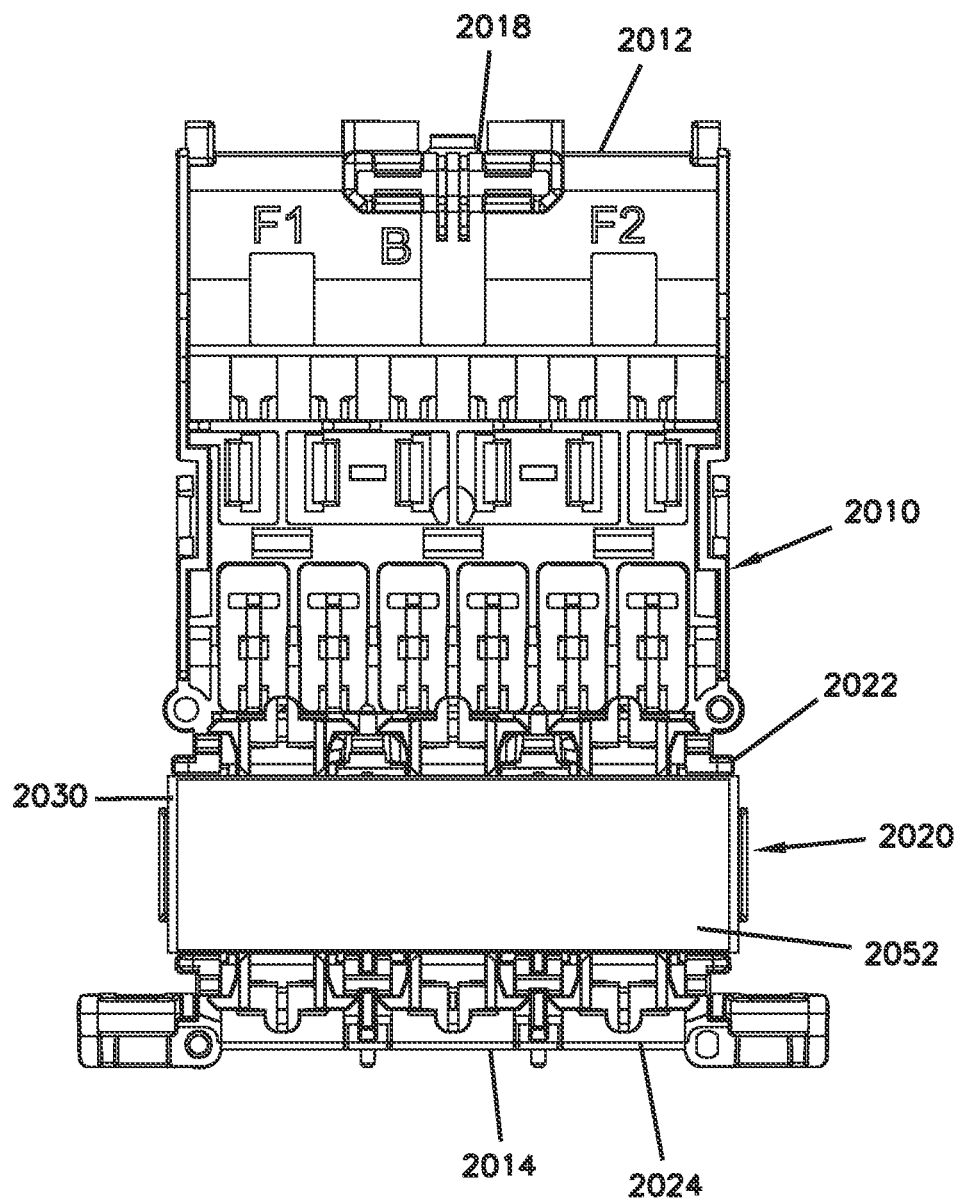

FIGS. 121-123 depict another telecommunications device 2000 in accordance with the principles of the present disclosure. It will be appreciated that the telecommunications device 2000 is configured to provide functionality of the type previously described with respect to other examples disclosed herein. For example, the telecommunications device 2000 can provide cable sealing, cable anchoring, splicing functionality, patching functionality, drop cable management, feeder cable management and other functionalities. As depicted at FIG. 122, the telecommunications device 2000 includes a re-enterable enclosure 2002 containing an insert unit 2004. The enclosure 2002 is preferably environmentally sealed and includes a gasket 2006 for providing perimeter sealing between a base 2007 and a cover 2009 of the enclosure 2002. The enclosure 2002 has a cable access end 2008 through which cables (e.g., drop cables and feeder cables/pass-through cables) can be routed into an interior of the enclosure 2002. The insert unit 2004 includes a cable anchoring and sealant containment frame 2010 (see FIGS., 128-132) having a first end 2012 and an opposite second end 2014. The first end 2012 includes an interface 2016 (see FIG. 130 which depicts a top side of the cable anchoring and sealant containment frame 2010 adapted for anchoring drop cables) configured for mating with a complementary interface of a fiber management component (e.g., the fiber management component 1100) such that the cable anchoring and sealant containment frame 2010 and the fiber management component can be coupled together end-to-end. Additionally, the first end 2012 includes a pivot interface 2018 (see FIG. 131 depicting the bottom side of the cable anchoring and sealant containment frame 2010 adapted for anchoring feeder cables) configured for attaching a pivotal feeder fiber management tray such as the fiber management tray 964. The upper and lower sides of the cable anchoring and sealant containment frame 2010 can include attachment locations for allowing the direct anchoring of drop cables and/or feeder cables (e.g., via tie wraps or the like) or for attaching intermediate anchoring devices used to secure drop cables and feeder cables to the cable anchoring and sealant containment frame 2010. In certain examples, connection interfaces such as one or more portions of the connection interface 702 can be integrated into the frame 2010 for facilitating attaching anchoring devices to the frame 2010.

The second end 2014 of the cable anchoring and sealant containment frame 2010 is configured for providing axial containment of a sealant arrangement 2020 at a location adjacent the cable access end 2008 of the enclosure 2002. As used herein, an axial orientation is an orientation that coincides with the direction cables pass through the sealant arrangement 2020. By contrast, as used herein, a radial orientation is an orientation that extends along a plane perpendicular relative to the axial orientation. Based on these definitions, an axial face seal is a seal that is pressurized in the axial orientation, while a radial seal is a seal that is pressurized in the radial orientation. In certain examples, the sealant arrangement 2020 can include axial face sealing portions and radial sealing portions that cooperate together to provide effective sealing with respect to the base 2007 and the cover 2009.

The second end 2014 of the cable anchoring and sealant containment frame 2010 includes inner and outer primary axial sealant containment structures 2022 and 2024 (see FIGS. 130 and 131) between which the sealant arrangement 2020 is contained. Examples of containment structures include walls, plates, fingers, retention elements and combinations thereof suitable for providing containment of sealant. The inner and outer primary sealant containment structures 2022, 2024 are coupled together by intermediate struts 2026 (see FIGS. 135 and 138-142) that extend axially between the containment structures 2022, 2024. During sealing, it is preferred for the containment structures 2022, 2024 to be axially fixed relative to one another and not axially adjustable relative to one another. For example, the intermediate struts 2026 can be configured to axially fix the containment structures 2022, 2024 relative to one another. The sealant containment structures 2022, 2024 can also interface with the base 2007 and the cover 2009 when the base 2007 and the cover 2009 are closed so that the base 2007 and the cover 2009 prevent movement of the containment structures 2022, 2024 relative to one another in the axial orientation. For example, the containment structures 2022, 2024 can include projections or other elements that fit within corresponding receptacles defined by the base 2007 and the cover 2009. For example, the base 2007 and the cover 2009 can include slots or other structures extending across the width of the enclosure 2002 for receiving upper and lower ends of the containment structures 2022, 2024. Other interlock configurations could also be used.

Figure 124:
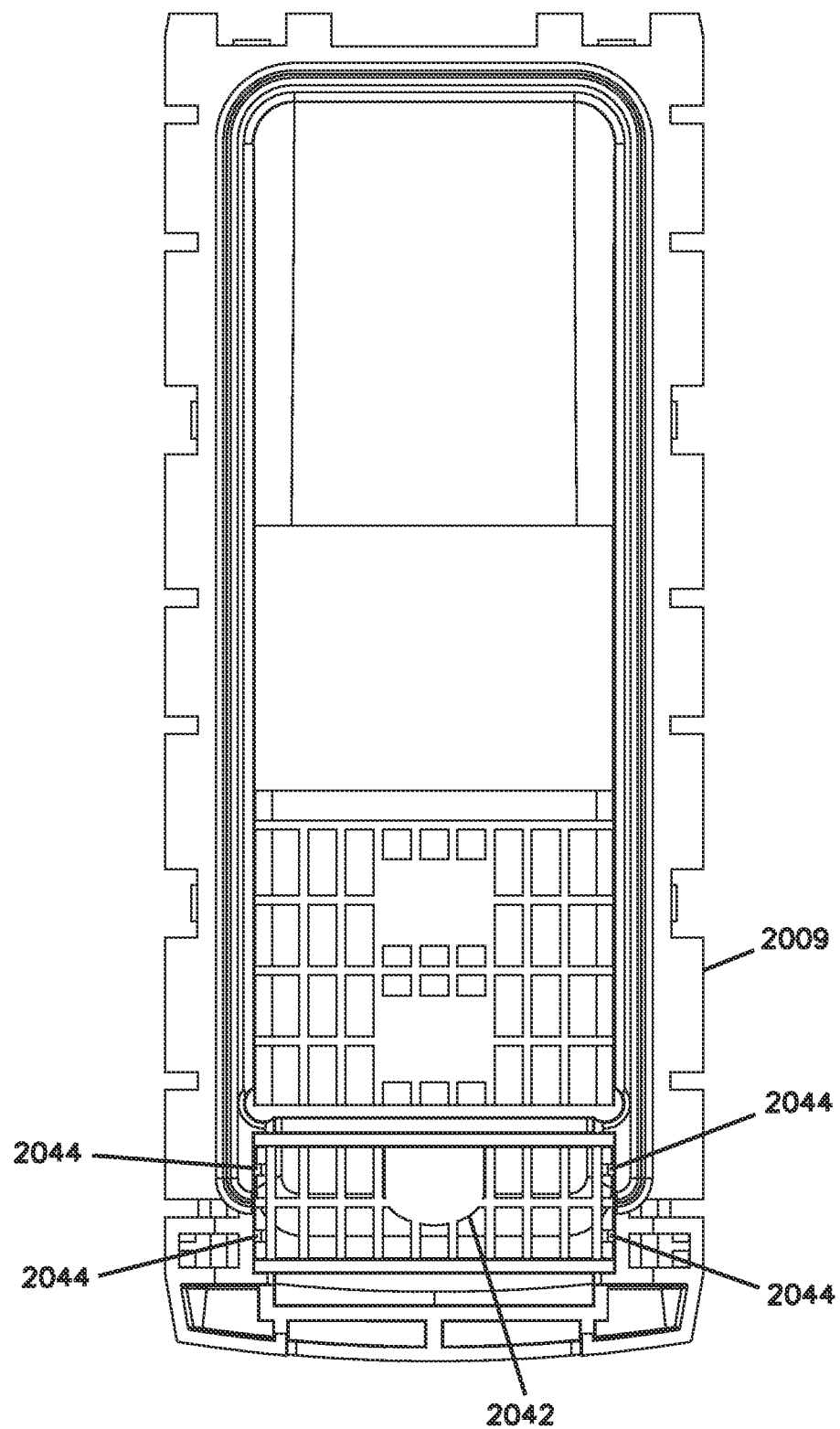
Figure 125:
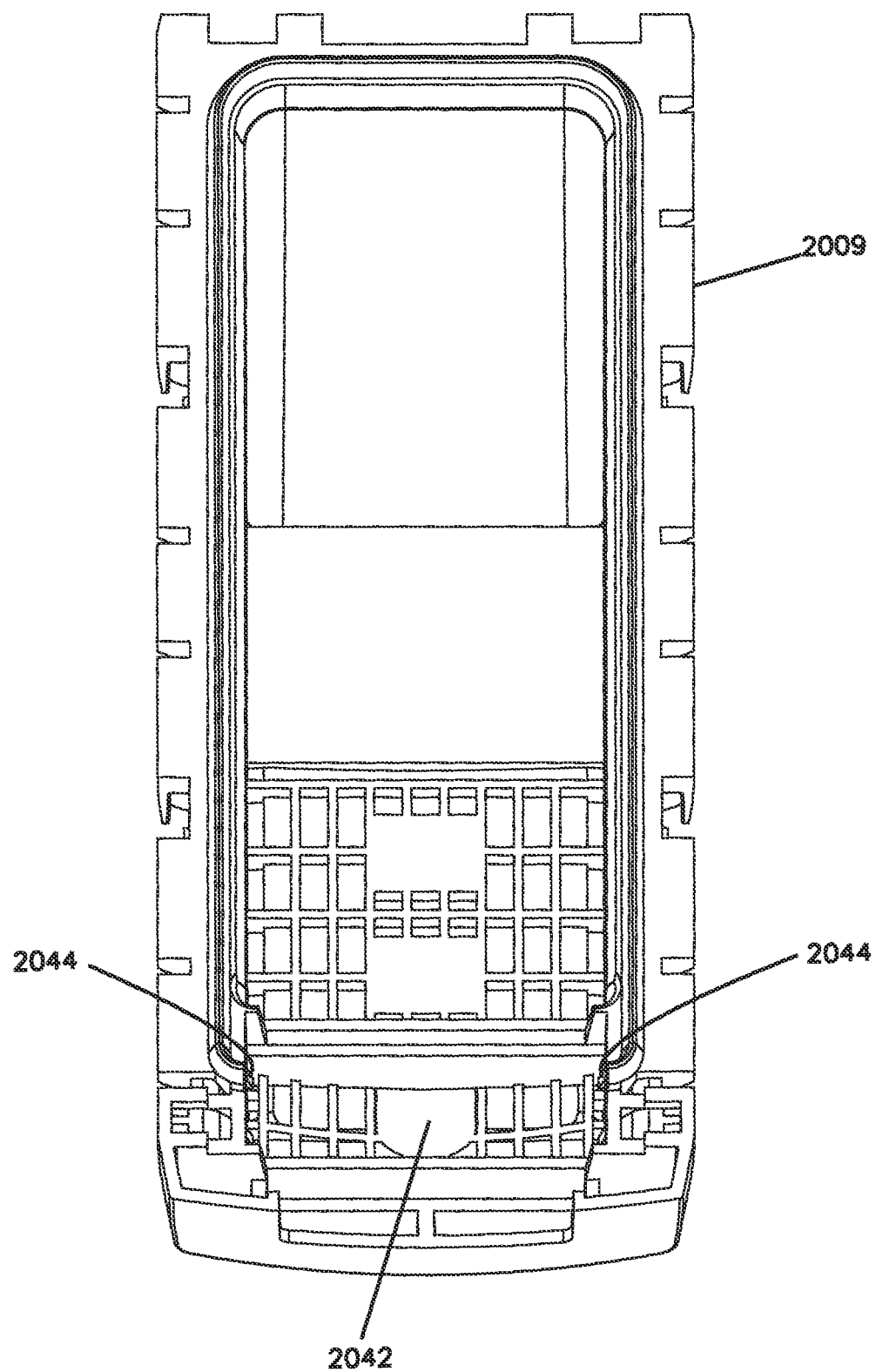
Figure 126:
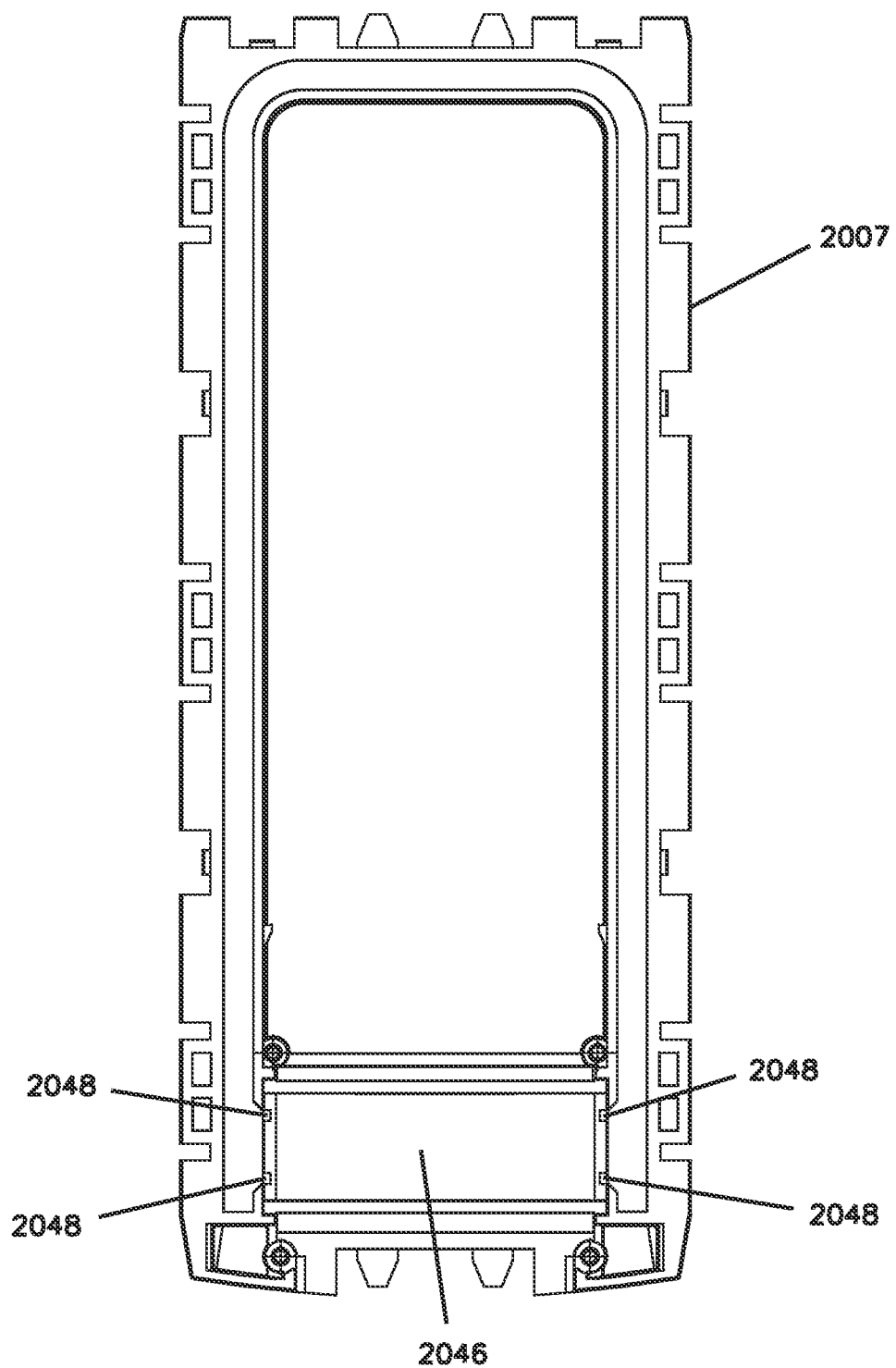
Figure 127:
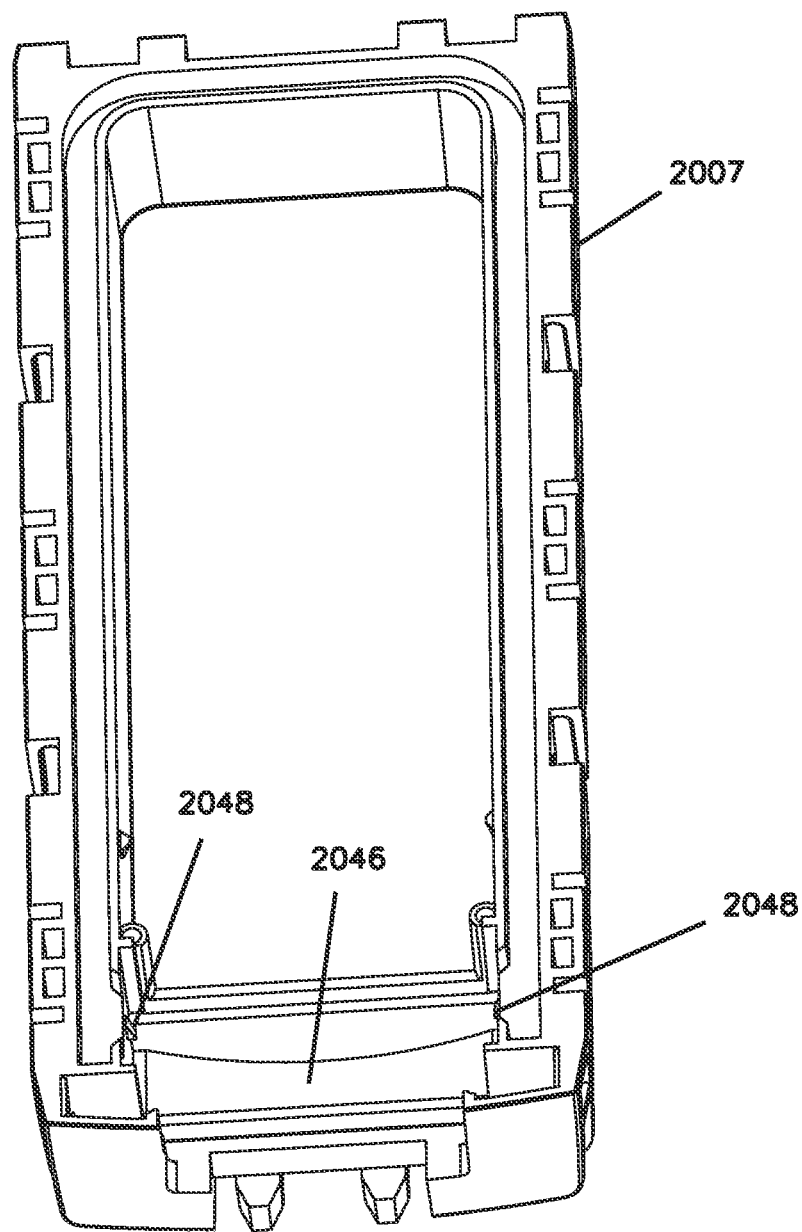

Referring to FIGS. 128-131, the sealant arrangement 2020 includes an upper sealant block 2028, a lower sealant block 2030 and an intermediate sealant block 2032 positioned between the upper and lower sealant blocks 2028, 2030. In certain examples, the upper and lower sealant blocks 2028, 2030 can have identical configurations. In certain examples, the intermediate sealant block 2032 is over-molded over the intermediate struts 2026 such that the intermediate sealant block 2032 is carried with and secured to the cable anchoring and sealant containment frame 2010 at a location between the inner and outer primary sealant containment structures 2022, 2024. The upper and lower sealant blocks 2028, 2030 can each include a volume of sealant 2034 and a reinforcing carrier 2036 (see FIG. 134) enclosed within (e.g., over-molded within) the volume of sealant 2034. The carrier 2036 can include a plurality of openings 2038 through which the volume of sealant 2034 can flow. Additionally, the carrier 2036 can include tabs 2040 adjacent ends of the volume of sealant 2034. The tabs 2040 allow the upper and lower sealant blocks 2028, 2030 to respectively be snapped within corresponding locations of the cover 2009 and the base 2007. For example, referring to FIGS. 124 and 125, the cover 2009 includes a receptacle 2042 for receiving the upper sealant block 2028. Catches 2044 are provided at opposite ends of the receptacle 2042 for engaging with the tabs 2040 of the upper sealant block 2028 for retaining the upper sealant block 2028 within the receptacle 2042. In certain examples, the receptacle 2042 can have a concave curvature extending across a width of the enclosure 2002. Additionally, reinforcing ribs can be provided within the receptacle 2042. Similarly, referring to FIGS. 126 and 127, the base 2007 includes a receptacle 2046 including catches 2048 adapted to engage the tabs 2040 of the carrier 2036 within the lower sealant block 2030 to secure the lower sealant block 2030 within the receptacle 2046. The receptacle 2046 has a bottom surface 2050 with a concave curvature that curves across the width of the enclosure 2002. The curvatures of the receptacles 2042 and 2046 provide open space for receiving sealant when the sealant arrangement 2020 is pressurized.

Referring to FIGS. 128-131, the sealant arrangement 2020 includes upper and lower springs 2052 positioned respectively above the upper sealant block 2028 and below the lower sealant block 2030. As depicted, the springs 2052 are leaf springs, but other spring configurations can be used. The springs 2052 are configured to apply a spring biasing force to the sealant of the sealant arrangement 2020 when the sealant arrangement 2020 is pressurized. For example, when the enclosure 2002 is closed, the upper sealant block 2028, the lower sealant block 2030 and the intermediate sealant block 2032 are pressurized between the base 2007 and the cover 2009. The amount of pressurization depends upon the number of cables routed through the sealant arrangement 2020 as well as the size of the cables. When the sealant arrangement 2020 is pressurized, sealant from the upper and lower sealant blocks 2028, 2030 flows through the openings 2038 in the carriers 2036 into open regions defined by the receptacles 2042, 2046. As the sealant flows through the openings 2038, the springs 2052 are engaged by the flowing sealant and caused to flex. Additionally, the carriers 2036 can be constructed of a flexible material so that pressurization of the upper and lower sealant blocks 2028, 2030 causes volumes of sealant 2034 as well as the carriers 2036 to flex upwardly/downwardly causing their respective springs 2052 to flex into the open regions defined by the receptacles 2042, 2046. In this way, the receptacles 2042, 2046 provide space for receiving displaced volume of the sealant of the sealant arrangement 2020.

In certain examples, the upper and lower sealant blocks 2028, 2030 have cable sealing faces that contact respective sealing faces of the intermediate sealant block 2032. In certain examples, the sealing faces are planar. In certain examples, the sealing faces do not have any predefined openings or notches for receiving cables.

It will be appreciated that since predefined openings are not defined within the sealant arrangement 2020, a substantial amount of sealant is displaced when cables are loaded into the sealant arrangement 2020. It will also be appreciated that since the inner and outer primary sealant containment structures 2022, 2024 are axially fixed relative to one another, the inner and outer primary sealant containment structures 2022, 2024 cannot move axially relative to one another to accommodate the displacement of sealant by the cables routed through the sealant arrangement 2020. This being the case, the telecommunications device 2000 is equipped with other features for accommodating sealant displacement so as to allow for relatively large range taking with respect to different cable sizes and to also accommodate different numbers of cables.

As described above, the receptacles 2042, 2046 within the cover 2009 and the base 2007 provide open space for sealant to flow during pressurization of the sealant arrangement 2020, and the springs 2052 ensure that adequate pressure application is maintained on the sealant arrangement 2020. Additionally, the cable anchoring and sealant containment frame 2010 can include port reducers 2054 (see FIGS. 135-139) that mount to the inner and outer primary sealant containment structures 2022, 2024. The port reducers 2054 mount at enlarged port locations 2056 of the inner and outer primary sealant containment structures 2022, 2024. The enlarged port locations 2056 are sized to receive relatively large cables. If it is desired to accommodate smaller cables, the port reducers 2054 are mounted at the enlarged port locations 2056. The port reducers 2054 define reduced-size port locations 2058 corresponding to smaller cable diameters. In certain examples, port reducers 2054 can snap into the enlarged port locations 2056 from the bottom side of the cable anchoring and sealing containment frame 2010. In certain examples, the port reducers 2054 can also include volume occupying portions 2060 that project into the intermediate space between the inner and outer primary sealant containment structures 2022, 2024 when the port reducers 2054 are secured to the inner and outer sealant containment structures 2022, 2024. In certain examples, the volume occupying portions 2060 can fit within predefined recesses 2062 (see FIG. 149) defined at primary inner and outer sides of the intermediate sealant block 2032.

When it is desired to route smaller cables through the sealant arrangement 2020, the port reducers 2054 occupy volume between the inner and outer primary sealant contact structures 2022, 2024 and within the recesses 2062 to ensure that the sealant arrangement 2020 is adequately pressurized when the enclosure 2002 is closed. As shown at FIG. 142, port reducers 2054 include latches 2064 (e.g., resilient cantilever-type latches) for securing the port reducers 2054 to the inner or outer primary sealant containment structure 2022, 2024 via a connection such as a snap-fit connection. Other connection methods such as fasteners or the like could also be used.

Referring to FIGS. 142-146, each of the port reducers 2054 includes two of the latches 2064, two stabilizing projections 2065 and two side channels 2067 having open sides that face laterally outwardly from opposite sides of each port reducer 2054. The port reducers 2054 mount between posts 2069 (e.g., dividers, fingers, separators) (see FIG. 139) of the inner and outer primary sealant containment structures 2022, 2024. The enlarged port locations 2056 are defined between the posts 2069. The port reducers 2054 are installed in the enlarged port locations 2056 by linearly loading the port reducers into the enlarged port locations 2056 such that guide and or rail portions of the posts 2069 slide within the side channels 2067 to guide the port reducers 2054 into position and to limit axial movement of the port reducers 2054 relative to the inner and outer primary sealant containment structures 2022, 2024. When the port reducers 2054 are fully inserted into position between the posts 2069, the latches 2064 snap within latch receivers 2071 (see FIGS. 139 and 158) defined by the sealant containment structures 2022, 2024 and the stabilizing projections 2065 fit within projection receivers 2073 defined by the sealant containment structures 2022, 2024. The port reducers 2054 each have a split (e.g., bifurcated) configuration including first and second half-portions 2054a, 2054b separated by a slot 2055. The half-portions 2054a, 2054b are connected by a flexible hinge 2057 that allows the half-portions 2054a, 2054b to move relative to one another during installation of the port reducers 2054 into the containment structures 2022, 2024 and during removal of the port reducers 2054 from the containment structures 2022, 2024. The relative movability of the half-portions 2054a, 2054b facilitates the installation and removal process. The flexible hinges 2057 form finger tabs that facilitate pressing/directing the port reducers 2054 into the enlarged port locations 2056 and pulling the port reducers 2054 from the enlarged port locations 2056.

As shown in FIGS. 145 and 146, the reduced-size port locations 2058 are generally U-shaped. As shown at FIGS. 143 and 145, the port reducers 2054 include a sealant engagement side 2066 adapted to engage the sealant of the sealant arrangement 2020. The sealant engagement side 2066 can include a sealant containment surface 2068 provided on the volume occupying portion 2060. The sealant containment surface 2068 is preferably generally perpendicular relative to the axial direction when a port reducer 2054 is mounted to one of the inner or outer primary sealing containment structures 2022, 2024. The sealant containment surface 2068 is offset to one side of the reduced-sized port location 2058 (e.g., is offset from an axis defined by the port location 2058) and is non-symmetrically arranged relative to the reduced-size port location 2058. The sealant engagement side of the port reducer 2054 also preferably includes a sealant displacement surface 2070 that is preferably angled at a non-perpendicular angle relative to the sealant containment surface 2068. The sealant displacement surface 2070 is preferably angled at an oblique angle relative to the axial orientation (e.g., the orientation defined by the cable axes of cable that pass through the sealant arrangement 2020). The surface 2070 is also orientated at an oblique angle relative to a reference plane 2033 (see FIG. 158) positioned mid-way between the containment structures 2022, 2024 which bisects the sealant arrangement 2020. In certain examples, when the sealant is pressurized, the sealant displacement surface 2070, via its angular orientation, forces sealant to deform or flow partially in a radial orientation and partially in an axial orientation.

Because the sealant displacement surface 2070 forces sealant in a radial and axial orientation, the sealant can be forced toward areas which are more difficult to seal to provide better sealing and to ensure that adequate sealant is present at the difficult to seal locations. For example, when the sealant arrangement 2020 is pressurized by closing the enclosure 2002, the sealant displacement surfaces 2070 apply forces to the sealant in directions that are obliquely angled relative to the axial orientation and the plane 2033. In the depicted example of FIG. 158, the angled sealant displacement surfaces 2070 of a pair of the port reducers 2054 corresponding to a given cable pass-through location 2091 are positioned on opposite sides of the reference plane 2033 and face toward one another (e.g., oppose each other). FIG. 158 represents a state of the sealing arrangement prior to closing the enclosure 2002 and pressurizing the sealant. When the sealant is pressurized by mating the cover 2009 and the base 2007 together to close the enclosure 2002, portions of the sealant contact the angled displacement surfaces 2070 and are forced toward the reference plane 2033 such that the sealant adjacent the cable pass-through location is axially pressurized (see FIG. 159) to provide enhanced sealing which is particularly beneficial when a cable is being sealed at the pass-through location 2091. As the enclosure 2002 is closed, the base 2007 and the cover 2009 move toward one another in an orientation that extends generally along the reference plane 2033. During sealant pressurization resulting from closing the enclosure 2002, sealant on a first side of the reference plane 2033 is forced at least partially in a first axial direction 2035 toward the reference plane 2033 and sealant on an opposite second side of the reference plane 2033 is forced at least partially in an opposite second direction 2037 toward the reference plane 2033 which opposes the first direction 2035. FIG. 159 shows the sealant deformed toward the reference plane 2033 once the enclosure 2002 has been closed.

The port reducers 2054 provide two basic functions. First, the port reducers 2054 provide a port size reducing function by defining the reduced-sized port locations 2058 within the containment structures 2022, 2024 which are smaller than the enlarged port locations 2056 in which the port reducers 2054 mount and which are adapted for accommodating smaller cables than the enlarged port locations 2058. The smaller size of the reduced-sized port locations 2058 prevents sealant from extruding through the enlarged port locations 2056 of the containment structures 2022, 2024 when smaller cables are mounted within the enlarged port locations 2056 with the assistance of the port reducers 2054. Second, the port reducers 2054 provide a volume occupying function by occupying volume in the region axially between the containment structures 2022, 2024. The volume occupied by the port reducers can correspond at least in part to the difference in the volume of gel/sealant displacement that exist between a smaller cable intended to be routed though one of the enlarged port locations 2058 with the assistance of one of the port reducers 2054 and a larger cable intended to be routed directly through the enlarged port location 2058 without the use of the port reducer 2054. The volume occupying function can be provided by the volume occupying portions 2060 of the port reducers 2054 when the port reducers 2054 are mounted at the enlarged port locations 2056.

When the port reducers 2054 are mounted at the enlarged port locations 2056, the volume occupying portions occupy volume axially between the containment structures 2022, 2024 and/or prevent sealant from occupying certain volume axially between the containment structures 2022, 2024. For example, the volume occupying portions 2060 extend from the containment structures 2022, 2024 axially into the space between containment structures 2022, 2024. As shown at FIG. 158, when the port reducers 2054 are mounted at the enlarged port locations 2056, the volume occupying portions 2060 (e.g., sealant displacement portions) can include first regions 2060a within the axial space between the containment structures 2022, 2024 that coincide/axially align with the enlarged port locations 2058 and second regions 2060b within the axial space between the containment structures 2022, 2024 that project outwardly from the first regions 2060a in an orientation transverse respect to the axial orientation. As depicted at FIG. 158, the second regions 2060b overlap portions of the containment structures 2022, 2024 that face toward the reference plane 2033. In certain examples, when a given one of the port reducers 2054 is mounted at one of the enlarged port locations 2056, the volume occupying portion 2060 prevents sealant from occupying a volume between the containment structures 2022, 2024 that coincides with at least 10 percent, or at least 15 percent, or at least 20 percent, or at least 30 percent, or at least 40 percent of a difference in sealant displacement that occurs between the smallest cable intended to be routed through the port reducer 2054 and the largest cable intended to be routed through the enlarged port location 2056.

The port reducers 2054 with volume occupying portions 2060 and reduced port size defining portions assist in enhancing cable size range taking. For example, when the port reducers 2054 are mounted at the enlarged port locations 2056, the port reducers 2054 accommodate smaller cables by preventing sealant extrusion around the cable through the containment structures 2022, 2024 and by occupying volume between the axially fixed containment structures 2022, 2024 to ensure adequate seal pressurization for smaller cables when the enclosure 2002 is closed. When the port reducers 2054 are not mounted at the enlarged port locations 2056, the enlarged port locations 2056 can receive larger cables that can be received by the port reduces 2054, and the absence of the port reducers 2054 and their corresponding volume occupying portions 2060 make available additional volume between the axially fixed containment structures 2022, 2024 which can be filled/occupied by the additional sealant that is displaced by the larger cables when the sealant is pressurized via closing the enclosure 2002.

Referring to FIGS. 147-152, the intermediate sealant block 2032 has a relatively complex shape. For example, as indicated previously, the inner and outer sides of the intermediate sealant block 2032 include the recesses 2062. The presence of the recesses 2062 defines a reduced thickness region 2072 having a thickness T1 (see FIG. 152) which is substantially smaller than enlarged thickness regions 2074 at the ends of the intermediate sealant block 2032 which have enlarged thicknesses T2. Additionally, as shown at FIG. 151, the intermediate sealant block 2032 includes notched corners 2076 which extend through a height of the intermediate sealant block 2032. The notched corners 2076 cooperate to define a rib or projection 2078 at each of the ends of the intermediate sealant block 2032. The rib 2078 extends across a total height of the intermediate sealant block 2032. The rib 2078 has a thickness T3 (see FIG. 147) that is less than the maximum thickness of the intermediate sealant block 2032 and less than a thicknesses T4 of the upper and lower sealant blocks 2028, 2030. Thus, when the sealant arrangement 2020 is assembled, the upper and lower sealant blocks 2028, 2030 horizontally overlap the notched corners 2076. When the sealant arrangement 2020 is pressurized, portions 2084 of the upper and lower sealant blocks 2028, 2030 flow into the notches 2078 (see FIG. 147) so as to vertically overlap the intermediate sealant block 2032. Additionally, a portion of the lower sealant block 2030 flows upwardly into the recesses 2062 of the intermediate sealant block 2032 to provide additional vertical overlap. Thus, when the sealant arrangement 2020 is pressurized, portions of the lower sealant block 2030 flow into portions of the recesses 2062 that are not occupied by the volume occupying portions 2060 of the port reducers 2054.

In certain examples, the ribs 2078 at the ends of the intermediate sealant block 2032 have outer end faces 2079 that provide radial sealing with respect to corresponding internal surfaces of the base 2007 and the cover 2009. Additionally, ends 2080 of the gasket 2006 engage the end faces 2079 to ensure that sealing communication is provided between the sealant of the sealant arrangement 2020 and the gasket 2006. In this way, leak paths are prevented.

Referring to FIG. 158, the cable pass-through location 2091 is defined between the intermediate sealant block 2032 and the lower sealant block 2030. Specifically, the cable pass-through location 2091 is defined at an engagement interface between a sealing face 2093 defined by the reduced thickness region 2072 and an opposing sealing face 2095 defined by the lower sealing block 2030. When a cable is routed through the cable pass-through location 2091, the cable passes between the sealing faces 2093, 2095 and the sealing faces 2093 and 2095 form a seal circumferentially about the exterior of the cable. The intermediate sealing block 2032 has an axial thickness T1 at the sealing face 2093 while the lower sealing block 2030 has an axial thickness T4 at the sealing face 2095. The axial thickness T4 is larger than the axial thickness T1. In certain examples, the axial thickness T4 is at least 1.1, 1.2, 1.3, 1.4, 1.5, 1.6, 1.7, 1.8, 1.9 or 2.0 times as large as the axial thickness T1. The reduced thickness T1 can assist in allowing the sealant to better deform about larger cables. When the sealant arrangement is pressurized, the angled surfaces 2070 of the port reducers 2054 can assist in forcing the oversized portions of the lower sealing block 2030 into the otherwise void regions adjacent the reduced thickness region 2072 of the intermediate sealing block 2032.

Aspects of the present disclosure relate to structures for encouraging the flow of sealant to desired sealant locations during pressurization of the sealant. For example, as indicated previously, ramped surfaces can be provided at structures such as port reducers or other structures for encouraging the flow of sealant in a combined axial and radial direction by angling the surface so that the surface has a radial component and an axial component. Additionally, different sections of sealant block can be sized differently (e.g., opposing faces can have different axial thicknesses) such that portions of the sealant blocks overlap one another and other portions overhang one another. Thus, during pressurization, the overhanging portions of the one sealant block can be forced into void regions of the other sealant block. As depicted at FIG. 147, after pressurization, portions of the upper and lower sealant blocks 2028, 2030 vertically overlap portions of the intermediate sealant block 2032. This is because the intermediate sealant block 2032 has regions with reduced thicknesses as compared to the upper and lower sealant blocks 2028, 2030. The regions of reduced thickness provide void areas into which portions of the upper and lower sealant blocks 2028, 2030 flow during pressurization of the sealant arrangement 2020.

Referring to FIG. 148, the sealant arrangement 2020 utilizes a combination of axial sealing and radial sealing to provide a continuous sealing path/boundary/interface between the sealant arrangement 2020 and the interior of the enclosure 2002. For example, as shown at FIG. 148, hatching 2082 shows locations where the sealant arrangement 2020 seals relative to the interior of the enclosure 2002. For example, section 2082a of the hatching 2082 represents an axial face seal portion of the seal path where the lower sealant block 2030 engages a corresponding surface of the base 2007. Also, section 2082b of the hatching 2082 represents a portion of the seal path where the sealant arrangement 2020 provides radial sealing relative to the base 2007 and the cover 2009. Further, section 2082c of the hatching 2082 represents a section of the seal path where the upper sealing block 2028 provides axial face sealing with respect to a corresponding surface within the cover 2009. Reference number 2082d denotes a radial sealing location similar to the sealing location 2082b but located at the opposite end of the sealant arrangement 2020. The end faces 2079 of the ribs 2078 of the intermediate sealant block 2032 assist in providing effective radial sealing with respect to the base 2007 and the cover 2009, also provide an effective location of contact between the sealant arrangement 2020 and the gasket 2006. Vertical overlap regions 2084 provide an effective transition between the face sealing regions 2082a, 2082c and the radial sealing regions 2082b, 2082d.

Referring to FIG. 128, the cable anchoring and sealant containment frame 2010 includes latches 2090 for securing the insert unit 2004 within the base 2007. It will be appreciated that the upper and lower sealant blocks 2028, 2030 are preferably pre-loaded into their corresponding receptacles 2042, 2046 within the cover 2009 and the base 2007 prior to loading the cable anchoring and sealant containment frame 2010 into the base 2007. It is desirable for the sealant of the sealant arrangement 2020 to be precisely placed within the base 2007 and the cover 2009 to ensure an effective sealing. In this regard, reinforcing carriers can be used within the volumes of sealant to provide reinforcement within the sealant and to ensure that portions of the sealant are directed to the appropriate locations. The sealant preferably adheres to the carriers. With respect to the intermediate sealant block 2032, a reinforcing carrier 2092 is over-molded within the sealant volume of the intermediate sealant block 2032. FIGS. 153 and 154 show the volume of sealant of the intermediate sealant block 2032 in a transparent manner such that the positioning of the internal reinforcing carrier 2092 within the volume of sealant is visible. FIGS. 155-157 show the carrier 2092 in isolation from the volume of sealant. The carrier 2092 includes enlarged end plates 2094 (e.g., caps, flanges, etc.) enclosed at opposite ends of the sealant of the intermediate sealant block 2032. The enlarged end plates 2092 extend for a majority of the height of the volume of the intermediate sealant block 2032 and are preferably relatively close to the ends of the intermediate sealant block 2032. The plates 2094 are interconnected by struts 2096 that extend along the length of the intermediate sealant block 2032 adjacent the top of the intermediate sealant block 2032. A window or passage 2097 is defined between the struts 2096. When the cable anchoring and sealant containment frame 2010 is snapped into the base 2007, the plates 2094 adjacent the ends of the intermediate sealant block 2032 provide positioning control of the sealant at the ends of the intermediate sealant block 2032 such that during the insertion process the sealant is supported in such a way that the sealant slides downwardly to the appropriate location within the base 2007 and does not catch on the sidewall or otherwise negatively deform during the insertion process. In this way, it is ensured that the sealant at the ends of the intermediate sealant block 2032 moves to the appropriate locations within the base 2007 to provide appropriate sealing.

As indicated previously, a gasket 2006 can be used to provide perimeter sealing between the base 2007 and the cover 2009 of the enclosure 2002. In one non-limiting example, the gasket 2006 can have an H-shaped cross-sectional profile (see FIG. 160) and can provide perimeter sealing as disclosed in U.S. Pat. No. 9,837,754, which is hereby incorporated by reference in its entirety. Other profiles can be used as well. It will be appreciated that to maintain effective sealing, the gasket 2006 should contact the sealant of the sealant arrangement 2020. Proper sealing can be particularly problematic in the region adjacent the gasket 2006 because the separate pieces of the enclosure 2002 (e.g., the base 2007 and the cover 2009) also meet at this location. To ensure sealing at this region (e.g., often referred to as a triple-point region), the sealant of the sealant arrangement can contain sealant positioning elements (e.g., stabilizers, reinforcement elements, etc.) to which the sealant adheres. A given positioning element can be over-molded within the sealant and can be configured to ensure that the sealant remains precisely at a desired sealing location (e.g., the triple point where the pieces of the enclosure meet and the gasket is located) when the sealant arrangement is loaded into the enclosure and when the sealant is pressurized. In certain examples, the sealant positioning element can traverse a mechanical interface between first and second pieces of an enclosure between which a gasket is present. FIG. 161 shows a generic sealant (e.g., gel) block 4000 which contains and adheres to an internal sealant positioner 4002 which provides sealant reinforcement and stabilization which prevents unwanted movement or displacement of the sealant from a desired location. As depicted, the sealant positioner 4002 is over-molded in the block 4000 and a triple-point sealing portion 4004 (e.g., a triple point sealing portion) of the sealant is adhered to the positioner 4002. The positioner 4002 traverses an interface between first and second housing pieces 4006, 4008 (e.g., a base and a cover) between which a gasket 4010 is positioned. In this way, the positioner 4002 ensures that the sealing portion 4004 is properly positioned so as to seal against the gasket 4010 and to continuously extend across the mechanical interface so as to seal against both housing pieces 4006, 4008.

For the sealant arrangement 2020, the end plates 2094 of the carrier 2092 over-molded within the intermediate gel block 2032 function as positioners that ensure proper sealant positioning and sealing at the interface between the cable sealant arrangement 2020 and the gasket sealed mechanical interface between the base 2007 and the cover 2009 of the enclosure 2002. FIGS. 162 and 163 show an arrangement in which the ends of the gasket 2006 are turned toward the sealant arrangement 2020 such that the sealant arrangement 2020 seals against the cross-sectional profile of the gasket 2006. As shown at FIG. 163, the end plates 2094 oppose the ends of the gasket 2006 and traverse the mechanical interface/joint between the base 2007 and the cover 2009. Outer portions of the sealant material of the intermediate gel block 2032 adhere to the end plates 2094 and are positioned to extend across and seal the mechanical interface between the base 2007 and the cover 2009 and to seal against the gasket 2006. FIGS. 164 and 165 show an arrangement in which the gasket 2006 does not turn and the sealant arrangement 2020 seals against the side of the gasket 2006. As shown at FIG. 165, the end plates 2094 oppose the sides of the gasket 2006 and traverse the mechanical interface/joint between the base 2007 and the cover 2009. Outer portions of the sealant material of the intermediate gel block 2032 adhere to the end plates 2094 and are positioned to extend across and seal the mechanical interface between the base 2007 and the cover 2009 and to seal against the gasket 2006.

It will be appreciated that the sealant arrangement 2020 depicted at FIG. 128 is suited for providing sealing in difficult environmental conditions such as for underground applications. For other applications, such as aerial applications, less robust sealing is required. In this regard, FIGS. 166-168 depict a sealant arrangement 2020a adapted for aerial applications. It will be appreciated that for aerial applications, the same basic structure of the cable anchoring and sealant containment frame 2010 can be used. However, for aerial applications, rather than using the upper sealant block 2028, the lower sealant block 2030 and the springs 2052, alternative upper and lower sealant blocks 2028a, 2030a are used in combination with the remainder of the cable anchoring and sealant containment frame 2010. The upper and lower sealant blocks 2028a, 2030a have identical constructions and are suited for providing sealing without the use of springs. In the arrangement of FIG. 166, the sealant arrangement 2028a utilizes radial sealing around the entire sealant arrangement 2020a since no springs are utilized.

As shown at FIG. 167, the upper and lower sealant blocks 2028a, 2030a, have central regions 3000 that are relatively thin and also include enlarged end regions 3002. The upper and lower sealant blocks 2028a, 2030a can each include a reinforcing carrier 3004 that contains and reinforces sealant of the sealant blocks 2028a, 2030a. The carrier 3004 will include end latches 3006 or tabs for engaging the corresponding catches 2044, 2048 in the cover 2009 and the base 2007. Additionally, the carrier 3004 can include axial containment walls 3010 between which the relatively thin portion of the sealant material is located. The sealant is radially exposed about an outer perimeter of the sealant blocks 2028a, 2030a. Reinforcing ribs 3012 can project axially from each of the axial containment walls 3010 at intermediate locations along the length of the relatively thin central portion of the sealant blocks 2028a, 2030a. It will be appreciated that the upper and lower sealant blocks 2028a, 2030a are compatible with the same intermediate sealant block 2032 that is also compatible with the upper and lower sealant blocks 2028, 2030. Thus, the enclosure can be adapted for either underground sealing or aerial sealing by selecting the appropriate upper and lower sealing blocks.

Aspects of the present disclosure relate to sealant arrangements having sealant contained between first and second axial sealant containment structures. In one example, the axial sealant containment structures are not axially moveable relative to one another to accommodate displacement of the sealant during sealing. In certain examples, the sealing arrangement is configured to accommodate displacement by cables of at least five, ten, fifteen, twenty or twenty-five percent of the total volume of sealant without requiring or utilizing movement of the axial sealant containment structures. Optionally, one or more open cavities or spaces can be provided for accommodating or receiving displaced sealant. Optionally, a spring or springs such as a leaf spring or leaf springs can be used to apply spring pressure to the displaced sealant. Optionally, port reducers having volume occupying portions are used to occupy volume between the fixed axial sealant containment structures when smaller cables are being sealed or when a fewer number of cables are being sealed. The port reducers are removable from the axial containment structures to accommodate larger cables. Optionally, the port sized reducers can include surfaces which are angled to encourage the flow of sealant to more difficult to seal regions. Optionally, the sealant does not include any pre-defined cable passages extending axially through the sealant. In certain examples, the cable sealant includes at least one pre-defined recess in which the volume occupying portion of the port size reducer fits. In certain examples, the sealant arrangement includes first and second separate volumes of sealant positioned one on top of the other, with at least one of the volumes of sealant having a void or open region into which the adjacent volume of sealant flows during pressurization of the sealant to provide vertical overlap between the volumes of sealant. In certain examples, vertical overlap can be provided at an axial end face of a volume of sealant or at a corner of a volume of sealant.

Example Sealant Materials and Material Properties

Sealant materials (e.g., gel material) that may be used with any of the examples disclosed herein can have certain material properties adapted to facilitate cable size range taking and reliable sealing in systems that optionally may not include a separate actuator for pressurizing the sealant and for maintaining pressure on the sealant over extended times. For example, example sealant materials can be defined by properties such as hardness, compression set, resistance to extrusion, elongation to failure, and oil bleed out properties. Example value ranges for each property and testing procedures for measuring these values for sample materials are described below.

Indentation Hardness

The sealant material can be tested for indentation hardness using a texture analyzer including a load cell and a probe assembly. The load cell may be motor drive. The load cell may be bi-directional. The probe assembly includes a stainless-steel ball probe. The ball probe has a size of about 6.35 mm (0.25 in). The load cell has a minimum resolution of 0.20 g and ±0.5% FSR accuracy. The load cell has a trigger point of about 4 g. One example texture analyzer suitable for the hardness test is the Brookfield CT3 Model 1500 offered by Brookfield Engineering Laboratories, Inc. of Middleboro, MA.

During the test, the material to be tested is placed in a cup beneath the probe assembly. The cup is formed from aluminum. The cup is filled with 51 g of the material to be tested. The material filling the cup is bubble free. The cup has a frusto-conical inner shape having a major inner diameter of 50 millimeters at an open top end, a minor inner diameter of 45 millimeters at a closed bottom end, and a depth of 30 millimeters extending between the top and bottom ends.

The load cell drives the probe assembly vertically into a sample of material at a speed of 2 mm/sec to a depth of 4 mm. The load cell holds the probe assembly at the 4 mm depth for 1 hour.

The indentation hardness is measured (in grams) as a peak force and a residual force applied by the load cell to the probe assembly. The peak hardness is measured instantly when the probe assembly is at the pre-set depth from the trigger point. The residual hardness is measured at the pre-set depth after passage of the pre-set period of time. For example, the residual hardness may be measured after 1 hour (3600 seconds). In certain examples, an average and standard deviation are calculated for the peak force and residual force measurements. In one example, a sealing materials suitable for use in the gel sealing applications described herein have a residual indentation hardness ranging from 20 g to 80 g after 1 hour.

Compression Set

The sealant material can be tested for compression set under constant deflection in air. In certain examples, the material is tested using ASTM D395, Method B.

The material to be tested is formed into a cylindrical sample. The cylindrical sample has a diameter of about 20 mm and a height of about 20 mm.

The test is conducted using an oven (e.g., air-circulating) and a compression fixture. The compression fixture includes compression plates, spacers, and components to compress the plates. The compression plates are arranged in a vertical orientation so that the compression fixture has top and bottom compression plates. The compression plates and spacers are formed from steel. The plates have the dimensions 150 mm length×150 mm width×12.5 mm height. The spacers have the dimensions 25 mm width×10 mm height. The spacers each have an 8 mm center hole. The components to compress the plates include bolts and nuts. The bolts are 10 mm long.

During the test, the sample (e.g., the cylindrical sample) is placed on the compression fixture between the top and bottom compression plates so that the height of the sample extends along an axis between the top and bottom plates. The nuts and bolts are tightened to move the compression plates together to compress the sample. The spacers are positioned between the compression plates to limit the compression of the sample. In certain examples, the compression plates are moved relatively towards each other (e.g., the top plate is moved towards the bottom plate, the bottom plate is moved towards the top plate, or both plates are moved towards each other) until the compression plates are separated by a height of the spacers. For example, the sample may be compressed to a height of about 10 mm using 10 mm tall steel spacers.

The compressed sample is placed in the oven at a pre-set temperature for a pre-set period of time. In certain examples, the compression fixture and the sample are placed in the oven. The compression fixture holds the sample in the compressed state while in the oven. The compressed sample remains in the oven for 22 hours while the oven maintains an internal temperature of 70° C.

The heated sample and compression fixture are removed from the oven after the pre-set period of time. The top compression plate is removed from the sample to allow the sample to recover. For example, the nuts and bolts may be loosened and/or removed so that the top compression plate can be removed from the sample.

The height of the sample is measured after 100 hours of recovery time. The percent compression set is calculated by the following equation:

$$\text{Compression set} = \frac{(OH - PH)}{(OH - SH)} \times 100 \qquad (1)$$

where OH is the original sample height, PH is the sample height after testing and recovering, and SH is the spacer height.

In one example, a sealing materials suitable for use in the gel sealing applications described herein have a compression set of less than 10% after 100 hours of recovery time, or less than 5% after 100 hours of recovery time, or less than 2% after 100 hours of recovery time.

Resistance to Extrusion

The sealant material can be tested for resistance to extrusion using an extrusion fixture, a pneumatic cylinder, and an oven (e.g., an air-circulating oven). The extrusion fixture includes a body defining an interior test chamber and an extrusion plate that selectively covers a first end of the test chamber. The test chamber is cylindrical in shape and as a diameter of 25 millimeters. The extrusion plate closing one end of the test chamber defines a 4 mm circular opening in its center in fluid communication with the test chamber.

The material to be tested is formed into a cylindrical sample having a diameter of 25 mm and a height of 25 mm.

During the test, the sample is placed inside the cylindrical test chamber and the extrusion plate is placed over the first end of the test chamber. An aluminum cup is placed outside the extrusion fixture beneath the circular opening.

A compression plate is placed behind the sample at an opposite second end of the test chamber. The compression plate is round with a diameter of 25 mm. The compression plate is low friction and formed of plastic. A pneumatic cylinder is operationally coupled to the compression plate to move the compression plate relative to the extrusion fixture. In particular, compression rods of the pneumatic cylinder contact the plastic compression plate.

The pneumatic cylinder is energized and pressurized such that the pneumatic cylinder applies 200 kPa of pressure to the sample. The pressurized sample and pneumatic cylinder are placed in the oven at 70° C. Materials that are not extrusion resistant will fall into the aluminum cups. Materials that are extrusion resistant will bulge out of the opening in a bulbous extrusion. If no part of the sample falls into the aluminum cup, then the pressure is removed from the sample after 24 hours. The sample is allowed to recover with no pressure applied and allowed to return to room temperature. Once the sample returns to room temperature, the volume (if any) that remains extruded in a bulge outside the extrusion plate is measured. In certain examples, suitable materials will have a measured volume of no more than 0.5 cm3, or no more than 0.25 cm3 or 0 cm3.

Elongation to Failure

The sealant material can be tested for tensile elongation using ASTM D638. For example, the material can be tested using a Universal Test Machine (UTM), such as a Universal Testing System offered by Instron of Norwood, MA. The UTM includes a 2 kg load cell and two cylindrical rods. Each cylindrical rod has a 6 mm diameter and is formed of steel. The rods are each horizontally oriented with a lower rod attached to a stationary base of the UTM and an upper rod attached to the load cell. Accordingly, the lower rod remains stationary relative to the base while the upper rod is movable relative to the lower rod using the load cell.

The material to be tested is cut into rings having an outer diameter of 30 mm and an inner diameter of 20 mm. The rings have a thickness of 3-4 mm.

During the test, the rings are positioned so that the upper and lower rods extend into the rings. The load cell is moved at a rate of 50 mm/min. Accordingly, the upper rod moves away from the lower rod at that rate. As the upper rod is moved, the UTM measures a force applied to the upper rod versus the extension curve of the ring. From these measurements, the elongation to failure is calculated. The elongation to failure is calculated based on the initial length (approximately 31.5 mm) of the ring. In certain examples, suitable materials will have an elongation to failure of at least 300%, or 500% or 800% of the initial length of the sample.

Oil Bleed Out

The sealant material can be tested for oil bleed out to determine the oil loss of the material under pressure. The material to be tested is formed into multiple cylindrical samples each having a diameter of 14 mm and a thickness of 3-4 mm.

The test is performed using a test block, three coarse screens (0.16 $mm^2$ mesh), three fine screens (0.01 $mm^2$ mesh), three pistons, three weights, an analytical balance, and an oven. The test block defines three testing cavities having open upper ends. Each testing cavity is sized to receive one of the cylindrical samples through the open upper end. The weights are shaped to fit partially into respective testing cavities through the open upper ends.

During the test, the initial weight of each sample is measured. Each sample is placed on a respective fine screen. Then, each sample and corresponding fine screen is placed on a respective coarse screen. The screens support the samples while allowing low molecular weight material to separate. Each sample and corresponding screens is placed within one of the cavities defined in the test block.

A respective piston is placed over each sample within the respective testing cavity. A respective weight is placed over each piston to apply 120 kPa of pressure to the respective sample. The weight is shaped so that a portion of the weight extends downwardly into the testing cavity through the open upper end. The test block, screens, samples, pistons, and weights form a testing assembly. The testing assembly is placed in an air circulating oven.

At regular intervals, the testing assembly is removed from the oven and the samples are removed from the testing block. The samples are blotted on cleaning paper and weighed on an analytical balance. After weighing, the samples are replaced within the respective testing cavities and the weights are replaced over the samples. The testing assembly is returned to the oven. These regular intervals are repeated until at least 500 hours have elapsed or the sample weights have stabilized. In certain examples, the sample weight of suitable materials measured at 500 hours will be greater than or equal to 85% of the initial weight (e.g., less than 15% oil bleed out), or greater than or equal to 90% of the initial weight (e.g., less than 10% oil bleed out), or greater than or equal to 95% of the initial weight (e.g., less than 5% oil bleed out).

Example Sealant Materials

In certain implementations, sealant material for use in applications of the type disclosed herein includes a hydrosilation cured vinyl-terminated polydimethylsiloxane (PDMS) gel. Additional information on such a gel can be found in U.S. Pat. No. 8,642,891, the disclosure of which is hereby incorporated herein by reference in its entirety. In other implementations, sealant material for use in applications of the type disclosed herein include peroxide or heat cured vinyl-terminated PDMS gel. In other implementations, sealant material for use in applications of the type disclosed herein includes moisture (and/or UV) cured PDMS gel (various terminations possible, including silanol). In other implementations, sealant material for use in applications of the type disclosed herein includes moisture (and/or UV) cured, silylated polyether (commonly "MS polymer") gel. In certain implementations, the gel material includes polyether or polyester based polyurethane gel. In other implementations, sealant material for use in applications of the type disclosed herein includes chemically cross-linked polyacrylate (acrylic or methacrylic) e.g. n-butyl acrylate or ethyl-hexyl acrylate with triethylene glycol dimethacrylate. In other implementations, sealant material for use in applications of the type disclosed herein includes ionically crosslinked rubber gel. In other implementations, sealant material for use in applications of the type disclosed herein includes chemically crosslinked SBS family TPE gel (crosslinks in polystyrene phase only). In other implementations, sealant material for use in applications of the type disclosed herein includes physically crosslinked triblock polyacrylate gel (e.g. Kurarity®). In other implementations, sealant material for use in applications of the type disclosed herein includes physically crosslinked triblock olefin gel (e.g. Infuse). In other implementations, sealant material for use in applications of the type disclosed herein includes hybrids and/or multiple combinations of above chemistries.

ASPECTS OF THE DISCLOSURE

Aspect 1. A telecommunications enclosure comprising:
  a housing that is elongate along a major axis of the housing, the major axis extending along a length of the housing between first and second opposite ends, the housing including a base and a cover that cooperate to define an interior of the housing, the cover being pivotally connected to the base and being pivotally moveable relative to the base between an open position and a closed position, the cover defining a front of the housing and the base defining a rear of the housing;
  a sealing arrangement for sealing the housing, the sealing arrangement including a cable sealing arrangement at the first end of the housing, the cable sealing arrangement including a rear gel volume mounted in the base, a front gel volume mounted in the cover, and an intermediate gel volume positioned between the front and rear gel volumes, the cable sealing arrangement including a first cable entry location defined between the rear gel volume and the intermediate gel volume and a second cable entry location defined between the front gel volume and the intermediate gel volume, the sealing arrangement also including a perimeter seal that extends about a perimeter of the housing for sealing between the cover and the base;
  a management unit that mounts within the interior of the housing, the management unit being elongate along a major axis that is parallel to the major axis of the housing when the management unit is mounted within the interior of the housing, the major axis of the management unit extending along a length of the management unit between a first end and an opposite second end of the management unit, the first end of the management unit being positioned adjacent to the first end of the housing when the management unit is mounted within the housing, the second end of the management unit being positioned at the second end of the housing when the management unit is mounted within the housing, the management unit including a support infrastructure including a front side and an opposite back side, the support infrastructure including an adapter mounting location and a front cover positioned between the adapter mounting location and the second end of the management unit at a front of the management unit, the management unit also including a rear tray positioned at a rear of the management unit, the rear tray being pivotally coupled to the support infrastructure, the rear tray being pivotally moveable about a tray pivot axis that is transverse relative to the major axis of the management unit between an open positon and a closed position, the rear tray being located at the second end of the management unit;
  splice mounting components mounted to the support infrastructure at a location positioned forwardly with respect to the rear tray, the splice mounting components being covered by the rear tray when the rear tray is in the closed position and being accessible from the rear of the management unit when the tray is in the open position;
  a bank of adapters mounted at the adapter mounting location, the bank of adapters including first portions that face at least partially toward the first end of the management unit and second ports that face at least partially toward the second end of the management unit, the front cover being configured to block access to the second ports from the front of the management unit;
  pre-installed fiber optic connectors loaded into the second ports of the fiber optic adapters, the pre-installed fiber optic connectors terminating the ends of pigtail optical fibers that are routed to the splice mounting location;
  first cable anchors provided at the first end of the management unit at the rear of the management unit;
  second cable anchors provided at the first end of the management unit at the front of the management unit;
  wherein in use:
    a) a pass-through cable is routed through the first cable entry location, is anchored to the rear of the support infrastructure by the first cable anchors, has a portion stored in a cable loop at the rear tray, and includes optical fibers that are accessed from a mid-span location of the pass-through cable within the housing and that are spliced to the pigtail optical fibers at the splice mounting location; and
    b) drop cables are routed through the second cable entry location and anchored to the front of the support infrastructure by the second cable anchors, the drop cables having connectorized ends that plug into the first ports of the fiber optic adapters.

Aspect 2. The telecommunications enclosure as recited in aspect 1, wherein the management unit and the intermediate volume of gel are removeable together from the housing while the drop cables and the pass-through cable remain anchored to and carried with the management unit.

Aspect 3. The telecommunications enclosure as recited in aspect 1, wherein the rear tray includes a detent structure that holds the rear tray in the open and closed positions Aspect 4. The telecommunications enclosure as recited in aspect 3, wherein the detent structure includes a flat-sided pivot component received within an elastic pivot holder Aspect 5. The telecommunications enclosure as recited in aspect 1, wherein the support infrastructure includes front side walls and rear side walls Aspect 6. The telecommunications enclosure as recited in aspect 5, wherein fiber management tabs project inwardly from the rear side walls and assist in managing the pigtail optical fibers and/or the optical fibers accessed from the pass-through cable.

Aspect 7. The telecommunications enclosure as recited in aspect 1, wherein a drop cable looping area is provided at the front side of the management unit between the second cable anchors and the fiber optic adapters.

Aspect 8. The telecommunications enclosure as recited in aspect 1, further comprising a plurality of band clamp receivers positioned at the first and second ends of the housing, each of the band clamp receivers being configured to receive a band of a band clamp.

Aspect 9. The telecommunications enclosure as recited in aspect 8, wherein the band clamps extend through the band clamp receivers in an orientation that extends along a minor axis of the housing.

Aspect 10. The telecommunications enclosure as recited in aspect 1, further comprising mounting structure including a mounting projection defining a fastener opening therethrough and also defining band clamp receptacles between which the mounting projection is positioned.

Aspect 11. The telecommunications enclosure as recited in aspect 1, wherein the fiber optic adapters define axes that are angled in a front-to-rear orientation such that first ports of the fiber optic adapters face at least partially in a forward direction and second ports of the fiber optic adapters face at least partially in a rearward direction.

Aspect 12. The telecommunications enclosure as recited in aspect 1, further comprising a plurality of latches spaced about a perimeter of the housing for clamping the cover in the closed position.

Aspect 13. The telecommunications enclosure as recited in aspect 1, wherein the hinge axis of the housing is parallel to the major axis of the housing.

Aspect 14. The telecommunications enclosure of aspect 1, wherein the support infrastructure includes a rear side wall structure that extends around at least a portion of a perimeter of the management unit, and wherein the splice mounting components are mounted to a support bracket attached to the rear side wall structure by a tongue and groove interface.

Aspect 15. The telecommunications enclosure of aspect 14, wherein the support bracket includes a support surface defining first and second T-shaped openings which are linearly aligned with each other, wherein the support bracket also includes a resilient cantilever, wherein the splice mounting components each include two tongue features positioned between two angled stops, wherein the tongue features and the angled stops are linearly aligned, wherein the tongue features fit within the T-shaped slots, wherein when the splice mounting component is mounted to the support bracket one of the angled stops opposes an end of one of the T-shaped openings and the other of the angled stops opposes an end of the resilient cantilever, and wherein the resilient cantilever flexes to accommodate insertion of the tongue features and the angled stops into the T-shaped openings.

Aspect 16. The telecommunications enclosure of aspect 1, wherein the housing includes inner and outer gel containment walls between which the gel sealing arrangement is positioned.

Aspect 17. A telecommunications enclosure comprising:
a housing defining an interior accessible through a first cable entry and a second cable entry;
a gel block arrangement mounted to the housing at the first and second cable entries, the gel block arrangement including a rear gel block, a front gel block, and an intermediate gel block that cooperate to seal the opening of the housing;
a management unit disposed within the interior of the housing, the management unit including anchoring structure to which cables entering the enclosure through the first and second cable entries are anchored;
wherein the management unit and the intermediate gel block are removable from housing without detaching cables from the management unit.

Aspect 18. An optical fiber management device comprising:
tray mount and a fiber management tray that are coupled together by a pivot interlock that when interlocked couples the tray mount and the fiber management tray together by a pivotal connection that allows the fiber management tray to pivot relative to the tray mount between a first pivot position and a second pivot position;
the pivot interlock including a detent pivot arrangement and guide pivot arrangement;
the detent pivot arrangement including a detent pivot pin portion integrated with one of the tray mount and the fiber management tray, the detent pivot arrangement also including a detent receptacle integrated with the other of the tray mount and the fiber management tray, the detent receptacle being configured for receiving the detent pivot portion when the pivot interlock is interlocked, the detent pivot pin portion including a plurality of pin flat surfaces positioned circumferentially about the detent pivot pin portion, the detent receptacle defining a plurality of receptacle flat surfaces;
the guide pivot arrangement including a cylindrical pivot pin portion integrated with one of the tray mount and the fiber management tray, the guide pivot arrangement also including a guide receptacle integrated with the other of the tray mount and the fiber management tray, the guide receptacle being configured for receiving the cylindrical pivot pin portion when the pivot interlock is interlocked, the guide receptacle having an open end positioned opposite from a closed end, the open end being configured to allow the cylindrical pivot pin portion to be inserted into the guide receptacle, the closed end including a guide surface having a concave curvature that curves along a convex curvature of the cylindrical pivot pin portion when the pivot interlock is interlocked; and
wherein when pivot interlock is interlocked, a pivot axis about which the fiber management tray pivots extends axially though the cylindrical pivot pin portion, the detent pivot pin portion, the guide receptacle and the detent receptacle, wherein as the fiber management tray is pivoted between the first pivot position and the second pivot position, at least some of the pin flat surfaces and the receptacle flat surfaces engage one another to cause the detent receptacle to elastically deform and the cylindrical pivot pin portion concurrently pivots within the guide receptacle, and wherein an interaction between at least some of the pin flat surfaces and the receptacle flat surfaces provides a tray retention force for retaining the fiber management tray in the first and second pivot positions.

Aspect 19. The optical fiber management device of aspect 18, wherein the cylindrical pivot pin portion and the detent pivot pin portion are integrated with the fiber management tray, and wherein the guide receptacle and the detent receptacle are integrated with the tray mount.

Aspect 20. The optical fiber management device of aspect 19, wherein the detent pivot arrangement includes first and second spaced-apart detent pivot pin portions, wherein the detent pivot arrangement includes first and second spaced-apart detent receptacles that respectively receive the first and second detent pivot pin portions, wherein the guide pivot arrangement includes first and second cylindrical pivot pin portions positioned axially between the first and second detent pivot pin portions, wherein the first and second cylindrical pivot pin portions are separated by a central flange, wherein the guide pivot arrangement also includes first and second guide receptacles that respectively receive the first and second cylindrical pivot pin portions, wherein the first and second guide receptacles are separated a central slot, and wherein when the pivot interlock is interlocked the central flange fits within the central slot to limit axial movement of the fiber management tray relative to the tray mount along the pivot axis.

Aspect 21. The optical fiber management device of aspect 20, wherein outer ends of the first and second spaced-apart detent pivot pin portions are integrally coupled to end flanges which are coupled to a main body of the fiber management tray, wherein inner ends of the first and second spaced-apart detent pivot pin portions are integrally coupled to outer ends of the first and second cylindrical pivot pin portions, wherein inner ends of the first and second cylindrical pivot pin portions are integrally connected to the central flange, wherein the central flange is coupled to the main body of the fiber management tray, and wherein the central flange and the end flanges offset the first and second detent pivot pin portions and the first and second cylindrical pivot pin portions from the main body of the fiber management tray.

Aspect 22. The optical fiber management device of aspect 18, wherein the detent receptacle elastically deforms as the fiber management tray is pivoted between the first and second pivot positions, and wherein the guide receptacle does not elastically deform as the fiber management tray is moved between the first and second pivot positions.

Aspect 23. The optical fiber management device of aspect 18, wherein as the fiber management tray is pivoted between the first and second pivot positions, a maximum deformation of the detent receptacle occurs at a central pivot position between the first and second pivot positions.

Aspect 24. The optical fiber management device of aspect 18, wherein the detent receptacle is in a stable state when the fiber management tray in the first and second pivot positions, wherein when the detent receptacle is in the stable state the detent receptacle is either not elastically deformed or has less elastic deformation as compared when the fiber management tray has been pivoted to a pivot position between the first and second pivot positions.

Aspect 25. The optical fiber management device of aspect 18, wherein the detent pivot pin portion has a square transverse cross-sectional shape.

Aspect 26. The optical fiber management device of aspect 18, wherein the detent receptacle includes first and second resilient arms having base ends and free ends, wherein the first and second resilient arms define the receptacle flat surfaces and wherein the receptacle flat surfaces corresponding to each of the first and second resilient arms face toward each other, and wherein the first and second resilient arms flex outwardly about their base ends as the fiber management tray is moved between the first and second pivot positions.

Aspect 27. The optical fiber management device of aspect 26, wherein the first and second resilient arms have retainers at the free ends for retaining the detent pivot pin portion within the detent receptacle, wherein the first and second resilient arms flex apart from a retaining position to an insertion position allow insertion of the detent pivot pin portion past the retainers and into the detent receptacle, and wherein the first and second resilient arms resiliently return to the retaining position once the detent pivot pin portion has been inserted past the retainers and into the detent receptacle.

Aspect 28. A mechanical connection interface comprising:
a first connection interface arrangement defining an attachment opening defining a groove portion and an enlarged portion, the groove portion having a length that extends along a first reference line and a first width that extends perpendicular to the first reference line, the enlarged portion defining a second width perpendicular to the first reference line that is larger than the first width, the first connection interface arrangement further including a flexible cantilever latch positioned within the enlarged portion of the attachment opening, the flexible cantilever latch having a length that extends along the first reference line, the flexible cantilever latch including a base end and a free end, the enlarged portion of the attachment opening including an interlock receiving portion defined between the free end of the flexible cantilever latch and the groove portion of the attachment opening, the free end of the flexible cantilever latch defining a stop surface, and the flexible cantilever latch defining a stop receptacle;
a second connection interface arrangement configured to interlock with the first connection interface arrangement, the second connection interface arrangement including an interlock and a stop aligned along a second reference line, the stop including a stop surface, the interlock defining a third width that extends perpendicular to the second reference line, the third width being smaller than the second width and larger than the first width;
wherein at least one of the stop receptacle and the stop includes a ramp surface;
wherein the second connection interface arrangement is connected to the first connection interface arrangement by orienting the second connection interface arrangement in a first position relative to the first connection interface arrangement in which: a) the first and second reference axes are aligned; b) the interlock is received within interlock receiving portion of the enlarged portion of the attachment opening; and c) the first stop is positioned within the stop receptacle of the of the flexible cantilever latch; and then sliding the second connection interface arrangement along the aligned first and second reference axes from the first position to a second position in which: a) the first interlock is received within and interlocked with the groove portion of the attachment opening; b) the stop is positioned within the interlock receiving portion of the enlarged portion of the first attachment opening with the stop surface of the stop opposing the stop surface at the free end of the flexible cantilever latch; c) the interlock is received within and interlocked with the groove portion of the second attachment opening; and wherein as the second connection interface arrangement is slid from the first position to the second position, the ramp surface causes the flexible cantilever latch to deflect from a latching position to an unlatched position, and wherein after the stop moves past the free end of the flexible cantilever latch the flexible cantilever latch elastically returns from the unlatched position to the latching position.

Aspect 29. The mechanical connection interface of aspect 27, wherein the first connection interface arrangement is integrated with a telecommunications component.

Aspect 30. The mechanical connection interface of aspect 29, wherein the telecommunication component includes structure is adapted to manage optical fibers.

Aspect 31. The mechanical connection interface of aspect 30, wherein the telecommunications component is a tray.

Aspect 32. The mechanical connection interface of aspect 28, wherein the telecommunications component is a bracket.

Aspect 33. The mechanical connection interface of aspect 28, wherein the second connection interface arrangement is integrated with a holder is adapted to hold a fiber optic component.

Aspect 34. The mechanical connection interface of aspect 33, wherein the fiber optic component is a splice protector, a fiber optic adapter, a passive optical power splitter or a wavelength division multi-plexer.

Aspect 35. The mechanical connection interface of aspect 28, wherein the groove portion and the interlock have dovetailed shapes in cross-sectional planes that are perpendicular to the first and second reference lines.

Aspect 36. The mechanical connection interface of aspect 29, wherein a main body of the telecommunications component includes first portion having a top side and a bottom side, wherein the attachment opening extends through the first portion of the main body from the top side to the bottom side, wherein the base end of the flexible cantilever latch is unitarily formed with the main body, and wherein the stop receptacle of the flexible cantilever latch is defined at a top side of the flexible cantilever latch that is coplanar with the top side of the first portion of the main body when the flexible cantilever latch is in the latching position, and wherein the stop receptacle extends downwardly into the flexible cantilever latch from the top side of the flexible cantilever latch so that the stop receptacle extends lower than the top surface of the first portion of the main body when the flexible cantilever latch is in the latching position.

Aspect 37. The mechanical connection interface of aspect 28, wherein the first connection interface arrangement includes a first seating surface through which the attachment opening extends, wherein the second connection interface arrangement defines a second seating surface from which the interlock and the stop project, wherein the first and second seating surfaces are flush when the second connection interface arrangement is in the first position relative to the first connection interface arrangement and are also flush when the second connection interface arrangement is in the second position relative to the first connection interface arrangement, wherein the flexible cantilever latch is in the latching position when the second connection interface arrangement is in the first position relative to the first connection interface arrangement, and wherein the flexible cantilever latch is in the latching position when the second connection interface arrangement is in the second position relative to the first connection interface arrangement.

Aspect 38. The mechanical connection interface of aspect 28, wherein the stop receptacle and the stop include ramp surfaces, wherein the ramp surface of the stop opposes the ramp surface of the stop receptacle when the second connection interface arrangement is in the first position relative to the first connection interface arrangement, and wherein the ramp surfaces engage each other as the second connection interface arrangement is moved from the first position to the second position relative to the first connection interface arrangement to cause deflection of the flexible cantilever latch from a latching position to an unlatched position.

Aspect 39. The mechanical connection interface of aspect 28, wherein the attachment opening is a first attachment opening, the interlock is a first interlock and the stop is a first stop, wherein the first connection interface arrangement further includes a second attachment opening aligned along the first reference line, wherein the second attachment opening incudes an enlarged portion and a groove portion, wherein the second connection interface arrangement further includes a second interlock and a second stop aligned along the second reference line, wherein the first and second interlocks are between the first and second stops, wherein the second interlock fits within the enlarged portion of the second attachment opening when the second connection interface arrangement is in the first portion relative to the first connection interface arrangement, wherein the second interlock fits within the groove portion of the second attachment opening when the second connection interface arrangement is in the second position relative to the first connection interface arrangement, and wherein the second stop opposes a closed end of the groove portion of the second attachment opening when the second connection interface arrangement is in the second position relative to the first connection interface arrangement.

Aspect 40. The mechanical connection interface of aspect 28, wherein the second connection interface arrangement defines a latch release opening that aligns with the flexible cantilever latch when the second connection interface arrangement is in the second position relative to the first connection interface arrangement.

Aspect 41. A mechanical connection interface comprising:
- a first connection interface arrangement defining first and second attachment openings aligned along a first reference line, the first and second attachment openings each defining a groove portion and an enlarged portion, the groove portions having lengths that extend along the first reference line and first widths that extend perpendicular to the first reference line, the enlarged portions defining second widths that are larger than the first widths and that are perpendicular to the first reference line, the first connection interface arrangement further including a flexible cantilever latch positioned within the enlarged portion of the first attachment opening, the flexible cantilever latch having a length that extends along the first reference line, the flexible cantilever latch including a base end and a free end, the enlarged portion of the first attachment opening including an interlock receiving portion defined between the free end of the flexible cantilever latch and the groove portion of the first attachment opening, the free end of the flexible cantilever latch defining a first stop surface, the groove portion of the second attachment opening having an end positioned opposite from the enlarged portion of the second attachment opening which defines a second stop surface, and the flexible cantilever latch defining a stop receptacle including a ramp surface;
- a second connection interface arrangement including a first interlock, a second interlock, a first stop and a second stop all aligned along a second reference line, the first and second interlocks being positioned between the first and second stops, the first and second stops including stop surfaces that face at least partially away from the first and second interlocks, the first and second stops having ramp surfaces that face at least partially toward the first and second interlocks, the first and second interlocks defining third widths that extend perpendicular to the second reference line, the third widths being smaller than the second widths of the enlarged portions of the first and second attachment openings, the third widths being larger than the first widths of the groove portions of the first and second attachment openings, and the first and second interlocks being separated by a spacing along the second reference line that corresponds to a spacing between the enlarged portions of the first and second attachment openings along the first reference line;
- wherein the second connection interface arrangement is connected to the first connection interface arrangement by orienting the second connection interface arrangement in a first position relative to the first connection interface arrangement in which: a) the first and second reference axes are aligned; b) the first interlock is received within interlock receiving portion of the enlarged portion of the first attachment opening; c) the second interlock is received within the enlarged portion of the second attachment opening; and d) the first stop is positioned within the stop receptacle of the of the flexible cantilever latch with the ramp surface of the first stop opposing the ramp surface of the stop receptacle; and then sliding the second connection interface arrangement along the aligned first and second reference axes from the first position to a second position in which: a) the first interlock is received within and interlocked with the groove portion of the first attachment opening; b) the first stop is positioned within the interlock receiving portion of the enlarged portion of the first attachment opening with the stop surface of the first stop opposing the first stop surface at the free end of the flexible cantilever latch; c) the second stop is positioned within the groove portion of the second attachment opening with the stop surface of the second stop opposing the second stop surface at the end of the groove portion of the second attachment opening; and d) the second interlock is received within and interlocked with the groove portion of the second attachment opening; and
- wherein as the second connection interface arrangement is slid from the first position to the second position the ramp surface of the first stop engages the ramp surface of the stop receptacle to cause deflection of the flexible cantilever latch from a latching position to an unlatched position, and wherein after the first stop moves past the free end of the flexible cantilever latch the flexible cantilever latch elastically returns from the unlatched position to the latching position.

Aspect 42. The mechanical connection interface of aspect 41, wherein the first connection interface arrangement integrated with a telecommunications component.

Aspect 43. The mechanical connection interface of aspect 42, wherein the telecommunications component includes structure is adapted to manage optical fibers.

Aspect 44. The mechanical connection interface of aspect 43, wherein the telecommunications component is a tray.

Aspect 45. The mechanical connection interface of aspect 41, wherein the first connection interface arrangement is integrated with a bracket.

Aspect 46. The mechanical connection interface of aspect 41, wherein the second connection interface arrangement is integrated with a holder adapted to hold a fiber optic component.

Aspect 47. The mechanical connection interface of aspect 46, wherein the fiber optic component is a splice protector, a fiber optic adapter, a passive optical power splitter or a wavelength division multi-plexer.

Aspect 48. The mechanical connection interface of aspect 41, wherein the groove portions and the first and second interlocks have dovetailed shapes in cross-sectional planes that are perpendicular to the first and second reference lines.

Aspect 49. The mechanical connection interface of aspect 41, wherein the stop surfaces of the first and second stops face at least partially in opposite directions, wherein the ramp surfaces of the first and second stops face partially towards each other, and wherein the first and second stop surfaces face at least partially towards each other.

Aspect 50. The mechanical connection interface of aspect 41, wherein a main body of the telecommunications component includes first portion having a top side and a bottom side, wherein the base end of the flexible cantilever latch is unitarily formed with the main body, wherein the first and second attachment openings extend through the first portion of the main body from the top side to the bottom side, and wherein the stop receptacle of the flexible cantilever latch is defined at a top side of the flexible cantilever latch that is coplanar with the top side of the first portion of the main body when the flexible cantilever latch is in the latching position, and wherein the stop receptacle extends downwardly into the flexible cantilever latch from the top side of the flexible cantilever latch so that the stop receptacle extends lower than the top side of the first portion of the main body when the flexible cantilever latch is in the latching position.

Aspect 51. The mechanical connection interface of aspect 41, wherein the first connection interface arrangement defines a first seating surface through which the first and second attachment openings extend, wherein the second connection interface arrangement defines a second seating surface from which the first interlock, the second interlock, the first stop and the second stop project, wherein the first and second seating surfaces are flush when the second connection interface arrangement is in the first position relative to the first connection interface arrangement and are also flush when the second connection interface arrangement is in the second position relative to the first connection interface arrangement, wherein the flexible cantilever latch is in the latching position when the second connection interface arrangement is in the first position relative to the first connection interface arrangement, and wherein the flexible cantilever latch is in the latching position when the second connection interface arrangement is in the second position relative to the first connection interface arrangement.

Aspect 52. A fiber optic system comprising:
a first connection interface arrangement;
a second connection interface arrangement configured to interlock with the first connection interface arrangement;
a splice holder having the second connection interface arrangement; and
a fiber optic adapter holder having the second connection interface arrangement.

Aspect 53. The fiber optic system of aspect 52, further comprising a passive optical splitter holder having the second connection interface arrangement.

Aspect 54. The fiber optic system of aspect 52, further comprising a wavelength division multi-plexer holder having the second connection interface arrangement.

Aspect 55. A cable anchor comprising:
an anchor component having a cable strength member clamp at a first end, a retention tab at an opposite second end, and a cable clamp mounting bracket between the first and second ends, the cable clamp mounting bracket including first and second fingers separated by a gap; and
a strap-style cable clamp mounted at the cable clamp mounting bracket.

Aspect 56. The cable anchor of aspect 55, wherein the strap-style cable clamp is a hose clamp or a cable tie.

Aspect 57. A cable anchoring system comprising:
a section of hook tape including a tape layer and a plurality of mini-hooks integrated with a hook side of the tape layer; and
a strap-style cable clamp for compressing strength members of a fiber optic cable against the hook side of the tape layer.

Aspect 58. The cable anchor of aspect 57, wherein the strap-style cable clamp is a hose clamp or a cable tie.

Aspect 59. A tray arrangement comprising:
a first fiber management tray and a second fiber management tray pivotally connected to the first tray;
the first tray including a first side and an opposite second side, the first side including connectorized patching or splicing functionality and the second side providing loop storage of uncut buffer tubes of a feeder cable, the first side of the first tray being adapted to anchor drop cables thereto and the second side of the first tray being adapted to anchor the feeder cable thereto; and
a second tray having a first side providing splicing functionality and the second side managing accessed but uncut optical fibers of the feeder cable.

Aspect 60. The tray arrangement of aspect 59, wherein the second tray is pivotally moveable between open and closed positions relative to the first tray, and wherein the first side of the second tray faces the second side of the first tray when the second tray is in the closed position.

Aspect 61. A telecommunications device comprising:
a re-enterable enclosure including a cable access end;
an insert unit that can be loaded into the re-enterable enclosure as a unit, the insert unit having a first side and a second side, the insert unit including:
a sealant containment arrangement that is positioned adjacent the cable access end of the enclosure when the insert unit is positioned within the enclosure, the sealant containment region including a first cable routing region for routing cables through the cable access end of the enclosure to the first side of the insert unit, and a second containment region including a second cable routing region for routing cables through the cable access end of the enclosure to the second side of the insert unit;
a first cable anchoring location at the first side of the insert unit;
a second cable anchoring location at the second side of the insert unit;
a fiber patching region at the first side of the insert unit, the fiber patching region including either optical slicing locations or demateable optical connection locations;
a fiber loop-storage region at the second side of the insert unit; and
a fiber splicing region layered between the first and second sides of the insert unit.

Aspect 62. The telecommunications device of aspect 61, wherein the fiber loop-storage region is provided on a pivotal tray.

Aspect 63. The telecommunications device of aspect 61 or 62, wherein the patching region includes the demateable optical connection locations.

Aspect 64. The telecommunications device of any of aspects 61-63, wherein the insert unit includes a sealant containment and cable anchoring frame which includes the sealant containment arrangement, the first cable anchoring location and the second cable anchoring location.

Aspect 65. The telecommunications device of aspect 64, further comprising an intermediate tray attached to one end of the sealant containment and cable anchoring frame, the intermediate tray including a first side that faces toward the first side of the insert unit and a second side that faces toward the second side of the insert unit.

Aspect 66. The telecommunications device of aspect 65, further comprising a fiber optic adapter mounting panel that attaches to the first side of the intermediate tray.

Aspect 67. The telecommunications device of aspect 66, wherein the fiber optic adapter mounting panel attaches to the first side of the intermediate tray by a snap-fit connection.

Aspect 68. The telecommunications device of aspect 66, further comprising a cover that covers the first side of the intermediate tray.

Aspect 69. The telecommunications device of aspect 68, wherein the cover is removable.

Aspect 70. The telecommunications device of aspect 68, wherein the adapter mounting panel has a first side that faces toward the first cable anchoring location and a second side that faces away from the first cable anchoring location, wherein the cover includes a first portion that covers a first portion of the intermediate tray positioned at the first side of the adapter mounting panel and a second portion that covers a second portion of the intermediate tray positioned at the second side of the adapter mounting panel, the first portion of the cover aligning with a bottom of the adapter mounting panel and the second portion of the cover extending to a top of the adapter mounting panel.

Aspect 71. The telecommunications device of aspect 70, wherein the second portion of the cover is a dome portion.

Aspect 72. The telecommunications device of any of aspects 65-71, further comprising a splice tray mounted at the second side of the intermediate tray.

Aspect 73. The telecommunications device of aspect 72, further comprising a pivotal tray at which the loop storage region of the insert unit is provided, the pivotal tray being moveable relative to the sealant containment and cable anchoring frame between a first position wherein the pivotal tray covers a side of the splice tray and a second position wherein the side of the splice tray is accessible from the second side of the insert unit.

Aspect 74. A telecommunications device comprising:
a fiber management component including:
a first fiber management tray; and
a second fiber management tray, wherein the first and second fiber management are coupled together in a stacked relationship with the first fiber management tray defining a first side of the fiber management component and the second fiber management tray defining a second of the fiber management component that is opposite from the first side.

Aspect 75. The telecommunications device of aspect 74, wherein the first and second fiber management trays are coupled by a snap-fit connection.

Aspect 76. The telecommunications device of any of aspects 74 or 75, wherein the first and second fiber management trays are not pivotal relative to one another.

Aspect 77. The telecommunications device of any of aspects 74-76, wherein the first fiber management tray is a patching tray including an adapter mounting panel at the first side of the fiber management component and a splicing tray at the second side of the fiber management component.

Aspect 78. The telecommunications device of aspect 77, wherein the fiber management component has a first end positioned opposite from a second end, wherein the adapter mounting panel has a first side that faces toward the first end of the fiber management component, wherein the first end is adapted to connect to a cable anchoring and sealing frame, and wherein a cover mounts over a fiber storage region located at the first side of the fiber management component between the second side of the adapter mounting panel and the second end of the fiber management panel.

Aspect 79. The telecommunications device of aspect 78, wherein the patching tray includes a tray platform having first and second platform portions located at the fiber storage region, the first platform portion being elevated relative to the second platform portion and being positioned between the second side of the adapter mounting panel and the second platform portion, the second platform portion being positioned between the first platform portion and the second end of the fiber management component, the first and second platforms being vertically separated be a step defining an opening that extends through the step and across width of the fiber management component, where a fiber coil storage space is located over the second platform portion and under the first platform portion.

Aspect 80. The telecommunications device of any of aspects 78 or 79, wherein a fiber pass-through is defined between the second side of the fiber management component and the fiber storage region, the fiber pass-through having an open side at an outer perimeter of the fiber management component.

Aspect 81. The telecommunications device of any of aspects 78-80, wherein the fiber management component defines a fiber by-pass pass-through for routing an optical fiber around the adapter mounting panel from the first side of the adapter mounting panel to the second side of the fiber management component, the fiber by-pass pass-through having an open side at an outer perimeter of the fiber management component.

Aspect 82. The telecommunications device of aspect 81, wherein the cover has an outer inset portion that coincides with the fiber by-pass pass-through.

Aspect 83. A telecommunications device comprising:
a tray including a cable tie-down element including an arm having first and second sides, the arm defining a first set of notches at the first and second sides and a second set of notches at the first and second sides, the first set of notches being axially spaced from the second set of notches along a length of the arm, the tray also including a shoulder axially space from a free end of the arm;
a cable anchor including first and second sets of latches and a retainer, the first and second sets of latches being configured to fit within the first and second sets of notches, wherein by positioning the cable anchor such that the first and second sets of latches are received within the first and second sets of notches and then sliding the cable anchor axially relative to the arm, the cable anchor is moved to a secured position relative to the arm where the latches prevent the cable anchor from being lifted from the arm, and wherein the retainer snaps past the shoulder to an axial movement locking position when the cable anchor is slid to the secured position.

Aspect 84. A telecommunications device comprising:
a tray including first and second latches defining an anchor receiving location between the first and second latches, the tray also including an anchor support rib positioned at the anchor receiving location, the tray further including an anchor retention opening; and
a cable anchor including a first portion that snaps between the first and second latches and seats on the anchor support rail, the cable anchor also including a retention tab that fits within the anchor retention opening.

Aspect 85. A sealed enclosure comprising:
a housing defining an opening;
a cable sealing arrangement positioned within the opening, the cable sealing arrangement engaging the housing to seal the opening, the cable sealing arrangement including a block of gel defining a total gel volume, the cable sealing arrangement including at least first and second gel sections which coincide with at least a portion of the block of gel, the cable sealing arrangement including a cable pass-through location defined at an interface between the first and second gel sections, the first and second gel sections being configured to form seals about cables routed axially through the cable pass-through location, the gel volume having a first outer boundary corresponding to an outer shape of the gel volume when the block of gel is not sealing about cables, wherein open space is provided to accommodate deformation of the block of gel when the gel is pressurized while one or more cables are within the cable pass-through location, and wherein the open space has a volume that is at least 5 percent as large as the total gel volume.

Aspect 86. The sealed enclosure of aspect 85, wherein the open space has a volume that is at least 10 percent as large as the total gel volume.

Aspect 87. The sealed enclosure of aspect 85, wherein the open space has a volume that is at least 12.5 percent as large as the total gel volume.

Aspect 88. The sealed enclosure of aspect 85, wherein the open space has a volume that is at least 15 percent as large as the total gel volume.

Aspect 89. The sealed enclosure of any of aspects 85-88, wherein at least a portion of the open space is located laterally outside the first outer boundary.

Aspect 90. The sealed enclosure of any of aspects 85-88, wherein a majority of the open space is located laterally outside the first outer boundary.

Aspect 91. The sealed enclosure of any of aspects 85-90, wherein at least a portion of the open space is within the first outer boundary at a location offset from the cable pass-through location.

Aspect 92. The sealed enclosure of any of aspects 85-90, wherein at least a portion of the open space is within the first outer boundary at a location encapsulated within one of the first and second gel sections at a location offset from the cable pass-through location.

Aspect 93. The sealed enclosure of any of aspects 85-92, wherein the block of gel includes a third gel section, wherein the second gel section is positioned between the first and third gel sections, wherein the cable pass-through location is a first cable pass-through location, and wherein a second cable pass-through location is defined at an interface between the second and third gel sections.

Aspect 94. The sealed enclosure of any of aspects 61-69, wherein at least a portion of the open space is within the first outer boundary at a location encapsulated within one of the second gel section at a location offset from the first and second cable pass-through locations.

Aspect 95. The sealed enclosure of any of aspects 85-94, wherein the housing includes a base and a cover that cooperate to define an interior of the housing, and wherein the block of gel is pressed between the base and the cover when the base and the cover are secured together.

Aspect 96. The sealed enclosure of aspect 95, wherein the base and the cover are clamped by perimeter clamps together to close the housing, wherein the perimeter clamps apply force for pressurizing the block of gel, and wherein a dedicated actuator is not provided for pressurizing the block of gel.

Aspect 97. The sealed enclosure of aspect 96, wherein a dedicated spring is not provided for maintaining the block of gel in compression. Aspect 98. The sealed enclosure of any of aspects 85-97, wherein no pre-defined cable receiving positions are defined by the first and second gel sections at the cable pass-through location.

Aspect 99. The sealed enclosure of any of aspects 85-98, wherein the cable pass-through location seals itself without requiring a plug when the block of gel is pressurized and no cable is present at the cable pass-through location.

Aspect 100. The sealed enclosure of any of aspects 85-99, wherein a volume of gel displaced by a cabling passing through the block of gel is at least 90 percent of a total volume defined by the cabling within the block of gel.

Aspect 101. The sealed enclosure of aspect 100, wherein the volume of gel displaced by cabling passing through the block of gel is generally equal to the total volume defined by the cabling within the block of gel.

Aspect 102. The sealed enclosure of any of aspects 85-101, wherein the cable pass-through location can accommodate cables having a diameter across a full range from 0-14 millimeter.

Aspect 103. The sealed enclosure of any of aspects 85-101, wherein the cable pass-through location can accommodate at least a 14 millimeter range in cable diameter.

Aspect 104. The sealed enclosure of any of aspects 85-103, further comprising inner and outer axial containment walls for axially containing the block of gel during pressurization.

Aspect 105. The sealed enclosure of aspect 104, wherein the inner and outer axial containment walls are axially fixed relative to each other when the block of gel is pressurized.

Aspect 106. The sealed enclosure of aspect 104, wherein the inner and outer axial containment walls are axially fixed relative to the housing when the block of gel is pressurized.

Aspect 107. The sealed enclosure of any of aspects 85-106, further comprising a volume compensation plate positioned at the first outer boundary of the block of gel, the volume compensation plate defining a plurality of gel receiving openings into which gel flows when the block of gel is pressurized while cabling is present at the cable pass-through location.

Aspect 108. The sealed enclosure of aspect 107, wherein at least some of the gel extrudes through the gel receiving openings into a region defined between the housing and the volume compensation plate.

Aspect 109. The sealed enclosure of any of aspects 107 or 108, further comprising a cover layer attached to the volume compensation plate which covers the gel receiving openings, wherein the cover layer flexes, stretches or breaks to allow the portion of the gel to enter or pass-through the gel receiving openings.

Aspect 110. The sealed enclosure of any of aspects 85-109, further comprising a volume compensation plate positioned within the block of gel, the volume compensation plate defining a plurality of gel receiving openings into which gel flows when the block of gel is pressurized while cabling is present at the cable pass-through location, wherein the gel receiving openings pass through the volume compensation plate from a first side to a second side, wherein cover layers which cover the gel receiving openings are attached to the volume compensation plate at the first and second sides of the volume compensation plate, and wherein one or both of the cover layer flex, stretch or break to allow the gel to enter the gel receiving openings.

Aspect 111. The sealed enclosure of aspects 107 or 108, further comprising foam within the gel receiving openings that compresses when the block of gel is pressurized.

Aspect 112. The sealed enclosure of any of aspects 85-109, further comprising a volume compensation plate positioned within the block of gel, the volume compensation plate defining a plurality of gel receiving openings into which gel flows when the block of gel is pressurized while cabling is present at the cable pass-through location, wherein the gel receiving openings pass through the volume compensation plate from a first side to a second side, wherein foam is positioned the gel receiving openings, and wherein the foam compresses to allow gel to enter the flex, stretch or break to allow the gel to enter the gel receiving openings.

Aspect 113. The sealed enclosure of any of aspects 85-109, wherein the open space is defined between tapered projections between which gel of the block of gel flows when the block of gel.

Aspect 114. The sealed enclosure of aspect 113, wherein the tapered projections are configured such that a cross-sectional area of the open space reduces as the gel flows into the open space.

Aspect 115. The sealed enclosure of aspect 114, wherein the tapered projections have free ends at minor ends of the tapered projections and base ends at major ends of the tapered projections.

Aspect 116. The sealed enclosure of aspect 115, wherein the based ends of the tapered projections are formed with a plate.

Aspect 117. The sealed enclosure of any of aspects 114-116, wherein the tapered projections are cone-shaped or truncated coned-shaped.

Aspect 118. A cable sealant arrangement comprising:
first and second sealant axial containment structures that are axially fixed relative to one another; and
sealant contained between the first and second axial containment structures, wherein the cable sealant arrangement can accommodate at least 5, 10, 15, 20 or 25 percent displacement of a total volume of the sealant by cable without axial movement of the first and second sealant axial containment structures.

Aspect 119. The cable sealant arrangement of aspect 118, further comprising removable port size reducers that mount to enlarged port locations of the first and second sealant containment structures, the removable port size reducers including volume occupying portions that extend between the first and second sealant axial containment structures when the removable port size reducers are mounted to the first and second sealant axial containment structures.

Aspect 120. The cable sealant arrangement of any of aspects 118 or 119, wherein the port size reducer includes a reduced-sized port defining section about an axis, and wherein the volume occupying portion is offset from the axis and not symmetric about the axis.

Aspect 121. The cable sealant arrangement of any of aspects 118-120, wherein the volume occupying portion defines an sealant axial containment surface having a surface area larger than or at least two times as large as a cross-sectional area defined the reduced-sized.

Aspect 122. The cable sealant arrangement of any of aspects 118-121, wherein the volume occupying portion of at least one of the port size reducers extends into the interior space between the first and second sealant axial containment structures for an axial distance the corresponds to at least 10, 15 or 20 percent of a total axial distance between the first and second sealant axial containment structures.

Aspect 123. The cable sealant arrangement of any of aspects 118-122, wherein the sealant includes a pre-defined recess or recesses in which the volume occupying portions are located when the port reducers are mounted to the first and second sealant axial containment structures.

Aspect 124. The cable sealant arrangement of any of aspects 118-123, wherein the cable sealant arrangement is incorporated at a cable entrance location of a housing.

Aspect 125. The cable sealant arrangement of any of aspects 118-124, wherein the sealant arrangement is pressurized between a base and a cover of the housing.

Aspect 126. The cable sealant arrangement of aspect 125, wherein the base and/or the cover define open space for accommodating displacement of the sealant.

Aspect 127. The cable sealant arrangement of aspect 126, further comprising a spring for applying spring pressure to sealant that flows into the open space.

Aspect 128. The cable sealant arrangement of any of aspects 118-127, wherein no predefined cable passages are defined through the cable sealant arrangement.

Aspect 129. A cable sealant arrangement comprising:
first and second volumes of sealant that meet at an interface plane when not pressurized, wherein cables can be routed between the first and second volumes of sealant at the interface plane; and
the first volumes of sealant defining a void region adjacent the interface plane such that when the first and second volumes of sealant are pressurized a portion of the second volume of sealant flows across the interface plane and into the void region.

Aspect 130. A cable sealant arrangement comprising:
first and second volumes of sealant positioned one on top of the other, wherein cables can be routed between the first and second volumes of sealant; and
the first volume of sealant defining a void region adjacent the second volume of sealant such that when the first and second volumes of sealant are pressurized a portion of the second volume of sealant flow into the void region such that a vertical overlap exists between the first and second volumes of sealant.

Aspect 131. A cable sealant arrangement comprising:
first and second volumes of sealant positioned adjacent one such that the first and second volumes oppose one another along a first orientation, wherein cables can be routed between the first and second volumes of sealant; and the first volume of sealant defining a void region adjacent the second volume of sealant such that when the first and second volumes of sealant are pressurized a portion of the second volume of sealant flow into the void region such that an overlap exists between the first and second volumes of sealant along a second orientation that is perpendicular to the first orientation.

Aspect 132. A cable sealing block comprising:
a volume of sealant; and
a carrier embedded in the sealant.

Aspect 133. The cable sealing block of aspect 132, wherein the carrier includes retention structures for snap-fitting the cable sealing block into a piece of a housing.

Aspect 134. The cable sealing block of aspect 133, wherein the block is elongate along a length, and wherein the retention structures includes tabs at opposite ends of the length of the block.

Aspect 135. The cable sealing block of aspect 132, wherein volume of sealant is overmolded over the carrier, and wherein the carrier includes reinforcing plates at ends of the volume of sealant for controlling placement of the sealant at the ends of the volume of sealant during installation.

Aspect 136. The cable sealing block of aspect 135, wherein the reinforcing plates are connected by struts that extend across a length of the volume of sealant between the reinforcing plates.

Aspect 137. A cable sealant arrangement comprising:
first and second sealant axial containment structures that are axially fixed relative to one another; and
sealant contained between the first and second axial containment structures; and
removable port size reducers that mount to enlarged port locations of the first and second sealant containment structures, the removable port size reducers including volume occupying portions that extend between the first and second sealant axial containment structures when the removable port size reducers are mounted to the first and second sealant axial containment structures.

Aspect 138. The cable sealant arrangement of aspect 137, wherein the port size reducer includes a reduced-sized port defining section about an axis, and wherein the volume occupying portion is offset from the axis and not symmetric about the axis.

Aspect 139. The cable sealant arrangement of any of aspects 137 or 138, wherein the volume occupying portion defines an sealant axial containment surface having a surface area larger than or at least two times as large as a cross-sectional area defined by the reduced-sized port.

Aspect 140. The cable sealant arrangement of any of aspects 137-139, wherein the volume occupying portion of at least one of the port size reducers extends into the interior space between the first and second sealant axial containment structures for an axial distance the corresponds to at least 10, 15 or 20 percent of a total axial distance between the first and second sealant axial containment structures.

Aspect 141. The cable sealant arrangement of any of aspects 137-140, wherein the sealant includes a predefined recess or recesses in which the volume occupying portions are located when the port reducers are mounted to the first and second sealant axial containment structures.

Aspect 142. A cable sealant arrangement for sealing a cable passage location defined at an end of an enclosure, the cable sealant arrangement comprising:
sealant providing sealing between a base and a cover of the enclosure at the cable passage location, the sealant defining a continuous seal including axial face seal portions extending across widths of the cover and the base and radial seal portions extending across a mechanical interface between the base and the cover.

Aspect 143. The cable sealant arrangement of aspect 142, wherein the sealant includes first and second separate volumes positioned adjacent to one another, and wherein the first volume defines a void into which a portion of the second volume flows when the sealant is pressurized.

Aspect 144. The cable sealant arrangement of aspect 143, wherein the void is at a transition between one of the face seal portions and one of the radial seal portions.

Aspect 145. The cable sealant arrangement of any of aspects 142-144, wherein springs for applying spring pressure to the sealant are mounted in the base and in the cover.

Aspect 146. A telecommunications device comprising:
an enclosure including a base and a cover, the enclosure having a cable entrance;
first and second sealant axial containment structures mounted within the enclosure adjacent the cable entrance end, the first and second sealant axial containment structures that are axially fixed relative to one another; and
sealant contained between the first and second sealant axial containment structure, the sealant including an intermediate sealant block secured between the first and second sealant axial containment structures, the sealant also including an upper sealant block that contacts the intermediate sealant block at a first cable pass-through interface, the sealant further including a lower sealant block that contacts the intermediate sealant block at a second cable pass-through interface.

Aspect 147. The telecommunications device of aspect 146, wherein struts extend axially between the first and second sealant axial containment structures, and wherein the intermediate sealant block is overmolded over the struts.

Aspect 148. The telecommunications device of aspect 146 or 147, wherein the upper and lower sealant blocks snap within receptacles defined by the cover and the base.

Aspect 149. The telecommunications device of any of aspects 146-148, wherein the intermediate sealant block includes a carrier embedded in a volume of sealant.

Aspect 150. The telecommunications device of any of aspects 146-149, wherein the carrier includes end plates connected by elongate struts.

Aspect 151. The telecommunications device of any of aspects 146-150, wherein the first and second sealant axial containment structures are port of a cable anchoring and cable fixation frame that snaps within the base.

Aspect 152. The telecommunications device of any of aspects 146-151, further comprising removable port size reducers that mount to enlarged port locations of the first and second sealant axial containment structures, the removable port size reducers including volume occupying portions that extend between the first and second sealant axial containment structures when the removable port size reducers are mounted to the first and second sealant axial containment structures.

Aspect 153. The telecommunications device of any of aspects 146-152, wherein the port size reducer includes a reduced-sized port defining section about an axis, and wherein the volume occupying portion is offset from the axis and not symmetric about the axis.

Aspect 154. The telecommunications device of any of aspects 146-153, wherein the volume occupying portion defines an sealant axial containment surface having a surface area larger than or at least two times as large as a cross-sectional area defined the reduced-sized.

Aspect 155. The telecommunications device of any of aspects 146-154, wherein the volume occupying portion of at least one of the port size reducers extends into the interior space between the first and second sealant axial containment structures for an axial distance the corresponds to at least 10, 15 or 20 percent of a total axial distance between the first and second sealant axial containment structures.

Aspect 156. The telecommunications device of any of aspects 146-155, wherein the sealant includes a predefined recess or recesses in which the volume occupying portions are located when the port reducers are mounted to the first and second sealant axial containment structures.

Aspect 157. The telecommunications device of any of aspects 146-156, wherein no predefined cable passages are defined through the cable sealant arrangement.

Aspect 158. A cable sealing system:
first and second sealant axial containment structures mounted within the enclosure adjacent the cable entrance end, the first and second sealant axial containment structures that are axially fixed relative to one another; and
an intermediate sealant block secured between the first and second sealant axial containment structures;
a first set of upper and lower sealing blocks used with the intermediate sealing block to provide cable sealing rated for underground applications; and
a second set of upper and lower sealing blocks used with the intermediate sealing block to provide cable sealing rated for aerial applications.

Aspect 159. A telecommunications device comprising:
sealant including a first volume and a second volume that meet at a cable pass-through location, the first volume having a first axial thickness at the cable pass-through location, the second volume having a second axial thickness at the cable pass-through location, the second axial thickness being larger than the first axial thickness.

Aspect 160. The telecommunications device of aspect 159, wherein the second axial thickness is at least 1.1, 1.2, 1.3, 1.4, 1.5, 1.6, 1.7, 1.8, 1.9 or 2.0 times as large as the first axial thickness.

Aspect 161. The telecommunications device of any of aspects 159 or 160, wherein the first and second volumes are mounted between first and second sealant axial containment structures that are axially fixed relative to one another.

Aspect 162. The telecommunications device of any of aspects 159-161, wherein the sealant mounts within an enclosure and is pressurized by closing the enclosure.

Aspect 163. The telecommunications device of aspect 162, further comprising angled ramp surfaces that are oriented at oblique angles relative to an axial orientation and that are positioned at the cable pass-through location for forcing portions of the second volume at least partially axially toward the cable pass-through location when the enclosure is closed.

Aspect 164. The telecommunications device of aspect 163, wherein the angled ramp surfaces are associated with the first and second axial containment structures.

Aspect 165. The telecommunications device of aspect 164, wherein the angled ramp surfaces are defined by port reducers mounted to the first and second axial containment structures.

Aspect 166. A telecommunications device comprising:
first and second sealant axial containment structures that are axially fixed relative to one another and relative to an enclosure when mounted therein;
sealant contained between the first and second containment structures, the sealant defining a cable pass-through location;
angled ramp surfaces associated with the first and second containment structures, the angled ramp surfaces being are oriented at oblique angles relative to an axial orientation ad being configured to forcing portions of the sealant at least partially in an axially orientation when the enclosure is closed.

Aspect 167. The telecommunications device of aspect 166, wherein the angled ramp surfaces are defined by port reducers mounted to the first and second axial containment structures.

Aspect 168. The telecommunications device of any of aspects 166-167, wherein the ramp surfaces oppose each other and axially compress the sealant thereinbetween.

Aspect 170. The telecommunications device of any of aspects 166-168, wherein the ramp surfaces are positioned in alignment with and on opposite sides of the cable pass-through location.

Aspect 171. A cable sealant arrangement comprising:
first and second sealant axial containment structures that are axially fixed relative to one another; and
sealant contained between the first and second axial containment structures; and removable port size reducers that mount to enlarged port locations of the first and second sealant containment structures, the removable port size reducers including port reducing portions defining reduced-sized ports and volume occupying portions that extend between the first and second sealant axial containment structures when the removable port size reducers are mounted to the first and second sealant axial containment structures.

Aspect 172. The cable sealant arrangement of aspect 171, wherein the volume occupying portions include first sections that align with the enlarged port locations and second sections that project outwardly from the first sections in an orientation transverse to an axial orientation.

Aspect 173. The cable sealant arrangement of aspect 172, wherein the second sections overlap the first and second axial containment structures.

Aspect 174. The cable sealant arrangement of any of aspects 171-173, wherein when a given one of the port reducers is mounted at one of the enlarged port locations, the volume occupying portion prevents sealant from occupying a volume between the containment structures that coincides with at least 10 percent, or at least 15 percent, or at least 20 percent, or at least 30 percent, or at least 40 percent of a difference in sealant displacement that occurs between a smallest cable intended to be routed through the port reducer and a largest cable intended to be routed through the enlarged port location.

Aspect 175. A telecommunications device comprising:
an enclosure including a first housing piece and a second housing piece that meet at a perimeter interface sealed by a gasket, the enclosure defining a cable entrance location;
a volume of sealant mounted at the cable entrance location for sealing cables routed into the enclosure;
a reinforcing element enclosed in the volume of sealant for ensuring proper positioning of a portion of the volume of sealant at a location where the first and second housing pieces engage the gasket.

Aspect 176. The telecommunications device of aspect 176, wherein the reinforcing element traverses a joint between the first and second housing piece that is sealed by the gasket.

Aspect 177. The telecommunications device of any of aspects 175-176, wherein the reinforcing element is over-molded in the sealant.

Aspect 178. The telecommunications device of any of aspects 175-177, wherein the reinforcing element is a plate.

Aspect 179. The device or arrangement of any of aspects 1-179, wherein the sealant has a residual hardness in the range of 20-80 g after one hour, and/or a compression set less than 10% or less than 5% or less than 2% after 100 hours, and/or a resistance to extrusion having a measured volume less than 0.5 cubic centimeters or less than 0.25 cubic centimeters or 0 cubic centimeters, and/or an elongation to failure of at least 300%, or 500% or 800% and/or an oil bleed out less than 15% or less than 10% or less than 5% by weight measured at 500 hours.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A cable sealant arrangement comprising:
first and second sealant axial containment structures that are axially fixed relative to one another;
sealant contained between the first and second sealant axial containment structures; and
removable port size reducers that mount to enlarged port locations of the first and second sealant axial containment structures, the removable port size reducers including volume occupying portions that extend between the first and second sealant axial containment structures when the removable port size reducers are mounted to the first and second sealant axial containment structures.

2. The cable sealant arrangement of claim 1, wherein each removable port size reducer includes a reduced-sized port defining section about an axis, and wherein the volume occupying portion is offset from the axis and not symmetric about the axis.

3. The cable sealant arrangement of claim 2, wherein the volume occupying portion defines a sealant axial containment surface having a surface area larger than or at least two times as large as a cross-sectional area defined by the reduced-sized port defining section.

4. The cable sealant arrangement of claim 1, wherein the volume occupying portion of at least one of the removable port size reducers extends into an interior space between the first and second sealant axial containment structures for an axial distance that corresponds to at least 10 percent of a total axial distance between the first and second sealant axial containment structures.

5. The cable sealant arrangement of claim 4, wherein the volume occupying portion of at least one of the removable port size reducers extends into the interior space between the first and second sealant axial containment structures for an axial distance that corresponds to at least 15 percent of the total axial distance between the first and second sealant axial containment structures.

6. The cable sealant arrangement of claim 4, wherein the volume occupying portion of at least one of the removable port size reducers extends into the interior space between the first and second sealant axial containment structures for an axial distance that corresponds to at least 20 percent of the total axial distance between the first and second sealant axial containment structures.

7. The cable sealant arrangement of claim 1, wherein the sealant includes a pre-defined recess or recesses in which the volume occupying portions are located when the removable port size reducers are mounted to the first and second sealant axial containment structures.

8. The cable sealant arrangement of claim 1, wherein the volume occupying portions include first sections that align with the enlarged port locations and second sections that project outwardly from the first sections in an orientation transverse to an axial orientation.

9. The cable sealant arrangement of claim 8, wherein the second sections overlap the first and second sealant axial containment structures.

10. The cable sealant arrangement of claim 1, wherein when one of the removable port size reducers is mounted at one of the enlarged port locations, the volume occupying portion prevents sealant from occupying a volume between the first and second sealant axial containment structures that coincides with at least 10 percent of a difference in sealant displacement that occurs between a smallest cable intended to be routed through the port size reducer and a largest cable intended to be routed through the enlarged port location.

11. The cable sealant arrangement of claim 10, wherein the difference in sealant displacement is at least 15 percent.

12. The cable sealant arrangement of claim 10, wherein the difference in sealant displacement is at least 20 percent.

13. The cable sealant arrangement of claim 10, wherein the difference in sealant displacement is at least 30 percent.

14. The cable sealant arrangement of claim 10, wherein the difference in sealant displacement is at least 40 percent.

15. The cable sealant arrangement of claim 1, wherein the removable port size reducers mount at the enlarged port locations of the first and second sealant containment structures via snap-fit connections.

16. The cable sealant arrangement of claim 15, wherein each removable port size reducer includes two latches that snap within latch receivers of the first and second sealant axial containment structures.

17. The cable sealant arrangement of claim 15, wherein each removable port size reducer includes a stabilizing projection that fits within a projection receiver of the first sealant axial containment structure.

18. A port size reducer comprising a body including first and second portions connected by a flexible extension so that the first and second portions are movable relative to each other, the first and second portions cooperating to define a passage forming a reduced port size location extending between a first end and a second end, the body defining a sealant containment surface at the first end of the body, the sealant containment surface extending generally perpendicular to the passage, the body also including a sealant displacement surface extending from the sealant containment surface at an oblique angle relative to the passage.

19. The port size reducer of claim 18, wherein the flexible extension forms a finger tab configured to facilitate directing the port size reducer.

20. The port size reducer of claim 18, wherein the body includes two latches, two stabilizing projections, and two side channels having open sides that face laterally outwardly from opposite sides of the port size reducer.

21. A sealed enclosure including the cable sealant arrangement of claim 1, the sealed enclosure comprising:
   a housing defining an opening; and
   the cable sealant arrangement being positioned within the opening, the cable sealant arrangement engaging the housing to seal the opening, the sealant of the cable sealant arrangement including a block of gel defining a total gel volume, the cable sealant arrangement including at least first and second gel sections which coincide with at least a portion of the block of gel, the cable sealant arrangement including a cable pass-through location defined at an interface between the first and second gel sections, the first and second gel sections being configured to form seals about cables routed axially through the cable pass-through location, the block of gel having a first outer boundary corresponding to an outer shape of the block of gel when the block of gel is not sealing about cables, wherein open space is provided to accommodate deformation of the block of gel when the block of gel is pressurized while one or more cables are within the cable pass-through location, and wherein the open space has a volume that is at least 10 percent as large as the total gel volume;
   wherein the open space is defined between tapered projections between which gel of the block of gel flows when the tapered projections are configured such that a cross-sectional area of the open space reduces as the gel flows into the open space, wherein the tapered projections have free ends at minor ends of the tapered projections and base ends at major ends of the tapered projections, and wherein the base ends of the tapered projections are formed with a plate.

22. A sealed enclosure including the cable sealant arrangement of claim 1, the sealed enclosure comprising:
   a housing that is elongate along a major axis of the housing, the major axis extending along a length of the housing between first and second opposite ends, the housing including a base and a cover that cooperate to define an interior of the housing, the cover being pivotally connected to the base and being pivotally movable relative to the base between an open position and a closed position, the cover defining a front of the housing and the base defining a rear of the housing;
   the cable sealant arrangement being positioned at the first end of the housing, the sealant of the cable sealant arrangement including a rear gel volume mounted in the base, a front gel volume mounted in the cover, and an intermediate gel volume positioned between the front and rear gel volumes, the cable sealant arrangement including a first cable entry location defined between the rear gel volume and the intermediate gel volume and a second cable entry location defined between the front gel volume and the intermediate gel volume, the cable sealant arrangement also including a perimeter seal that extends about a perimeter of the housing for sealing between the cover and the base;
   a management unit that mounts within the interior of the housing, the management unit being elongate along a major axis that is parallel to the major axis of the housing when the management unit is mounted within the interior of the housing, the major axis of the management unit extending along a length of the management unit between a first end and an opposite second end of the management unit, the first end of the management unit being positioned adjacent to the first end of the housing when the management unit is mounted within the housing, the second end of the management unit being positioned at the second end of the housing when the management unit is mounted within the housing, the management unit including a support infrastructure including a front side and an opposite back side, the support infrastructure including an adapter mounting location and a front cover positioned between the adapter mounting location and the second end of the management unit at a front of the management unit, the management unit also including a rear tray positioned at a rear of the management unit, the rear tray being pivotally coupled to the support infrastructure, the rear tray being pivotally movable about a tray pivot axis that is transverse relative to the major axis of the management unit between an open position and a closed position, the rear tray being located at the second end of the management unit;
   splice mounting components mounted to the support infrastructure at a splice mounting location positioned forwardly with respect to the rear tray, the splice mounting components being covered by the rear tray when the rear tray is in the closed position and being accessible from the rear of the management unit when the rear tray is in the open position;
   a bank of adapters mounted at the adapter mounting location, the bank of adapters including first portions that face at least partially toward the first end of the management unit and second ports that face at least partially toward the second end of the management unit, the front cover being configured to block access to the second ports from the front of the management unit;
   pre-installed fiber optic connectors loaded into the second ports of the fiber optic adapters, the pre-installed fiber optic connectors terminating the ends of pigtail optical fibers that are routed to the splice mounting location;
   first cable anchors provided at the first end of the management unit at the rear of the management unit;
   second cable anchors provided at the first end of the management unit at the front of the management unit;
   wherein, in use:
   a) a pass-through cable is routed through the first cable entry location, is anchored to the rear of the support infrastructure by the first cable anchors, has a portion stored in a cable loop at the rear tray, and includes optical fibers that are accessed from a mid-span location of the pass-through cable within the housing and that are spliced to the pigtail optical fibers at the splice mounting location; and
   b) drop cables are routed through the second cable entry location and anchored to the front of the support infrastructure by the second cable anchors, the drop cables having connectorized ends that plug into the first ports of the fiber optic adapters.

23. A sealed enclosure including the cable sealant arrangement of claim 1, the sealed enclosure containing:
- a tray mount and a fiber management tray that are coupled together by a pivot interlock that when interlocked couples the tray mount and the fiber management tray together by a pivotal connection that allows the fiber management tray to pivot relative to the tray mount between a first pivot position and a second pivot position;
- the pivot interlock including a detent pivot arrangement and a guide pivot arrangement;
- the detent pivot arrangement including a detent pivot pin portion integrated with one of the tray mount and the fiber management tray, the detent pivot arrangement also including a detent receptacle integrated with the other of the tray mount and the fiber management tray, the detent receptacle being configured for receiving the detent pivot portion when the pivot interlock is interlocked, the detent pivot pin portion including a plurality of pin flat surfaces positioned circumferentially about the detent pivot pin portion, the detent receptacle defining a plurality of receptacle flat surfaces;
- the guide pivot arrangement including a cylindrical pivot pin portion integrated with one of the tray mount and the fiber management tray, the guide pivot arrangement also including a guide receptacle integrated with the other of the tray mount and the fiber management tray, the guide receptacle being configured for receiving the cylindrical pivot pin portion when the pivot interlock is interlocked, the guide receptacle having an open end positioned opposite from a closed end, the open end being configured to allow the cylindrical pivot pin portion to be inserted into the guide receptacle, the closed end including a guide surface having a concave curvature that curves along a convex curvature of the cylindrical pivot pin portion when the pivot interlock is interlocked; and
- wherein when the pivot interlock is interlocked, a pivot axis about which the fiber management tray pivots extends axially though the cylindrical pivot pin portion, the detent pivot pin portion, the guide receptacle, and the detent receptacle, wherein as the fiber management tray is pivoted between the first pivot position and the second pivot position, at least some of the pin flat surfaces and the receptacle flat surfaces engage one another to cause the detent receptacle to elastically deform and the cylindrical pivot pin portion to concurrently pivots within the guide receptacle, and wherein an interaction between at least some of the pin flat surfaces and the receptacle flat surfaces provides a tray retention force for retaining the fiber management tray in the first and second pivot positions.

24. A sealed enclosure including the cable sealant arrangement of claim 1, the sealed enclosure containing a tray and a component that detachably mounts to the tray, the tray and the component including a mechanical connection interface including:
- a first connection interface arrangement defining an attachment opening defining a groove portion and an enlarged portion, the groove portion having a length that extends along a first reference axis and a first width that extends perpendicular to the first reference axis, the enlarged portion defining a second width perpendicular to the first reference axis that is larger than the first width, the first connection interface arrangement further including a flexible cantilever latch positioned within the enlarged portion of the attachment opening, the flexible cantilever latch having a length that extends along the first reference axis, the flexible cantilever latch including a base end and a free end, the enlarged portion of the attachment opening including an interlock receiving portion defined between the free end of the flexible cantilever latch and the groove portion of the attachment opening, the free end of the flexible cantilever latch defining a stop surface, and the flexible cantilever latch defining a stop receptacle;
- a second connection interface arrangement configured to interlock with the first connection interface arrangement, the second connection interface arrangement including an interlock and a stop aligned along a second reference line, the stop including a stop surface, the interlock defining a third width that extends perpendicular to the second reference line, the third width being smaller than the second width and larger than the first width;
- wherein at least one of the stop receptacle and the stop includes a ramp surface;
- wherein the second connection interface arrangement is connected to the first connection interface arrangement by orienting the second connection interface arrangement in a first position relative to the first connection interface arrangement in which: a) the first and second reference axes are aligned; b) the interlock is received within interlock receiving portion of the enlarged portion of the attachment opening; and c) the first stop is positioned within the stop receptacle of the of the flexible cantilever latch; and then sliding the second connection interface arrangement along the aligned first and second reference axes from the first position to a second position in which: a) the interlock is received within and interlocked with the groove portion of the attachment opening; b) the stop is positioned within the interlock receiving portion of the enlarged portion of the attachment opening with the stop surface of the stop opposing the stop surface at the free end of the flexible cantilever latch; and
- wherein as the second connection interface arrangement is slid from the first position to the second position, the ramp surface causes the flexible cantilever latch to deflect from a latching position to an unlatched position, and wherein after the stop moves past the free end of the flexible cantilever latch the flexible cantilever latch elastically returns from the unlatched position to the latching position.

25. A sealed enclosure including the cable sealant arrangement of claim 1, the sealed enclosure containing a tray arrangement including:
- a first tray and a second tray pivotally connected to the first tray;
- the first tray including a first side and an opposite second side, the first side including connectorized patching or splicing functionality and the second side providing loop storage of uncut buffer tubes of a feeder cable, the first side of the first tray being adapted to anchor drop cables thereto and the second side of the first tray being adapted to anchor the feeder cable thereto; and
- the second tray having a first side providing splicing functionality and a second side managing accessed but uncut optical fibers of the feeder cable.

26. The cable sealant arrangement of claim 1, wherein the sealant includes an intermediate sealant block secured between the first and second sealant axial containment structures, the sealant also including an upper sealant block that contacts the intermediate sealant block at a first cable pass-through interface, the sealant further including a lower sealant block that contacts the intermediate sealant block at a second cable pass-through interface.

27. A sealed enclosure including the cable sealant arrangement of claim 1, the sealed enclosure containing a telecommunications device including:
a fiber management component including:
a first fiber management tray; and
a second fiber management tray, wherein the first and second fiber management trays are coupled together in a stacked relationship with the first fiber management tray defining a first side of the fiber management component and the second fiber management tray defining a second side of the fiber management component that is opposite from the first side;
wherein the first fiber management tray is a patching tray including an adapter mounting panel at the first side of the fiber management component and a splicing tray at the second side of the fiber management component;
wherein the fiber management component has a first end positioned opposite from a second end, wherein the adapter mounting panel has a first side that faces toward the first end of the fiber management component, wherein the first end is adapted to connect to a cable anchoring and sealing frame, and wherein a cover mounts over a fiber storage region located at the first side of the fiber management component between a second side of the adapter mounting panel and the second end of the fiber management component;
wherein the patching tray includes a tray platform having first and second platform portions located at the fiber storage region, the first platform portion being elevated relative to the second platform portion and being positioned between the second side of the adapter mounting panel and the second platform portion, the second platform portion being positioned between the first platform portion and the second end of the fiber management component, the first and second platform portions being vertically separated by a step defining an opening that extends through the step and across a width of the fiber management component, where a fiber coil storage space is located over the second platform portion and under the first platform portion;
wherein the fiber management component defines a fiber bypass pass-through for routing an optical fiber around the adapter mounting panel from the first side of the fiber management component to the second side of the fiber management component, the fiber bypass pass-through having an open side at an outer perimeter of the fiber management component; and wherein the cover has an outer inset portion that coincides with the fiber bypass pass-through.

28. A sealed enclosure including the cable sealant arrangement of claim 1, the sealed enclosure containing a telecommunications device including:
a tray including a cable tie-down element including an arm having first and second sides, the arm defining a first set of notches at the first and second sides and a second set of notches at the first and second sides, the first set of notches being axially spaced from the second set of notches along a length of the arm, the tray also including a shoulder axially spaced from a free end of the arm; and
a cable anchor including first and second sets of latches and a retainer, the first and second sets of latches being configured to fit within the first and second sets of notches, wherein by positioning the cable anchor such that the first and second sets of latches are received within the first and second sets of notches and then sliding the cable anchor axially relative to the arm, the cable anchor is moved to a secured position relative to the arm where the latches prevent the cable anchor from being lifted from the arm, and wherein the retainer snaps past the shoulder to an axial movement locking position when the cable anchor is slid to the secured position.

29. A sealed enclosure including the cable sealant arrangement of claim 1, the sealed enclosure containing a telecommunications device including:
a tray including first and second latches defining an anchor receiving location between the first and second latches, the tray also including an anchor support rib positioned at the anchor receiving location, the tray further including an anchor retention opening; and
a cable anchor including a first portion that snaps between the first and second latches and seats on the anchor support rib, the cable anchor also including a retention tab that fits within the anchor retention opening.

* * * * *